United States Patent [19]
Grantham et al.

[11] Patent Number: 6,073,160
[45] Date of Patent: Jun. 6, 2000

[54] DOCUMENT COMMUNICATIONS CONTROLLER

[75] Inventors: Paul V. Grantham, Burlingame; Joseph B. Lyles, Mountain View; William T. Smith, Belmont, all of Calif.

[73] Assignee: Xerox Corporation, Stamford, Conn.

[21] Appl. No.: 08/768,420

[22] Filed: Dec. 18, 1996

Related U.S. Application Data

[60] Provisional application No. 60/008,946, Dec. 20, 1995, and provisional application No. 60/008,943, Dec. 20, 1995.

[51] Int. Cl.⁷ .................................................. G06F 77/00
[52] U.S. Cl. ..................... 709/200; 709/202; 709/218; 709/219; 705/40
[58] Field of Search ..................... 395/300.32, 200.48, 395/200.5, 200.53, 200.55, 200.57, 200.58, 200.77, 200.8; 370/401, 466, 463, 400, 395, 398; 348/1, 3; 380/4; 709/200, 202, 218, 219; 705/30, 34, 39, 40, 404

[56] References Cited

U.S. PATENT DOCUMENTS

| | | | |
|---|---|---|---|
| 4,528,643 | 7/1985 | Freeny, Jr. | 705/52 |
| 4,761,780 | 8/1988 | Bingham et al. | 370/411 |
| 5,001,710 | 3/1991 | Gawrys et al. | 370/271 |
| 5,130,984 | 7/1992 | Cisneros | 370/399 |
| 5,247,575 | 9/1993 | Sprague et al. | 380/9 |
| 5,305,311 | 4/1994 | Lyles | 370/390 |
| 5,453,601 | 9/1995 | Rosen | 705/65 |
| 5,600,364 | 2/1997 | Hendricks et al. | 348/1 |
| 5,633,869 | 5/1997 | Burnett et al. | 370/396 |
| 5,634,012 | 5/1997 | Stefik et al. | 705/39 |
| 5,701,152 | 12/1997 | Chen | 348/3 |
| 5,717,691 | 2/1998 | Dighe et al. | 370/401 |
| 5,812,669 | 9/1998 | Jenkins et al. | 380/25 |
| 5,852,812 | 12/1998 | Reeder | 705/39 |

FOREIGN PATENT DOCUMENTS

| | | |
|---|---|---|
| 0 695 985 A1 | 2/1996 | European Pat. Off.. |
| 0 698 982 A2 | 2/1996 | European Pat. Off.. |

OTHER PUBLICATIONS

"All Aboard the SST," Computer Letter published by Technologic Partners, vol. 9, No. 32, Sep. 27, 1993, pp. 1–7.

Cisneros, Arturo. "Large Packet Switch and Contention Resolution Device," Proceedings of XIII International Switching Symposium–Poster Session, vol. III, Paper No. 14, May–Jun. 1989, pp. 77–83.

Lyles, Bryan. "Requirement for Authenticated Signaling," contribution T1S1.5/94–118 to Standards Committee T1S submitted Apr. 11–15, 1994.

Neuman, B. Clifford and Gennady Medvinsky. "Requirements for Network Payment: The NetCheque™ Perspective," Digest of Papers COMPCON'95 Technologies for the Information Superhighway, Mar. 5–9, 1995, San Francisco, CA, pp. 32–36.

Neuman, B. Clifford. "Security, Payment, and Privacy for Network Commerce," IEEE Journal on Selected Areas in Communications, vol. 13, No. 8, Oct. 1995, pp. 1523–1531.

(List continued on next page.)

Primary Examiner—Dung C. Dinh
Assistant Examiner—Quoc-Khanh Le

[57] ABSTRACT

The present invention is a method and apparatus for providing a general-purpose, multifunction, individually addressable, full-bandwidth bi-directional communication device with built-in Authentication, Authorization, and Accounting (AAA) capabilities that connects a home or business user with ATM and other switched broadband digital networks in a convenient, adaptable, extensible manner at reasonable cost. The device supports a Document Services Architecture (DSA) and, in particular, supports agent-based communications (including interaction with an Agent Instance Service) to ensure well-behaved communications and fair allocation of network resources among users. The device can be used in a heterogeneous environment and with different types of networks and protocols. The full-bandwidth bi-directional communication and built-in AAA capabilities of the device distinguish it from other "set-top boxes."

7 Claims, 21 Drawing Sheets

OTHER PUBLICATIONS

Shenker, Scott. "Service Models and Pricing Policies for an Integrated Services Internet," Proceedings of Public Access to the Internet, Harvard University, May 26–27, 1993.

Sirbu, Marvin and J.D. Tygar. "NetBill An Internet Commerce System Optimized for Network Delivered Services," Digest of Papers COMPCON '95 Technologies for the Information Superhighway, Mar. 5–9, 1995, San Francisco, CA, pp. 20–25.

Smith, Ted and John Stidd. "Requirements and Methodology for Authenticated Signalling," ATM Forum/94–1213, Nov. 10, 1994.

U.S. Department of Commerce/National Institute of Standards and Technology, "Digital Signature Standard (DSS)," Federal Information Processing Standards Publication 186, May 19, 1994.

DOCUMENT COMMUNICATIONS CONTROLLER

Priority is claimed from U.S. provisional application Nos. 60/008,946 and 60/008,943, both filed Dec. 20, 1995 by the same inventors and assignee.

This invention relates generally to telecommunications, and more particularly to an apparatus designed to provide a common interface between existing and future telecommunication equipment and a plurality of broadband information distribution networks.

CROSS REFERENCE

The following related application is hereby incorporated by reference for its teachings:

"PRINCIPLED DOCUMENT BANK," Paul V. Grantham et al., application Ser. No. 08/768,452, filed concurrently herewith. (Atty. Docket No. D/95287)

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND AND SUMMARY OF THE INVENTION

The present invention is an apparatus adapted to provide commonality in the interface between a user's telecommunication equipment and a plurality of broadband information distribution networks. The functionality of the present invention further includes an architecture through which a user (or more appropriately a principal) may obtain secure, authorized and billable connections to broadband networks. The invention provides a general-purpose, multifunction, individually addressable, full-bandwidth bi-directional communication device with built-in Authentication, Authorization, and Accounting (AAA) capabilities that connect a home or business user with ATM and other switched broadband digital networks in a convenient, adaptable, extensible manner at reasonable cost. The device supports a Document Services Architecture (DSA) and, in particular, supports agent-based communications (including interaction with an Agent Instance Service) to ensure well-behaved communications and fair allocation of network resources among users. The device can be used in a heterogeneous technical environment and with different kinds of networks and protocols. The full-bandwidth bi-directional communication and built-in AAA capabilities of the device distinguish it from other "set-top boxes."

It will be appreciated by those skilled in the art of telecommunications that in order to further encourage commerce via the national information infrastructure (NII) that the digital exchange of information must be facilitated. However, the goal of unlimited access to digital information or "works" has been unrecognized. This is primarily due to the lack of a mechanism or system by which an owner of a digital work can be assured of compensation for allowing authorized access to the work. This is also due to the sometimes prohibitive cost of systems and interfaces to the NII. Hence, the present invention is directed to a document communications controller that not only provides a low-cost interface to communications networks, but also provides the services necessary to assure that commercial transactions over a broadband network are authenticated, authorized and accountable.

Heretofore, a number of patents and publications have disclosed various aspects of usage rights, architectures and protocols associated with broadband communications, the relevant portions of which may be briefly summarized as follows:

In "Requirement for Authenticated Signaling: contribution T1S1.5/94–118 to Standards Committee T1S," submitted Apr. 11–15, 1994, Bryan Lyles proposed that authenticated signaling be made a part of signaling. The contribution offered two principal reasons: (a) the efficient maintenance of security, particularly in the presence of "security firewalls" as used in many companies and institutions today, and (b) the efficient prevention of fraud.

In "Service Models and Pricing Policies for an Integrated Services Internet," Proceedings of "Public Access to the Internet". Harvard University, 1993, Scott Shenker argues that an efficient integrated services Internet—his use of the term includes B-ISDN ATM service—must employ per-user, quality-of-service sensitive, and usage-based pricing policies. Implementing such policies requires that the network provider have a capability of recording network usage according to the quality of service employed, and assign costs of such usage to individual clients. Specifically, "[t]he network accounting infrastructure must be built into the basic underlying network protocols. These protocols must not only be able to support accounting, but also some degree of authentication, so that charges are not misassigned." This implies a known, defined relationship between the object that is authenticated and that against which accounting data accrues. As described by T. Smith & J. Stidd, in Requirements and Methodology for Authenticated Signaling, ATM Forum/94–1213 (SA&A Sub Working Group), Nov. 10, 1994, hereby incorporated by reference for its teachings, commerce over a broadband network requires, in addition to Authentication and Accounting. Authorization. A service provider may be satisfied that the requesting party is genuine and that an account for accrual of charges is available, but the provider may not wish to grant the request for any number of reasons, including credit standing or age. Further, Authorization may be a service that the provider wishes to "outsource" to another provider, such as a credit card organization. All of these services depend critically on Authentication and on the identification of the authenticated object with the authorized object and the accounting data accrual object. Efficiency and commerce, in turn, depend critically on the services being at least implementable in broadband protocols. If authentication is not done at call setup time, it must be done "out of band". This would be at least more expensive and time consuming, if not dependent itself on some form of authenticated signaling.

Broadband services inevitably raise issues of privacy and responsibility. Preserving the privacy of the individual within a family or other collocated group, and exercising parental norms, in the absence of user-based setup, would require individual "addresses" or some overhead-laden out-of-band scheme. Implementation of broadband telephony, especially when described as the "information superhighway" and the like, poses many challenges. It is unreasonable to suppose that the public market is going to wait for all of the necessary standards to be in place before charging ahead with what is possible, even if the approaches to the problems those standards pose aren't well treated or even posed. Establishing authenticatable, user-based communication as a basis for efficient commerce, not to mention efficient network provisioning, is a problem that must be resolved to enable electronic commerce.

At the present time, Internet security is generally handled by "security firewalls", as described by Lyles. These firewalls must examine all of the Internet packet headers passing through the firewall to verify that communication is occurring only between authorized host systems. While this security filter will work over any network, including B-ISDN, it will cause severe performance degradation of a high-speed connection, since the router software implementing the firewall may be unable to process the data fast enough to prevent slowdown. Some method is needed to inform the firewall of the source and destination systems involved in a B-ISDN connection so that the data can be passed around the firewall, if the connection is authorized, in order to avoid terminating one end of the connection at the firewall.

The present invention is directed to aspects of computer network authentication that depends on verifying the identity of a user by requiring proof of knowledge of the value of secret data. This secret data, called the "key", is unique for every user, and is used whenever the user must prove identity. A trivial version of this is the password that a user must enter in order to log in to most computer systems. A much more sophisticated and secure method is available in the federal government's Digital Signature Standard (DSS), FIPS 186, Digital Signature Specification, NIST, 1993. DSS is based on public key cryptography, which uses two separate keys, one for encryption and the other for decryption. Using the secret encryption key, the user encrypts a block of several data items to form a "digital signature". The data items and the signature are then examined by whoever must verify the authenticity of the user's identity. The digital signature is decrypted with the user's publicly known decryption key. (For example, the public key may be stored in a user directory.) If the decrypted signature forms the same data items that were also available in clear text, then the user must have known the secret encryption key, and hence is authentic. (The secret and public keys are generated in pairs, and one cannot be derived from the other.) Given the ease of administration of an authentication system based on DSS, and the fact that DSS is exportable without restriction under federal law, it is proposed here as the algorithm used in the authentication. However, the rest of this proposal would work with any digital signature or password scheme; it does not depend fundamentally on DSS.

U.S. Pat. No. 5,305,311 to Lyles, issued Apr. 19, 1994, discloses a copy network providing multicast capabilities in a broadband ISDN fast packet switch.

U.S. Pat. No. 4,761,780 to Bingham et al., issued Aug. 2, 1988, teaches an enhanced efficiency Batcher-Banyan packet switch.

In "Large Packet Switch and Contention Resolution Device," XIII International Switching Symposium—Poster Session, Vol. III, Paper No. 14, pp. 77–83 (May–June 1989), A. Cisneros teaches a contention resolution mechanism in a packet switch. The mechanism allows arbitration over a large number of input lines at a high speed.

In "All Aboard the SST", Computer Letter (Technologic Partners), Vol. 9 No. 32, (Sep. 27, 1993), pp. 1–7, describes a need for a smart set-top (SST) box positioned at the hub of a system to request services, information and programming from an upstream network, while using a VCR and TV as peripherals in a mode similar to a personal computer or workstation.

To further understand the advantages of the present invention, it is best to provide some background associated with existing or contemplated technology. First, the set-top box, where the model is that of an "information diode." Broadband transmission runs from the service provider (the "head end") to the consumer, with very low bandwidth transmission in the reverse direction. The head end has a powerful server computer, whereas the consumer has a relatively dumb box acting as the document communications controller (DCC). There is no built-in AAA; instead, authentication and authorization is per box, not per user, and accounting is handled by metering performed at the head end. The envisioned range of applications focuses on home entertainment and information services.

CommerceNet, Netscape 2.0—This model contemplates two-way communication between sellers and buyers of goods and services. Bandwidth is generally somewhat limited (MBone is a possible exception?). At either end of the communication can be a personal computer, a workstation, or a local-area network. Authentication and authorization is layered on top of the basic Internet protocol, rather than being built in from the ground up. There is no built-in accounting function. The envisioned range of applications focuses on business conducted over the Internet, which includes the provision of goods and services to end-use consumers and also interactions between businesses, including a lack of service level management businesses that act as intermediaries or brokers.

In accordance with the present invention, there is provided a document communications control device, comprising:

a processor;

a first hardware interface for establishing an interconnection between the document communications control device and a broadband network;

a customer premises equipment interface for interconnecting the document communications control device with customer premises equipment; and memory for storing code executable on said processor said code including an operating system and communications protocols to implement a plurality of document service functions including at least one of authorization, authentication and accounting.

In accordance with another aspect of the present invention, there is provided a communications system, including:

a first document communications controller comprising a processor, a first hardware interface for establishing an interconnection between the document communications control device and a broadband network, a customer premises equipment interface for interconnecting the document communications control device with customer premises equipment, and memory for storing code executable on said processor, said code including an operating system and communications protocols to implement a plurality of document service functions including authorization, authentication and accounting;

a second document communications controller also comprising a processor, a first hardware interface for establishing an interconnection between the document communications control device and a broadband network, a customer premises equipment interface for interconnecting the document communications control device with customer premises equipment, and memory for storing code executable on said processor, said code including an operating system and communications protocols to implement a plurality of document service functions including authorization, authentication and accounting; and a broadband communications network interconnecting said first and said second document communications controllers.

One aspect of the invention deals with a basic problem in broadband telecommunications (e.g., an asynchronous transfer mode (ATM) network)—that of providing a common interface for various pieces of telecommunications equipment that presently exist in a home, office or similar location. In particular, it is necessary to provide a low-cost document communications controller (i.e., a document communications controller) that may be employed as either a set-top or point of service entry unit.

This aspect is further based on the discovery of an architecture that alleviates this problem. The architecture includes a document communications controller (DCC) that not only serves as the physical interface with the ATM service, but also provides a software interface to a plurality of software modules. The combination of the document communications controller and its associated software and communications capabilities is one aspect of a communications system infrastructure that may be employed to provide secure, authorized and billable access to the ATM networks.

In a collaborative workgroup environment, the DCC provides a cost effective way of networking desktops, including video, sound, document transfer and telephone connection switching. The DCC can also be employed to connect existing local area network environments to an ATM backbone serving entire buildings. For home communications, the DCC provides a low cost method of delivering on-demand video, telephone and print distribution to the home over a single connection. It is submitted that the DCC will support telecommuting by enabling the establishment of direct video, audio and document interchange with colleagues—at a level of quality superior to ISDN environments. Moreover, the present invention enables multicasting, and the document communications capabilities of the DCC allow a consumer to exploit the most cost effective communication mode.

The system broadly described above is advantageous because it is both efficient and inexpensive compared to other approaches, while making it unnecessary to have a plurality of service access devices (e.g., one for each telecommunication device). The plurality of service access devices are thereby replaced by, or interconnect to, a centrally managed port. Moreover, the proposed document communications controller is flexible and can be adapted to provide access via any of a number of broadband communication networks. The present invention can be used to provide additional communications services to the consumer via expansion of consumer-owned services or via third party services. The techniques of the invention are advantageous because they provide a range of communication alternatives, each of which is useful in appropriate situations. A wide variety of operations can be implemented using these techniques, including the implementation of accounting, authorization and authentication for transactions accomplished via the communications networks. As a result of the invention, it is believed that consumers will be provided with a convenient, cost-competitive interface to broadband communication networks.

Figure 1:
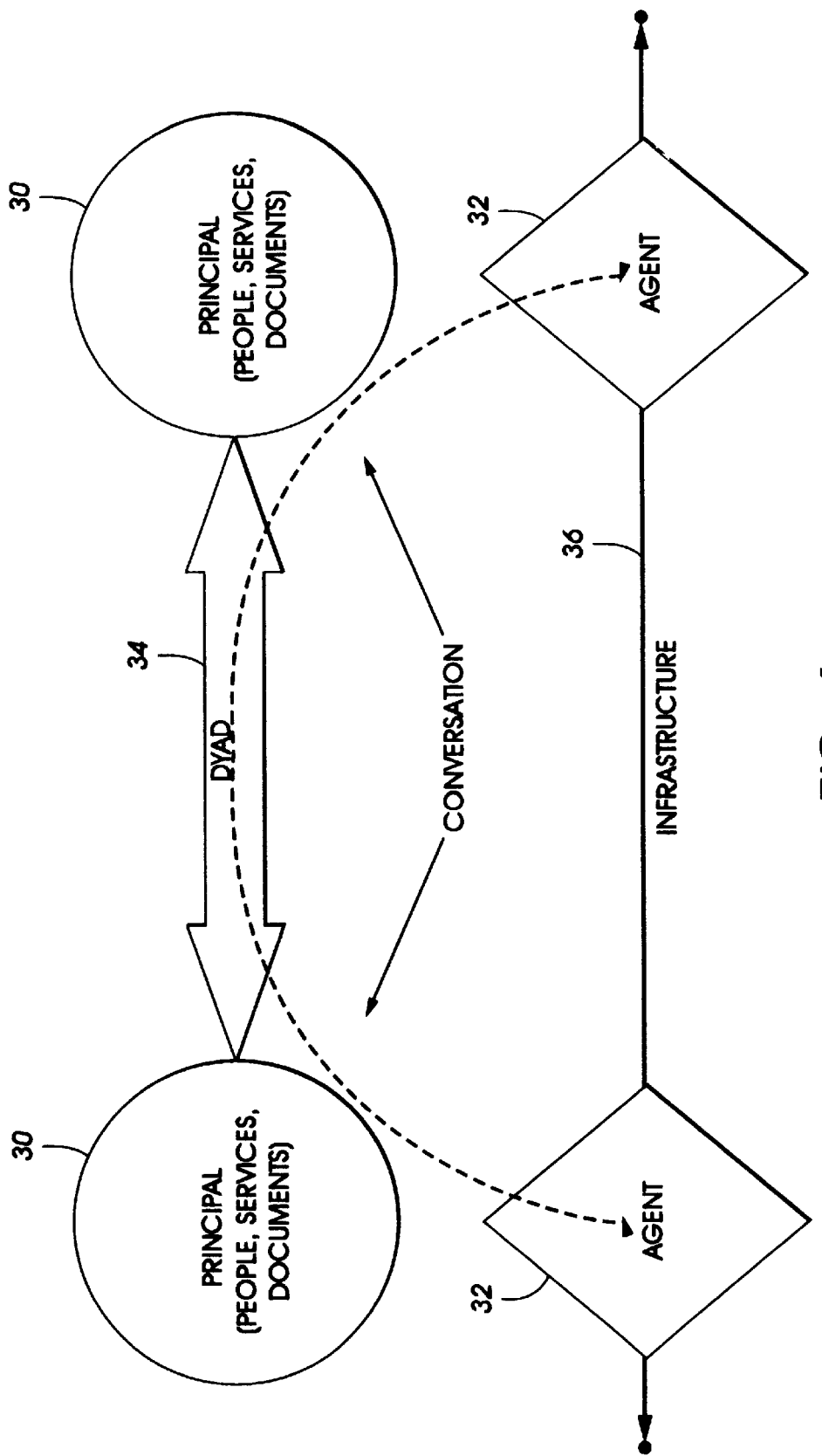
FIG. 1 is a general representation of the Document Services Architecture (DSA) for broadband communication services in accordance with an aspect of the present invention.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low." A bit is an "inverse" of another bit if the two bits have different values. An N-bit item of data has one of 2N values. A "multi-bit" item of data is an item of data that includes more than one bit. The term "data" includes data existing in any physical form, and includes data that are transitory or are being stored or transmitted. For example, data could exist as electromagnetic or other transmitted signals or as signals stored in electronic, magnetic, or other form.

"Circuitry" or a "circuit" is any physical arrangement of matter that can respond to a first signal at one location or time by providing a second signal at another location or time. Circuitry "stores" a first signal when it receives the first signal at one time and, in response, provides substantially the same signal at another time. Circuitry "transfers" a first signal when it receives the first signal at a first location and, in response, provides substantially the same signal at a second location.

A "data storage medium" or "storage medium" is a physical medium that can store data. Examples of data storage media include magnetic media such as diskettes, floppy disks, and tape; optical media such as laser disks and CD-ROMs; and semiconductor media such as semiconductor ROMs and RAMs. As used herein, "storage medium" covers one or more distinct units of a medium that together store a body of data. For example, a set of floppy disks storing a single body of data would together be a storage medium. A "storage medium access device" is a device that includes circuitry that can access data on a data storage medium. Examples include drives for reading magnetic and optical data storage media.

"Memory circuitry" or "memory" is any circuitry that can store data, and may include local and remote memory and input/output devices. Examples include semiconductor ROMs, RAMs, and storage medium access devices with data storage media that they can access. A "memory cell" is memory circuitry that can store a single unit of data, such as a bit or other n-ary digit or an analog value.

A "data transmission medium" or "transmission medium" or "communications medium" is a physical medium that transmits or transfers data from one location to another.

A "data processing system" is a physical system that processes data. A "data processor" or "processor" is any component or system that can process data, and may include one or more central processing units or other processing components. A processor performs an operation or a function "automatically" when it performs the operation or function independent of concurrent human control. A "processing unit" is a processor that is a component within another processor.

The terms "coprocessor" and "host processor" are complementary terms. A "host processor" is capable of operating independently but it can also be connected to a "coprocessor" so that the host processor and the coprocessor operate in an interdependent manner.

A signal "indicates" or "selects" one of a set of alternatives if the signal causes the indicated one of the set of alternatives to occur. For example, a signal can indicate one bit set in a sequence of bit sets to be used in an operation, in which case the signal causes the indicated bit set to be used in the operation.

Any two components are "connected" when there is a combination of circuitry that can transfer signals from one of the components to the other. For example, two components are "connected" by any combination of connections between them that permits transfer of signals from one of the components to the other.

A processor "accesses" an item of data in memory by any operation that retrieves or modifies the item, such as by reading or writing a location in memory that includes the item. A processor can be "connected for accessing" an item of data by any combination of connections with local or remote memory or input/output devices that permits the processor to access the item.

A "data unit" or "unit of data" is an item of data that a processor can access or otherwise operate on as a unit. For example, an eight-bit byte is a data unit in many data processing systems. A "block" of items of data is a number of items of data that form a sequence.

A processor or other component of circuitry "operates on" an item of data by performing an operation that includes obtaining a resulting item of data that depends on the item of data operated on. For example, the resulting item of data could result from an operation that accesses the item of data operated on or from a logic or arithmetic operation on the item of data operated on.

An "operand" is an item of data on which an operation is performed. An operation is performed "using an operand" when the operation is performed on the operand. An "arithmetic operation" is an operation that obtains a numerical result that depends on the value of an operand. Addition, subtraction, multiplication, and division are examples of arithmetic operations.

A "logic operation" is an operation that obtains one bit using each bit of an operand independent of values of other bits of the operand. NOT is an example of a logic operation that uses one operand. OR, AND, and XOR are examples that use two or more operands. Some arithmetic operations can be efficiently implemented using logic operations, but others include carrying, borrowing, or shifting, making such implementation difficult.

A "binary outcome operation" is an operation that obtains a binary result that depends on the numerical value of an operand. >, <, and = are examples of binary outcome operations. A binary outcome operation "compares" a component data item with another value when it applies one or more of the operators >, <, and = to determine how the value of the component and the other value are related. A "flag bit" is a bit indicating a result of a binary outcome operation.

A processor or other circuitry performs an operation "in parallel" on an operand that includes plural bits when a result is obtained for all of the bits at approximately the same time. The amount of time required may, for example, be a single clock cycle of a processor. A "composite operand" is an operand that includes two or more data items, referred to as "component data items" or "components." A logic operation is performed "in parallel" using a multi-bit operand when the logic operation is performed independently on each bit of the operand. NOT is a logic operation that can be performed in parallel using one multi-bit operand. AND, OR, and XOR are logic operations that can be performed in parallel using two or more multi-bit operands.

A bit in an operand of an operation performed in parallel is "aligned" with a bit in a result of the operation if the operation uses the bit in the operand to obtain the bit in the result. Similarly, a bit in a first operand is "aligned" with a bit in a second operand if the operation uses the two bits to obtain a bit in the result. A first multi-bit data item is "aligned" with a second multi-bit data item if each bit of the first data item is aligned with a bit of the second data item.

A logic operation "merges" two composite operands that include plural component data items aligned in pairs if the result of the operation includes, for each pair, one component that has the same value as one of the components in the pair.

A logic operation "selects" bits or data items from an operand if, in the result, bits or data items aligned with the selected bits or data items have the same value as the selected bits or data items while all other bits in the result have a uniform value.

A "mask operand" or "mask" is an operand on which an operation can be performed together with another operand to select bits or data items in the other operand.

A processor or other circuitry performing an arithmetic operation on a composite operand may produce an "inter-component signal." An inter-component signal is a signal like a carry signal, a borrow signal, or a shifted bit that may cause an operation on one component to affect results obtained for another component.

A binary number can be represented as a sum of powers of two. Each bit in the binary number indicates presence or absence of a particular power of two in the sum. Therefore, the "most significant bit" or "MSB" of a binary number is the bit that indicates presence or absence of the largest power of two and the "least significant bit" or "LSB" is the bit that indicates presence or absence of the smallest power of two. Conventionally, the bits of a binary number are ordered in sequence from MSB to LSB or vice versa. As used herein, "left" and "leftward" arbitrarily refer to a direction toward an MSB in sequence while "right" and "rightward" arbitrarily refer to a direction toward an LSB in sequence. The "most significant bit position" of a subarray of processing positions operating on a binary number is a position operating on the MSB of the binary number. The "least significant bit position" of a subarray of processing positions operating on a binary number is a position operating on the LSB of the binary number.

A processor or other component of circuitry "uses" an item of data in performing an operation when the result of the operation depends on the value of the item. For example, the operation could perform a logic or arithmetic operation on the item or could use the item to access another item of data.

An "address" is an item of data that can be used to address a memory cell within memory circuitry that includes plural memory cells.

Stored data can be "accessed using" or "accessible using" other data if the memory containing the stored data responds to the other data or to data that depends on the other data by permitting access to the stored data. For example, the other data may be an address, an offset used to produce an address, or a content-addressable value stored with the stored data.

An "instruction" is an item of data that a processor can use to determine its own operation. A processor "executes" a set of instructions when it uses the instructions to determine its operations. Execution of instructions "causes" a processor to perform an operation when the processor performs the operation in the process of executing the instructions. A signal "requests" or "is a request for" an event or state when the signal can cause occurrence of the event or state. To "obtain" or "produce" an item of data is to perform any combination of operations that begins without the item of data and that results in the item of data. An item of data can be "obtained" or "produced" by any operations that result in the item of data. An item of data can be "obtained from" or "produced from" other items of data by operations that obtain or produce the item of data using the other items of data.

An "amount of data" in an item of data can be measured by counting the number of units of data of a specific size in the item of data. The amount of data in a binary item of data can be measured, for example, by counting the number of bits in the item. An item of data defines an image "with an amount of data" when the part of the item of data that defines the image includes the amount of data.

An item of data "identifies" or "is an identifier of" one of a set of identifiable items if the item of data is one of a set of items of data, each of which can be mapped to at most one of the identifiable items.

An operation "encodes" items of data when performing the operation on the items of data produces different items of data from which the encoded data items can subsequently be recovered. The operation that recovers the encoded data items is "decoding."

A first item of data "indicates" a second item of data when the second item of data can be obtained from the first item of data. The second item of data can be accessible using the first item of data. Or the second item of data can be obtained by decoding the first item of data. Or the first item of data can be an identifier of the second item of data. For example, an item of data may indicate a set of instructions a processor can execute or it may indicate an address.

"Code" of "software code" means data indicating instructions, but in a form that a processor can execute or in a form that can be processed (e.g., compiled, linked, assembled) to produce a form that a processor can execute.

An item of data "indicates" a thing, an event, or a characteristic when the item has a value that depends on the existence or occurrence of the thing, event, or characteristic or on a measure of the thing, event, or characteristic.

An item of data "includes" information indicating a thing, an event, or a characteristic if data indicating the thing, event, or characteristic can be obtained by operating on the item of data. Conversely, an item of information that indicates a thing, an event, or a characteristic can be said to "include" an item of data if data indicating the thing, event, or characteristic can be obtained by operating on the item of data.

An operation or event "transfers" an item of data from a first component to a second if the result of the operation or event is that an item of data in the second component is the same as an item of data that was in the first component prior to the operation or event. The first component "provides" the data, and the second component "receives" or "obtains" the data.

An "Account Record" is a data set comprising an account-header, extension-vector(s) and trailer-record containing a common conversion identifier (CID) and globally unique identifier for a transaction method tree instance (GUTMID). An "Account-Base" is an unordered set of zero or more account records. An "Account-Entry" is a set of account records containing a common, unique GUTMID. (i.e., generated by a single transaction method tree instance), and an "Account-Journal" is a collection of account records generated by a given principal.

An "Extension-Vector" is a sub-set of an account record that consists of a principal defined collection of {LENGTH|TYPE|VALUE} attributes.

As noted above, "GUTMID" is an acronym for a globally unique identifier for a transaction method tree instance. The GUTMID is produced by a root transaction method (the transaction method instantiated by BSOM, not by receipt of a C-Begin request), and is propagated down the transaction tree constructed by subsequent invocations. The GUTMID may be used to correlate all arcs and nodes involved in a distributed, nested set of transaction method instances.

Document Services Architecture (DSA) Overview

Referring to FIG. 1, shown therein is a general representation of the Document Services Architecture (DSA). DSA is an architecture by which communication takes place between at least two principals 30. As illustrated in the diagram of FIG. 1, a principal may represent, among other things, people, services and documents. Principals, using agents 32 as intermediaries, communicate via dyads 34. A "principal" is a named set of transaction methods (TM). During the existence of any conversation between principals, there are four items of information available: (i) the name of the invoking principal; (ii) the name of the invoked principal; (iii) the name of the executing transaction method within the invoking principal; and (iv) the name of the invoked transaction within the invoked principal. "Dyads" are abstractions of a communications session representing, for example, authentication of the principals at both ends. Dyads "contain" the active conversations between two principals and, using a communication infrastructure 36, "carry" data between the two principals. As illustrated, there is precisely one agent for each active principal. The agent 32 implements the DSA communications. To provide required communication services, the agent also implements/possesses agent methods.

The DSA does not distinguish the agent's methods from the principal's transaction methods. In other words, the same object class preferably represents both sets of transaction methods. However, the DSA architecture uses different communication abstractions for the two types of transaction methods where the semantics are the same. For example, principal transaction methods may use the syntax represented by communication verbs beginning with "dyad_", for example dyad_begin represents the verb, c_begin. Infrastructure transaction methods, or "connection abstractions," begin with the text, "connection_", for example connection_begin representing c_begin. The semantics for both uses of the communication verbs are the same. So the agent provides the DSA communication application program interface (API) to principals' transaction methods. The communication services, or access to infrastructure services is provided via the agent API, but implemented in agent transaction methods. There are agent transaction methods for each of the infrastructure services (Agent Instance Service, Authentication, Authorization and Accounting) as represented by Table A.

TABLE A

| Agent Instance Service (AIS) | lookup-by-name |
| --- | --- |
| | lookup-by-address |
| | find-AIS |
| | register-principal |
| | un-register-principal |
| Authentication Service | authenticate-principal |
| Authorization Service | get-authorization-ticket |
| | get-capability |
| | validate-authorization-ticket |
| | get-access-class |

TABLE A-continued

| Accounting Service | account-open-record |
| --- | --- |
| | account-close-record |
| | account-append-record |
| | account-flush-record |

Figure 2:
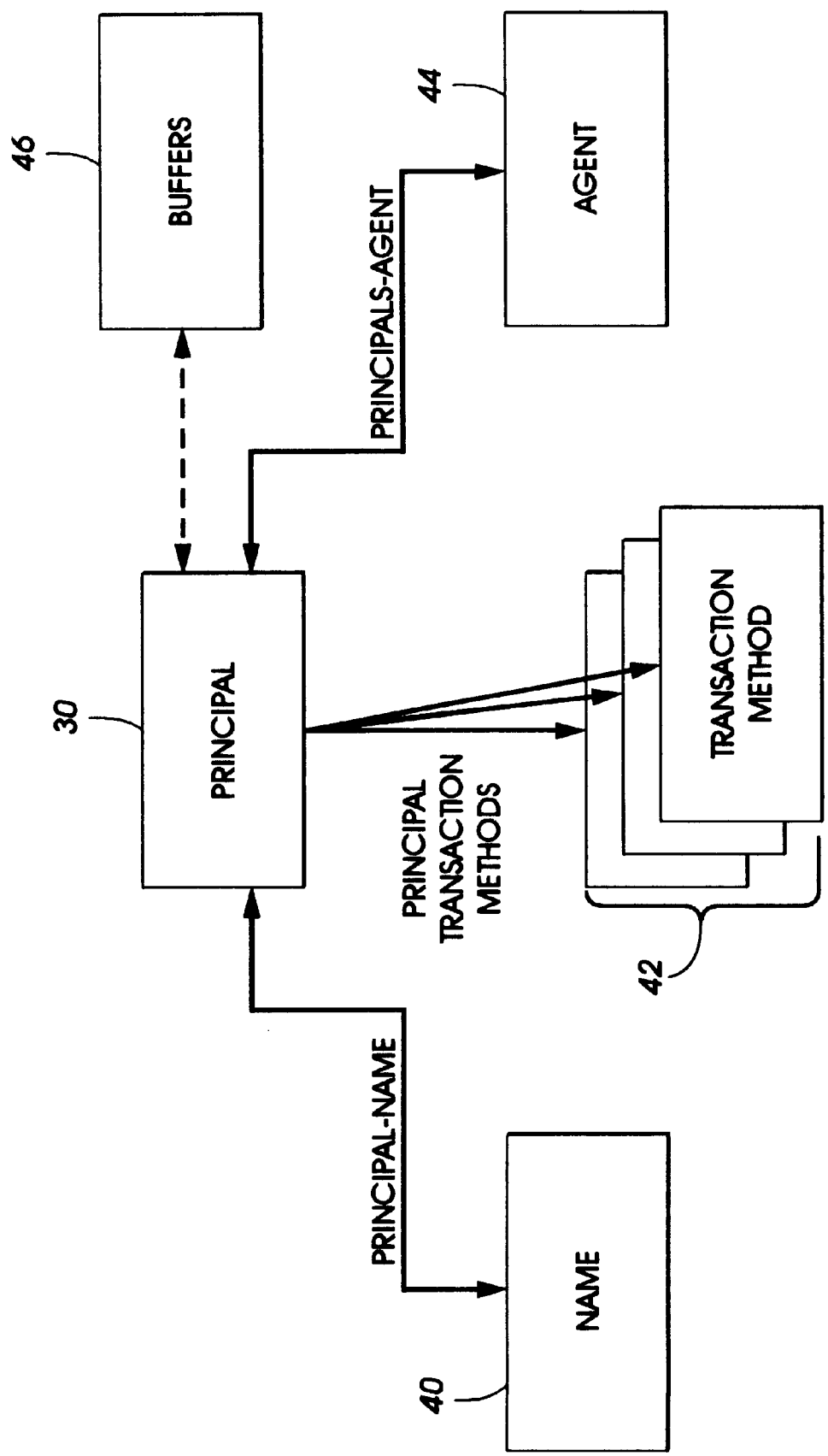
FIG. 2 is a more detailed view of the various elements that comprise a principal in the DSA of FIG. 1.
Figure 3:
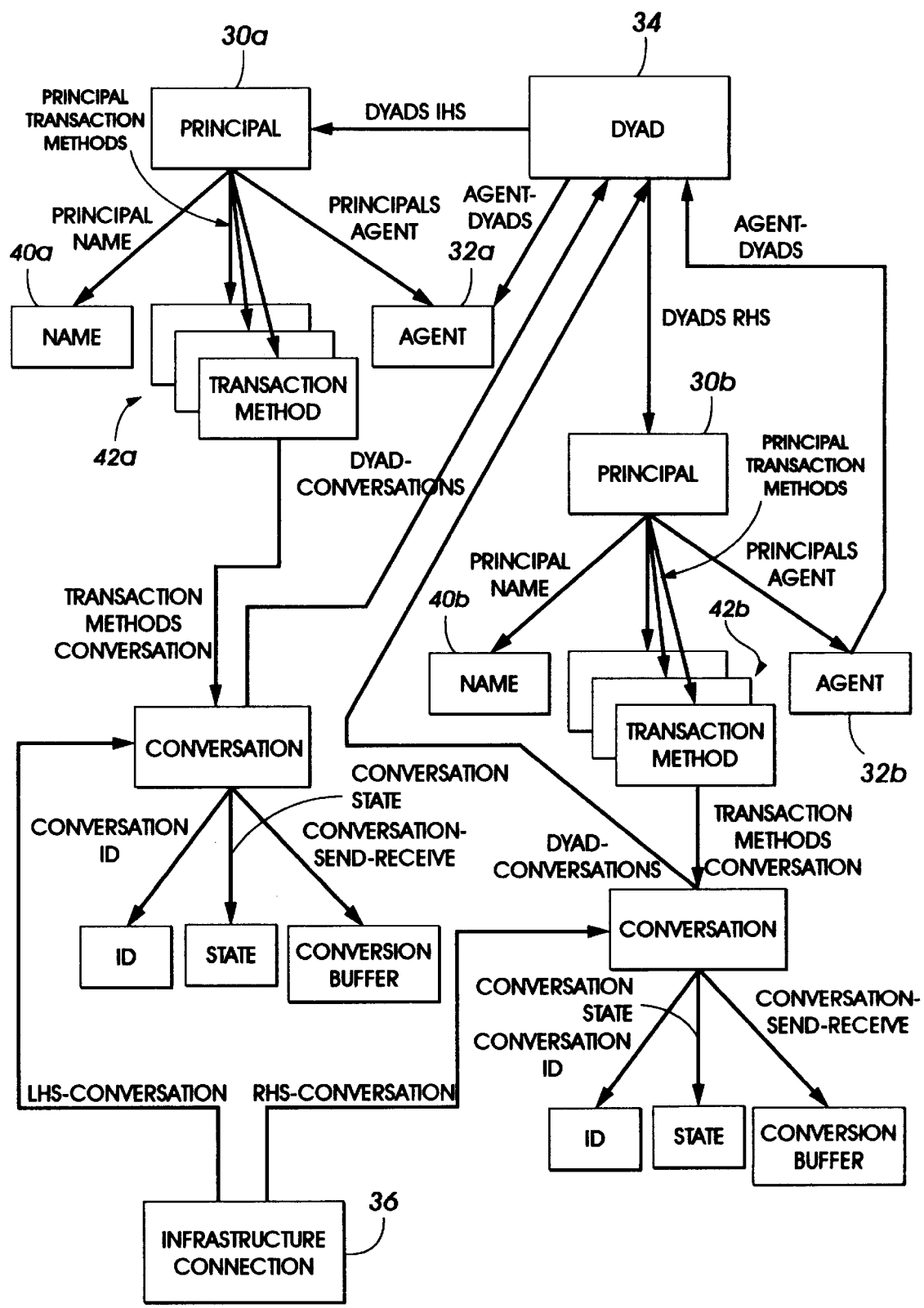
FIG. 3 is a detailed pictorial representation of the elements that form a communication dyad as depicted in FIG. 1.

As stated, communication between infrastructure services and between agents and infrastructure services are the same. The DSA communication verbs are employed for principal to principal, agent to infrastructure service, as well as infrastructure service to infrastructure service communication. Assuming two abstract syntax trees, one for each principal, as illustrated in FIGS. 2 and 3 by the rhs-principal and lhs-principal, each of the trees have defined at least the following attributes: a principal-name 40, a non-empty set of principal-transaction-methods 42, and a principals-agent 44. Recall that the definition of the principal is a named set of transaction methods. Accordingly, as depicted in FIG. 2, the principals are represented as possessing, along with the set of transaction methods, a set of buffers 46 to handle the transfer of data between Principals. Preferably, the buffers include in-data and out-data buffer "sections" (not shown) so as to provide buffering capability for bi-directional communications, principals collect data sent to and received from other principals in these buffers. At some time during a transaction, the data is transferred to a buffer managed by the conversation. However, initially the principal's buffer is the collection point for this data.

Initially, the in-data and out-data buffers (attributes) are empty. When transactions are ready to send data, the out-data buffers are filled with data. The transfer of data from one transaction method to another is represented by "moving" the data from the sending transaction method out-data buffer to the in-data buffer of the receiving transaction method.

Document Services Architecture (DSA) Environment

The DSA is implemented using a combination of hardware and software components. A listing of the infrastructure software code employed to implement DSA functionality via the DCC hardware is contained in the Appendix. In particular, the Xerox Document Communications Controller infrastructure software found in the Appendix provides secure, authorized, billable communications connections on broadband networks, enabling switched virtual circuit networks, protection against abuse of both services and content on the network, accurate accounting of the use of content delivered over the network, and accurate accounting for network facilities used by the customer based on actual usage.

The Infrastructure software consists of a set of software modules connected through a distributed network. These components may be distributed in as many nodes and servers as needed to achieve desired performance goals. The infrastructure software implements X/OPEN standard communications verbs with extensions for broadband selection. Applications can use a library that implements the communications verbs or use the events management subsystem in Macintosh or Windows 95 environments. The preferred development language is C++, although other object-oriented programming languages may be employed. The software is preferably executed on system running a multi-threaded operating system capable of providing POSIX compliant interfaces. Exemplary operating systems include, but are not limited to, Sun OS, Macintosh 7.1, Windows '95, and VxWorks.

In a preferred embodiment, the infrastructure software supports a plurality of communications protocols, including ATM at the AAL-5 interface with Switched Virtual Circuits (Q.2931) call set up standard, Ethernet (802.3), TCP/IP, and ISDN (CAPI). Security features include built-in support of Authenticated Call Set-up (ATM Forum and ANSI T.1 RFC). Any public key authentication scheme is supported including the Generic Security Services API (IETF RFC 1508), including RSA and Kerberos. An accounting record is generated during a communication session by the DSA that identifies users, documents, and methods, with user extensions for custom billing processes. It is to be further understood that accounting records may also be provided for cell usage (AAL-5) with Available Bit Rate (ABR), Constant Bit Rate (CBR) and Variable Bit Rate (VBR) service levels indications. In the DSA, data is made available through an X/OPEN API verb set. The system can be fully managed with any SNMP system management tools, include HP-OpenView.

In a preferred embodiment, the hardware platform on which the DSA is installed would include: at least 1 Megabit of RAM and be capable of an aggregate throughput rate of up to 155 Megabits per second. In addition, the platform should support unlimited simultaneous virtual communications channels (VCCs) so as to maintain an average call set up time of about 20 milliseconds.

The software found in the Appendix fits in a complete system architecture, with third party, and customer developed system components. The architecture supports natural communications between people, documents, and the services performed on documents. This general architecture allows development of complex communications solutions that are media independent, spanning video, audio, and text. All communication is fully symmetric, that is, it sends and receives with the same format and capacity.

Figure 4:
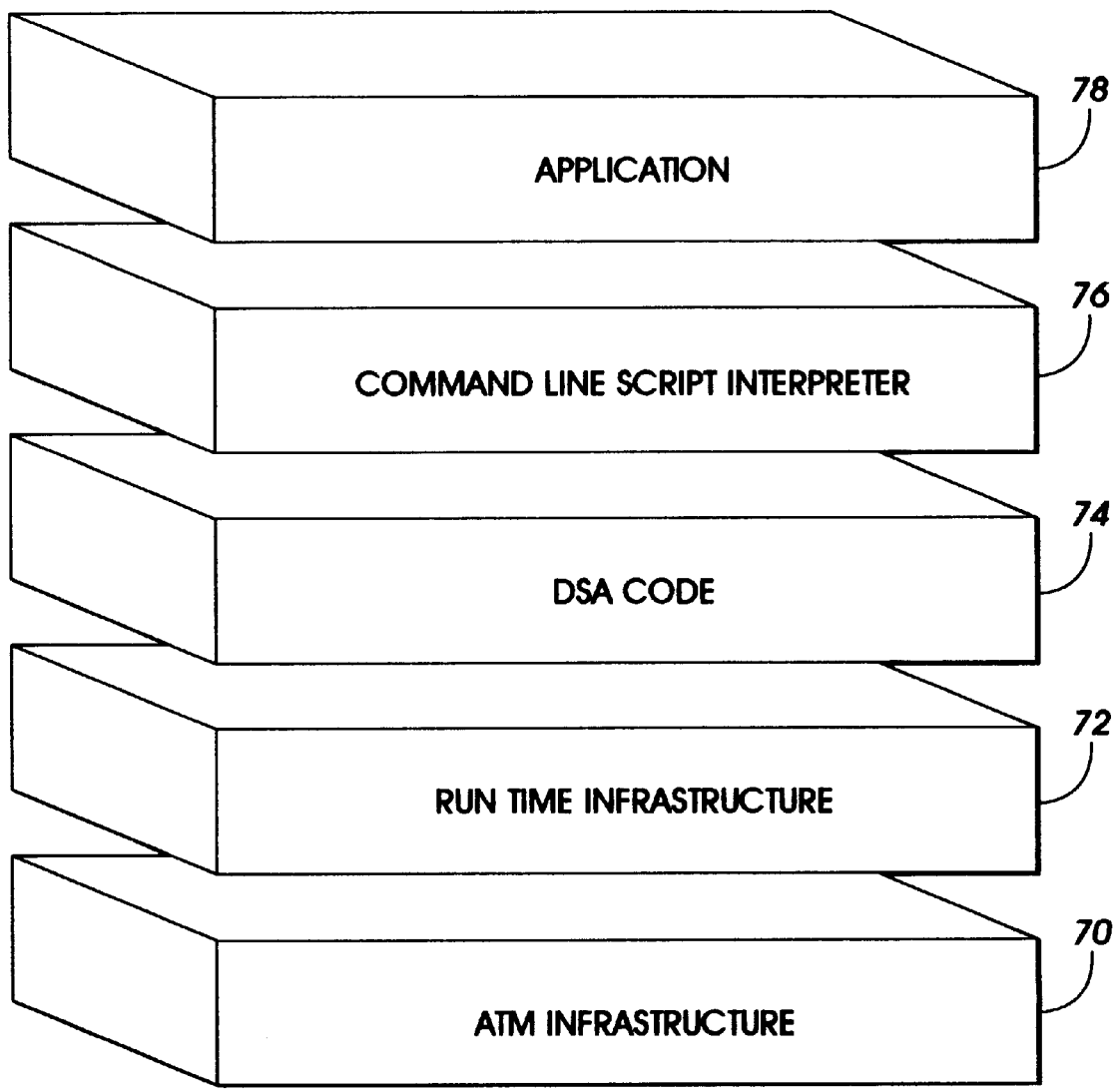
FIG. 4 is a diagram depicting the hierarchical model of the levels of the DSA.
Figure 5:
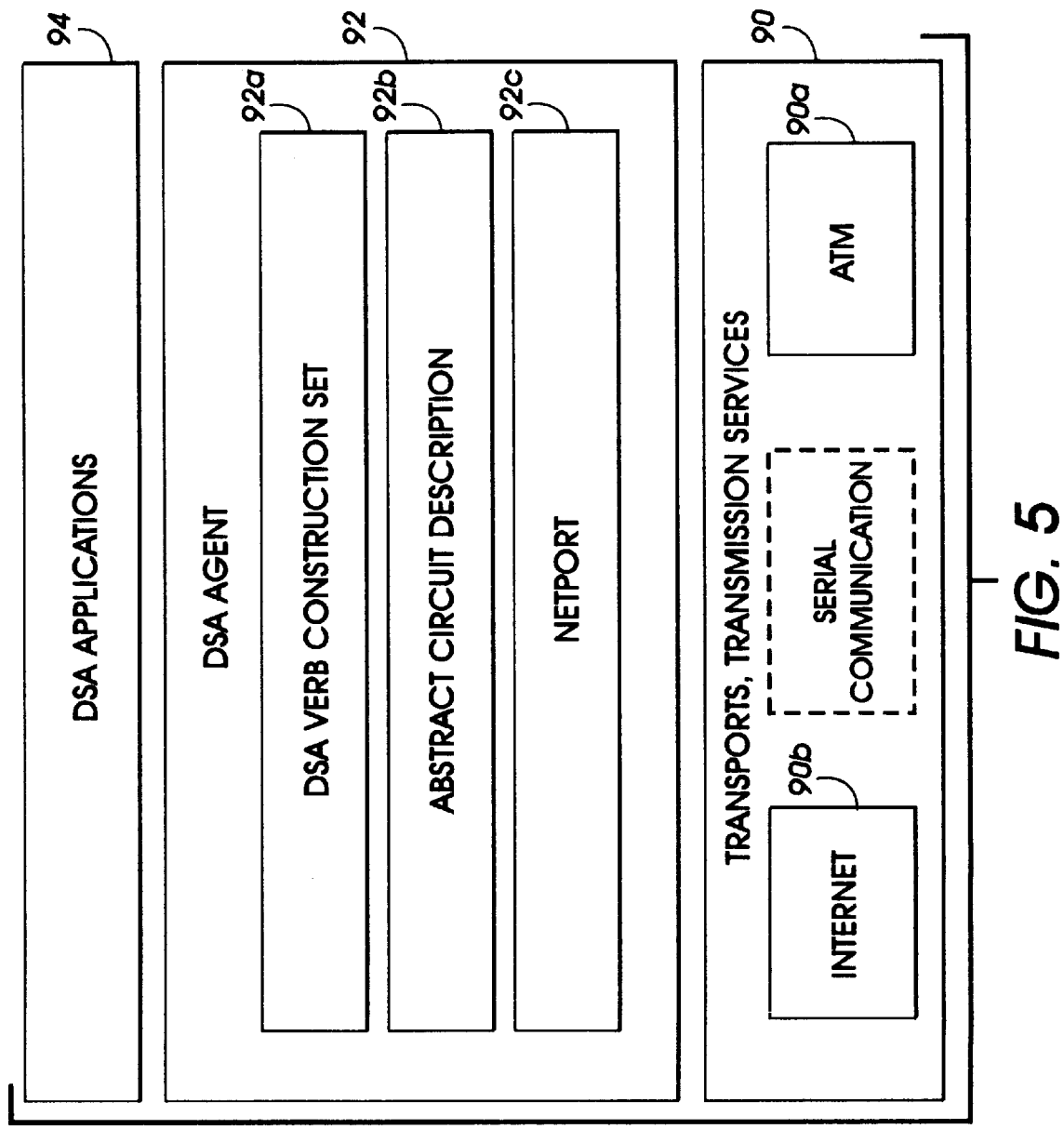
FIG. 5 is a is a more detailed diagram of the software architecture in the DSA code level of the present invention.

FIGS. 4 and 5 illustrate, respectively, a high level software environment and a general architecture of the DSA software code. Referring to FIG. 4, depicted in the software environment is a lower level infrastructure block 70 that represents, in one embodiment, an ATM infrastructure over which the principals of FIG. 1 establish dyads to accomplish communication. Above the infrastructure level is software associated with the development environment 72 for the DSA system. In particular, development environment level 72 contains software that not only provides the interface to the infrastructure but provides functionality to enable the monitoring of the DSA system in a development mode. On top of the development environment software, resides the DSA software code that implements the functionality described in association with the present invention. In particular, the software includes functionality, as described herein, associated with the AIS, Authentication, Authorization and Accounting. The application level software, level 78, interfaces to the DSA level via a command line interpretation level 76 so that commands from the application level may be employed to invoke specific functionality in the DSA code level 74.

As illustrated in FIG. 5, the DSA code consists of three general levels, 90, 92 and 94, each organized in a hierarchical fashion to build upon the functionality of the level below it. More specifically, level 90 contains the transport and transmission services of the DSA code. As depicted, these services provide the interface "hooks" to provide access to the infrastructure level 70 of FIG. 4. Specifically supported are ATM (90a) and Internet (90b) infrastructures, however, the invention is not intended to be limited to such infrastructures. The next level of the DSA code is the DSA Agent code, level 92, where the verb set 92a for the various code objects is contained. Lastly, lying on top of the AIS is the DSA Application layer, layer 94, where the Authorization, Authentication and Accounting functions are implemented. Having described the general software architecture of the DSA, attention will now be turned to describing the specific functionality of the various components therein.

Agent Instance Service (AIS)

The Agent Instance Service (AIS) is a distributed location function, providing addressability to principals by binding their network address, also referred to as a substrate address, to a principal's name. Other principals and services use the AIS to acquire addressability to a given principal. The agent instance service is distributed in the sense that there can be many instances of an AIS, but principals are aware only of a single, unified service. In the DSA, there is a distinct functional domain of agent instance services. Furthermore, DSA uses functional domains to allow different infrastructure services to employ different distribution properties. In one embodiment, the contents of the functional domains are perishable a (not preserved across service instance failures) volatile (the rate of change is expected to be great) and they are partially inconsistent (for a given principal, the state of one AIS may be at variance with the state of another, or at variance with the state of a principal's agent). The protocols are preferably designed to tolerate such inconsistency, and the consistency of agent and AIS state machines converges over time.

The distribution algorithms used by the AIS are probabilistic. Each AIS maintains a record of the probable contents of those adjacent (directly addressable via the substrate network) to it. These records are not perfectly accurate, but their accuracy may be tuned to trade off the number of false resolutions against the costs of maintaining the records. The records are maintained by the use of Bloom filters, which are essentially multiple hash functions. For each principal registered in an AIS instance, the service keeps the principal name and one or more substrate addresses. Addresses are grouped according to protocol suite, and each suite is called a family. The collection of a name, one or more families, each of which contains one or more addresses, is called an AIS entry. In the preferred embodiment these objects are respectively defined as:

AIS-ENTRY—a subtype of the agent instance service

PRINCIPAL-NAME—an attribute of a principal

ADDRESS-FAMILY—a subtype of infrastructure services

NET-ADDRESS—an attribute of address-family

Because an AIS domain may be very large (e.g., intercontinental), a principal's name and address list are kept in only one copy of an agent instance service. Substrate adjacent AIS instances carry only a Bloom filtered bit vector of the probable contents of the service instance holding the complete AIS entry (name, families, and addresses). These vectors are called probability vectors, and are defined as AIS-PROBABILITY-VECTOR—a subtype of agent instance service.

An agent instance service exports four major functions that are accessible by the DSA Application layer 94, expressed herein as transaction methods:

AIS-REGISTER requests that an AIS entry be created containing a principal name, address family, and substrate network address. Assuming the request is authentic, if no such name exists in the local name list, and probably does not exist in adjacent AIS services, the entry is added to the local name list and the probability vector is changed to reflect the new name.

If the name does exist in the local name list or any probability vectors, the request represents the registration of a surrogate agent (again assuming the request is authentic).

AIS-RESIGN requests the removal of a named AIS entry. The local name list and probability vectors are modified, and the vector scheduled for broadcast to adjacent services.

AIS-RESOLVE-NAME causes a search for the name in the local name list and all probability vectors. If the name exists in the name list address families and associated substrate addresses are returned to the invoker. If the name probably exists in an adjacent AIS service, the request is forwarded to that service instance.

AIS-RESOLVE-ADDRESS causes a search of the AIS entries for address family and network address combinations that match those in the request. principal names associated with any matches are returned to the invoker.

"Verbs" are calls or commands uttered by programs running in the agent instance service environment 92a. These programs (see Appendix) may or may not be transaction methods (in the strict sense), which may or may not be members of a principal. They are simply calls to the underlying agent instance service, and are distinguished from architected transaction methods that may employ them.

AIS-ACTIVE Informs an AIS that a principal name and one or more substrate addresses are to be placed in an AIS entry in the local name list. This verb registers a principal as a operational member of a DSA network. When a principal-address binding is placed in the local name list, the probability vector representing the contents of the list is updated, and the vector is scheduled for broadcast to adjacent AIS instances.

AIS-ACTIVATE Causes the AIS to issue an activation order to an agent/principal pair at the substrate address specified in the call. The principal may or may not be present and able to answer the order. ACTIVATE produces the same effect that ACTIVE does, but is directed to a principal rather than initiated by it.

AIS-INACTIVE Informs an AIS that a principal has exited or "logged off" a DSA network. The principal name and associated addresses are removed from the local active name list, and the probability vector is updated and broadcast accordingly.

AIS-DEACTIVATE Causes the AIS to issue an activation order to an agent/principal pair at the substrate address specified in the call, but is issued by a third party.

AIS-ADD-ADDRESS Adds an address family and network address(es) to an existing AIS entry, or adds one or more network addresses to an existing address family in an AIS entry.

AIS-DELETE-ADDRESS Removes a substrate address from an address family in an AIS entry. If no effective address remain in an address family, the family item is also removed from the AIS entry.

AIS-RESOLVE-NAME Searches the local AIS entry list for the supplied principal name, and returns any address families and network addresses associated it if found. If the principal name does not exist in the local list, the call returns the AIS identifiers of any probability vectors that indicate they might contain the principal name entry.

AIS-SET-VECTOR-ATTRIBUTES Sets the values associated with a probability vector and its Bloom filter. These attributes (vector width and depth) determine the likelihood of both true and false "hits" for a given (principal name) search argument. They also determine the resultant size of the vector, and therefore the overhead -along with frequency- of maintaining consistency.

AIS-GET-VECTOR-ATTRIBUTES Returns the values governing a given probability vector.

AIS-SET-VECTOR Establishes a probability vector image, associated with a particular AIS instance, in the AIS in which the call is issued. If the AIS instance represented already has a vector associated with it, that vector is replace by the one supplied in the call. If the AIS instance name supplied is the local AIS, the local probability vector is the target vector.

AIS-GET-VECTOR Returns the probability vector image associated with the AIS instance named in the call. If the AIS instance name supplied is the local AIS, the local probability vector is returned.

Authentication

As used herein, the term "authentication" represents the reliable establishment of the identities of the principals in a communication system. Principals "authenticate" themselves when they register in the system. i.e., at the time that the agent registers them in the AIS. This requires an application program interface for the authentication service that executes a function characterized in words as "register me in an AIS". In the DSA, a principal must be registered before it can use services or communicate with other principals. The following describes the architecture of the Authentication Service (AS) in DSA, and its interaction with principals and other infrastructure services. Also discussed are the authentication/verification requirements for all of the interactions between actors in the DSA system—principals and infrastructure services. It is assumed that the Authentication Service is secure, i.e. that it cannot be penetrated, commandeered, or destroyed by an intruder or nature. In other words, this architecture is secure only to the extent that the AS is. There is no such assumption made about the AIS however; it is assumed that all of the information stored in the AIS's Registration Data Base is readable by anyone, and that recovery must be possible from an AIS failure.

In the DSA, a principal must be registered in the AIS before it can use services or communicate with other principals. The AIS contains information about all of the principals that are currently active in a DSA system, including all of the principal's addresses in all address families, and information necessary to validate the principal's signature, referred to hereafter as the "signature key." There is no particular key length or type required, rather the properties of the signature key depend on the particular security mechanisms adopted for communication between principals and between a principal and an Infrastructure service.

Figure 6:
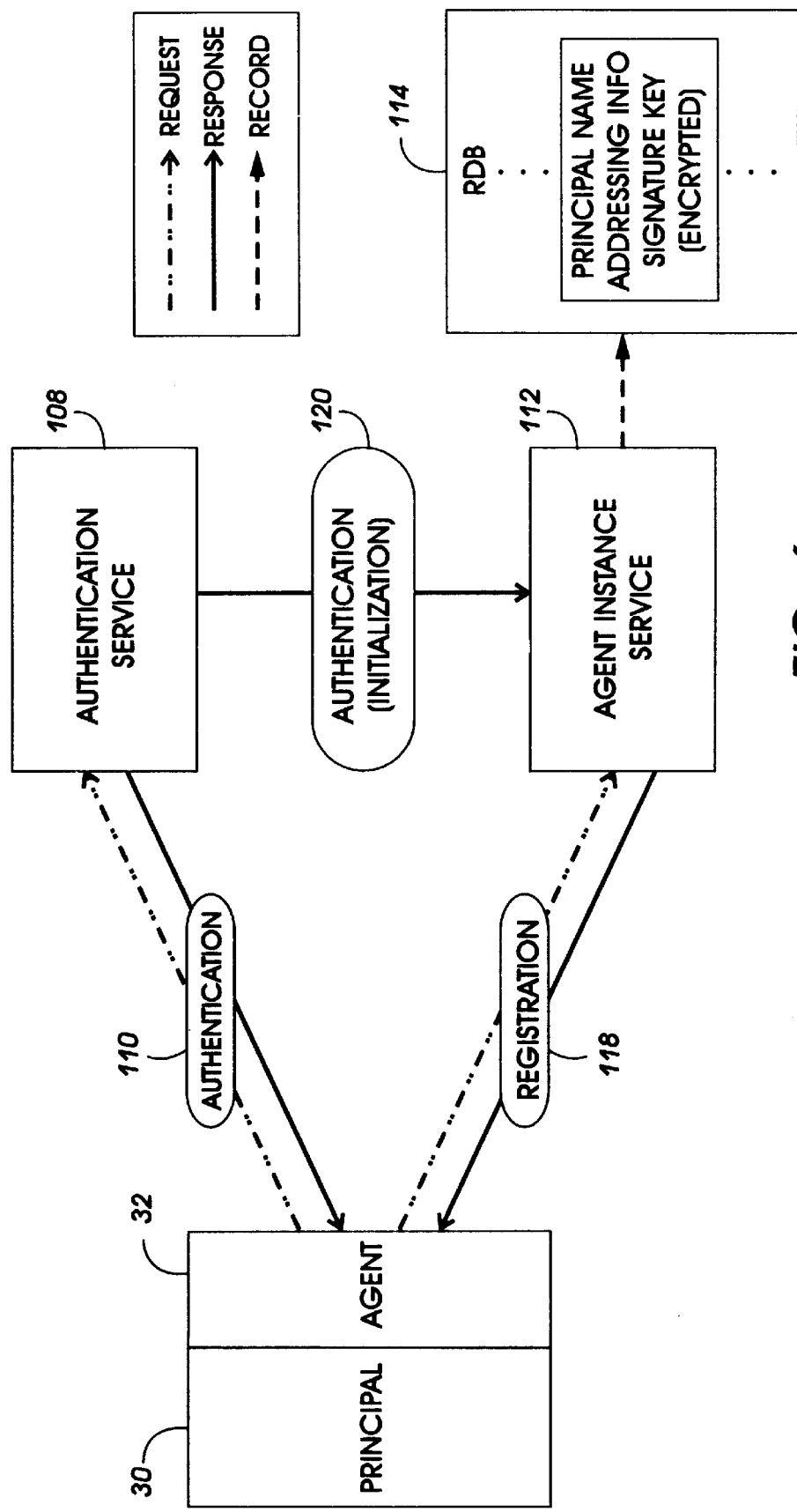
FIG. 6 is a data flow diagram illustrating the authentication process carried out in accordance with an aspect of the present invention.

Referring to FIG. 6, in order for a principal to register, it must first be authenticated. The nature of authentication is that the principal 30 first "proves," to the Authentication Service 108, via agent 32, that it is who it says it is; it reliably establishes its identity. The Authentication Service then sends the principal the information it needs to sign its correspondence, i.e. its signature key, and a token for registration that will be honored by the AIS. This is shown as step 110 in FIG. 6. In step 110, the principal (agent) sends the required information, including its identification, its address families and addresses, and the authentication token to the AIS 112. AIS 112 extracts the principal's signature key from the registration token and stores information about the principal in the Registration Data Base (RDB) 114. The RDB is preferably a table of information about principals, indexed by principal-Name. There is no requirement that it is "relational", on magnetic media, or implemented any particular manner. This registration operation is represented as step 118. Note that since RDB 114 associated with AIS 112 can be read by anyone, the signature key must not be stored in the clear. The copy of the signature key that the AIS extracts from the Registration Token has been encrypted by Authentication Service 108 in step 110. Later, the Authentication Service may retrieve and decrypt this key in order to verify the principal's signature.

Also depicted in FIG. 6 is an initialization step 120 in which the AIS is authenticated. As part of this step, the AIS receives the information it needs to decode registration tokens sent to it by registering principals. Note that the Authentication Service creates and initially knows a principal's signature key, but forgets it until it is needed for signature verification. The AIS stores the signature key, but does not know it. The principal receives a Registration Token created by the AS, but cannot read it or create it, it can only be read (but not created) by the AIS. Once the principal has been registered, it is ready to communicate with other entities in the DSA system.

Figure 7:
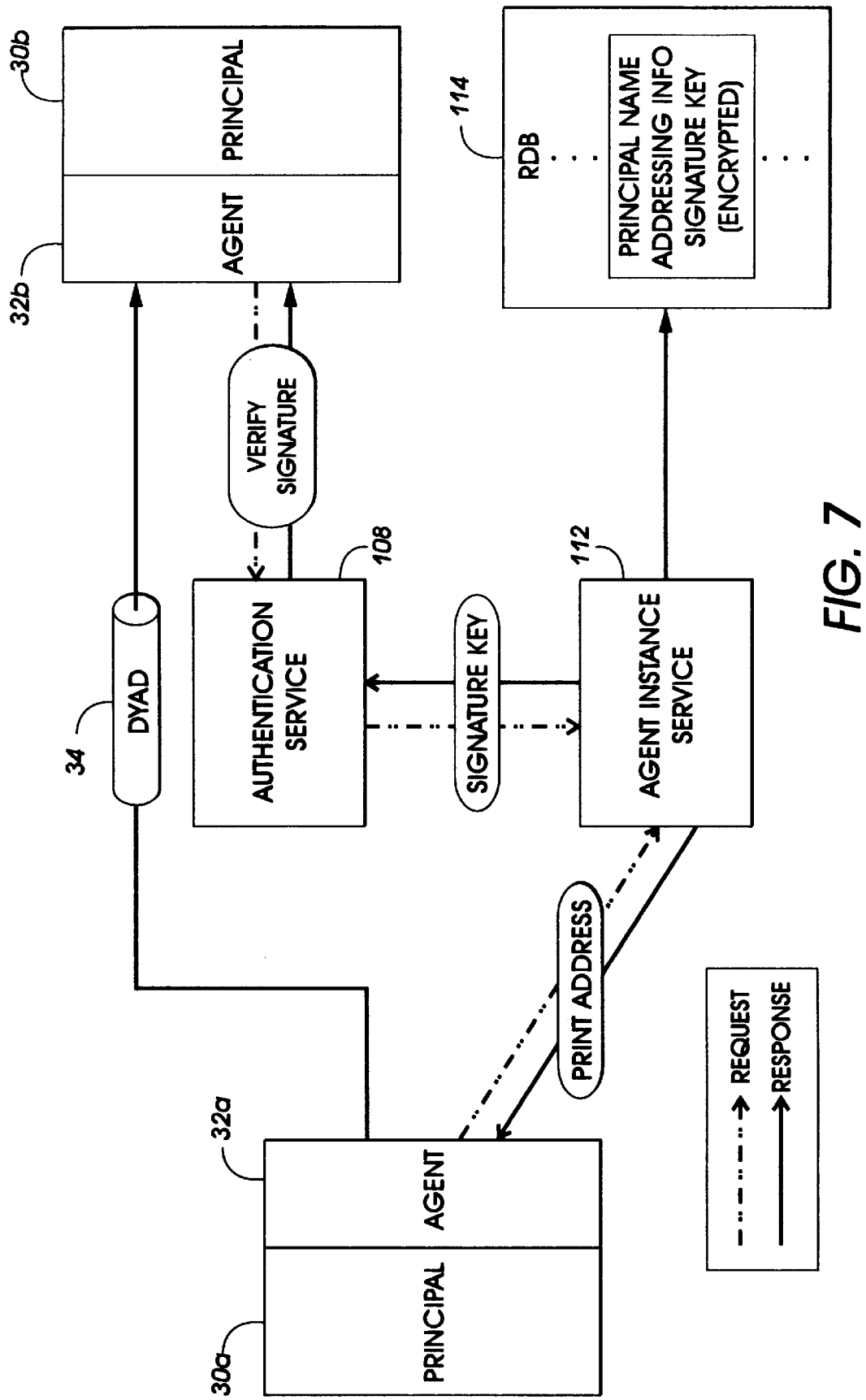
FIG. 7 is a data flow diagram illustrating the establishment of a dyad.

Turning now to FIG. 7, depicted therein is the data flow during establishment of a dyad 34 between two principals, 30a and 30b. Initially, principal 30a must obtain an address for the entity with which it wishes to communicate, shown here as principal 30b. This is accomplished by having the principal 30a's Agent 32a interrogate the AIS 112. In the preferred embodiment, the principal issues a c-begin verb. It uses the signature key it received from the Authentication Service 108 to form its own signature. Subsequently, Agent 32b for principal 30b requests the Authentication Service to verify the signature of principal 30a. To satisfy this request, AS 108 must obtain principal 30a's encrypted signature key from AIS 112, and decrypt it. Once principal 30a's signature is verified, AS 108 sends principal 30b the information required to enable secure communication between the principals.

In order to assure the trustworthiness of the communication (dyad) between the principals depicted in FIG. 7, the following must be true:

1) The Authentication Service must be secure (i.e., it must not be possible for another entity (intruder) to impersonate this service).

2) There must be confidence that the credentials used by the principals to prove their identities are unforgeable and not stolen.

Also important with respect to the Authentication process is the use made of the Generic Security Services Application Programming Interface (GSS—API) by the Authentication Service and entities that make use of it. Further details of the GSS-API can be found in RFC 1508 "Generic Security Service Application Program Interface", J. Linn, September 1993, and subsequent draft work on GSS-API, Version 2 by the IETF Common Authentication Technology (CAT) Working Group, the relevant portions of both works being hereby incorporated by reference for their teachings. Use of the GSS-API enables the choice of specific authentication schemes by DSA systems, ranging from no authentication through Kerheros-style authentication based on shared secret keys to public key systems employing X.509-style certificates (as described in TTU Recommendation X.509, "The Directory—Authentication Framework", Melbourne, 1988). GSS-API enables the use of different authentication mechanisms for different contexts and system elements. For example, the initial interaction between a principal and the Authentication Service might use a public key authentication scheme that depends on accessing the principal's certificate from a trusted directory, while the interaction between principals might be authenticated by using the signature key as input to a digest (hash) of the initial message. The former is computationally intensive and time-consuming, but only has to be done once when the principal registers. The latter is quick and affordable for pairwise mutual authentication of every conversation. The GSS-API makes the choice of security mechanism transparent to the application, and allows different choices to be made for different interactions and for different classes of systems.

The implementation of the services provided by GSS-API is called the "mechanism" The central idea of GSS-API is to separate the application functions from the methodology used to provide security, so that in principle, the application software need not know what type of cryptography and other methods are being employed to protect communications. (The application may have security requirements that mandate the choice of certain such methods and exclude others)

In the simplest and least secure implementations of DSA, the AIS and other infrastructure services will be authenticated once as the DSA network system is initialized. The mechanism that supports authentication need not be the same as any of those used for other interactions. If the AIS is initiated under the control of a trusted human operator able to observe the results of the interaction and subsequent states of the services, then the operator can vouch for the authenticity of the AIS. In a more secure implementation with multiple instances of the AIS, a more elaborate mechanism is required, perhaps even a public key mechanism (e.g., SPKM) that requires each instance of the AIS to have its own credential, and that requires the AIS to he re-authenticated after the expiration of a certain amount of time. No matter what mechanism is employed, one of the results of the initial interaction between AIS and the Authentication Service (AS) is that the AIS must be able to subsequently verify that principals trying to register with the AIS have been authenticated. A preferred method of accomplishing this would be as follows:

1) After establishing the authenticity of the AIS, the AS provides a key that the AIS can use to decrypt tokens it receives from registering principals;

2) As each principal is authenticated, the AS provides a registration token encrypted with the key sent to the AIS. The registration token must include the principal's signature key and might include the name of the principal, a time stamp, and other information to enable positive identification of the principal, and prevent replay; and 3) When the principal registers with AIS, it presents the registration token to the AIS to decrypt.

The interaction between the principal and the Authentication Service (AS) ultimately depends upon the service domain structure(s) of the DSA network system different methods of distributing the AS and AIS, and the association of infrastructure service instances with principals that use them. It is understood, however, that this the interaction described is one that most well-known authentication methods have been designed to work with, and any of such methods would work for DSA. Preferably, a symmetric key mechanism,(e.g. Kerberos), or an asymmetric key mechanism, (e.g. SPKM), would be employed. The interaction only occurs once when the principal initially attaches to the DSA network, so high performance is not considered to be an issue. For some DSA systems a very large population of potential principals is anticipated, most of whom may have credentials that were not originally produced by the DSA system. This and the previous point suggest the use of a public key system like SPKM. The AS must produce a registration token as part of the interaction. The registration token includes the name and other information about the principal encrypted in a manner that the AIS can decipher, and the principal's signature key encrypted in a manner that only the Authentication Service can decipher. The AS also generates a signature key, and returns it securely to the principal. If a public key authentication mechanism is being employed, the signature key can be encrypted with the principal's public key, which makes it opaque to all but the possessor of the principal's private key, i.e. the principal. If a symmetric key mechanism is used, the signature key could be encrypted with the principal's symmetric key, or it may even be the principal's symmetric key.

The principal proves its identity to the AIS by means of the registration token generated by the AS during the interaction described is the previous section. The format of this token depends on the GSS mechanism used between the AS and AIS. The token is opaque to both the principal and any other party that observes the interaction between the principal and AIS. The simplest way to meet all of these requirements is to select a mechanism for the AS/AIS interaction that supports the combination of the principal's identity proof and signature key into a single token encrypted with a confidentiality scheme. When the principal registers with AIS, it sends this token both to prove its identity and to provide the AIS with its signature key. Note that a secure exchange of the token is required between the AS and the principal during authentication, in order to prevent an intruder from stealing the token in order to impersonate the principal.

The token can be sent in the clear to the AIS during registration. This implies that there is no requirement to use the GSS-API in this interaction, although the uniform use of GSS throughout DSA provides consistency. Similarly, the principal with infrastructure services interaction could use the same mechanism as the principal/principal interaction described above.

Authorization

As used herein, the term "authorization" refers to the control of access to information resources by "authenticated" principals. Authorization is the responsibility of the responding principal or infrastructure service. In one embodiment, the authorization is established by ascertaining the identity of the initiating principal. A service provider may be satisfied that the requesting party is genuine and that an account for accrual of charges is available, but the provider may not wish to grant the request for any number of reasons, including credit standing or age. Further, Authorization may be a service that the provider wishes to "outsource" to another provider, such as a credit card organization.

Accounting

As used herein, the term "accounting" means the recording of what has been done by an "authenticated" and "authorized" principal as well as the time at which it was done.

The accounting service is a service in DSA that collects accounting information accumulated by principals and their agents. As noted above with respect to FIGS. 2 and 3, a given transaction tree may invoke many transaction methods in many different locations, and the accounting data needs to be collected in one place and to be consolidated. The agents cache information (referred to as a "four-tuple") identifies the invoking principal and transaction method, the invoked principal and transaction method. These entries are time stamped, and eventually forwarded to the accounting service. Agents export simple verbs so that principals can append service-specific information that is captured by the agents.

The accounting service is only the collector of this information; transforming it into actual costs is preferably performed by a separate billing service that is not part of the infrastructure. The accounting model is based in part on the definition of a principal: a named set of transaction methods. During the existence of any conversation between principals, there are four items of information available as follows:

the name of the invoking principal;

the name of the invoked principal;

the name of the transaction method executing within the invoking principal; and the name of the invoked transaction method executing within the invoked principal.

The accounting records generated for a conversation between two principals are listed in Table C:

TABLE C

| Account-Record | Extension-Header | Extension-Vector | Trailer-Record |
| --- | --- | --- | --- |
| Length | CID | Length | CID |
| Type | GUTMID | Type | Gutmid |
| P-i |  | Value | Time-Stamp |
| TM-1 |  | Billable? | Status |
| P-2 |  |  |  |
| TM-2 |  |  |  |
| CID |  |  |  |
| GUTMID |  |  |  |
| Billable? |  |  |  |
| Time-Stamp |  |  |  |

Account records are recorded in the functional domain of a given transaction method execution and the agents of the principals executing each transaction method will collect and accumulate the journal entries. Account records may be forwarded to an accounting service by the agents at the end of a conversation (push), or account records may be forwarded when accounting service requests. (pull). Account records are posted to the journal in the appropriate accounting service in a functional domain.

As with the services previously described, the accounting service employs a set of verbs to support the functions provided by the accounting service. The following verbs are functions in the agent protocol boundary:

Account_Open_Record creates an accumulation space within the agent and writes an account record 4-tuple containing the principal names (issuing and partner), their transaction method names, and a time stamp.

Account_Append_Record adds an extension vector to an account record.

Account_Close_Record closes an account record by generating a trailer-record to indicate the closing timestamp of the conversation and marks the record eligible for movement to an accounting service.

Account_Flush_Record requests the agent to forward accumulated account-records to an accounting service.

The following verbs are functions provided by the accounting service:

Account_Forward copies an account record from the specified accounting base to another accounting service.

Account-Retrieve requests the agent of a principal to flush the records to a particular accounting service. This is the "pull" approach of the "account_flush_record".

Account_Delete_On_Attributes removes accounting records from the specified accounting base, based on attributes values. Depending on the attributes specified, Account_Delete_On_Attributes can be used to erase records, entries, journals, or other organized collections.

Account_Extract_On_Attributes returns account records based on attribute values. Depending on the attributes specified, Account_Extract_On_Attributes can be used to retrieve records, entries, journals, or other organized collections.

Referring again to FIG. 3, in a preferred embodiment, each conversation has two half-conversations. For each half-conversation, the agent will generate one account-record (Table C), zero to many extension-vectors, and one trailer-record. The account-type, will have an integer value, e.g. account-type=1. The range 1–32471 is reserved for DSA internal use. The range of 32472–58467 will be used for customers. A trailer record will be generated when the conversation is terminated. This trailer record will have the conversation id, GUTMID, the terminating time-stamp and the status of the conversation. The status field in a trailer-record tells of the normal (called by c_end) or abnormal termination (called by c_end with "abort" as a parameter) of a conversation. The two accounting records generated for each conversation (one for each ½ conversation) will have the same data except the 6 tuples. The value for P-1, TM-1, P-2, TM-2 and CID will be different. The lhs-record will have P-1 as the invoking principal, TM-1 the invoking TM, P-2 as the invoked principal (it may not have the TM-2 data, e.g., Lance, "View movie", Susie's video, "xxxx", 88). The rhs-record will have the P-2 as the invoked principal, TM-2 as the invoked TM, P-1 as the invoking principal (it may not know the invoking TM, TM-1 data, e.g., Lance, "xxxx", Susie's vide6, "play the movie", 99).

The supplied parameter "CID" does not provide all the information for the 6 tuples because the protocol information does not send through the wire. Therefore the account-record may be created without the complete information, (e.g., missing TM-2 in the lhs-record and missing TM-1 in the rhs record). However, during a subsequent "roll-up" of the accounting information, based on the GUTMID, the missing information will be collected. The default value for the account-billable? parameter is "false," meaning that if there is any billable transaction, there should be an extension-vector generated. Therefore, the default value for extension-billable? is "true". The extension-billable? parameter has the override capability to the account-billable?.

Acct-Append-Record is an agent verb, by which a principal concatenates principal-specific accounting information to an account record. In this case, only the acct-value, acct-value-length and acct-value-type fields are appended to the account-record. These three fields compose an "extension-vector". Or, if the account record had already been sent to the accounting service, the extension header with the ext-length, ext-type, etc. would be generated first along with the extension-vector and be forwarded asynchronously relative to the base, and appended during GUTMID-keyed roll-ups in the accounting service. If there is already an extension header then this function will only append extension-vector to the extension header. There is no need to generate an extension header again.

The user accounting information will be collected and stored in the "acct-value" field. This field will be a free format text field. The acct-value-length and acct-value-type are used to specify the length and type of this field. The acct-value-type is preferably an integer field, and is application specific. A reserved range will be specified for this application type. A set of application types can be pre-defined. e.g., Acct-value-type=43=Location. Acct-value-type can be used to specify the time-stamp if a user wishes to do so to indicate the starting and ending time for each extension.

When the account-record is flushed to the accounting service, an extension record with extension header and ext-length, ext-type, ext-value will be generated to associate the extension vector with the account-record. If there is already an ext-header existing, there is no need to generate a complete extension record again. The acct-flush-record function can be called any time, not necessarily at the end of the conversation. If the buffer is flushed during the conversation, there is no need to de-allocate the buffer. The buffer will be de-allocated when the CID-buffer is flushed and the conversation is terminated. In the acct-close-record, when the flush? parameter equals true, then the function acct-flush-record will be called to send the records to the accounting service. Preferably, there is one buffer per each CID. An agent can carry multiple conversations simultaneously, so there may be multiple buffers existing at one time for one agent. For one conversation, there will be one buffer for the account-record, extension-vectors and trailer-record with the same CID.

The Acct-flush-record function requests the agent to forward accumulated records to an accounting service. This function can be called by the acct-close-record or by BSOM.

Figure 8:
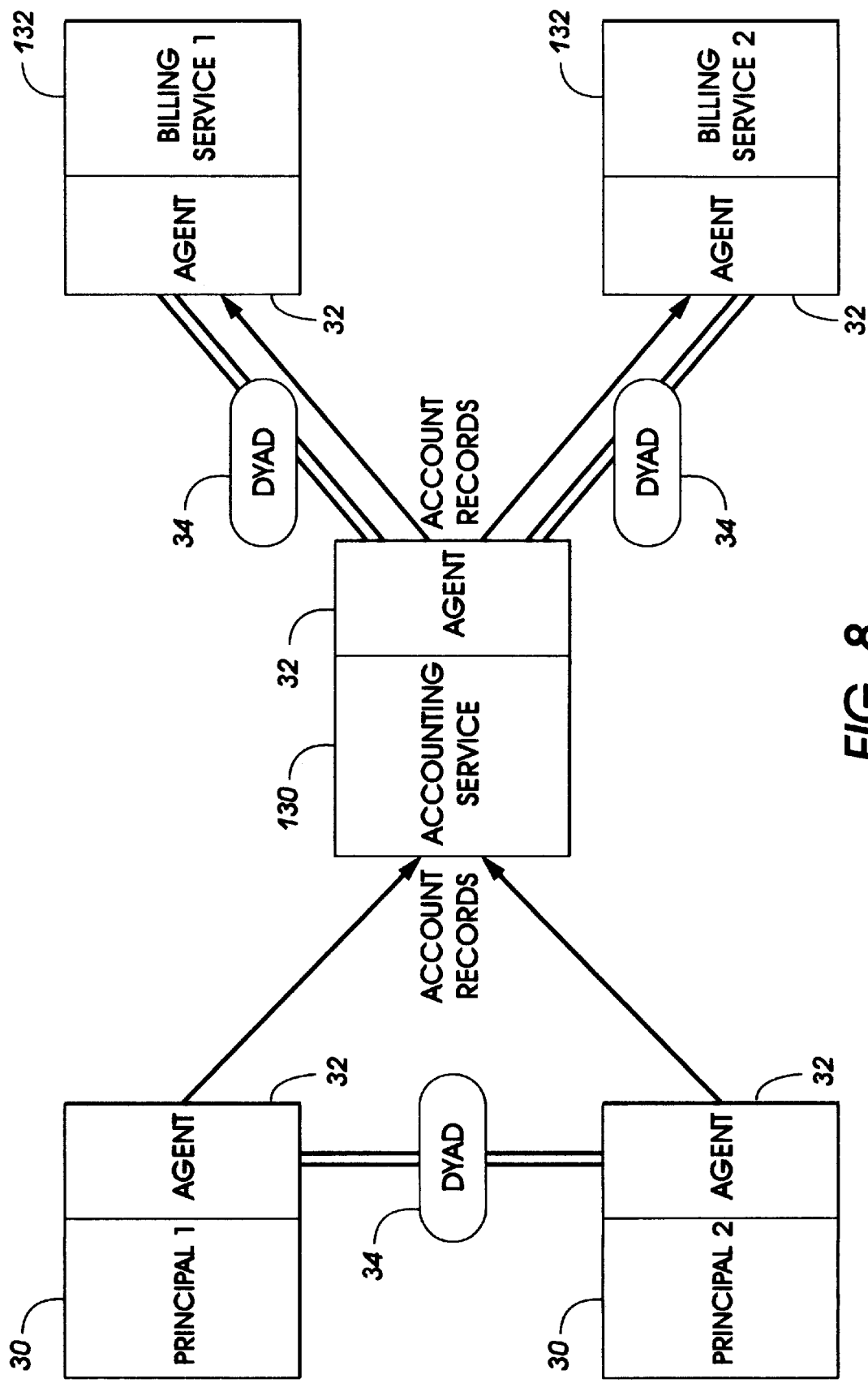
FIG. 8 is a data flow diagram representing communications between an accounting service and a billing service in accordance with an accounting aspect of the present invention.

Principal and transaction method names will use an X/Open standard format, e.g. 1 byte for length field. Referring to FIG. 8, an agent 32 communicates with an accounting service 130 using the communication-verb as a syntax (e.g., connection_begin, connection_end,) however, no dyad creation is necessary. Similarly, one accounting service communicates with another accounting service using communication-verbs. On the other hand, a billing service 132 obtains information resident in an accounting service 130 by acting as a principal, where two principals (billing service and accounting service) communicate via dyad (34) creation (e.g., dyad-begin, dyad-end) as depicted in FIG. 8. An Account-Retrieve-record operation requests the agent of a principal to flush the records to a particular accounting service. This is the "pull" approach of the "account-flush-record".

In a preferred embodiment, a user can do roll-up at any time. When a roll-up is done the acct-extract-on-attributes operation is invoked, while the acct-delete-on-attributes is used to clean up the account-base in the accounting-service. In other words, in the database of the accounting service, a complete accounting record will not exist, the user must move the organized accounting records to another location, at which time the account-records, extension-records and trailer-records must be cleaned or removed from the database. In an accounting record, there are an account-record, zero to many ext-vectors and one trailer-record. The acct-type field in the extension-vector can be used to indicate the time stamp.

Figure 9:
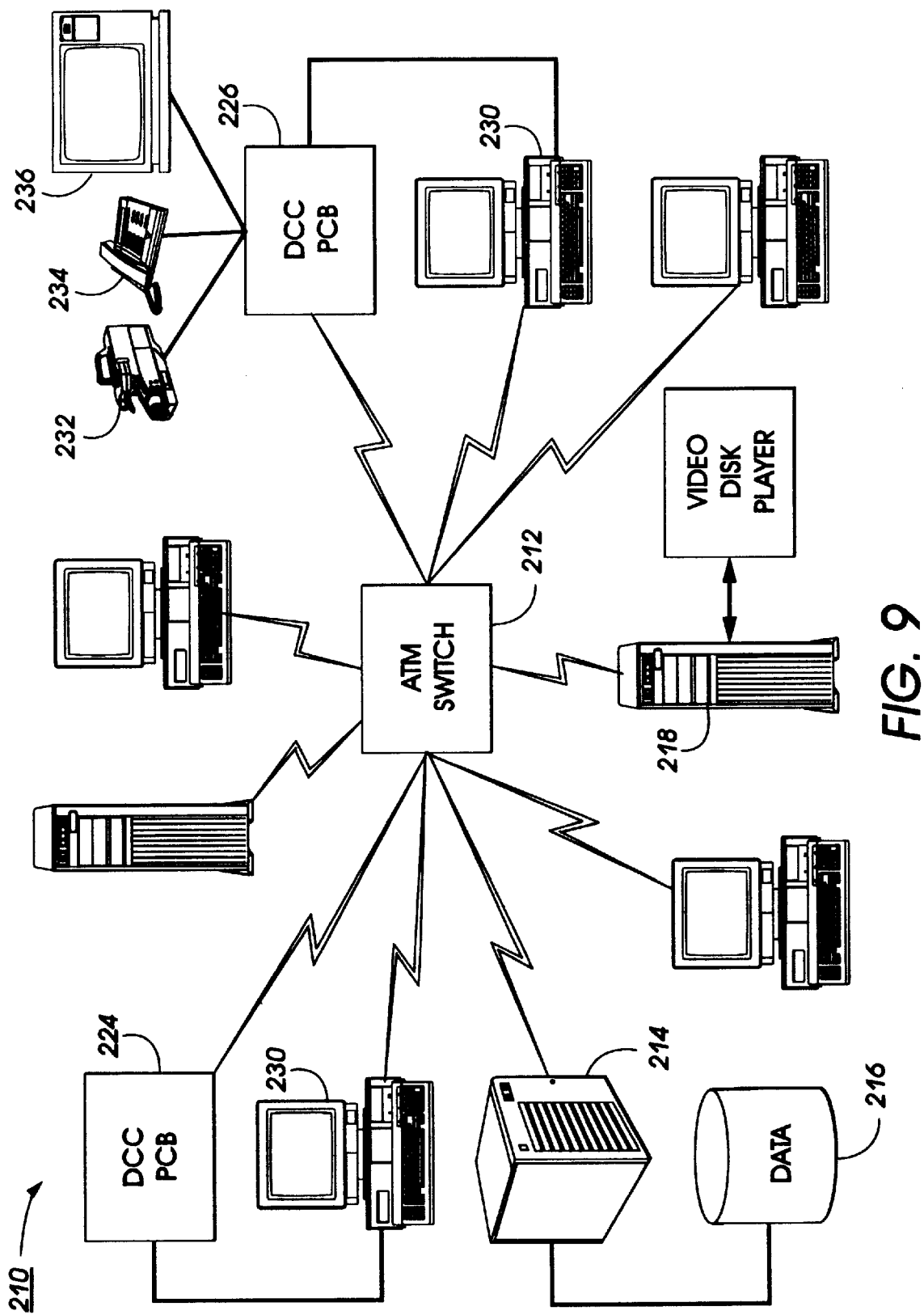
FIG. 9 is an exemplary broadband network environment in which the present invention finds particular use.

In a preferred embodiment, the DSA system is implemented using a plurality of interconnected systems, wherein the systems each comprise one or more processor or data processing units. One hardware embodiment in which the DSA system finds particular use is depicted in FIG. 9. FIG. 9, is an exemplary illustration of the various components that may be associated using the DSA, however, FIG. 9 is not intended to depict limitations to such a system. As noted previously, the DSA may be employed across a network of interconnected computing systems arranged to accommodate broadband communications.

Turning to FIG. 9, illustrated therein is an exemplary environment 210 comprising a plurality of systems and/or devices, all interconnected via an asynchronous transfer mode (ATM) switch 212 to form a node of an ATM infrastructure 70 as represented in FIG. 4 Additional details concerning ATM can be found in a presentation by B. Kercehval, "The Truth About ATM" Usenix LISA presentation, (September 1995) Alternatively, the DSA may be implemented on equivalent communications networks, including a synchronous optical network (SONET). Interconnected via ATM switch 212 are data servers 214 suitable for the storage of large quantities of data on disk or other storage media 216. For example, a server 214 may allow a user to access a database of image or video data or similar compilation. The data stored on media 216 being accessible, via the server 214, by one or more systems connected to switch 212. Also included in the environment 210 is a system 218 that contains the DSA services described with respect to, and depicted in, FIG. 5. System 218 is preferably a Sun workstation. FIG. 9 also depicts the document communications controller (DCC) that forms an aspect of the present invention. In particular, DCCs 224 and 226 provide the interface to the ATM infrastructure for workstations 230, and other telecommunications equipment including video sources 232, audio systems 234 (e.g., telephones) and television 236.

The infrastructure software executed by system 218 provides secure, authorized and "billable" connections on the broadband ATM network. In a preferred embodiment, the software modules forming the DSA, as described in detail above, would be distributed throughout the network, residing on as many network nodes as necessary to assure adequate performance standards. More importantly, the software provides a simple API using X/OPEN standard verb sets. Applications interfacing to such a system can utilize a library that implements the communications verbs or may employ events management subsystems found in the Macintosh or Windows '95 environments. The development language employed is C++ and the operating system may be any multithreaded operating system with POSIX compliant interfaces, including VxWorks (Wind River Systems). Operational parameters for the preferred embodiment include a minimum of 1 Megabits of RAM, an aggregate throughput of up to 155 Megabits per second, support for unlimited simultaneous virtual channel connections (VCC), and an average call setup time of approximately 30 milliseconds.

Document Communications Controller

Having generally described the Document Services Architecture and hardware employed to implement an exemplary system using an ATM infrastructure, attention is now turned to the description of the Document Communications Controller that forms an aspect of the present invention. The document communications controller (DCC) or equivalently the network interface unit (NIU) is designed to provide low cost communications between customer premises equipment (CPE) on broadband networks with:

1. Security to switch virtual circuit networks
2. Protection against abuse of both services and content on the network
3. Accurate accounting of use of content delivered over the network
4. Accurate accounting of network facilities used by the customer based on actual usage As illustrated in FIG. 9, the DCC hardware itself consists of a network interface module (DCC PCB) 224 connected to a general purpose processor 230, memory (not shown), and an ATM Switch 212. In a building wired for high speed networks, served by a local ATM switch, the DCC provides a cost effective way of networking desktops, including video, sound, document transfer, as well as to switch telephone connections. The DCC can also be used to connect existing LAN environments to the ATM backbone serving whole buildings. The DCC may also be employed to provide low cost delivery of video on demand, telephone, and print distribution to the home over a single connection. The ease of sending as well as receiving information via the DCC, enables the creation of new information service providers, complete with usage accounting. The DCC further provides a way of establishing direct video, audio, and document interchange with other colleagues, where the quality of service provided is superior to the well-known ISDN environment.

The DCC is intended to fit into a complete system architecture, the architecture is developed to support natural communications between people, documents, and the services performed on documents. The general nature of the architecture allows development of complex communications solutions that are media independent, spanning video, audio, and text.

Figure 10:
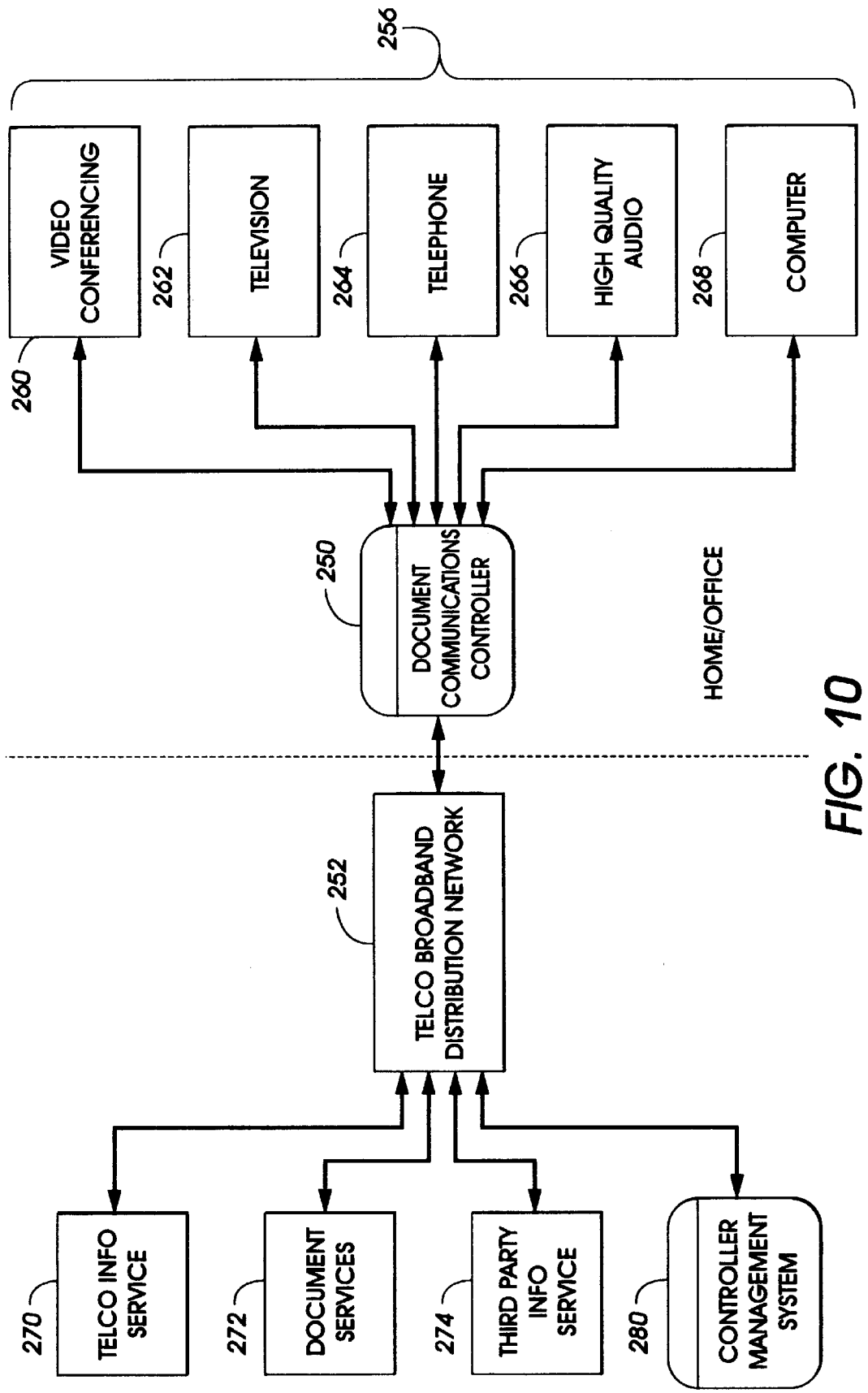
FIG. 10 is a data flow diagram illustrating the document communications controller in one network interface embodiment.

Referring now to FIG. 10, illustrated therein is a data flow diagram illustrating the document communications controller (DCC) in a network interface embodiment. In one embodiment, the document communication controller 250 is connected as the "link" between a telephone company broadband connection (e.g., ATM) 252 and a set of customer premises equipment 256. Set 256 includes, but is not limited to, a video conferencing unit 260, a television or display device 262, a telephone 264, an audio output system 266 and a computer 268. As depicted, the customer premises equipment is located with a home or office environment. Using the DCC, any one of the components in set 256 may be employed to access information via the broadband network. The information is represented as one of three objects, including telephone company information 270, document services 272 or third party information services 274. Further details of the document services object are found in copending application Ser. No. 08/768,452 (Atty. Docket No. D/95287), filed concurrently herewith and hereby incorporated by reference for its teachings. Also depicted in FIG. 10 is Controller management system 280.

Figure 11:
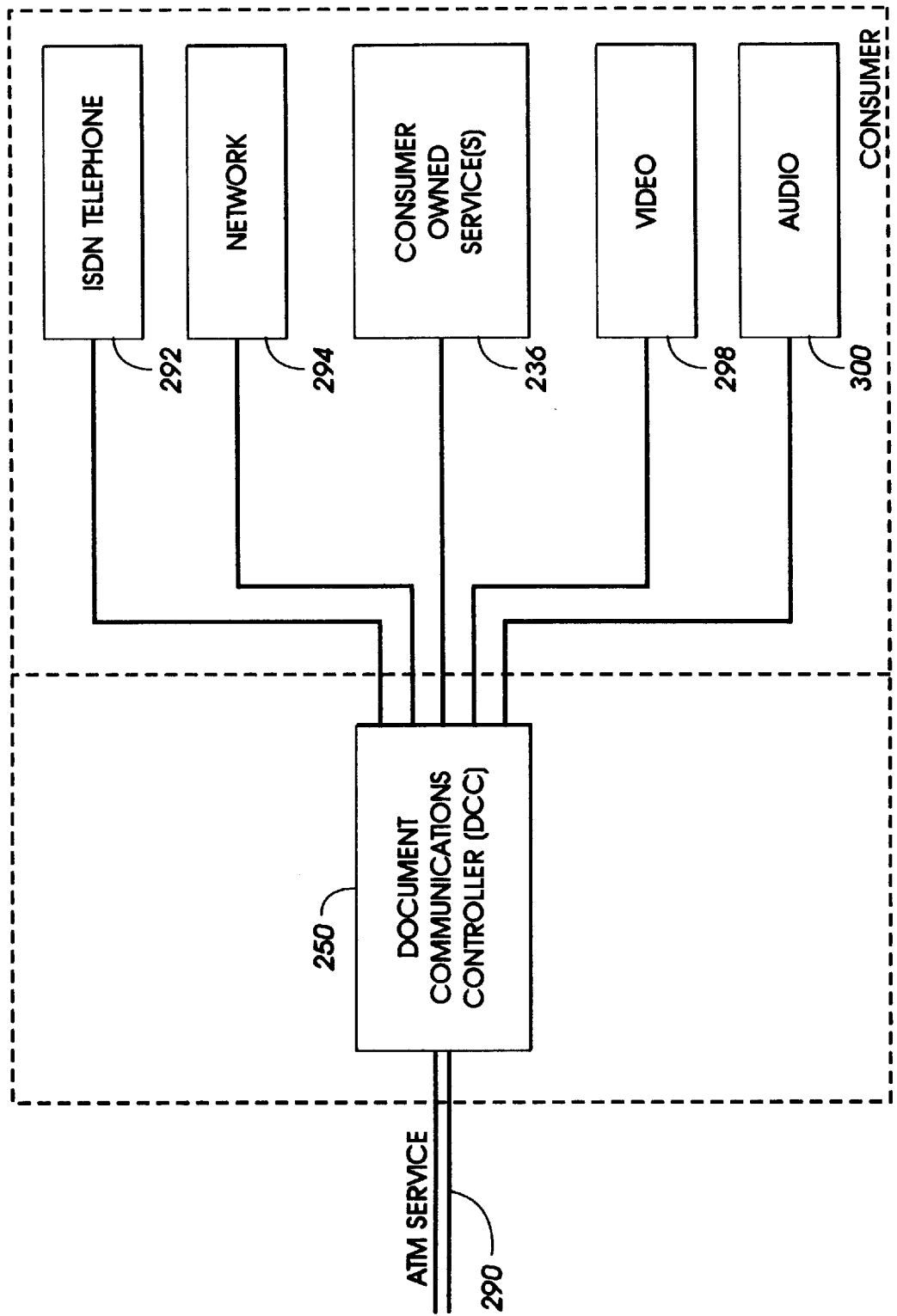
FIG. 11 is a detailed view of the physical interconnections accomplished by the document communications controller.

FIG. 11 is a detailed view of the physical interconnections achieved with the document communications controller. In particular, the DCC is connected to the telco via an external ATM connection 290. Within the customer premises, interconnections to the ATM network are provided via the DCC. As will be described in further detail with respect to FIGS. 14 and 15, interface ports are provided on the DCC hardware to interconnect ISDN telephony equipment 292, local area network 294, video equipment 298, audio equipment 300 and other consumer owned services represented as block 296. It will be appreciated that the consumer owned services may include expansion capability for third-party services provided on the customer premises. Such services may include on-demand video, video conferencing, interactive television, digital audio. As will described herein, the various pieces of diverse home/office hardware require differing interfaces and protocols for interconnection. The DCC is intended to meet the requirements of the diverse hardware, providing a common interface for all to the ATM network 290.

The DCC is intended as a low cost communications device consisting of a set of network adaptor cards or components that may be connected to a general purpose processor having associated memory and an ATM switch. In one embodiment, the components of the DCC are tied together using a very fast PCI bus. Such a configuration enables the addition of special functionality through the addition of industry standard PCI cards.

Figure 12:
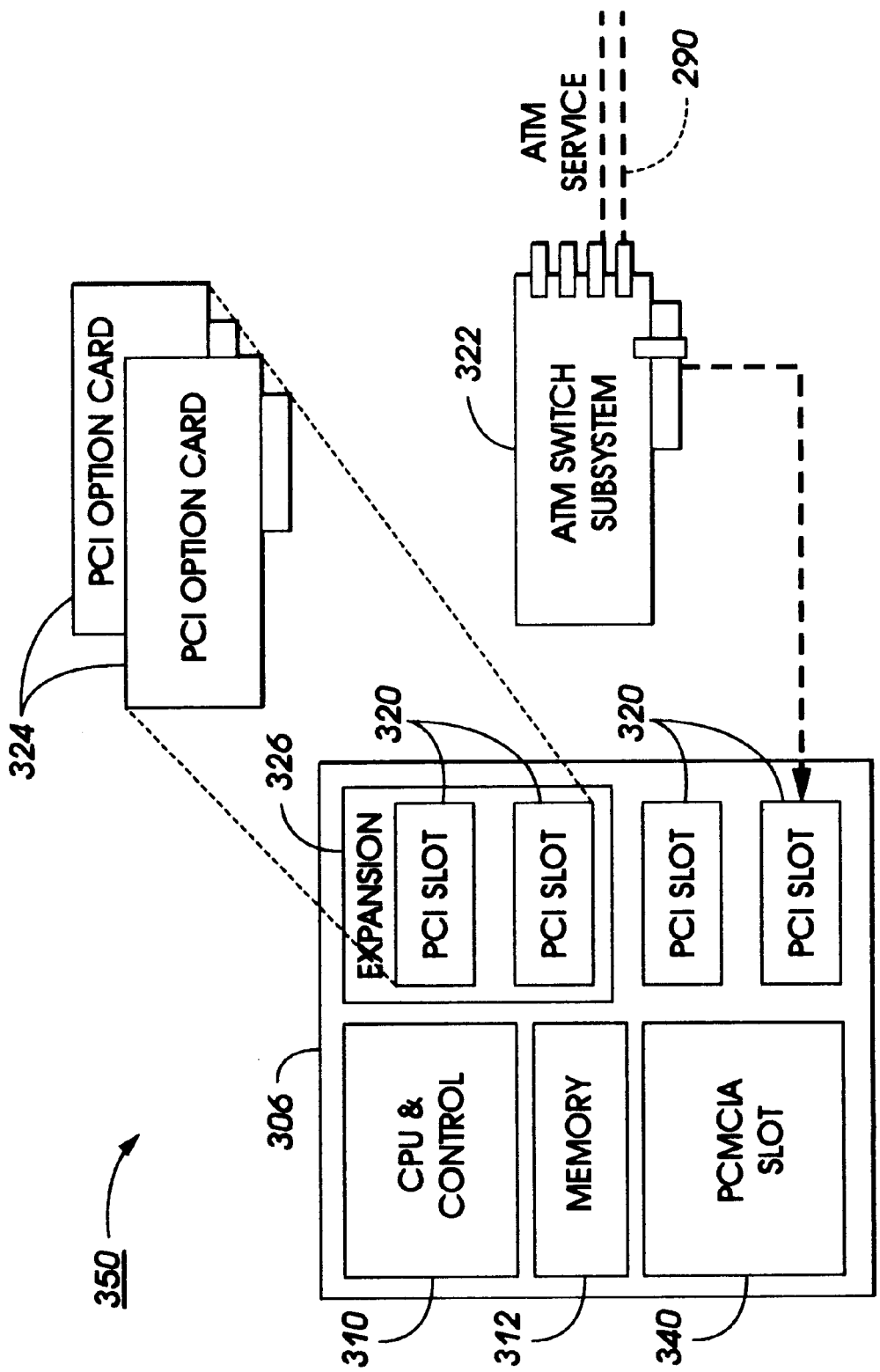
FIG. 12 is a schematic illustration of an exemplary hardware embodiment for the document communications controller.

Referring to FIG. 12, depicted therein is a schematic illustration of an exemplary hardware embodiment for the document communications controller 250. Preferably, the processor base 306 includes an IBM Power PC (#403 GA) CPU 310, connected to memory 312 via a local bus-to-PCI bus architecture (V3 290PBC) and backplane (not shown). Memory 312 preferably includes a 512 KB ROM, non-volatile random access memory (NVRAM) and a slave PCI memory burst DRAM memory. so as to enable data stream buffering on the order of 128 megabytes. The processor base further includes an Ethernet® connection and RS232 communication port (not shown). The PCI backplane provides at least four standard PCI interface slots 320. In one embodiment, ATM Switch 322 is inserted into interface slot 320 to provide a fiber ATM interface capable of a bandwidth on the order of 155 megabits per second (Mb/s). Moreover, the ATM switch preferably provides at least 4 low cost fiber ATM channels. The remaining interface slots in the backplane can be made available, via PCI option cards 324, for interfacing to disk storage, an audio interface, or ISDN and analog telephone interfaces.

The hardware of FIG. 12 is partionable into three functional parts. The first part is the core hardware block consisting of the CPU and associated memory. The second part is the ATM switch represented by a PCI slot and the ATM Switch subsystem 322. The third functional part is the bridge or expansion hardware 326, including PCI slots 320 and option cards 324. The processor base 306 is intended to provide services that may be identified as a single predominant interface standard, whereas the expansion options are intended to interface to those services having a multiplicity of interface standards (e.g., video). To provide video interfaces, a PCI video card (not shown) would be used. The PCI video card would preferably include the appropriate compression and video processing circuitry and would be a customizable option to be installed in a cabint housing the DCC 250.

Also included on the processor base of FIG. 12 is a PCMCIA interface 340. The interface preferably supports a pair of type-2 PCMCIA slots and complies to PC Card Standard Specification Release 2.1. The PCMCIA interface is interconnected to the PCI bus and consists essentially of a Texas Instrument® 1050 PCI-to-PCMCIA controller and associated sockets.

Figure 13:
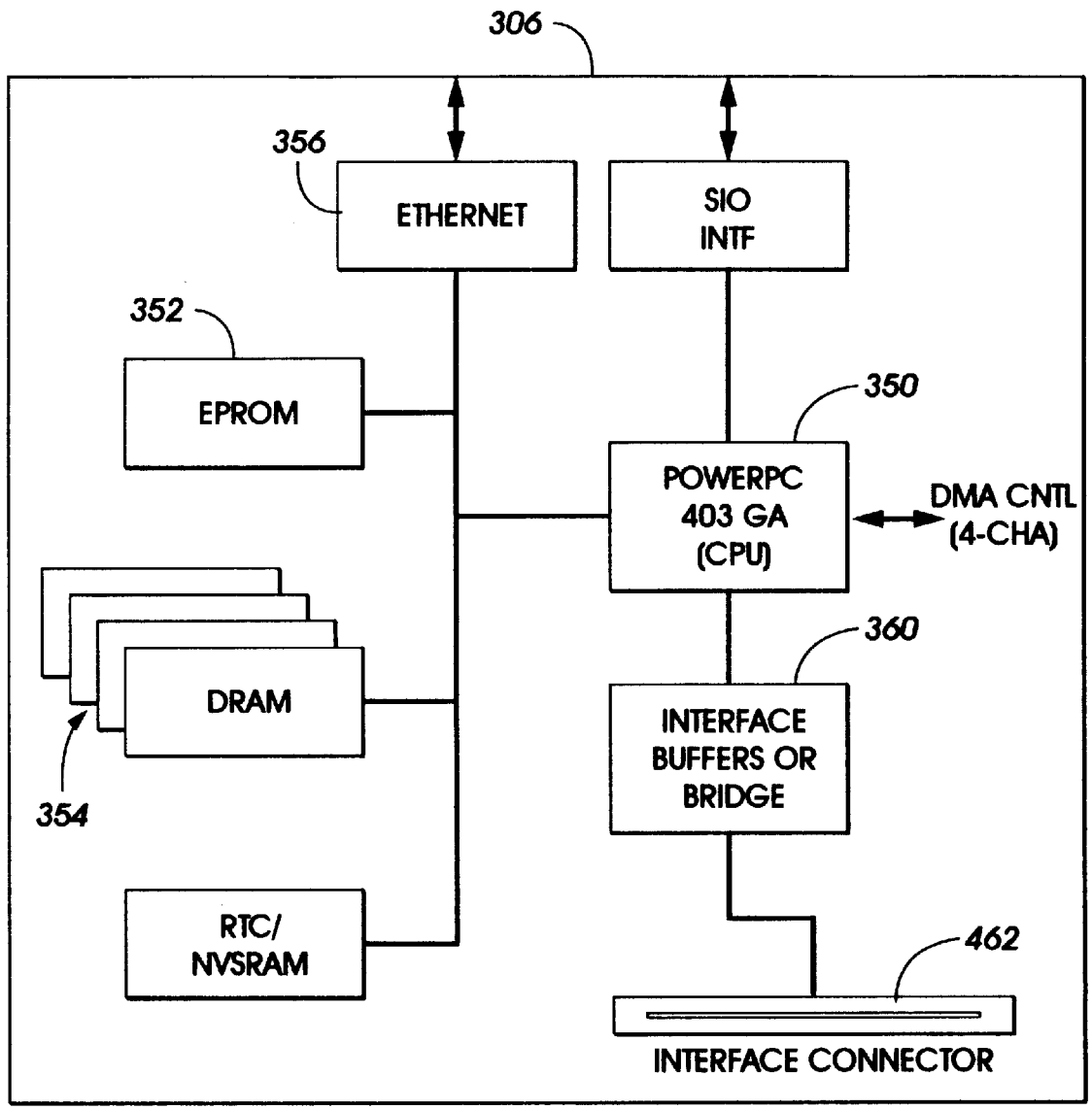
FIG. 13 is a block diagram illustrating the various elements of the hardware embodiment of FIG. 12.

FIG. 13 is a block diagram illustrating various components of the base processor of FIG. 12. In particular, base processor 306 includes an IBM® Power PC processor 350, a highly integrated 32-bit processor with the PowerPC instruction set. Also included in the base processor is a DRAM controller, programmable chip selects, an interrupt controller (controlling up to 5 external interrupt inputs) and a serial port. The base processor further includes a 2KB instruction cache and a 1KB data cache. Both caches being two-way associative. The local memory comprises 512MB of Programmable ROM (PROM) 352. In the embodiment depicted in FIGS. 12 and 13, the executable code will be transferred from the local PROM 352 to the local DRAM 354, where it will be stored for faster execution. Other peripheral circuitry located on the local bus of the base processor includes an Intel® 82596 Ethernet controller 356 having associated driver and receiver circuits (not shown) for a 10 BaseT Ethernet connection. Circuit 358 includes a real-time clock (RTC) and about 8KB of static RAM (SRAM).

In the first embodiment of the DCC depicted in FIG. 13, the processor subsystem 310 interfaces with the PCI bus through a V3 290 PCI Bridge chip 360 (available from V3 Corp.). The bridge chip 360 handles data flow to/from the PCI. For the processor to/from the PCI bus, the bridge includes a 256 byte FIFO buffer to temporarily store posted processor witings direct to the PCI bus, and a 32 byte FIFO buffer for processor readings from the PCI bus. Two of the DMA channels built into the processor base will be employed to write data into, or read data out from, the bridge chip FIFOs. The bridge chip will acquire the PCI bus as a bus master, transferring the data depending upon the state of the FIFOs.

Figure 14:
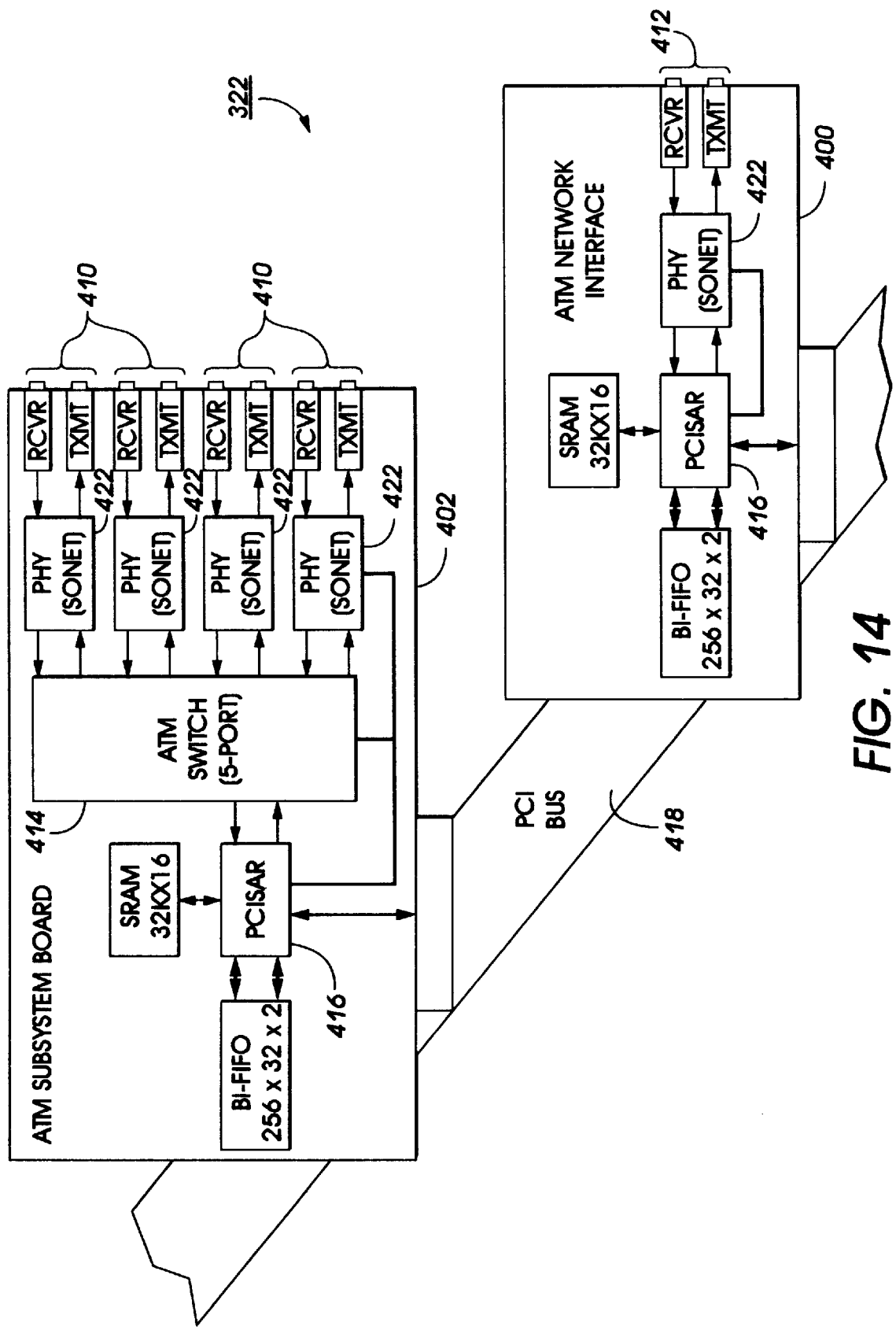
FIG. 14 is a block diagram of the ATM subsystem in accordance with one embodiment of the present invention.

FIG. 14 is a more detailed block diagram of the ATM subsystem 322 illustrated in FIG. 12. The ATM subsystem for the first embodiment is a PCI compliant printed wiring board (PWB) that can be interconnected with any system having PCI bus interface sockets. Generally, the ATM subsystem can be split into two operationally distinct units as illustrated in the figure; ATM Network interface unit 400 and ATM Subsystem Board 402. ATM subsystem board 402 is a 4-port ATM switch, having four 155 Mb/s SONET fiber optic compliant ports 410. Moreover, the four ports are completely identical and can be connected to any combination of public/private ATM networks. The on board ATM switch is implemented, as illustrated, by a 5-port switch 414, where the remaining (5th) port 412 being connected/accessed via PCISAR chips 416 and the PCI bus 418.

PCISAR chip 416 provides a PCI bus interface to the ATM system switch and port, and includes a Utopia interface to the PHY devices 422. PCISAR 416 also provides segmentation of the AAL5 format to ATM cells during transmission, including functionality for sixteen virtual transmitting channels, rate control, transmitter CRC insertion, and F4 and F5 flow OAM cells. The PCISAR further provides reassembly of ATM cells to AAL5 format during receiving, preferably including 8095 virtual receiving channels, receiver CRC and length error detection.

As depicted, the ATM subsystem board 402 and the ATM Network interface unit 400 preferably provide virtual switching/remapping—on the order of four thousand switching/mapping entries per port. Details of switching circuits and contention resolution are found in U.S. Pat. No. 5,305,311 to Lyles and U.S. Pat. No. 4,761,780 to Bingham et al. as well as the proceedings of the International Switching Symposium, "Large Packet Switch and Contention Resolution, A. Cisneros, Vol. III, p. 77–83 (Poster session Paper No. 14), the relevant portions of which are hereby incorporated by reference. Also provided are non-block switching, multicasting, peak cell rate policing on the virtual channels, including cell lost priority updates due to peak cell rate violations and cell drops due to peak cell rate violations. Cell count statistics are maintained on a per input channel basis and cell lost statistics are maintained on a per switch device basis.

Figure 15:
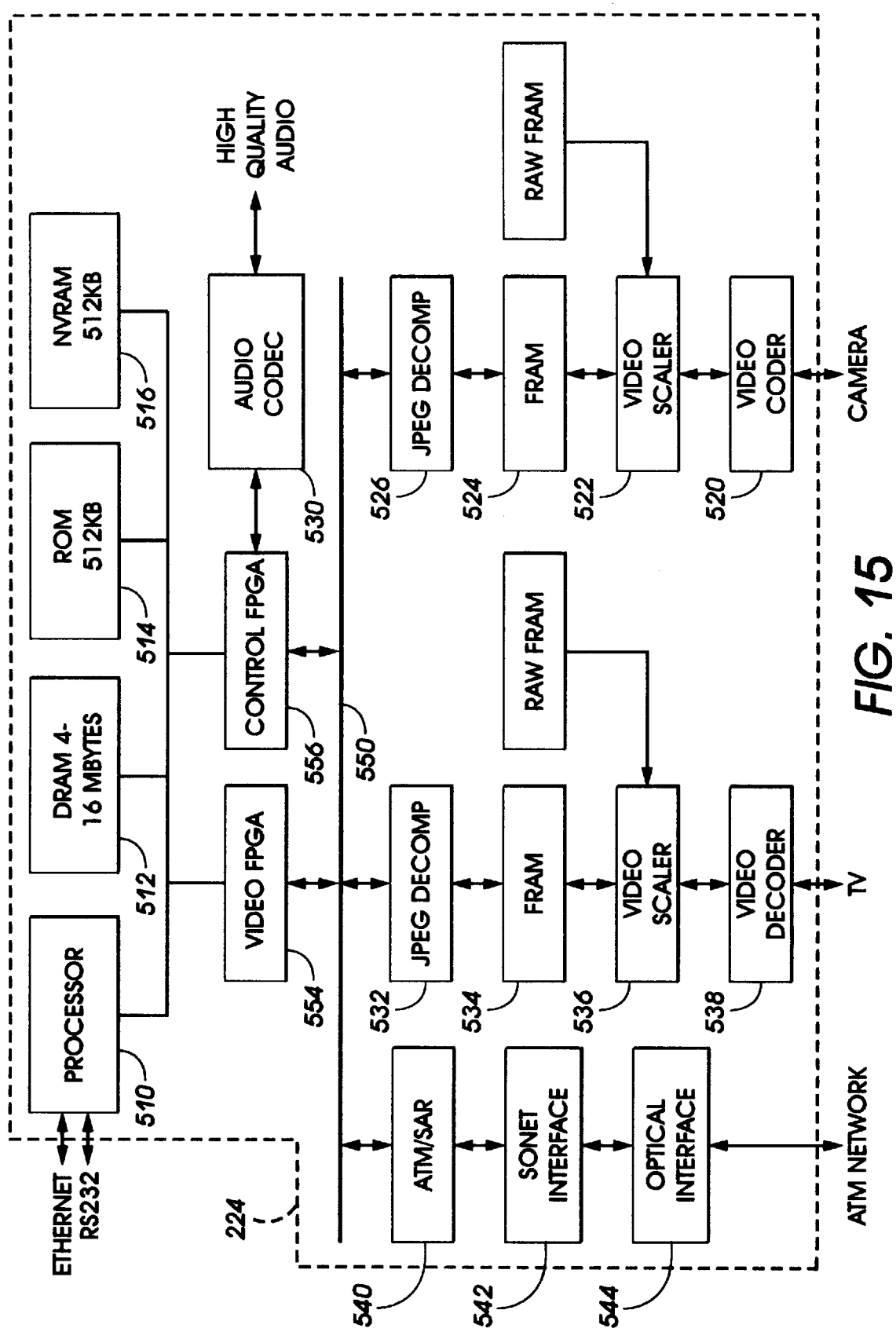
FIG. 15 is a hardware block diagram illustrating the various compenents of an alternative embodiment of the document communications controller.

In the alternative embodiment of FIG. 15, the DCC interface platform could include various commercially available components arranged in an interconnected fashion to provide all of the functionality previously discussed with respect to FIGS. 10 and 11. Referring to FIG. 15, depicted therein is a hardware block diagram for the DCC interface platform. A Motorola MC68360™ Integrated Multiprotocol processor 510 is used as the main processor on the hardware platform. Connected thereto is local RAM 512 of at least 4 Mbytes, expandable to 16 Mbytes. Block 514 represents a ROM device (e.g., PROM, EPROM, E²PROM) for boot strap code and application software storage, while NVRAM device 516 is intended for the storage of hardware configuration parameters. Services available from the hardware printed circuit board 500 include Analog to Digital and Digital to Analog video conversion and frame capture via video coder 520, video scaler 522, Frame RAM 524 and compressor 526. Preferably, compressor 526 is capable of providing the well-known JPEG compression of the video images stored in Frame RAM 524. Also included on PCB 500 is Analog to Digital and Digital to Analog audio conversion and acquisition hardware represented as audio coder/decoder 530. Motion JPEG compression and decompression is accomplished via compressor 526 and decompressor 532, respectively. An ATM/SONET interface is implemented via hardware component blocks 540, 542 and 544. Similarly, the hardware also provides Ethernet LAN and Serial RS232 interfaces An address/data bus 550 is employed to facilitate high-speed interconnection of the various components. The hardware interfaces are controlled via field programmable gate arrays (FPGA) 554 (video) and 556 (control). The FPGA's are Xilinx™ gate arrays although the functionality of the gate arrays is preferably accomplished using application specific integrated circuits. Included in the hardware interfaces, but not specifically illustrated in FIG. 15, are the following connections:

1 pair of optical fiber (one for transmit and one for receive);
 1 composite video (NTSC) input;
 2 S-video input;
 1 composite video (NTSC) output;
 1 S-video output;
 2 line level audio inputs (Right and Left channels);
 2 line level audio outputs (Right and Left channels);
 1 Ethernet LAN connection; and
 1 RS232 serial connection.

The software operating on the DCC processor 510 is preferably a VxWorks™ 5.2 real-time multi-tasking kernel and VxWorks Shell that provides the user interface for exercising the capabilities of the DCC via the operating system's Shell interface. Upon consideration of the differences between the first embodiment of FIG. 12 and the alternative embodiment of FIG. 15, it will be appreciated that the alternative embodiment provides greater hardware support for various consumer equipment, for example, a video interface, an audio interface, and a television output port.

Figure 16:
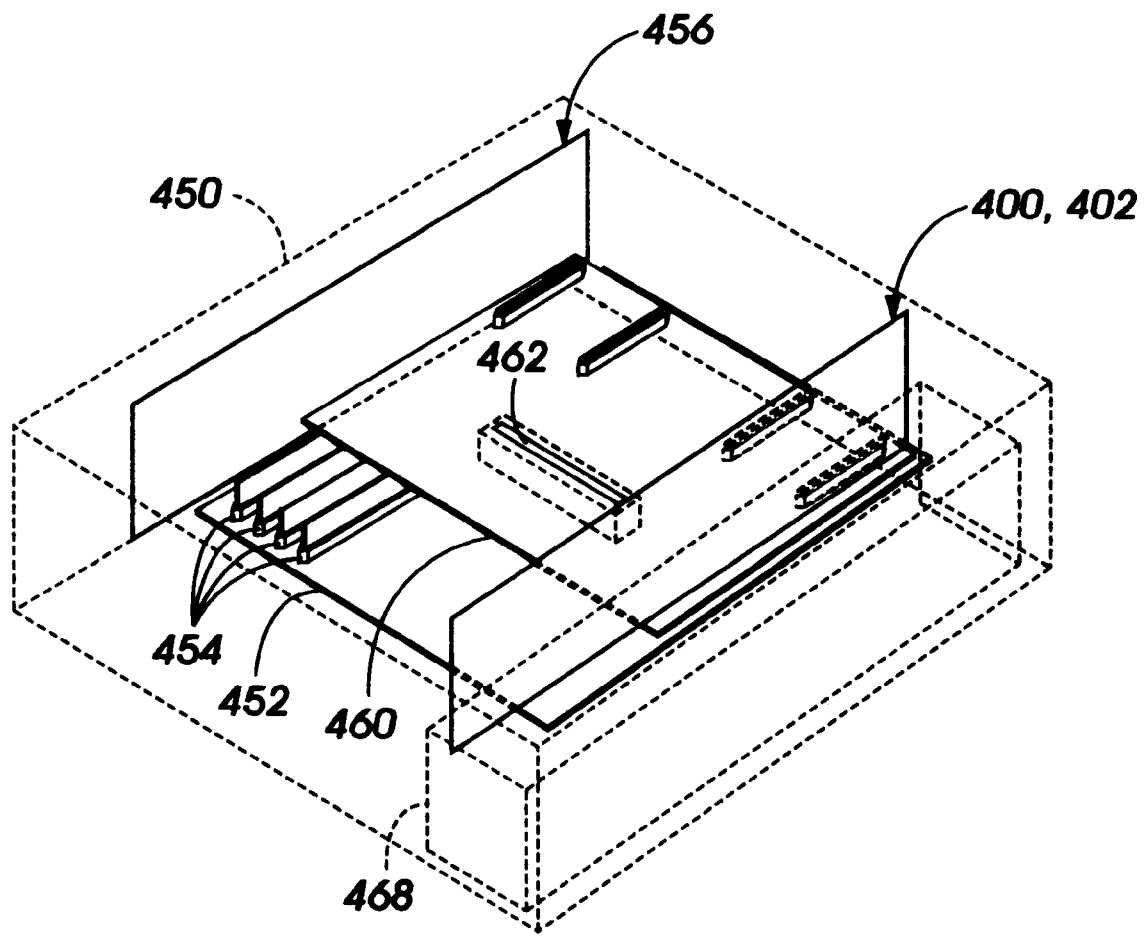
FIG. 16 is a representative illustration of the physical layout of the hardware components depicted in FIGS. 12–14.

Referring to FIG. 16 there is shown a representative layout of the hardware components depicted in FIGS. 12–14. Generally, the components will be housed in a chassis 450. Along the bottom of chassis 450 is the processor PWB 452, containing the generally denoted by reference numeral 306 in FIG. 12. Processor PWB 452 includes sockets 454, into one which is plugged a PCI expansion board 456. Also connected to the processor PWB 452 is bridge interface PWB 460, connected to the processor PWB 452 via interface connector 462. As previously noted, the bridge boar contains sockets for up to 4 PCI compatible boards, one or more of which are occupied by the ATM switch PWB 402 and/or ATM Network interface unit 400. As will be appreciated, chassis 450 will also include a power supply 468.

Figure 17:
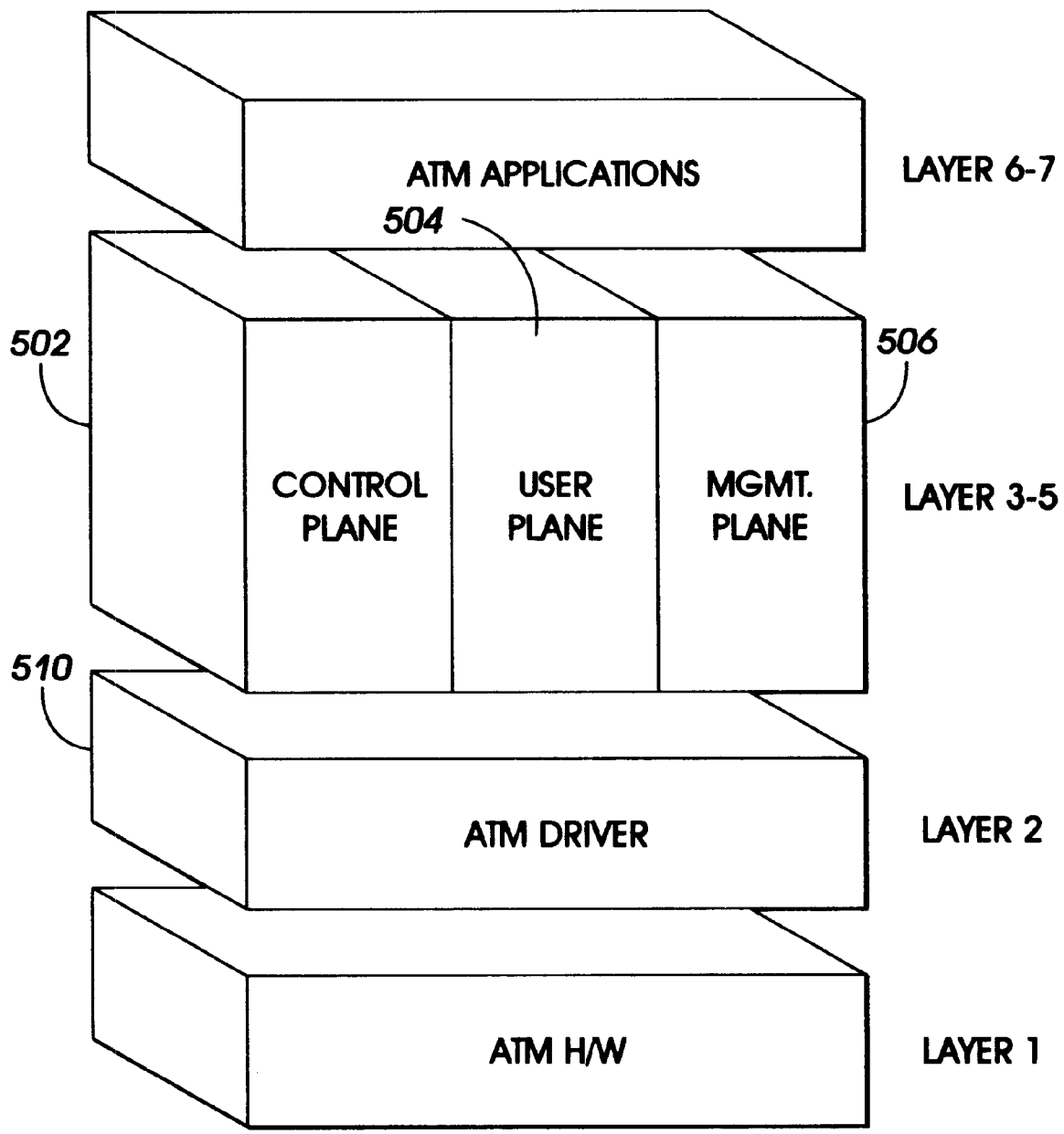
FIG. 17 is a pictorial representation of an overview of the ATM software architecture with layer labels corresponding to the OSI Reference Model.

Illustrated in FIG. 17 is an overview of the ATM software architecture. Along the right side of the figure are layer labels corresponding to the well known OSI Reference Model. The physical layer, layer 1, includes the ATM switch hardware and associated interfaces. Layer 2 represents the ATM drivers; software providing the ability for application programs to communicate with/via the ATM switch. Layers 3–5 are comprised of three separate code "planes"; control plane 502, user plane 504 and management plane 506. On top of the three planes is the ATM application software (layers 6–7), essentially comprising application programs suitable for exercising the functionality of the lower layers. One such application may be the principled document bank and its associated software as described in the copending application previously incorporated herein by reference.

Figure 18:
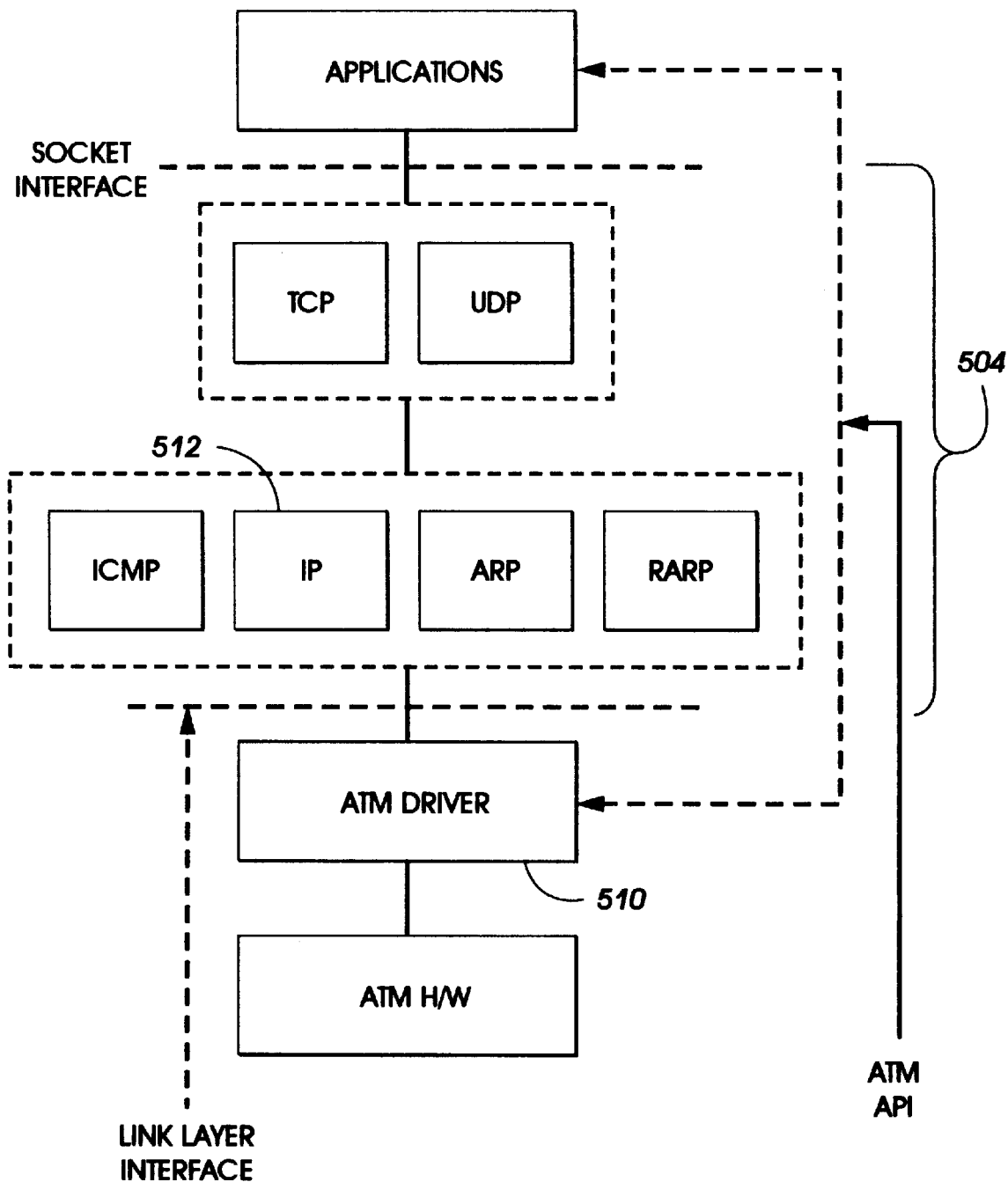
FIG. 18 is a detailed view of the software architecture illustrating the interrelationships between various aspects of the User Plane depicted in FIG. 17.
Figure 19:
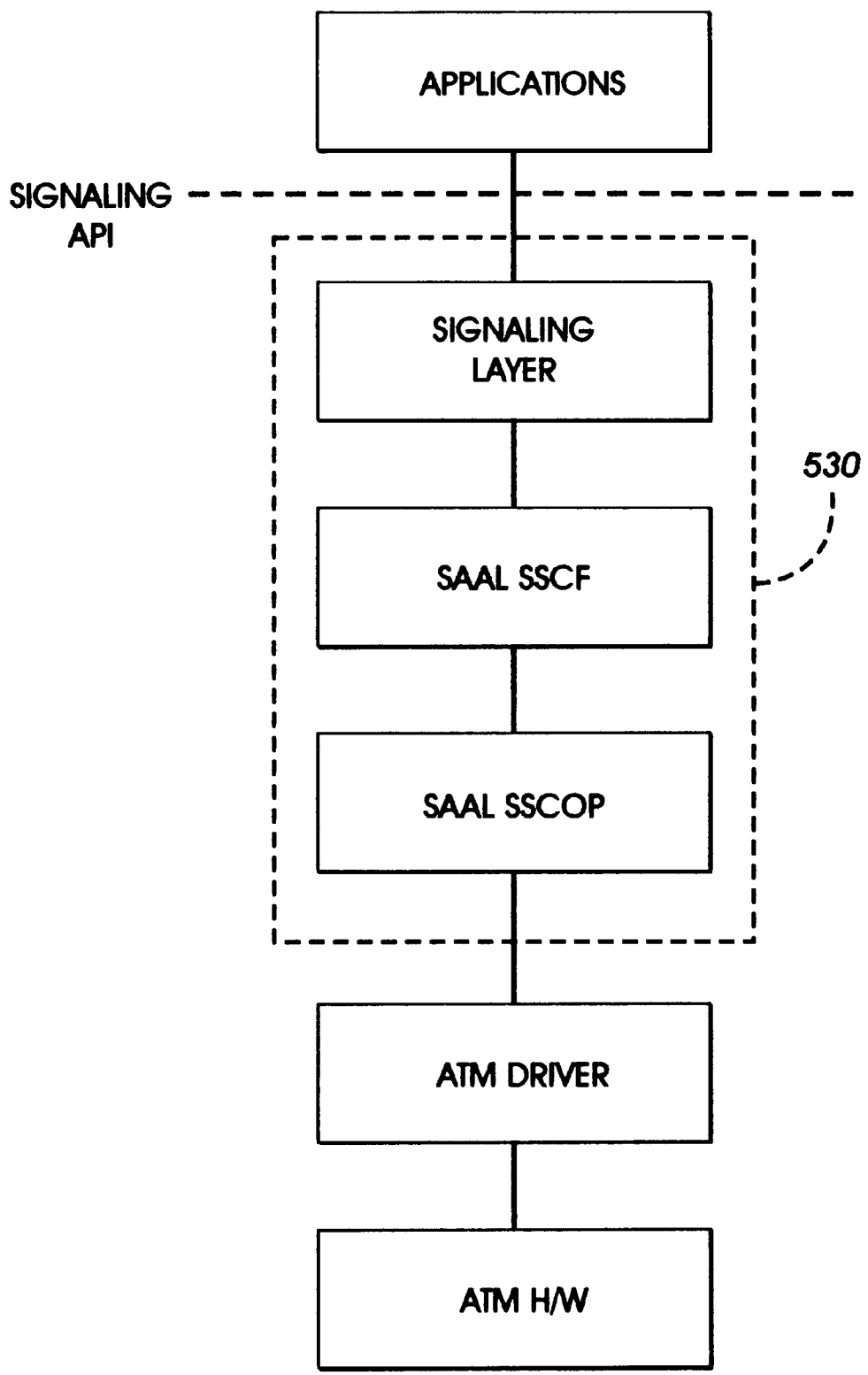
FIG. 19 is a detailed view of the software architecture illustrating the interrelationships between various aspects of the Control Plane depicted in FIG. 17.
Figure 20:
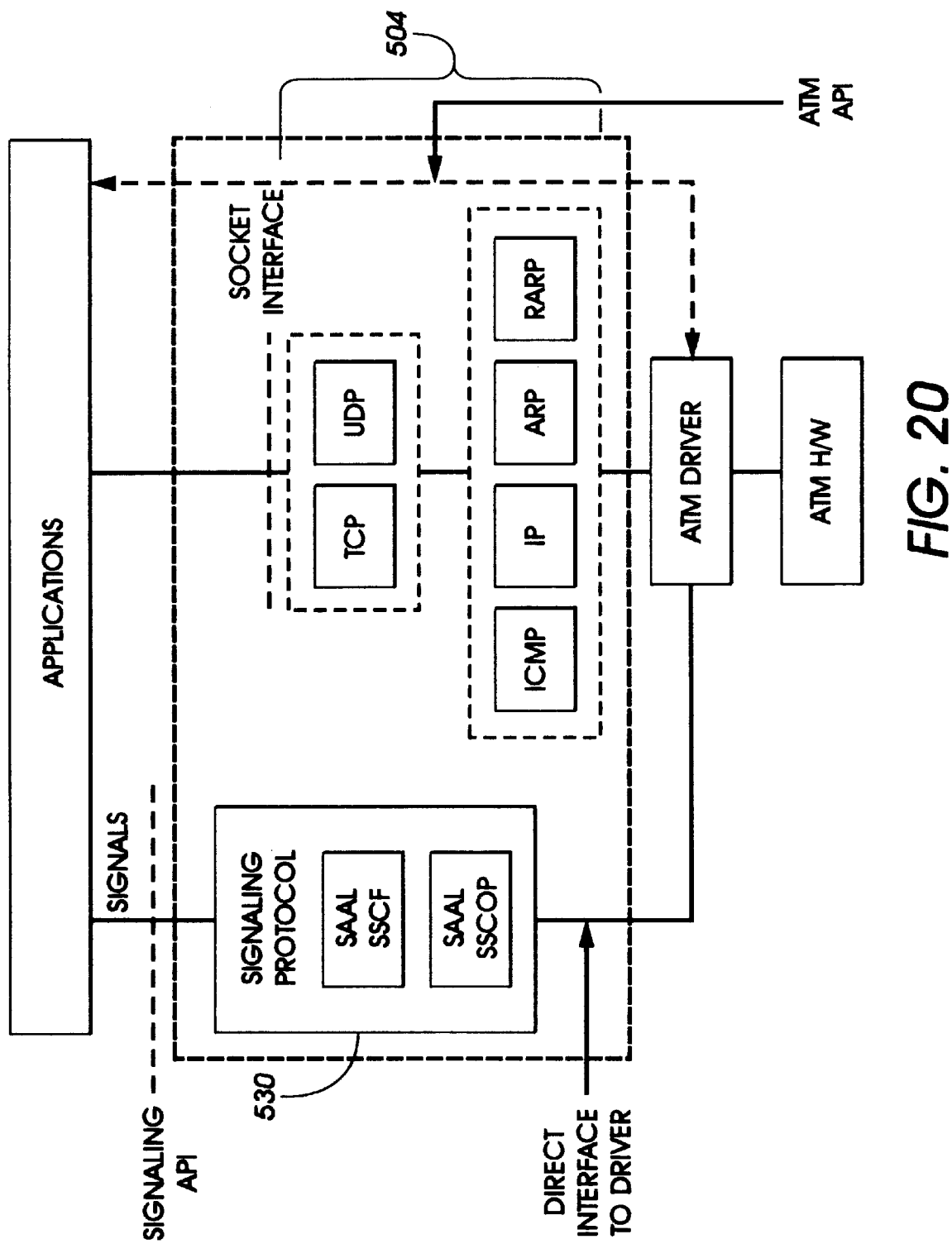
FIG. 20 is an exemplary illustration of an embodiment of the User and Control planes depicted in FIGS. 18 and 19.

Referring briefly to FIG. 18 the User Plane 504, as depicted in FIG. 17, preferably provides user-to-user information transfer functionality. In addition User Plane 504 includes controls that are required for the information transfer, including flow control and error recovery. As represented in the figure, ATM driver 510 provides encapsulation and termination functionality for IP block 512 in the User Plane. The User Plane also provides access for specific functionality via the ATM application program interface (ATM API). Now referring to FIG. 19, displayed therein is a detailed view of the software architecture illustrating the interrelationships between various aspects of the Control Plane 502 as previously shown in FIG. 17. In one embodiment, the Control Plane 502 supports call control and connection functionality, such as signalling functions 530, for the ATM switch. The signalling function 530 establishes, supervises and releases calls and connections. ATM signalling messages are based upon B-ISDN Draft Recommendation Q.2931, and example signals include: connect, connect acknowledge, release, restart, setup and status. Within the signaling layer, there is depicted a Signal ATM Adaption Layer (SAAL) having a Service Specific Coordination Function (SSCF) and a Service Specific Connection Oriented Protocol (SSCOP). FIG. 20 illustrates what is believed to be a preferred embodiment for the combination of the User Plane and Control Plane functionality, where the signalling layer provides signals to the ATM application layer and the control functionality manage the transfer of data to/from the ATM application layer.

Figure 21:
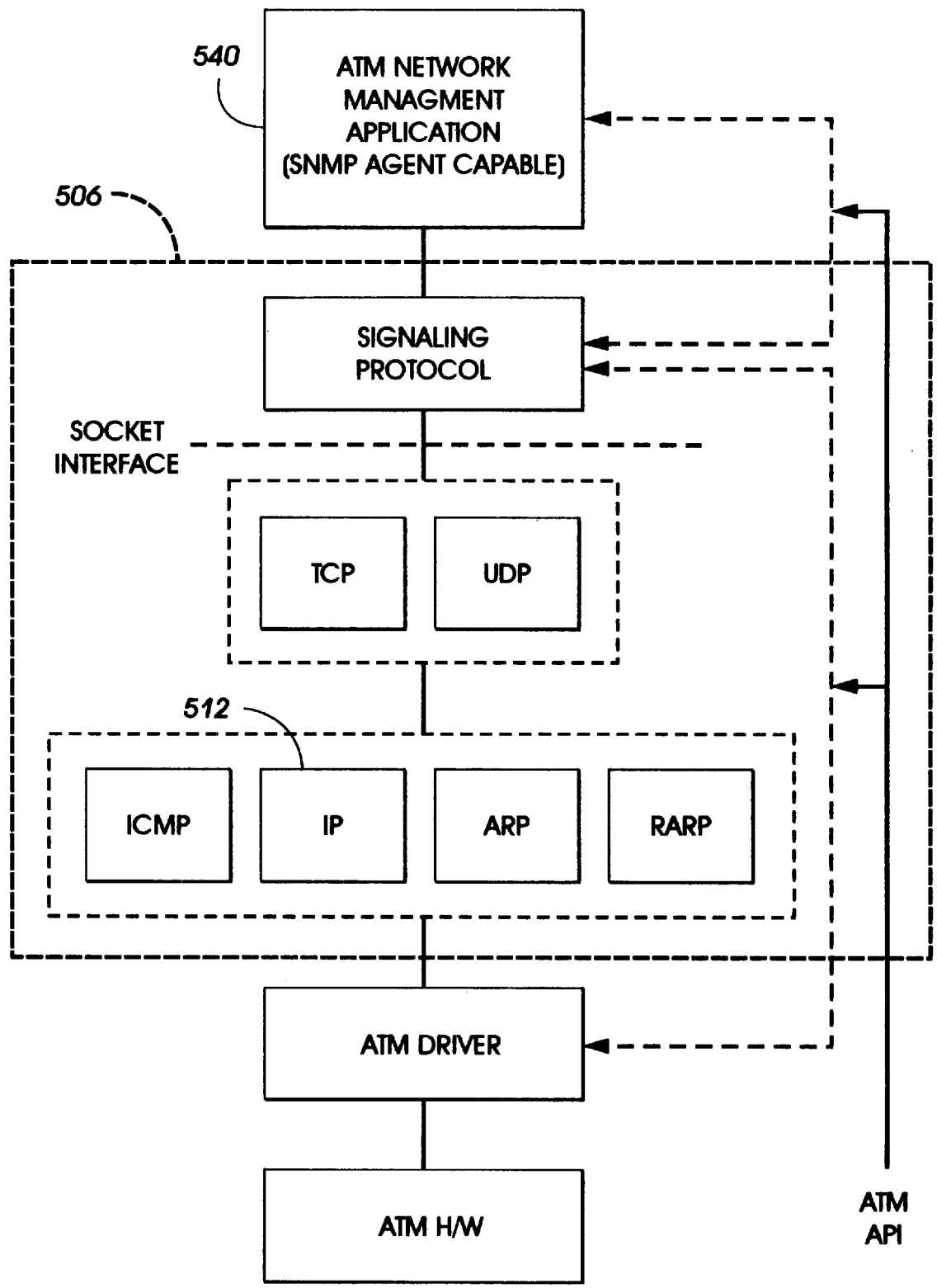
FIG. 21 is a detailed view of the software architecture illustrating the interrelationships between various aspects of the ATM Management Plane depicted in FIG. 17.

As represented in FIG. 21 the ATM Management Plane 506 controls an ATM device, for example, a switch of a hub. The Management Plane is defined by the ATM Forum's Interim Local Management Interface (ILMI), where the current protocol chosen for communications is SMNP. The management information defined by the ILMI provides status and configuration information from the UNI Management Entity (UME; the software object that collects network information) regarding its User Network Interface (UNI) previously characterized herein as the document communications controller (DCC). The information obtained by the UME details the status and configuration of both the ATM and physical layers (layer 1) at the UNI. The information is then organized into a Management Information Base (MIB) so as to be accessible by the ATM Network Management Application 540.

In recapitulation, the present invention is a method and apparatus for providing commonality in the interface between a consumer's telecommunication equipment and a plurality of broadband information distribution networks. The present invention further includes an architecture through which a user (or more appropriately a principal)

may obtain secure, authorized and billable connections to broadband networks. The invention provides a general-purpose, full-bandwidth, bi-directional communication device with built-in Authentication, Authorization, and Accounting (AAA) capabilities that connect a home or business with ATM and other switched broadband digital networks in a convenient manner at reasonable cost. The device supports a Document Services Architecture (DSA) and, in particular, supports agent-based communications (including interaction with an Agent Instance Service) to ensure well-behaved communications and fair allocation of network resources among users. The device can be used in a heterogeneous technical environment and with different types of networks and protocols.

It is, therefore, apparent that there has been provided, in accordance with the present invention, a method and apparatus for the control of document communication. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

APPENDIX

```
account-do.re
#|
Copyright (C) 1995 Xerox Corporation. All Rights Reserved. Copyright
protection claimed includes all forms and matters of copyrightable
material and information now allowed by statutory or judicial law or
hereinafter granted, including without limitation, material generated
from the software programs which are displayed on the screen such as
icons, screen display looks, etc.
|#
 !! in-package("RU")
!! in-grammar('user)
constant *account-length*: integer = 555
constant *account-type*: integer = 666
var ACCOUNTING-SERVICE: object-class subtype-of infrastructure
  var Accounting-Service-Name: map(accounting-service, symbol) = {||}
  var Acct-Data-Base: map(accounting-service, set(account-base))
    computed-using Acct-Data-Base(@@) = {}
var ACCOUNT-BASE: object-class subtype-of accounting-service
  var Database-Manager-Name: map(account-base, set(symbol))
    computed-using database-manager-name(@@) = {}
  var account-base-records: map(account-base, set(account-record))
    computed-using account-base-records(@@) = {}
#|
var ACCOUNT-BUFFER: object-class subtype-of conversation
  var account-buffer-records: map(account-buffer, set(account-record))
    computed-using account-buffer-records(@@) = {}
  var account-buffer-id: map(account-buffer, integer) = {||}
  var conversation-sending-receiving: map(conversation, account-buffer) = {||}
|#
var ACCOUNTING-MIB: object-class subtype-of accounting-service
  var MIB-Module-Identity: map(accounting-MIB, symbol) = {||}
  var MIB-Module-Description: map(accounting-MIB, string) = {||}
var ACCOUNT-RECORD: object-class subtype-of conversation
  var account-header-value: map(account-record, account-header) = {||}
  var extension-vector-value: map(account-record, set(extension-vector))
    computed-using extension-vector-vaiue(@@) = {}
  var trailer-record-value: map(account-record, trailer-record) = {||}
var ACCOUNT-HEADER: object-class subtype-of account-record
  var account-length: map(account-header, integer) = {||}
  var account-type: map(account-header, integer) = {||}
  var P-1: map(account-header, dsa-narue) = {||}
  var TM-1: map(account-header, dsa-name) = {||}
  var P-2: map(account-header, dsa-name) = {||}
  var TM-2: map(account-header, dsa-name) = {||}
  var cid: map(account-header, integer) = {||}
  var account-GUTMID: map(account-header, gutmid) = {||}
  var account-billable?: map(account-header, boolean) = {||}
  var account-time-stamp: map(account-header, dsa-time) = {||}
var EXTENSION-HEADER: object-class subtype-of account-record
  var ext-length: map(extension-header, integer) = {||}
  var ext-type: map(extension-header, integer) = {||}
  var ext-gutmaid: map(extension-header, gutmid) = {||}
  var ext-cid: map(extension-header, integer) = {||}
var EXTENSION-VECTOR: object-class subtype-of account-record
  var acct-value: map(extension-vector, symbol) = {||}
  var acct-value-length: map(extension-vector, integer) = {||}
  var acct-value-type: map(extension-vector, integer) = {||}
  var extension-billable?: map(extension-vector, boolean) = {||}
var TRAILER-RECORD: object-class subtype-of account-record
  var trailer-Time-Stamp: map(trailer-record, dsa-time) = {||}
  var status: map(trailer-record, integer) = {||}
  var trailer-type: map(trailer-record, integer) = {||}
  var conversation-account-record: map(conversation, account-record) = {||}
```

APPENDIX-continued

```
var Accounting-Service-Methods: set(symbol) = {'account-open-record-tm,
                                'account-close-record-tm,
                                'account-append-record-tm,
                                'account-flush-record-tm,
                                'account-forward-tm,
                                'account-accept-tm,
                                'account-retrieve-tm,
                                'account-delete-on-attrs-tm,
                                'account-extract-on-attrs-tm }
var ACCOUNTING-VERB: object-class subtype-of DSA-verb
var ACCOUNTING-INTERFACE: map(dsa-context, set(accounting-verb))
                computed-using accounting-interface(@@) = {}
var ACCOUNT-OPEN-RECORD: objectclass subtype-of accounting-verb
 var AORconversation: map(account-open-record, conversation) = {||}
 var AOR-billable?: map(account-open4ecord, boolean) = {||}
 var AOR-reason-code: map(account-open-record, reason-code) = {||}
var ACCOUNT-CLOSE-RECORD: objectclass subtype-of accounting-verb
 var ACR-conversation: map(account-close-record, conversation) = {||}
 var ACR-billable?: map(account-close-record, boolean) = {||}
 var flush?: map(account-close-record, boolean) = {||}
 var ACR-reason-code: map(account-close-record, reason-code) = {||}
var ACCOUNT-APPEND-RECORD. object-class subtype-of accounting-verb
 var AARconversanon: map(account-append4ecord, conversafion) = {||}
 var extension__vector: map(account-append-record, symbol) = {||}
 var AAR-reason-code: map(account-append-record, reason-code) = {||}
var ACCOUNT-FLUSH-RECORD: object-class subtype-of accounting-verb
 var AFR-conversation: map(account-flush-record, conversation) = {||}
 var AFR-reason-code: map(account-flush-record, reason-code) = {||}
var ACCOUNT-FORWARD: object-class subtype-of accounting-verb
 var AF-acct-data-base: map(account-forward, set(account-base))
                computed-using af-acct-data-base(@@) = {}
 var acct-record-p__1: map(account-forward, principal) = {||}
 var to-account-service: map(account-forward, accounting-service) = {||}
 var AF-reason-code: map(account-forward, reason-code) = {||}
 var result: map(account-forward, string) = {||}
var ACCOUNT-RETRIEVE: object-class subtype-of accounting-verb
 var ar-acct-data-base: map(account-retrieve, set(account-base))
                computed-using ar-acct-data-base(@@) = {}
 var sending-p__1: map(account-retrieve, principal) = {||}
 var ar-reason-code: map(account-retrieve, reason-code) = {||}
var ACCT-DELETE-ON-ATTRIBUTES: object-class subtype-of accounting-verb
 var adoa-acct-data-base: map(acct-delete-on-attributes, set(account-base))
                computed-using adoa-acct-data-base(@@) = {}
 var adoa-reason-code: map(acct-delete-on-attributes, reason-code) = {}
 var adoa-account-record: map(acct-delete-on-attributes, account-record) = {||}
 var adoa-extension-vector: map(acct-delete-on-attributes, set(extension-vector))
                computed-using adoa-extension-vector(@@) = {}
 var adoa-keys: map(acct-delete-on-attributes, seq(symbol))
                computed-using adoa-keys(@@) = []
var ACCt-EXTRACT-ON-ATTRIBUTES: objectclass subtype-of accounting-verb
 var aeoa-acct-data-base: map(acct-extract-on-attributes, set(account-base))
                computed-using aeoa-acct-data-base(@@) = {}
 var aeoa-account-record: map(acct-extract-on-attributes, account-record) = {||}
 var aeoa-extension-vector: map(acct-extract-on-attributes, set(extension-vector))
                computed-using aeoa-extension-vector(@@) = {}
 var aeoa-keys: map(acct-extract-on-attributes, seq(symbol))
                computed-using aeoa-keys(@@) = []
 var aeoa-reason-code: map(acct-extract-on-attributes, reason-code) = {||}
form DECLARE-ACCOUNTING-TREE-ATTRIBUTES
 define-tree-attributes('accounting-service, {'accounting-service-name,
                        'acct-data-base));
 define-tree-attributes('account-base, {'database-manager-name,
                        'account-base-records });
% define-tree-attributes('account-buffer, {'account-buffer-records,
%                        account-buffer-id});
 define-tree-attributes('accounting-mib, {'mib-module-identity,
                        'mib-module-description});
 define-tree-attributes('account-record, {'account-header-value,
                        'extension-vector-value,
                        'trailer-record-value});
 define-tree-attributes('account-header, {'account-length,
                        'account-type,
                        'tm-1,
                        'tm-2,
                        'cid,
                        'account-billable?,
                        'account-time-stamp,
                        'account-gutmid));
 define-tree-attributes('extension-header, {'ext-length,
```

APPENDIX-continued

```
                        'ext-type,
                        'ext-gutmid,
                        'ext-cid });
define-tree-attributes('extension-vector, {'acct-value,
                        acct-valuelength,
                        acct-value-type,
        'extension-billable?});
define-tree-attributes('trailer-record,
                        'trailer-time-stamp,
                        'status,
        'trailer-type});
define-tree-attributes('account-open-record, {'aor-conversation,
                        'aor-billable?,
                        'aor-reason-code});
define-tree-attributes('account-close-record, {'acr-conversation,
                        'acr-billable?,
                        'flush?,
                        'acr-reason-code});
define-tree-attributes('account-append-record, {'aar-conversation,
                        'extension_vector,
                        'aar-reason-code});
define-tree-attributes('account-flush-record, {'afr-conversation,
                        'afr-reason-code});
define-tree-attributes('account-forward, {'af-acct-data-base,
                        'acct-record-p_1,
                        'to-account-service,
                        'af-reason-code, 'result});
define-tree-attributes('account-retrieve, {'ar-acct-data-base,
                        'sending-p_1,
                        'ar-reason-code});
define-tree-attributes('acct-delete-on-attributes, {'adoa-acct-data-base,
                        'adoa-reason-code,
                        'adoa-account-record,
                        'adoa-extension-vector,
                        'adoa-keys });
define-tree-attributes('acct-extract-on-attributes, {'aeoa-acct-data-base,
                        'aeoa-reason-code,
                        'aeoa-account-record,
                        'aeoa-extension-vector,
                        'aeoa-keys})
ais-dom.re
#|
Copyright (C) 1995 Xerox Corporation. All Rights Reserved. Copyright
protection claimed includes all forms and matters of copyrightable
material and information now allowed by statutory or judicial law or
hereinafter granted, including without limitation, material generated
from the software programs which are displayed on the screen such as
icons, screen display looks, etc.
|#
!! in-package("RU")
!! in-grammar('user)
%%%%%%%%%%%%%%%%%%%%%%%%%%%%%%%%%%%%%%%%%%%%%%%%%%%%
%%%%%%%%%%%%%%%%%%%%%%%%
% ais#domain-model.re                    %
%%%%%%%%%%%%%%%%%%%%%%%%%%%%%%%%%%%%%%%%%%%%%%%%%%%%
%%%%%%%%%%%%%%%%%%%%%%%%
% Agent Instance Service Object Classes
var AGENT-INSTANCE-SERVICE: object-class subtype-of infrastructure
  var AIS-NAME: map(agent-instance-service, dsa-name) = {||}
var AIS-PROBABILITY-VECTOR: object-class subtype-of agent-instance-service
  var AIS-Vector-Depth: map(ais-probability-vector, integer) = {||}
var AIS-Vector-Width: map(ais-probability-vector, integer) = {||}
var Ais-Vector-Filters: map(ais-probability-vector, set(bloom-filter))
                        computed-using ais-vector-filters(@@) = {}
var BLOOM-FILTER: object-class subtype-of ais-probability-vector
var BOBS-BLOOM-FILTER: map(bloom-filter, symbol) = {||}
var AIS-ENTRY: object-class subtype-of agent-instance-service
%Following because net-address was defined for convenience, not function
var REAL-NET-ADDRESS: object-class subtype-of address-family
  var BOBS-REAL-ADDRESS: map(real-net-address, symbol) = {||}
  var Active-Principal-Name: map(ais-entry, principal) = {||}
  var Active-Address-Families:
                        map(ais-entry, set(address-family))
                        computed-using active-address-families(@@) = {}
  var Active-Addresses: map(ais-entry, set(real-net-address))
                        computed-using active-addresses(@@) = {}
var AIS-Active-Agent-List: map(agent-instance-service, set(ais-entry))
                        computed-using ais-active-agent-list(@@) = {}
var Local-Probability: map(agent-instance-service,
```

APPENDIX-continued

```
                    ais-probability-vector) = {||}
var AIS-PEER: object-class subtype-of agent-instance-service
var AIS-Peer-Instance: map(ais-peer, set(agent-instance-service))
                    computed-using ais-peer-instance(@@) = {}
var Peer-Probability: map(ais-peer, ais-probability-vector) = {||}
var Agent-Instance-Service-Verbs:
        set(symbol) = {'ais-active,
                       'ais-activate,
                         'ais-inactive,
                         'ais-deactivate,
                         'ais-add-address,
                         'ais-cut-address,
                         'ais-resolve-name,
                         'ais-set-vector-attributes,
                         'ais-get-vector-attributes,
                         'ais-set-vector,
                         'ais-get-vector,
                         'ais-peer-state)
var AIS-VERB: object-class subtype-of DSA-verb
var AIS-ACTIVE: object-class subtype-of ais-verb
%Supplied:
 var ACT-Pname: map(ais-active, DSA-name) = {||}
 var ACT-AFamily: map(ais-active, address-family) = {||}
var ACT-Address: map(ais active, real-net-address) = {||}
%Returned:
var ACT-Reason-Code: map(ais-active, reason-code) = {||}
var AIS-ACTIVATE: object-class subtype-of ais-verb
%Supplied:
 var ATV-Pname: map(ais-activate, DSA-name) = {||}
 var ATV-AFamily: map(ais-activate, address-family) = {||}
 var ATV-Address: map(ais-activate, real-net-address) = {||}
%Returned:
 var ATV-Reason-Code: map(ais-activate, reasoncode) = {||}
var AIS-INACTIVE: object-class subtype-of DSA-verb
%Supplied:
 var INAC-Pname: map(ais-inactive, DSA-name) = {||}
%Retnrned:
 var INAC-Reason-Code: map(ais-inactive, reason-code) = {||}
var AIS-DEACTIVATE: object-class subtype-of DSA-verb
%Supplied:
 var DAC-Pname: map(ais-deactivate, DSA-name) = {||}
%Returned:
 var DAC-Reason-Code: map(ais-deactivate, reason-code) = {||}
var AIS-ADD-ADDRESS: object-cIass subtype-of ais-verb
%Supplied:
 var ADAD-Pname: map(ais-add-address DSA-name) = {||}
 var ADAD-AFamily: map(ais-add-address, address-family) = {||}
 var ADAD-Address: map(ais-add-address, real-net-address) = {||}
%Returned:
 var ADAD-Reason-Code: map(ais-add-address, reason-code) = {||}
var AIS-DELETE-ADDRESS: object-class subtype-of ais-verb
%Supplied:
 var ADEL-Pname: map(ais-delete-address, DSA-name) = {||}
 var ADEL-AFamily: map(ais-delete-address, address-family) = {||}
 var ADEL-Address: map(ais-delete-address, real-net-address) = {||}
%Returned:
 var ADEL-Reason-Code: map(ais-delete-address, reason-code) = {||}
var AIS-RESOLVE-NAME: object-class subtype-of ais-verb
%Supplied:
 var ARN-Pname: map(ais-resolve-name, DSA-name) = (II}
 var ARN-AFamily: map(ais-resolve-name, address-family) = {||}
%Returned:
 var ARN-addresses: map(ais-resolve-name,
                        set(address-family))
         computed-using arn-addresses(@@) = {}
 var ARN-Reason-Code: map(ais-resolve-name, reason-code) = {||}
var AIS-SET-VECTOR-ATTRIBUTES: object-class subtype-of ais-verb
%Supplied:
 var ASVA-Vector-Depth: map(ais-set-vector-attributes, integer) = {||}
 var ASVA-Vector-Width: map(ais-set-vector-attributes, integer) = {||}
 var ASVA-Filters: map(ais-set-vector-attributes,
                       set(bloom-filter))
              computed-using asva-filters(@@)= {}
%Returned:
 var ASVA-Reason-Code: map(ais-set-vector-attributes, reason-code) = {||}
var AIS#GET-VECTOR-ATTRIBUTES: object-class subtype-of ais-verb
%Supplied:
 var AGVA-Peer-Name: map(ais-get-vector-attributes, ais-peer) = {||}
%Returned:
 var AGVA-Vector-Depth: map(ais-get-vector-attributes, integer) ={||}
```

APPENDIX-continued

```
 var AGVA-Vector-Width: map(ais-get-vector-attributes, integer) = {||}
 var AGVA-Filters: map(ais-get-vector-attributes,
                       set(bloom-filter))
                    computed-using agva-filters(@@) = {}
 var AGVA-Reason-Code: map(ais-get-vector-attributes, reason-code) = {||}
var AIS-SET-VECTOR: objectclass subtype-of ais-verb
%Supplied:
 var ASV-Peer-Name: map(ais-set-vector, ais-peer) = {||}
%Returned:
 var ASV-Reason-Code: map(ais-set-vector, reason-code) = {||}
var AIS-GET-VECTOR: object-class subtype-of ais-verb
%Supplied:
 var AGV-Peer-Name: map(ais-get-vector, ais-peer) = {||}
%Returned:
 var AGV-Vector: map(ais-get-vector, ais-probability-vector) = {||}
 var AGV-ReasonCode: map(ais-get-vector, reason-code) = {||}
ais-gra.re
#||
Copyright (C) 1995 Xerox Corporation. All Rights Reserved. Copyright
protection claimed includes all forms and matters of copyrightable
material and information now allowed by statutory or judicial law or
hereinafter granted, including without limitation, material generated
from the software programs which are displayed on the screen such as
icons, screen display looks, etc.
||#
%%%%%%%%%%%%%%%%%%%%%%%%%%%%%%%%%%%%%%%%%%%%%%%%%%%
%%%%%%%%%%%%%%%%%%%%%%%%%%%
%              ais-grammar.cat                  %
%        To be included in the universal grammar file
%%%%%%%%%%%%%%%%%%%%%%%%%%%%%%%%%%%%%%%%%%%%%%%%%%%
%%%%%%%%%%%%%%%%%%%%%%%%%%%
         agent-instance-service    ::=    ["agent-instance-service"
                                           ais-name
                                           ais-active-agent-list
                                           local-probability]
                                               builds agent-instance-service,
         ais-active               ::=    ["ais-active" "("
                                           act-pname",
                                           act-afamily",
                                           act-address")"
                                           "returns"
                                           act-reason-code]
                                               builds ais-active,
         ais-activate             ::=    ["ais-activate" "(
                                           atv-pname ",
                                           atv-afamily ",
                                           atv-address ")"
                                           "returns"
                                           atv-reason-code]
                                               builds ais-activate,
         ais-inactive             :=     ["ais-inactive" "("
                                           inac-pname")"
                                           "returns""
                                           inac-reason-code
                                               builds ais-inactive,
         ais-deactivate ::=    ["ais-
                                deacti-
                                vate"
                                "("
                                           dac-pname")"
                                           "returns"
                                           dac-reason-code]
                                               builds ais-deactivate,
         ais-add-address          ::=    ["ais-add-address" "("
                                           adad-pname",
                                           adad-afamily",
                                           adad-address")"
                                           "returns"
                                           adad-reason-code]
                                               builds ais-add-address,
         ais-delete-address       ::=    ["ais-delete-address" "("
         adel-pname",
         adel-afamily",
         adel-address")"
         "returns"
         adel-reason-code]
                                               buiids ais-delete-address,
         ais-resolve-name         ::=    ["ais-resolve-name" "("
                                           arn-pname",
```

APPENDIX-continued

```
                                            arn-afamily * ")"
%Above should probably be family name
                                        "returns"
                                        arn-addresses ","
                                        arn-reason-code]
                                            builds ais-resolve-name,
        ais-set-vector-attributes   ::=    ["ais-set-vector-attributes" "("
                                        asva-vector-depth * ","
                                        asva-vector-width * ","
                                        asva-filters * ")"
                                        "returns"
                                        asva-reason-code]
                                            builds ais-set-vector-attributes,
        ais-get-vector-attributes   ::=    ["ais-get-vector-attributes" "("
                                        agva-peer-name * ","
                                        agva-vector-depth","
                                        agva-vector-width","
                                        agva-filters")"
                                        "returns"
                                        agva-reason-code]
                                            builds ais-get-vector-attributes,
        ais-set-vector ["ais-set-vector" "("
                                        asv-peer-name ","
                                        "returns"
                                        asv-reason-code]
                                            builds ais-set-vector,
        ais-get-vector ["ais-get-vector"
        "("
                                        agv-peer-name")"'"
                                        "returns"
                                        agv-vector","
                                        agv-reason-code]
                                            builds ais-get-vector
end
authent.re
#||
Copyright (C) 1995 Xerox Corporation. All Rights Reserved. Copyright
protection claimed includes all forms and matters of copyrightable
material and information now allowed by statutory or judicial law or
hereinafter granted, including without limitation, material generated
from the software programs which are displayed on the screen such as
icons, screen display looks, etc.
||#
!! in-package("RU")
!! in-grammar('syntax)
grammar AUTHENTICATION
  start-classes authentication-request, authentication-response
  productions
      authentication-request      ::= ["authenticate"
                                      prin-2-be-authenticated
                                      "{"
                                      authentication-token
                                      "}"] builds authentication-request,
      principal                   ::= [principal-name] builds principal,
      dsa-name                    ::= [dsa-name-value] builds dsa-name,
      token                       ::= [token-string] builds token,
%%%%%%%%%%%%%%%%%%%%
      authentication-response     ::= [authentication-r-value]
                                      builds authentication-response
end
authent.re0
#||
Copyright (C) 1995 Xerox Corporation. All Rights Reserved. Copyright
protection claimed includes all forms and matters of copyrightable
material and information now allowed by statutory or judicial law or
hereinafter granted, including without limitation, material generated
from the software programs which are displayed on the screen such as
icons, screen display looks, etc.
||#
!! in-package("RU")
!! in-grammar('user)
"authentication-domain-model.re - 7/10/95"
var AUTHENTICATION-SERVICE: object-class subtype-of infrastructure
var AUTHENTICATION-REQUEST: object-class subtype-of dsa-language
var PRIN-2-BE-AUTHENTICATED: map(authentication-request, principal) = {||}
var AUTHENTICATION-TOKEN: map(authentication-request, token) = {||}
var AUTHENTICATION-RESPONSE: object-class subtype-of dsa-language
var AUTHENTICATION-R-VALUE: map(authentication-response, string)
                    computed-using authentication-r-value(@@) = []
```

APPENDIX-continued

```
var CREDENTIALS: object-class subtype-of authentication-service
  var CRED-CONTNTS: map(credentiais, any-type) = {||}
var TOKEN: object-class subtype-of authentication-service
  var TOKEN-STRING: map(token, string)
                  computed-using token-string(@@) = []
var SECURITY-CONTEXT: object-class subtype-of authentication-service
  var SC-TARGET: map(security-context, dsa-name) = {||}
  var SC-TOKEN: map(security-context, token) = {||}
  var SC-DELEG-FLAG: map(security-context, boolean) = {||}
%% Several more ofthese true/false flags are needed - see GSSAPI
  var SC-TIME: map(security-context, integer) = {||}
  var SC-CONTENTS: map(security-context, any-type) = {||}
%%% Principal authentication attributes
var PRINCIPAL-CREDENTIALS: map(principal, credentials) = {||}
var PRINCIPAL-SC: map-principal, security-context) = {||}
var DYADS-OF-PRINCIPAL: map(principal, set(dyad))
                  computed-using dyads-of-principal(@@) = {}
%%% Dyad authentication attributes
var SC-OF-DYAD: map(dyad, security-context) = {||}
%%% Giobal Constants
constant *GSS-S-COMPLETE*: integer = 0
constant *GSS-S-BAD-NAME*: integer = 1
constant *GSS-S-FAILURE*: integer = 2
%%%
authori.re
#||
Copyright (C) 1995 Xerox Corporation. All Rights Reserved. Copyright
protection claimed includes all forms and matters of copyrightable
material and information now allowed by statutory or judicial law or
hereinafter granted, including without iimitation, material generated
from the software programs which are displayed on the screen such as
icons, screen display looks, etc
||#
!! in-package("RU")
!! in-grammar('user)
"authorization-domain-model.re"
var AUTHORIZATION-SERVICE: object-class subtype-of infrastructure
var CAPABILITY: object-class subtype-of authorization-service
var CAPABILITY-CLASSIFICATION: map(capability, set(symbol))
  computed-using capability-classification(@@) = {}
var AUTHORIZATION-TICKET: object-class subtype-of autnorization-service
var ACCESS-RIGHTS: map(authorization-ticket, set(symbol))
  computed-using access-rights(@@) = {}
% Xarious definitions new attributes for some DSA objects
var PRINCIPALS-AUTHORIZATION-TICKETS:
  map(principal, set(authorization-ticket))
     computed-using principals-authorization-tickets(@@) = {}
var TRANSACTION-METHODS-AUTHORIZATION-TICKETS:
  map(transaction-method, set(authorization-ticket))
     computed-using transaction-methods-authorization-tickets(@@) = {}
var PRINCIPALS-CAPABILITY: map(principal, capability) = {||}
var TRANSACTION-METHODS-CAPABILITY: map(transaction-method, capability) = {||}
directo.re
#||
Copyright (C) 1995 Xerox Corporation. All Rights Reserved. Copyright
protection claimed includes all forms and matters of copyrightable
material and information now allowed by statutory or judicial law or
hereinafter granted, including without limitation, material generated
from the software programs which are displayed on the screen such as
icons, screen display looks, etc.
||#
!! in-package("RU")
!! in-grammar('user)
var DIRECTORY-VERB: object-class subtype-of dsa-verb
var DIRECTORY-INTERFACE: map(dsa-context, set(directory-verb))
                  computed-using directory-interface(@@) = {}
var D__CREATE-OBJECT: object-class subtype-of directory-verb
var CREATE-OBJECT-NAME: map(dgreate-object, dsa-name) = {II
var CREATE-OBJECT-REASON-CODE: map(d__create-object, reason-code) = {||}
var D__DELETE-OBJECT: object-class subtype-of directory-verb
var DELETE-OBJECT-NAME: map(d__delete-object, dsa-name) = {||}
var DELETE-OBJECT-REASON-CODE: map(d__delete-object, reason-code) = {||}
dsa-acc.re
#||
Copyright (C) 1995 Xerox Corporation. All Rights Reserved. Copyright
protection claimed includes all forms and matters of copyrightable
material and information now allowed by statutory or judiciai law or
hereinafter granted, including without limitation, material generated
from the software programs which are displayed on the screen such as
```

APPENDIX-continued icons, screen display looks, etc.
!! in-package("RU")
!! in-grammar('user)
%%%%%%%%%%%%%%%%%%%%%%%%%%%%%%%%%%%%%%%%%%%%%%%%%%%
%%%%%%%%%%%%%%%%%%%%%%%%%%%
%
% The first four transaction methods below are agent transaction methods,
% therefore they are used in the agent code in dsa-communication-model.re.
% They are commented out here because they are declared in that file.
%
%%%%%%%%%%%%%%%%%%%%%%%%%%%%%%%%%%%%%%%%%%%%%%%%%%%
%%%%%%%%%%%%%%%%%%%%%%%%%%%
||
var ACCOUNT-OPEN-RECORD-TM: transaction-method =
        set-attrs(make-object('transaction-method),
                'transaction-methed-name,
                set-attrs(make-object('dsa-name),
                        'dsa-name-value, 'account-open-record-tm))
var ACCOUNT-CLOSE-RECORD-TM: transaction-method =
        set-attrs(make-object('transaction-method),
                'transaction-method-name,
                set-attrs(make-object('dsa-name),
                        'dsa-name-value, 'account-close-record-tm))
var ACCOUNT-APPEND-RECORD-TM: transaction-method =
        set-attrs(make-object('transaction-method),
                'transaction-method-name,
                set-attrs(make-object('dsa-name),
                        'dsa-name-value, 'account-append-record-tm))
var ACCOUNT-FLUSH-RECORD-TM: transaction-method =
        set-attrs(make-object('transaction-method),
                'transaction-method-name,
                set-attrs(make-object('dsa-name),
                        'dsa-name-value, 'account-flush-record-tm))
||#
var ACCOUNT-FORWARD-TM: transaction-method =
        set-attrs(make-object('transaction-method),
            'transaction-method-name,
                set-attrs(make-object('dsa-name),
                        'dsa-name-value, 'account-forward-tm))
var ACCOUNT-RETRIVE-TM: transaction-method =
        set-attrs(make-object('transaction-method),
                'transaction-method-name,
                set-attrs(make-object('dsa-name),
                        'dsa-name-value, 'account-retrieve-tm))
var ACCOUNT-ACCEPT-TM: transaction-method =
        set-attrs(make-object('transaction-method),
            'transaction-method-name,
                set-attrs(make-object('dsa-name),
                        'dsa-name-value, 'account-accept-tm))
var ACCOUNT-DELETE-ON-ATTRS-TM: transaction-method =
        set-attrs(make-object('transaction-method),
                'transaction-method-name,
                set-attrs(make-object('dsa-name),
                        'dsa-name-value, 'account-delete-on-attrs-tm))
var ACCOUNT-EXTRACT-ON-ATTRS-TM: transaction-method =
        set-attrs(make-object('transaction-method),
                'transaction-method-name,
                set-attrs(make-object('dsa-name),
                        'dsa-name-value, 'account-extract-on-attrs-tm))
%%%%%%%%%%%%%%%%%%%%%%%%%%%%%%%%%%%%%%%%%%%%%%%%%%%
%%%%%%%%%%%%%%%%%%%%%%%%%%%This function is commented out in this file
because the dsa-communcation-model.re needs to call this function to compile. This file is compiled after
the dsa-communcation-model.re file. We moved this file to the dsa-communcation-model.re in order to
make the function build-conversation work.
%This function needs more work. The function is called by the agent when a conversation is established.
There is an arguement that instead of the conversation object, the conversation-id should be passed on as
the supplied parameter. Will change this function when the communication model is stablized.
%What the function does is to populate an accounting-header record for an established conversation. Need
to work on the invoked principal and tm values.
||
function OPEN-ACCOUNT-RECORD(conv: conversation) : reason-code =
 let(new-account-header: Account-header = make-object('account-header),
   Invoking-principal: principal = first(ancestors-of-class(conv, 'principal)),
   Invoked-principal: principal = make-object('principal),
   Invoking-tm: transaction-metnod = least-ancestor-of-class(conv, 'transaction-method),
   Invoked-tm: transaction-method = make-object('transaction-method),
   h: gutmid = make-object('gutmid),
   f: dsa-time = make-object('dsa-time),
   reason: reason-code = returned-error)

APPENDIX-continued

```
    (if undefined?(conv) then
      reason <- returned-error
    else
      p-1 (new-account-header) <- principal-name(Invoking-principal);
      tm-1(new-account-header) <- transaction-method-nanne(Invoking-tm);
      p-2(new-account-header) <- principal-name(Invoked-principal);
      tm-2(new-account-header) <- transaction-method-name(Invoked-tm);
      cid(new-account-header) <- conversation-id(conv);
      account-gutmid(new-account-header) <- h;
      account-time-stamp(new-account-header) <- f;
      account-billable?(new-account-header) <- false;
      account-length(new-account-header) <- *account-length*;
      account-type(new-account-header) <- *account-type*;
      re::format-vars(true, new-account-header);
    reason <- return-ok);
   reason
||#
%%%%%%%%%%%%%%%%%%%%%%%%%%%%%%%%%%%%%%%%%%%%%%%%%%
%%%%%%%%%%%%%%%%%%%%%%%%%%%%%%%%%%%To test the open-account-record function, use
the following command. This function is invoked by the create-dsa-model function in the system test script.
%:eval create-dsa-model(*top*)
%%%%%%%%%%%%%%%%%%%%%%%%%%%%%%%%%%%%%%%%%%%%%%%%%%
%%%%%%%%%%%%%%%%%%%%%%%%%%%%%%%%%%%To generate an extension vector when this
function is called.
%- if the account-header is in the agent's buffer, append the extension-vector to the account-header,
%- if the account-header has been flushed to the accounting service already, then generate an extension
header and append the vector to the extension header.
function APPEND-ACCOUNT-RECORD(target-cid: integer) : reason-code =
  let(new-ext-vector: extension-vector = make-object('extension-vector),
      new-ext-header: extension-header = make-object('extension-header),
      old-account-header: seq(account-header) = ([x| (x) account-header(x) & cid(x) = target-cid]),
      reason: reason-code = returned-error,
      h: gutmid = make-object('gutmid),
      new-account-header: seq(account-header) = [],
      new-extension-vector: seq(extension-vector) = [])
%If there is more than one account-header with the right cid in the buffer, then error-message returned.
  (if size(old-account-header)> 1 then
      reason <- returned-error;
      re:: format-vars (true, old-account-header)
%if there is one account-header with the right cid, then populate the extension-vector and append to the
account-header.
   elseif size(old-account-header) = 1 then
      (acct-value(new-ext-vector) <- *acct-value*;
      acct-value-length(new-ext-vector) <- *acct-value-length*;
      acct-value4ype(new-ext-vector) <- * acct-value-type*;
      extension-billable?(new-ext-vector) <- true;
      re::format-vars(true, new-ext-vector);
      new-account-header <- append(old-account-header, new-ext-vector);
      re::format-vars(true, new-account-header))
%if there is no account-header with the right cid in the agent buffer, populate an extension-header with the
right cid and then append the extension-vector with the extension-header.
   elseif size(old-account-header) = 0 then
      (ext-length(new-ext-header) <- *ext-length*;
      ext-type(new-ext-header) <-*ext-type*;
      ext-gutnaid(new-ext-header) <- h;
      ext-cid(new-ext-header) <- target-cid;
      re::format-vars(true, new-ext-header);
      new-extension-vector <- append([new-ext-header], new-ext-vector);
      re::format-vars(true, new-extension-vector);
    reason <- return-ok));
   reason
constant *ext-length* : integer = 6
constant *ext-type* : integer = 2
constant *acct-value-length* : integer = 100
constant *acct-value-type* : integer = 200
constant *acct-value* : symbol = 'couldbeanything
%%%%%%%%%%%%%%%%%%%%%%%%%%%%%%%%%%%%%%%%%%%%%%%%%%
%%%%%%%%%%%%%%%%%%%%%%%%%%%%%%
% In order to test the "else" statement, change the *test-convid-value* to a new number that does not
correspond to any of the cid value in all the test-account-records and run the :eval command. This will
result to a new-extension-header be generated first and then be appended to the new-extension-vector.
%:eval append-account-record(*test-convid-value*)
%Eventually, needs to set up a function to change the database automatically so that the if, else scenarios
can be tested without manually alter the data.
var *test-lhs-principal* : principal =
         *initialize-a-principal*('test-lhs-principal,
                                        'test-lhs-transaction)
var *test-rhs-principal* : principal =
         *initialize-a-principal*('test-rhs-principal,
```

APPENDIX-continued

```
                                                    'test-rhs-transaction)
var *test-gutmid-value* : gutmid = set-attrs(make-object('gutmid),
                                                    gutmid-value, ['abc, 'def])
var *test-convid-value* : integer = 44444444
var *test-extension-vector-10* : extension-vector =
        set-attrs(make-object('extension-vector),
                                                    'acct-value, 'ForrestGump,
                                                    'acct-value-length, 99,
                                                    'acct-value-type, 88,
                                                    extension-billable?, true)
var *test-extension-vector-20* : extension-vector =
        set-attrs(make-object('extension-vector),
                                                    'acct-value, 'ForrestGump,
                                                    'acct-value-length, 99,
                                                    'acct-value-type, 88,
                                                    'extension-billable?, true)
var *test-extension-vector-30* : extension-vector =
        set-attrs(make-object('extension-vector),
                                                    'acct-value, 'ForrestGump,
                                                    'acct-value-length, 99,
                                                    'acct-value-type, 88,
                                                    'extension-billable?, true)
var *test-extension-vector-40* : extension-vector =
        set-attrs(make-object('extension-vector),
                                                    acct-value, 'ForrestGump,
                                                    'acct-value-length, 99,
                                                    'acct-value-type, 88,
                                                    'extension-billable?, true)
var *test-extension-vector-50* : extension-vector =
        set-attrs(make-object('extension-vector),
                                                    'acct-value, 'ForrestGump,
                                                    'acct-value-length, 99,
                                                    'acct-value-type, 88,
                                                    'extension-billable?, true)
var *test-extension-vector-60* : extension-vector =
        set-attrs(make-object('extension-vector),
                                                    'acct-value, 'ForrestGump,
                                                    'acct-value-length, 99,
                                                    'acct-value-type, 88,
                                                    'extension-billable?, true)
var *test-trailer-record-10* : trailer-record =
        set-attrs(make-object('trailer-record),
                                                    'trailer-time-stamp,
                                                    make-object('dsa-time), 'status, 1)
var *test-trailer-record-20* : trailer-record =
        set-attrs(make-object('trailer-record),
                                                    'trailer-time-stamp,
                                                    make-object(,dsa-time), 'status, 1)
var *test-trailer-record-30* : trailer-record =
        set-attrs(make-object('trailer-record),
                                                    'trailer-time-stamp, set-attrs(make-object('dsa-time),
                'dsa-hour, 08,
                'dsa-minute, 56,
                'dsa-second, 58),
                'status, 1)
var *test-account-header-10* : account-header =
 set-attrs (make-object('account-header),
        'account-length, 12,
        'account-type, 12,
        'cid, 66,
        'p-1, principal-name(*test-rhs-principal*),
        'p-2, principal-name(*test-lhs-principal*),
        'tm-1, set-attrs(make-object('dsa-name), 'dsa-name-value, 'tm-1),
        'tm-2, set-attrs(make-object('dsa-name), 'dsa-name-value, 'tm-2),
        'account-gutmid, set-attrs(make-object('gutmid),
                                                    gutmid-value, ['abc, 'jkl]))
var *test-account-record-10* : account-record =
 set-attrs(make-object('account-record),
        'account-header-value, *test-account-header-10*,
        'extension-vector-value, {*test-extension-vector-10*,
                                                    *test-extension-vector-20*),
        'trailer-record-value, *test-trailer-record-10*)
var *test-account-header-20* : account-header =
 set-attrs(make-object('account-header),
        'account-length, 12,
        'account-type, 12,
        'cid, 75,
        'p-1, principal-name(*test-lhs-principal*),
        'p-2, principal-name(*test-rhs-principal*),
```

APPENDIX-continued

```
            'tm-1, set-attrs(make-object('dsa-name), 'dsa-name-value, 'tm-1),
            'tm-2, set-attrs(make-object('dsa-name), 'dsa-name-value, 'tm-2),
            'account-gutmid, set-attrs(make-object('gutmid),
                                       'gutmid-value, ['abc, 'def]))
var *test-account-record-20*: account-record =
  set-attrs(make-object('account-record),
            'account-header-value, *test-account-header-20*,
            'extension-vector-value, {*test-extension-vector-30*,
                                      *test-extension-vector-40*),
            'trailer-record-value, *test-trailer-record-20*)
var *test-account-header-30* : account-header =
  set-attrs(make-object('account-header),
            'account-length, 12,
            'account-type, 12,
            *cid, 99,
            'p-1, principal-name(*test-ihs-principal*),
            'p-2, principal-nanae(*test-rhs-principal*),
            'tm- 1, set-attrs(make-object('dsa-name), 'dsa-name-value, 'tm-1),
            'trn-2, set-attrs(make-object('dsa-name), 'dsa-name-value, 'tm-2),
            'account-gutmid, set-attrs(make-object('gutmid),
                                       gutmid-value, ['abc, 'def]),
            account-time-stamp, set-attrs(make-object('dsa-time),
                         'dsa-hour, 08,
                         'dsa-minute, 56,
                         'dsa-second, 08))
var *test-account-rrecord-30* : account-record =
  set attrs(make-object('account-record),
            'account-header-value, *test-account-header-30*,
            'extension-vector-value, {*test-extension-vector-50*
                                      *test-extension-vector-60*},
            'trailer-record-value, *test-trailer-record-30*)
var *test-account-base1* : account-base =
        set-attrs(make-object('account-base),
                  'account-base-records, {*test-account-record-10*,
                                          *test-account-record-20*,
                                          *test-account-record-30*{)
%%%%%%%%%%%%%%%%%%%%%%%%%%%%%%%%%%%%%%%%%%%%%%%%%%%%%%%%%
%%%%%%%%%%%%%%%%%%%%%%%%%%%%%%%%%
%%
function CLOSE-ACCOUNT-RECORD(target-cid : integer,
         abort? : boolean,
         flush? : boolean) : reason-code =           let(t-record: trailer-record = make-
object('trailer-record),
  f: dsa-time = make-object('dsa-time),
  reason: reason-code = retruned-error,
  existing-account-header: set(account-header) = ({x|| (x) account-header(x) & cid(x) = target-cid{))
%Since there should only be one account-header and one trailer-record for each cid, if there is more than
one account-header with the supplied cid, then error message returned.
  (if size(existing-account-header) ~= 1 then
    reason <- returned-error;
    re::format-vars(true, size(existing-account-header))
  else
%If there is only one account-header with the right cid, then populate one trailer-record
    trailer-time-stamp(t-record) <- f;
    trailer-type(t-record) <- *trailer-type*;
    re::format-vars(ture, abort?);
    re::format-vars(true, flush?);
%if the abort? = true, then the status field has a value = abnormal.
%if the abort? = false, then the status field has a value = normal.
    (if abort? = T then
       status(t-record) <- *abnormal*
    else
       status(t-record) <- *normal*);
    re::format-vars(true, status(t-record));
    re::format-vars(true, t-record);
%if the flush? = true, then call the FLUSH-ACCOUNT-RECORD function to send the records to the other
TM.
    (if flush? = true then
     FLUSH-ACCOUNT-RECORD;
    re::format-vars(true, flush-account-record));
   reason <- return-ok);
  reason
constant *normal* : integer = 500
constant *abnormal* : integer = 8
constant *trailer-type* : integer = 345
%%%%%%%%%%%%%%%%%%%%%%%%%%%%%%%%%%%%%%%%%%%%%%%%%%%%%%%
%%%%%%%%%%%%%%%%%%%%%%%%%%%%%%%
%:eval close-account-record(*test-conid-value*, false, true)
%:eval close-account-record(*test-conid-value*, true, true)
```

APPENDIX-continued

```
%test data
var *test-lhs-principal* : principal =
                *initialize-a-principal*('test-lhs-principal,
                                         'test-lhs-transaction)
var *test-rhs-pn.ncipal* : principal =
                *initialize-a-principal*('test-rhs-principal,
                                         'test-rhs-transaction)
var *test-gutmid-value* : gutmid = set-attrs(make-object('gutmid),
                                         'gutmid-value, ['abc, 'def])
var *test-conid-value* : integer = 72480
var *test-extension-vector-100* : extension-vector =
                set-attrs(make-object('extension-vector),
                                         'acct-value, 'ForrestGump,
                                         'acct-value-length, 99,
                                         'acct-value-type, 88,
                                         'extension-billable?, true)
var *test-extension-vector-200* : extension-vector =
                set-attrs(make-object('extension-vector),
                                         'acct-value, 'ForrestGump,
                                         'acct-value-length, 99,
                                         'acct-value-type, 88,
                                         'extension-billable?, true)
var *test-extension-vector-300* : extension-vector =
                set-attrs(make-object('extension-vector),
                                         'acct-value, 'ForrestGump,
                                         'acct-value-length, 99,
                                         'acct-value-type, 88,
                                         'extension-billable?, true)
var *test-extension-vector-400* : extension-vector =
                set-attrs(make-object('extension-vector),
                                         'acct-value, 'ForrestGump,
                                         'acct-value-length, 99,
                                         'acct-value-type, 88,
                                         'extension-billable?, true)
var *test-extension-vector-500* : extension-vector =
                set-attrs(make-object('extension-vector),
                                         'acct-value, 'ForrestGump,
                                         'acct-value-length, 99,
                                         'acct-value-type, 88,
                                         'extension-billable?, true)
var *test-extension-vector-600* : extension-vector =
                set-attrs(make-object('extension-vector),
                                         'acct-value, 'ForrestGump,
                                         'acct-value-lengtn, 99,
                                         'acct-value-type, 88,
                                         'extension-billable?, truie)
var *test-trailer-record-100* : trailer-record =
                set-attrs(make-object('trailer-record),
                                         'trailer-time-stamp,
                                         make-object('dsa-time), 'status, 1)
var *test-trailer-record-200* : trailer-record =
                set-attrs(make-object('trailer-record),
                                         'trailer-time-stamp,
                                         make-object('dsa-time), 'status, 1)
var *test-trailer-record-300* : trailer-record =
                set-attrs(make-object( trailer-record),
                                         'trailer-time-stamp, set-attrs(make-object('dsa-time),
                         'dsa-hour, 08,
                         'dsa-minute, 56,
                         'dsa-second, 58),
                         'status, 1)
var *test-account-header-100* : account-header =
 set-attrs(make-object('account-header),
        'account-length, 12,
        'account-type, 12,
        'cid, 1000,
        'p-1, prinapal-name(*test-rhs-principal*),
        'p-2, principal-name(*test-ihs-principal*),
        'tm-1, set-attrs(make-object('dsa-name), 'dsa-name-value, 'tm-1),
        'tm-2, set-attrs(make-object('dsa-name), 'dsa-name-value, 'tm-2),
        'account-gutmid, set-attrs(make-object('gutmid),
                                         gutmid-value, ['abc, 'jkl]))
var *test-account-record-100* : account-record =
 set-attrs(make-object('account-record),
        'account-header-value, *test-account-header-100*,
        'extension-vector-value, {*test-extension-vector-100*,
                                         *test-extension-vector-200*},
        'trailer-record-value, *test-trailer-record-100*)
var *test-account-header-200* : account-header =
```

APPENDIX-continued

```
set-attrs(make-object('account-header),
        'account-length, 12,
        'account-type, 12,
        'cid, 72480,
        'p-1, principal-name(*test-lhs-principal*),
        'p-2, principal-narue(*test-rhs-principal*),
        'tm-1, set-attrs(make-object('dsa-name), 'dsa-name-value, 'tm-1),
        'tm-2, set-attrs(make-object('dsa-name), 'dsa-name-value, 'tm-2),
        'account-gutmid, set-attrs(make-object('gutmid),
                                    'gutmid-value, ['abc, 'def]))
var *test-account-record-200* : account-record =
set-attrs(make-object('account-record),
        'account-header-value, *test-account-header-200*,
        'extension-vector-value, {*test-extension-vector-300*,
                                  *test-extension-vector-400* },
        'trailer-record-value, *test-trailer-record-200*)
var *test-account-header-300* : account-header =
set-attrs(make-object('account-header),
        'account-length, 12,
        'account-type, 12,
        'cid, 3000,
        'p-1, principal-name(*test-lhs-principal*),
        'p-2, principal-name(*test-rhs-principal*),
        'tm-1, set-attrs(make-object('dsa-name), 'dsa-name-value, 'tm-1),
        'tm-2, set-attrs(make-object('dsa-name), 'dsa-name-value, 'tm-2),
        'account-gutmid, set-attrs(make-object('gutmid),
                                    'gutmid-value, ['abc, 'def]),
                                    account-time-stamp, set-attrs(make-object('dsa-time),
                    'dsa-hour, 08,
                    'dsa-minute, 56,
                    'dsa-second, 08))
var *test-account-record-300* : account-record =
set-attrs(make-object('account-record),
        'account-header-value, *test-account-header-300*,
        'extension-vector-value, {*test-extension-vector-500*,
                                  *test-extension-vector-600*},
        'trailer-record-value, *test-trailer-record-300*)
var *test-account-base3* : account-base =
        set-attrs(make-object('account-base),
                    account-base-records, (*test-account-record-100*,
                                           *test-account-record-200*,
                                           *test-account-record-300*))
%%%%%%%%%%%%%%%%%%%%%%%%%%%%%%%%%%%%%%%%%%%%%%%%%%%%%
%%%%%%%%%%%%%%%%%%%%%%%%%%%%%%%%%%%%To run this function, go to the test data,
change the cid value of the *test-account-record-100* to a new value and change the *test-cid-value* to
match that andload the two variables. Need to run the function twice, one with abort? = true, and one with
abort? = false.
%:eval close-account-record(*test-conid-value*, false, true)
%:eval close-account-record(*test-conid-value*, true, true)
%%%%%%%%%%%%%%%%%%%%%%%%%%%%%%%%%%%%%%%%%%%%%%%%%%%%%
%%%%%%%%%%%%%%%%%%%%%%%%%%%%%%%%%
%
function FlUSH-ACCOUNT-RECORD(conversation-id: integer,
        accting-service-name: symbol) : reason-code =
          let(reason : reason-code = returned-error,
           target-account-records: set(account-record) = ({x| (x) account-record(x) & cid(x) = conversation-id}))
          %if there is no account-record with the right cid in the agent buffers, then error message returned.
            (if empty(target-account-records) then
              re::format-vars(true, target-account-records);
              returned-error
          %if tnere are records found, call the send-some-data function to send over to the destinated tm.
            else
              send-some-data(account-flush-record-tm, account-accept-tm,target-account-records);
              re::format-vars(true, send-some-data);
              re::format-vars(true, account-flush-record-tm);
              re::format-vars(true, account-accept-tm);
              reason <- return-ok);
            reason
            %%%%%%%%%%%%%%%%%%%%%%%%%%%%%%%%%%%%%%%%%%%%%%%%%%%%
            %%%%%%%%%%%%%%%%%%%%%%%%%%%%%%%%%
            %:evai flush-account-record(*tested-cid-value*, *test-acct-service-name*)
            %%test code
            var *test-lbs-principal* : principal =
            *initialize-a-principal*('test-lhs-principal,
                                    'test-lhs-transaction)
var *test-rhs-principal* : principal =
        *initialize-a-principal*('test-rhs-principal,
                                    'test-rhs-transaction)
var *test-gutmid-value* : gutmid = set-attrs(make-object('gutmid),
```

APPENDIX-continued

```
                                           'gutmid-value, ['abc, 'def])
var *tested-cid-value* : integer = 36
var *test-extension-vector-1000* : extension-vector =
        set-attrs(make-object('extension-vector),
                                           'acct-value, 'ForrestGump,
                                           'acct-value-length, 99,
                                           'acct-value-type, 88,
                                           'extension-billable?, true)
var *test-extension-vector-2000* : extension-vector =
        set-attrs(make-object('extension-vector),
                                           'acct-value, 'ForrestGump,
                                           'acct-value-length, 99,
                                           'acct-value-type, 88,
                                           'extension-billable?, true)
var *test-extension-vector-3000* : extension-vector =
        set-attrs(make-object('extension-vector),
                                           'acct-value, 'ForrestGump,
                                           'acct-value-length, 99,
                                           'acct-value-type, 88,
                                           'extension-billable?, true)
var *test-extension-vector-4000* : extension-vector =
        set-attrs(make-object('extension-vector),
                                           'acct-value, 'ForrestGump,
                                           'acct-value-length, 99,
                                           'acct-value-type, 88,
                                           'extension-billable?, true)
var *test-extension-vector-5000* : extension-vector =
        set-attrs(make-object('extension-vector),
                                           'acct-value, 'ForrestGump,
                                           'acct-value-length, 99,
                                           'acct-value-type, 88,
                                           'extension-billable?, true)
var *test-extension-vector-6000* : extension-vector =
        set-attrs(make-object('extension-vector),
                                           'acct-value, 'ForrestGump,
                                           'acct-value-length, 99,
                                           'acct-value-type, 88,
                                           'extension-billable?, true)
var *test-extension-vector-7000* : extension-vector =
        set-attrs(make-object('extension-vector),
                                           'acct-value, 'ForrestGump,
                                           'acct-value-length, 99,
                                           'acct-value-type, 88,
                                           'extension-billable?, true)
var *test-extension-vector-8000* : extension-vector =
        set-attrs(make-object('extension-vector),
                                           'acct-value, 'ForrestGump,
                                           'acct-value-length, 99,
                                           'acct-value-type, 88,
                                           'extension-billable?, true)
var *test-trailer-record-1000* : trailer-record =
        set-attrs(make-object('trailer-record),
                                           'trailer-time-stamp,
                                           make-object('dsa-time), 'status, 1)
var *test-trailer-record-2000* : trailer-record =
        set-attrs(make-object('trailer-record),
                                           'trailer-time-stamp,
                                           make-object('dsa-time), 'status, 1)
var *test-trailer-record-3000* trailer record =
        set-attrs(make-object('trailer-record),
                                           'trailer-time-stamp, set-attrs(make-object('dsa-time),
                        'dsa-hour, 08,
                        'dsa-minute, 56,
                        'dsa-second, 58),
                        'status, 1)
var *test-trailer-record-4000* : trailer-record =
        set-attrs(make-object('trailer-record),
                                           'trailer-time-stamp, set-attrs(make-object('dsa-time),
                        'dsa-hour, 12,
                        'dsa-minute, 56,
                        'dsa-second, 58),
                        status, 1)
var *test-account-header-1000* : account-header =
  set-attrs(make-object('account-header),
          'account-length, 12,
          'account-type, 12,
          'cid, 36,
          'p-1, principal-name(*test-rhs-principal*),
          'p-2, principal-name(*test-ihs-principal*),
```

APPENDIX-continued

```
            'tm-1, set-attrs(make-object('dsa-name), 'dsa-name-value, 'tm-1),
            'tm-2, set-attrs(make-object('dsa-name), 'dsa-name-value, 'tm-2),
            'account-gutmid, set-attrs(make-object('gutmid),
                                       gutmid-value, ['abc, 'jkl]))
var *test-account-record-1000* : account-record =
  set-attrs(make-object('account-record),
            'account-header-value, *test-account-header-1000*,
            'extension-vector-value, {*test-extension-vector-1000*,
                                      *test-extension-vector-2000* },
            'trailer-record-value, *test-trailer-record-1000*)
var *test-account-header-2000* : account-header =
  set-attrs(make-object('account-header),
            'account-length, 12,
            account-type, 12,
            'cid, 46,
            'p-1, principal-name(*test-ihs-principal*),
            'p-2, principal-name(*test-rhs-principal*),
            'tm-1, set-attrs(make-object('dsa-name), 'dsa-name-value, 'tm-1),
            'tm-2, set-attrs(make-object('dsa-name), 'dsa-name-value, 'tm-2),
            'account-gutmid, set-attrs(make-object('gutmid),
                                       gutmid-value, ['abc, 'def]))
                                       var *test-account-record-2000* : account-record =
                                         set-attrs(make-object('account-record),
            'account-header-value, *test-account-header-2000*,
            'extension-vector-value, {*test-extension-vector-3000*,
                                      *test-extension-vector-4000* },
            'trailer-record-value, *test-trailer-record-2000*)
            var *test-account-header-3000*: account-header =
              set-attrs(make-object('account-header),
            account-length, 12,
            'account-type, 12,
            'cid, 36,
            'p-1, principal-name(*test-ihs-principal*),
            'p-2, principal-name(*test-rhs-principal*),
            'tm-1, set-attrs(make-object('dsa-name), 'dsa-name-value, 'tm-1),
            'tm-2, set-attrs(make-object('dsa-name), 'dsa-name-value, 'tm-2),
            'account-gutmid, set-attrs(make-object('gutmid),
                                       gutmid-value, ['abc, 'def]),
            'account-time-stamp, set-attrs(make-object('dsa-time),
                        'dsa-hour, 08,
                        'dsa-minute, 56,
                        'dsa-second, 08))
var *test-account-record-3000* : account-record =
  set-attrs(make-object('account-record),
            'account-header-value, *test-account-header-3000*,
            'extension-vector-value, (*test-extension-vector-5000*,
                                      *test-extension-vector-6000*),
            'trailer-record-value, *test-trailer-record-3000*)
var *test-account-header-4000* : account-header =
  set-attrs(make-object('account-header),
            'account-length, 12,
            'account-type, 12,
            'cid, 22,
            'p-1, principal-name(*test-ihs-principal*),
            'p-2, principal-name(*test-rhs-principal*),
            'tm-1, set-attrs(make-object('dsa-name), 'dsa-name-value, 'tm-1),
            'tm-2, set-attrs(make-object('dsa-name), 'dsa-name-value, 'tm-2),
            'account-gutmid, set-attrs(make-object('gutmid),
                                       'gutmid-value, ['abc, 'def]),
            'account-time-stamp, set-attrs(make-object('dsa-time),
                        'dsa-hour, 08,
                        'dsa-minute, 56,
                        'dsa-second, 08))
var *test-account-record-4000* : account-record
  set-attrs(make-object('account-record),
            account-header-value, *test-account-header-4000*,
            'extension-vector-value, {*test-extension-vector-7000*,
                                      *test-extension-vector-8000* },
            'trailer-record-value, *test-trailer-record-4000*)
var *test-account-base4* : account-base =
        set-attrs(make-object('account-base),
                  'account-base-records, {*test-account-record-1000*,
                                          *test-account-record-2000*,
                                          *test-account-record-3000*,
*test-account-record-4000*})
var *test-conversation* conversation =
        set-attrs(make-object('conversation),
                'conversation-account-record, *test-account-record-1000*)
var *test-acct-service-name* : symbol = 'susie
```

APPENDIX-continued

```
%%%%%%%%%%%%%%%%%%%%%%%%%%%%%%%%%%%%%%%%
%%%%%%%%%%%%%%%%%%%%%%%%%%%%%%%The "Delete" function works the following
way:
%1) check the target database if there is any record existing. If yes, go to 2). If no, return error-message,
%2) loop through all the account records in the target base, find the record with the attribute type and value
matches with the supplied type and value,
%3) delete the records from the target base
%%%%%%%%%%%%%%%%%%%%%%%%%%%%%%%%%%%%%%%%
%%%%%%%%%%%%%%%%%%%%%%%%%%%%%%
function DELETE-ACCOUNT-RECORD-ON-P1 (target-base: account-base,
         principal-1: dsa-name) : reason-code =
let(reason:reason-code = returned-info,
  acct-records: set(account-record) = account-base-records(target-base),
  record-list: set(account-record) = {})
 (if empty(acct-records) then
    reason <- returned-info
  else
    record-iist <- acct-records;
    re::format-vars(true, acct-records);
    (enumerate rec over acct-records do
    (if dsa-name-value(p-1(account-header-value(rec))) = dsa-name-value(principal-1)
         then
      record-list <- acct-records less rec;
      re::format-vars(true, record-list);
      re::format-vars(true, rec);
      record-list <- setdiff(acct-records,
                     (extension-vector-value(rec)));
      re::format-vars(true, (extension-vector-value(rec)));
      record-list <- acct-records less (trailer-record-value(rec));
      re::format-vars(true, trailer-record-value(rec));
      erase-object(rec)));
      account-base-records(target-base) <- record-list;
      re::format-vars(true, account-base-records(target-base));
  reason <- return-ok);
reason
%%%%%%%%%%%%%%%%%%%%%%%%%%%%%%%%%%%%%%%%
%%%%%%%%%%%%%%%%%%%%%%%%%%%%%
function DELETE-ACCOUNT-RECORD-ON-P2(target-base: account-base,
         principal-2: dsa-name) : reason-code =
 let(reason:reason-code = returned-info,
  acct-records: set(account-record) = account-base-records(target-base),
  record-list: set(account-record) = {})
 (if empty(acct-records) then
   reason <- returned-info
 else
   record-1ist <- acct-records;
   re::format-vars(true, acct-records);
   (enumerate rec over acct-records do
   (if dsa-name-value(p-2(account-header-value(rec))) = dsa-name-value(principal-2)
        then
     record-list <- acct-records less rec;
     re::format-vars(true, record-list);
     re::format-vars(true, rec);
     record-list <- setdiff(acct-records,
                    (extension-vector-value(rec)));
     re::format-vars(true, (extension-vector-value(rec)));
     record-list <- acct-records less (trailer-record-value(rec));
     re::format-vars(true, trailer-record-value(rec));
     erase-object(rec)));
     account-base-records(target-base) <- record-list;
     re::format-vars(true, account-base-records(target-base));
  reason <- return-ok);
reason
%%%%%%%%%%%%%%%%%%%%%%%%%%%%%%%%%%%%%%%%
%%%%%%%%%%%%%%%%%%%%%%%%%%%%
function DELETE-ACCOUNT-RECORD-ON-TM1 (target-base: account-base,
         Tmethod-1: dsa-name) : reason-code =
           let(reason:reason-code = returned-info,
             acct-records: set(account-record) = account-base-records(target-base),
             record-list: set(account-record) = {}))
            (if empty(acct-records) then
              reason <- returned-info
            else
              record-list <- acct-records;
              re::format-vars(true, acct-records);
              (enumerate rec over acct-records do
              (if dsa-name-value(tm-1(account-header-value(rec))) = dsa-name-value(Tmethod-1)
           then
              record-list <- acct-records less rec;
```

APPENDIX-continued

```
            re::format-vars(true, record-list);
            re::format-vars(true, rec);
            record-list <- setdiff(acct-records,
                        (extension-vector-value(rec)));
        re::format-vars(true, (extension-vector-value(rec)));
        record-list <- acct-records less (trailer-record-value(rec));
        re::format-vars(true, trailer-record-value(rec));
        erase-object(rec)));
        account-base-records(target-base) <- record-list;
        re::format-vars(true, account-base-records (target-base));
    reason <- return-ok);
reason
%%%%%%%%%%%%%%%%%%%%%%%%%%%%%%%%%%%%%%%%%%%%%
%%%%%%%%%%%%%%%%%%%%%%%%%%%%%%
function DELETE-ACCOUNT-RECORD-ON-TM2(target-base: account-base,
                    Tmethod-2: dsa-name) : reason-code =
                    let(reason:reason-code = returned-info,
                        acct-records: set(account-record) = account-base-records(target-base),
                        record-list: set(account-record) = {})
                        (if empty(acct-records) then
                            reason <- returned-info
                        else
                            record-list <- acct-records;
                            re::format-vars(true, acct-records);
                            (enumerate rec over acct-records do
                                (if dsa-name-value(tm-2(account-header-value(rec))) = dsa-name-value(Tmethod-2)
        then
        record-list <- acct-records less rec;
        re: :format-vars(true, record-list);
        re::format-vars(true, rec);
        record-list <- setdiff(acct-records,
                    (extension-vector-value(rec)));
        re::format-vars(true, (extension-vector-value(rec)));
        record-list <- acct-records less (trailer-record-value(rec));
        re::format-vars(true, trailer-record-value(rec));
        erase-object(rec)));
        account-base-records(target-base) <- record-list;
        re::format-vars(true, account-base-records(target-base));
    reason <- return-ok);
reason
%%%%%%%%%%%%%%%%%%%%%%%%%%%%%%%%%%%%%%%%%%%%%
%%%%%%%%%%%%%%%%%%%%%%%%%%%%%%
function DELETE-ACCOUNT-RECORD-ON-GUTMID(target-base: account-base,
            target-gutmid: gutmid): reason-code =
            let(reason:reason-code = returned-info,
                acct-records: set(account-record) = account-base-records(target-base),
                record-list: set(account-record) = {})
                (if empty(acct-records) then
                    reason <- returned-info
                else
                    record-list <- acct-records;
                    re::format-vars(true, acct-records);
                    (enumerate rec over acct-records do
                        (if gutmid-value(account-gutmid(account-neader-value(rec))) = gutmid-value(target-gutmid)
        then
        record-list <- acct-records less rec;
        re::format-vars(true, record-list);
        re::format-vars(true, rec);
        record-list <- setdiff(acct-records,
                    (extension-vector-value(rec)));
        re::format-vars (true, (extension-vector-value(rec)));
        record-list <- acct-records less (trailer-record-value(rec));
        re::format-vars(true, trailer-record-value(rec));
        erase-object(rec)));
        account-base-records(target-base) <- record-list;
        re::format-vars(trrte, account-base-records(target-base));
    reason <- return-ok);
reason
%%%%%%%%%%%%%%%%%%%%%%%%%%%%%%%%%%%%%%%%%%%%%
%%%%%%%%%%%%%%%%%%%%%%%%%%%%%%
function DELETE-ACCOUNT-RECORD-ON-TIME-STAMP(target-base: account-base,
        starting-time-stamp : dsa-time,
        ending-time-stamp : dsa-time)
        :reason-code =
let(reason:reason-code = returned-info,
 acct-records: set(account-record) = account-base-records(target-base),
 record-list: set(account-record) = {})
 (if empty(acct-records) then
    reason <- returned-info
```

APPENDIX-continued

```
   else
    record-list <- acct-records;
    re::format-vars(true, acct-records);
    (enumerate rec over acct-records do
    (if((dsa-hour(account-time-stamp(account-header-value(rec)))) =
      dsa-hour(starting-time-stamp) and
      dsa-minute(account-time-stamp(account-header-value(rec))) =
      dsa-minute(starting-time-stamp) and
      dsa-second(account-time-stamp(account-header-value(rec))) =
      dsa-second(starting-time-stamp))
           and
      (dsa-hour(trailer-time-stamp(trailer-record-value(rec))) =
      dsa-hour(ending-time-stamp) and
      dsa-minute(trailer-time-stamp(trailer-record-value(rec))) =
      dsa-minute(ending-time-stamp) and
      dsa-second(trailer-time-stamp(trailer-record-value(rec))) =
      dsa-second(ending-time-stamp))
           then
      re::format-vars(true, rec);
      record-list <- acct-records less rec;
      re::format-vars(true, record-list);
      re::format-vars(true, rec);
      record-list <- setdiff(acct-records,
                            (extension-vector-value(rec)));
      re::format-vars(true, (extension-vector-value(rec)));
      record-list <- acct-records less (trailer-record-value(rec));
      re::format-vars(true, trailer-record-value(rec));
      erase-object(rec)));
      account-base-records(target-base) <- record-list;
      re::format-vars(true, account-base-records(target-base));
    reason <- return-ok);
reason
%%%%%%%%%%%%%%%%%%%%%%%%%%%%%%%%%%%%%%%%%%%%%
%%%%%%%%%%%%%%%%%%%%%%%%%%%%%%%
function DELETE-ACCOUNT-RECORD-ON-START-TIME-STAMP(target-base: account-base,
         starting-time-stamp : dsa-time)
         : reason-code =
         let(reason:reason-code = returned-info,
          acct-records: set(account-record) = account-base-records(target-base),
          record-list: set(account-record) = {})
          (if empty(acct-records) tnen
            reason <- returned-info
          else
            record-list <- acct-records;
            re::format-vars(true, acct-records);
            (enumerate rec over acct-records do
            (if((dsa-hour(account-time-stamp(account-header-value(rec)))) =
              dsa-hour(starting-time-stamp) and
              dsa-minute(account-time-stamp(account-header-value(rec))) =
              dsa-rninute(starting-time-stamp) and
              dsa-second(account-time-stamp(account-header-value(rec))) =
              dsa-second(starting-time-stamp))
           then
    re::format-vars(true, rec);
    record-list <- acct-records less rec;
    re::format-vars(true, record-list);
    re::format-vars(true, rec);
    record-list <- setdiff(acct-records,
                          (extension-vector-value(rec)));
    re::format-vars(true, (extension-vector-value(rec)));
    record-list <- acct-records less (trailer-record-value(rec));
    re::format-vars(true, trailer-record-value(rec));
    erase-object(rec)));
    account-base-records(target-base) <- record-list;
    re::format-vars(true, account-base-records(target-base));
  reason <- return-ok);
reason
%%%%%%%%%%%%%%%%%%%%%%%%%%%%%%%%%%%%%%%%%%%%%
%%%%%%%%%%%%%%%%%%%%%%%%%%%%%
function DELETE-ACCOUNT-RECORD-ON-END-TIME-STAMP(target-base: account-base,
         ending-time-stamp : dsa-time)
         reason-code =
let(reason:reason-code = returned-info,
 acct-records: set(account-record) = account-base-records(target-base),
 record-list: set(account-record) = {})
 (if empty(acct-records) then
   reason <- returned-info
 else
   record-list <- acct-records;
```

APPENDIX-continued

```
    re::format-vars(true, acct-records);
    (enumerate rec over acct-records do
    (if((dsa-hour(trailer-time-stamp(trailer-record-value(rec))) =
    dsa-hour(ending-time-stamp) and
    dsa-miute(trailer-time-stamp(trailer-record-value(rec))) =
    dsa-minute(ending-time-stamp) and
    dsa-second(trailer-time-stamp(trailer-record-value(rec))) =
    dsa-second(ending-time-stamp)))
        then
    re::format-vars(true, rec);
    record-list <- acct-records less rec;
    re::format-vars(true, record-list);
    re::format-vars(true, rec);
    record-list <- setdiff(acct-records,
                    (extension-vector-value(rec)));
    re::format-vars(true, (extension-vector-value(rec)));
    record-list <- acct-records less (trailer-record-value(rec));
    re::format-vars(true, trailer-record-value(rec));
    erase-object(rec)));
    account-base-records(target-base) <- record-list;
    re::format-vars(true, account-base-records(target-base));
  reason <- return-ok);
reason
%%%%%%%%%%%%%%%%%%%%%%%%%%%%%%%%%%%%%%%%%%%%%%
%%%%%%%%%%%%%%%%%%%%%%%%%%%%%%%%
function DELETE-ACCOUNT-RECORD-ON-CID(target-base: account-base,
        target-acctcid: integery: reason-code =
let(reason:reason-code returned-info,
 acct-records: set(account-record) = account-base-records(target-base),
 record-list: set(account-record) = {})
 (if empty(acct-records) then
   reason <- returned-info
 else
   record-list <- acct-records;
   re::format-vars(true, acct-records);
   (enumerate rec over acct-records do
   (if cid(account-header-value(rec)) = target-acct-cid
        then
    record-list <- acct-records less rec;
    re::format-vars(true, record-list);
    re::format-vars(true, rec);
    record-list <- setdiff(acct-records,
                    (extension-vector-value(rec)));
    re::format-vars(true, (extension-vector-value(rec)));
    record-list <- acct-records less (trailer-record-value(rec));
    re::format-vars(true, trailer-record-value(rec));
    erase-object(rec)));
    account-base-records(target-base) <- record-list;
    re::format-vars(true, account-base-records(target-base));
  reason <- return-ok);
reason
%%%%%%%%%%%%%%%%%%%%%%%%%%%%%%%%%%%%%%%%%%%%%%
%%%%%%%%%%%%%%%%%%%%%%%%%%%%%%%
function DELETE-ACCOUNT-RECORD-ON-STATUS(target-base: account-base,
        target-status: integer) : reason-code =
let(reason:reason-code = returned-info,
 acct-records: set(account-record) = account-base-records(target-base),
 record-list: set(account-record) = {})
 (if empty(acct-records) then
   reason <- returned-info
 else
   record-list <- acct-records;
   re::format-vars(true, acct-records);
   (enumerate rec over acct-records do
   (if status(trailer-record-value(rec)) = target-status
        then
    record-list <- acct-records less rec;
    re::format-vars(true, record-list);
    re::format-vars(true, rec);
    record-list <- setdiff(acct-records,
        (extension-vector-value(rec)));
    re::format-vars(true, (extension-vector-value(rec)));
    record-list <- acct-records less (trailer-record-value(rec));
    re::format-vars(tnie, trailer-record-value(rec));
    erase-object(rec)));
    account-base-records(target-base) <- record-list;
    re::format-vars(true, account-base-records(target-base));
  reason <- return-ok);
reason
```

APPENDIX-continued

```
%%%%%%%%%%%%%%%%%%%%%%%%%%%%%%%%%%%%%%%%%%%%%%%%
%%%%%%%%%%%%%%%%%%%%%%%%%%%%%%%
%%test code
var *starting-time-stamp* : dsa-time = set-attrs(make-object('dsa-time),
                        'dsa-hour, 08,
                        *dsa-minute, 56,
                        *dsa-second, 08)
var *ending-time-stamp*: dsa-time =
                        set-attrs(make-object('dsa-time),
                        'dsa-hour, 08,
                        'dsa-minute, 56,
                        *dsa-second, 58)
var *test-ihs-principal* : principal =
        *initialize-a-principal*('test-lhs-principal,
                                        'test-lhs-transaction)
var *test-rhs-principal* : principal =
        *initialize-a-principal*('test-rhs-principal,
                                        'test-rhs-transaction)
var *test-lhs-transaction* : transaction-method =
        *initialize-a-transaction-method*(
                                        *test-lhs-transaction)
var *test-rhs-transaction* : transaction-method =
        *initialize-a-transaction-method*(
                                        'test-rhs-transaction)
var *test-gutmid-value* : gutmid = set-attrs(make-object('gutmid),
                                        'gutmid-value, ['abc, 'def])
var *testing-cid-value* : integer = 88
var *test-acct-type-value* : integer = 222
var *test-conv-status* : integer = 1
var *test-extension-vector-11* : extension-vector =
                        set-attrs(make-object('extension-vector),
                                        'acct-value, 'ForrestGump,
                                        'acct-value-length, 99,
                                        'acct-value-type, 222,
                                        'extension-billable?, true)
var *test-extension-vector-12* : extension-vector =
                        set-attrs(make-object('extension-vector),
                                        'acct-value, 'ForrestGump,
                                        'acct-value-length, 99,
                                        'acct-value-type, 222,
                                        'extension-billable?, true)
var *test-extension-vector-13* : extension-vector =
                        set-attrs(make-object('extension-vector),
                                        'acct-value, 'ForrestGump,
                                        'acct-value-length, 99,
                                        'acct-value-type, 88,
                                        'extension-billable?, true)
var *test-extension-vector 14* : extension-vector =
                        set-attrs(make-object('extension-vector),
                                        acct-value, 'ForrestGump,
                                        'acct-value-length, 99,
                                        'acct-value-type, 88,
                                        'extension-billable?, true)
var *test-extension-vector-15* : extension-vector =
                        set-attrs(make-object(,extension-vector),
                                        acct-value, 'ForrestGump,
                                        'acct-value-length, 99,
                                        'acct-value-type, 102,
                                        'extension-billable?, true)
var *test-extension-vector 16* : extension-vector =
                        set-attrs(make-object('extension-vector),
                                        'acct-value, 'ForrestGump,
                                        'acct-value-length, 99,
                                        'acct-value-type, 102,
                                        'extension-billable?, true)
var *test-extension-vector-17* : extension-vector =
                        set-attrs(make-object('extension-vector),
                                        acct-value, 'ForrestGump,
                                        'acct-value-length, 99,
                                        'acct-value-type, 125,
                                        'extension-billable?, true)
var *test-extension-vector-18* : extension-vector =
                        set-attrs(make-object('extension-vector),
                                        'acct-value, 'ForrestGump,
                                        'acct-value-length, 99,
                                        'acct-value-type, 125,
                                        'extension-billable?, true)
var *test-trailer-record-11* : trailer-record =
                        set-attrs(make-object('trailer-record),
```

APPENDIX-continued

```
                                             'trailer-time-stamp,
                                             make-object('dsa-time), 'status, 1)
var *test-trailer-record-12* : trailer-record
                set-attrs(make-object('trailer-record),
                                             'trailer-time-stamp,
                                             make-object('dsa-time), 'status, 1)
var *test-trailer-record-13* : trailer-record =
                set-attrs(make-object('trailer-record),
                                             'trailer-time-stamp, set-attrs(make-object('dsa-time),
                        'dsa-hour, 08,
                        'dsa-minute, 56,
                        'dsa-second, 58),
                        'status, 1)
var *test-trailer-record-14* : trailer-record =
                set-attrs(make-object('trailer-record),
                                             'trailer-time-stamp, set-attrs(make-object('dsa-time),
                        'dsa-hour, 12,
                        'dsa-minute, 56,
                        'dsa-second, 58),
                        'status, 4)
var *test-account-header-11* : account-header =
 set-attrs(make-object('account-header),
        'account-length, 12,
        'account-type, 12,
        'cid, 16,
        'p-1, principal-name(*test-rhs-principal*),
        'p-2, principal-name(*test-ihs-principal*),
        'tm-1, transaction-method-name(*test-lhs-transaction*),
        'tm-2, transaction-method-name(*test-rhs-transaction*),
        'account-gutmid, set-attrs(make-object('gutmid),
                                     gutmid-value, ['nbc, 'jkl]))
var *test-account-record-11* : account-record =
 set-attrs(make-object('account-record),
        'account-header-value, *test-account-header-11*,
        'extension-vector-value, {*test-extension-vector-11*,
                                     *test-extension-vector-12*),
        'trailer-record-value, *test-trailer-record-11*)
var *test-account-header-12* : account-header =
 set-attrs(make-object('account-header),
        'account-length, 12,
        'account-type, 12,
        'cid, 33,
        'p-1, principal-name(*test-lhs-principal*),
        'p-2, principal-name(*test-rhs-principal*),
        'tm-1, set-attrs(make-object('dsa-name), 'dsa-name-value, 'tm-1),
        'tm-2, set-attrs(make-object('dsa-name), 'dsa-name-value, 'tm-2),
        'account-gutmid, set-attrs(make-object('gutmid),
                                     gutmid-value, ['abc, 'def]))
var *test-account-record-12*: account-record =
 set-attrs(make-object('account-record),
        'account-header-value, *test-account-header-12*,
        'extension-vector-value, {*test-extension-vector-13*,
                                     *test-extension-vector 14*},
        'trailer-record-value, *test-trailer-record 12*)
var *test-account-header-13*: account-header =
 set-attrs(make-object('account-header),
        'account-length, 12,
        'account-type, 12,
        'cid, 69,
        'p-1, principal-name(*test-ihs-principal*),
        'p-2, principal-name(*test-rhs-principal*),
        'tm-1, set-attrs(make-object('dsa-name), 'dsa-name-value, 'tm-1),
        'tm-2, set-attrs(make-object('dsa-name), 'dsa-name-value, 'trn-2),
        'account-gutmid, set-attrs(make-object('gutmid),
                                     gutmid-value, ['abc, def]),
        'account-time-stamp, set-attrs(make-object('dsa-time),
                        'dsa-hour, 08,
                        'dsa-minute, 56,
                        'dsa-second, 08))
var *test-account-record-13*: account-record =
 set-attrs(naake-object('account-record),
        'account-header-value, *test-account-header-13*,
        'extension-vector-value, (*test-extension-vector-15*,
                                     *test-extension-vector-16*},
        'trailer-record-value, *test-trailer-record-13*)
var *test-account-header-14*: account-header =
 set-attrs(make-object('account-header),
        'account-length, 12,
        'account-type, 12,
```

APPENDIX-continued

```
            'cid, 29,
            'p-1, principal-name(*test-lhs-principal*),
            'p-2, principal-name(*test-rhs-principal*),
            'tm-1, set-attrs(make-object('dsa-name), 'dsa-name-value, 'tm-1),
            'tm-2, set-attrs(make-object('dsa-name), 'dsa-name-value, 'tm-2),
            'account-gutmid, set-attrs(make-object('gutmid),
                                              'gutmid-value, ['abc, 'def]),
             account-time-stamp, set-attrs(make-object('dsa-time),
                         'dsa-hour, 08,
                         'dsa-minute, 56,
                         'dsa-second, 08))
var *test-account-record-14*: account-record =
  set-attrs(make-object('account-record),
            'account-header-value, *test-account-header-14*,
            'extension-vector-value, {*test-extension-vector-17*,
                                              *test-extension-vector-18*},
            'trailer-record-value, *test-trailer-record-14*)
var *test-account-header-15* : account-header =
  set-attrs(make-object('account-header),
            'account-length, 12,
            'account-type, 12,
            'cid, 16,
            'p-1, principal-name(*test-rhs-principal*),
            'p-2, principal-name(*test-ihs-principal*),
            'tm-1, transaction-method-name(*test-lhs-transaction*),
            'tm-2, transaction-method-name(*test-rhs-transaction*),
            'account-gutmid, set-attrs(make-object('gutmid),
                                              'gutmid-value, ['nbc, 'jkl]))
var *test-account-record-15*: account-record =
  set-attrs(make-object('account-record),
            'account-header-value, *test-account-header-15*,
            'extension-vector-value, (*test-extension-vector-11*,
                                              *test-xtension-vector-12* },
            'trailer-record-value, *test-trailer-record-11*)
var *test-account-header-16*: account-header =
  set-attrs(make-object('account-header),
            'account-length, 12,
            'account-type, 12,
            'cid, 33,
            'p-1, principal-name(*test-lns-principal*),
            'p-2, principal-name(*test-rhs-principal*),
            'tm-1, set-attrs(make-object('dsa-name), 'dsa-name-value, 'tm-1),
            'tm-2, set-attrs(make-object('dsa-name), 'dsa-name-value, 'tm-2),
            'account-gutmid, set-attrs(make-object('gutmid),
                                              gutmid-value, ['abc, 'def]))
var *test-account-record-16*: account-record =
  set-attrs(make-object('account-record),
            'account-header-value, *test-account-header-16*,
            'extension-vector-value, (*test-extension-vector-13*,
                                              *test-extension-vector-14*},
            'trailer-record-value, *test-trailer-record-12*)
var *test-account-header-17*: account-header =
  set-attrs(make-object('account-header),
            'account-length, 12,
            'account-type, 12,
            'cid, 69,
            'p-1, principal-name(*test-ihs-principal*),
            'p-2, principal-name(*test-rhs-principal*),
            'tm-1, set-attrs(make-object('dsa-name), 'dsa-name-value, 'tm-1),
            'tm-2, set-attrs(make-object('dsa-name), 'dsa-name-value, 'tm-2),
            'account-gutmid, set-attrs(make-object('gutmid),
                                              'gutmid-value, ['abc, 'def]),
            'account-time-stamp, set-attrs(make-object('dsa-time),
                         'dsa-hour, 08,
                         'dsa-minute, 56,
                         *dsa-second, 08))
var *test-account-record-17*: account-record =
  set-attrs(make-object('account-record),
            'account-header-value, *test-account-header-17*,
            'extension-vector-value, (*test-extension-vector-15*,
                                              *test-extension-vector-16*},
            'trailer-record-value, *test-trailer-record-13*)
var *test-account-header-18*: account-header =
  set-attrs(make-object('account-header),
            'account-length, 12,
            'account-type, 12,
            'cid, 29,
            'p-1, principal-name(*test-ihs-principal*),
            'p-2, principal-name(*test-rhs-principal*),
```

APPENDIX-continued

```
            'tm-1, set-attrs(make-object('dsa-name), 'dsa-name-value, 'tm-1),
            'tm-2, set-attrs(make-object('dsa-name), 'dsa-name-value, 'tm-2),
            'account-gutmid, set-attrs(make-object('gutmid),
                                    'gutmid-value, ('abc, 'def]),
            'account-time-stamp, set-attrs(make-object('dsa-time),
                        'dsa-hour, 08,
                        'dsa-minute, 56,
                        'dsa-second, 08))
var *test-account-record-18* : account-record =
  set-attrs(make-object('account-record),
            'account-header-value, *test-account-header-18*,
            'extension-vector-value, {*test-extension-vector-17*,
                                    *test-extension-vector-18*),
            'trailer-record-value, *test-trailer-record-14*)
var *test-account-header-19* : account-header =
  set-attrs(make-object('account header),
            'account-length 12,
            'account-type, 12,
            'cid, 29,
            'p-1, principal-name(*test-lhs-principal*),
            'p-2, principal-name(*test-rhs-principal*),
            'tm-1, set-attrs(make-object('dsa-name), 'dsa-name-value, 'tm-1),
            'tm-2, set-attrs(make-object('dsa-name), 'dsa-name-value, 'tm-2),
            'account-gutmid, set-attrs(make-object('gutmid),
                                    'gutmid-value, ['abc, 'def]),
            'account-time-stamp, set-attrs(make-object('dsa-time),
                        'dsa-hour, 08,
                        'dsa-minute, 56,
            'dsa-second, 08))
var *test-account-record-19* : account-record =
  set-attrs(make-object('account-record),
            'account-header-value, *test-account-header-19*,
            'extension-vector-value, {*test-extension-vector-17*,
                                    *test-extension-vector-18*},
            'trailer-record-value, *test-trailer-record-14*)
var *test-account-header-21* : account-header =
  set-attrs(make-object('account-header),
            'account-length, 12,
            'account-type, 12,
            'cid, 16,
            'p-1, principal-name(*test-rhs-principal*),
            'p-2, principal-name(*test-lhs-principal*),
            'tm-1, transaction-method-name(*test-lhs-transaction*),
            'tm-2, transaction-method-name(*test-lhs-transaction*),
            'account-gutmid, set-attrs(make-object('gutmid),
                                    'gutmid-value, ['nbc, 'jkl]))
var *test-account-record-21* : account-record =
  set-attrs(make-object('account-record),
            'account-header-value, *test-account-header-21*,
            'extension-vector-value, {*test-extension-vector-11*,
                                    *test-extension-vector-12*},
            'trailer-record-value, *test-trailer-record-11*)
            var *test-account-header-22* : account-header =
              set-attrs(make-object('account-header),
            'account-length, 12,
            'account-type, 12,
            'cid, 33, 'p-1, principal-name(*test-lhs,principal*),
            'p-2, principal-name(*test-rhs-principal*),
            'tm-1, set-attrs(make-object('dsa-name), 'dsa-name-value, 'tm-1),
            'tm-2, set-attrs(make-object('dsa-name), 'dsa-name-value, 'tm-2),
            'account-gutmid, set-attrs(make-object('gutmid),
                                    'gutmid-value, ['abc, 'def]))
var *test-account-record-22* : account-record =
  set-attrs(make-object('account-record),
            'account-header-value, *test-account-header-22*,
            'extension-vector-value, {*test-extension-vector-13*,
                                    *test-extension-vector 14* },
            'trailer-record-value, *test-trailer-record-12*)
var *test-account-header-23* : account-header
  set-attrs(make-object('account-header),
            'account-length, 12,
            'account-type, 12,
            'cid, 69,
            'p-1, principal-name(*test-ihs-principal*),
            'p-2, principal-name(*test-rhs-principal*),
            'tm-1, set-attrs(make-object('dsa-name), 'dsa-name-value, 'tm-1),
            'tm-2, set-attrs(make-object('dsa-name), 'dsa-name-value, 'tm-2),
            'account-gutmid, set-attrs(make-object('gutmid),
                                    'gutmid-value, ['abc, 'def]),
```

APPENDIX-continued

```
        'account-time-stamp, set-attrs(make-object('dsa-time),
                    'dsa-hour, 08,
                    'dsa-minute, 56,
                    'dsa-second, 08))
var *test-account-record-23* : account-record =
  set-attrs(make-object('account-record),
        'account-header-value, *test-account-header-23 *,
        'extension-vector-value, (*test-extension-vector-15*,
                                    *test-xtension-vector-16*),
        'trailer-record-value, *test-trailer-record-13*)
var *test-account-header-24* : account-header =
  set-attrs(make-object('account-header),
        'account-length, 12,
        'account-type, 12,
        'cid, 29,
        'p-1, principal-name(*test-lhs-principal*),
        'p-2, principal-name(*test-rhs-principal*),
        'tm-1, set-attrs(make-object('dsa-name), 'dsa-name-value, 'tm-1),
        'tm-2, set-attrs(make-object('dsa-name), 'dsa-name-value, 'tm-2),
        'account-gutmid, set-attrs(make-object('gutmid),
                                    'gutmid-value, ['abc, 'def]),
        'account-time-stamp, set-attrs(make-object('dsa-time),
                    'dsa-hour, 08,
                    'dsa-minute, 56,
                    'dsa-second, 08))
var *test-account-record-24* : account-record =
  set-attrs(make-object('account-record),
        'account-header-value, *test-account-header-24*,
        'extension-vector-value, (*test-extension-vector-17*,
                                    *test-extension-vector-18*),
        'trailer-record-value, *test-trailer-record-14*)
var *test-account-header-25* : account-header =
  set-attrs(make-object('account-header),
        'account-length, 12,
        'account-type, 12,
        'cid, 33,
        'p-1, principal-name(*test-lhs-principal*),
        'p-2, prncipal-name(*test-rhs-principal*),
        'tm-1, set-attrs(make-object('dsa-name), 'dsa-name-value, 'tm-1),
        'tm-2, set-attrs(make-object('dsa-name), 'dsa-name-value, 'tm-2),
        'account-gutmid, set-attrs(make-object('gutmid),
                                    'gutmid-value, ['abc, 'def]))
var *test-account-record-25* : account-record =
  set-attrs(make-object('account-record),
        'account-header-value, *test-account-header-25*,
        'extension-vector-value, {*test-extension-vector-13*,
                                    *test-extension-vector-14*),
        'trailer-record-value, *test-trailer-record-12*)
var *test-account-header-26* : account-header =
  set-attrs(make-object('account-header),
        'account-length, 12,
        'account-type, 12,
        'cid, 69,
        'p-1, principal-name(*test-lhs-principal*),
        'p-2, principal-name(*test-rhs-principal*),
        'tm-1, set-attrs(make-object('dsa-name), 'dsa-name-value, 'tm-1),
        'tm-2, set-attrs(make-object('dsa-name), 'dsa-name-value, 'tm-2),
        'account-gutmid, set-attrs(make-object('gutmid),
                                    gutmid-value, ['abc, 'def]),
        'account-time-stamp, set-attrs(make-object('dsa-time),
                    'dsa-hour, 08,
                    'dsa-minute, 56,
                    'dsa-second, 08))
var *test-account-record-26* : account-record =
  set-attrs(make-object('account-record),
        'account-header-value, *test-account-header-26*,
        'extension-vector-value, (*test-extension-vector-15*,
                                    *test-extension-vector-16*},
        'trailer-record-value, *test-trailer-record-13*)
var *test-account-header-27*: account-header =
  set-attrs(make-object('account-header),
        'account-length, 12,
        'account-type, 12,
        'cid, 29,
        'p-1, principal-name(*test-lhs-principal*),
        'p-2, principal-name(*test-rhs-principal*),
        'tm-1, set-attrs(make-object('dsa-name), 'dsa-name-value, 'tm-1),
        'tm-2, set-attrs(make-object('dsa-name), 'dsa-name-value, 'tm-2),
        'account-gutmid, set-attrs(make-object('gutmid),
```

APPENDIX-continued

```
                                         gutmid-value, ['abc, 'def]),
        'account-time-stamp, set-attrs(make-object('dsa-time),
                    'dsa-hour, 08,
                    'dsa-minute, 56,
                    'dsa-second, 08))
var *test-account-record-27* : account-record =
  set-attrs(make-object('account-record),
        'account-header-value, *test-account-header-27*,
        'extension-vector-value, (*test-extension-vector-17*,
                                    *test-extension-vector-18*},
        'trailer-record-value, *test-trailer-record-14*)
var *test-account-header-28* : account-header =
  set-attrs(make-object('account-header),
        'account-length, 12,
        'account-type, 12,
        'cid, 16,
        'p-1, principal-name(*test-rhs-principal*),
        'p-2, principal-name(*test-lhs-principal*),
        'tm-1, transaction-method-name(*test-lhs-transaction*),
        'tm-2, transaction-method-name(*test-rhs-transaction*),
        'account-gutmid, set-attrs(make-object('gutmid),
                                         gutmid-value, ['nbc, 'jkl]))
var *test-account-record-28* : account-record =
  set-attrs(make-object('account-record),
        'account-header-value, *test-account-header-28*,
        'extension-vector-value, {*test-extension-vector-11*,
                                    *test-extension-vector-12*},
        'trailer-record-value, *test-trailer-record-11*)
var *test-account-header-29* : account-header =
  set-attrs(make-object('account-header),
        'account-length, 12,
        'account-type, 12,
        'cid, 33,
        'p-1, principal-name(*test-lhs-principal*),
        'p-2, principal-name(*test-rhs-principal*),
        'tm-1, set-attrs(make-object('dsa-name), 'dsa-name-value, 'tm-1),
        'tm-2, set-attrs(make-object('dsa-name), 'dsa-name-value, 'tm-2),
        'account-gutmid, set-attrs(make-object('gutmid),
                                         gutmid-value, ['abc, 'def]))
var *test-account-record-29*: account-record =
  set-attrs(make-object('account-record),
        'account-header-value, *test-account-header-29*,
        'extension-vector-value, (*test-extension-vector-13*,
                                    *test-extension-vector-14*},
        'trailer-record-value, *test-trailer-record-12*)
var *test-account-header-48*: account-header =
  set-attrs(make-object('account-header),
        'account-length, 12,
        'account-type, 12,
        'cid, 69,
        'p-1, principal-name(*test-lhs-principal*),
        'p-2, principal-name(*test-rhs-principal*),
        'tm-1, set-attrs(make-object('dsa-name), 'dsa-name-value, 'tm-1),
        'tm-2, set-attrs(make-object('dsa-name), 'dsa-name-value, 'tm-2),
        'account-gutmid, set-attrs(make-object('gutmid),
                                         gutmid-value, ['abc, 'def]),
        'account-time-stamp, set-attrs(make-object('dsa-time),
                    'dsa-hour, 08,
                    'dsa-minute, 56,
                    'dsa-second, 08))
var *test-account-record-48*: account-record =
  set-attrs(make-object('account-record),
        'account-header-value, *test-account-header-48*,
        'extension-vector-value, (*test-extension-vector-15*,
                                    *test-extension-vector-16*},
        *trailer-record-value, *test-trailer-record-13*)
var *test-account-header-31* : account-header =
  set-attrs(make-object('account-header),
        'account-length, 12,
        'account-type, 12,
        'cid, 29,
        'p-1, principal-name(*test-ihs-principal*),
        'p-2, principal-name(*test-rhs-principal*),
        'tm-1, set-attrs(make-object('dsa-name), 'dsa-name-value, 'tm-1),
        'tm-2, set-attrs(make-object('dsa-name), 'dsa-name-value, 'tm-2),
        'account-gutmid, set-attrs(make-object('gutmid),
                                         gutmid-value, ['abc, 'def]),
        'account-time-stamp, set-attrs(make-object('dsa-time),
                    'dsa-hour, 08,
```

APPENDIX-continued

```
                    'dsa-minute, 56,
                    'dsa-second, 08))
var *test-account-record-31* : account-record =
 set-attrs(make-object('account-record),
          'account-header-value, *test-account-header-31*,
          'extension-vector-value, (*test-extension-vector-17*,
                                    *test-extension-vector-18*},
          'trailer-record-value, *test-trailer-record-14*)
var *test-account-header-32*: account-header =
 set-attrs(make-object('account-header),
          'account-length, 12,
          'account-type, 12,
          'cid, 88,
          'p-1, principal-name(*test-rhs-principal*),
          'p-2, principal-name(*test-lhs-principal*),
          'tm-1, transaction-method-name(*test-ihs-transaction*),
          'tm-2, transaction-method-name(*test-rhs-transaction*),
          'account-gutmid, set-attrs(make-object('gutmid),
                                     gutnaid-value, ['nbc, 'jkl]))
var *test-account-record-32* : account-record =
 set-attrs(make-object('account-record),
          'account-header-value, *test-account-header-32*,
          'extension-vector-value, (*test-extension-vector-11*,
                                    *test-extension-vector-12*},
          'trailer-record-value, *test-trailer-record-11*)
var *test-account-header-33*: account-header =
 set-attrs(make-object('account-header),
          'account-length, 12,
          'account-type, 12,
          'cid, 33,
          'p-1, principal-name(*test-ihs-principal*),
          'p-2, principal-name(*test-rhs-principal*),
          'tm-1, set-attrs(make-object('dsa-name), 'dsa-name-value, 'tm-1),
          'tm-2, set-attrs(make-object('dsa-name), 'dsa-name-value, 'tm-2),
          'account-gutmid, set-attrs(make-object('gutmid),
                                     'gutmid-value, ['abc, 'def]))
var *test-account-record-33* : account-record =
 set-attrs(make-object('account-record),
          'account-header-value, *test-account-header-33*,
          'extension-vector-value, {*test-extension-vector-13*,
                                    *test-extension-vector-14*},
          'trailer-record-value, *test-trailer-record-12*)
var *test-account-header-34* : account-header =
 set-attrs(make-object('account-header),
          'account-length, 12,
          'account-type, 12,
          'cid, 88,
          'p-1, principal-name(*test-lhs-principal*),
          'p-2, principal-name(*test-rhs-principal*),
          'tm-1, set-attrs(make-object('dsa-name), 'dsa-name-value, 'tm-1),
          'tm-2, set-attrs(make-object('dsa-name), 'dsa-name-value, 'tm-2),
          'account-gutmid, set-attrs(make-object('gutmid),
                                     'gutmid-value, ['abc, 'def]),
          'account-time-stamp, set-attrs(make-object('dsa-time),
                    'dsa-hour, 08,
                    'dsa-minute, 56,
                    'dsa-second, 08))
var *test-account-record-34*: account-record =
 set-attrs(make-object('account-record),
          'account-header-value, *test-account-header-34*,
          'extension-vector-value, (*test-extension-vector-15*,
                                    *test-extension-vector-16*},
          'trailer-record-value, *test-trailer-record-13*)
var *test-account-header-35 * : account-header =
 set-attrs(make-object('account-header),
          'account-length, 12,
          'account-type, 12,
          'cid, 29,
          'p-1, principal-name(*test-lhs-principal*),
          'p-2, principal-name(*test-rhs-principal*),
          'tm-1, set-attrs(make-object('dsa-name), 'dsa-name-value, 'tm-1),
          'tm-2, set-attrs(make-object('dsa-name), 'dsa-name-value, 'tm-2),
          'account-gutmid, set-attrs(make-object('gutmid),
                                     gutmid-value, ['abc, 'def]),
          'account-time-stamp, set-attrs(make-object('dsa-time),
                    'dsa-hour, 08,
                    'dsa-minute, 56,
                    'dsa-second, 08))
var *test-account-record-35* : account-record =
```

APPENDIX-continued

```
  set-attrs(make-object('account-record),
          'account-header-value, *test-account-header-35*,
          'extension-vector-value, {*test-extension-vector-17*,
                                    *test-extension-vector-18*},
          'trailer4ecord-value, *test-trailer-record-14*)
var *test-account-header-36* : account-header =
  set-a-tm(make-object('account-header),
          'account-length, 12,
          'account-type, 12,
          'cid, 88,
          'p-1, principal-name(*test-rhs-principal*),
          'p-2, principal-name(*test-ihs-principal*),
          'tm-1, transaction-method-name(*test-lhs-transaction*),
          'tm-2, transaction-method-name(*test-rhs-transacLion*),
          'account-gutmid, set-attrs(make-object('gutmid),
                                    'gutmid-value, ['nbc, 'jkl]))
var *test-account-record-36* : account-record =
  set-attrs(make-object('account-record),
          'account-header-value, *test-account-header-36*,
          'extension-vector-value, (*test-extension-vector-11*,
                                    *test-extension-vector-12*},
          'trailer-record-value, *test-trailer-record-11*)
var *test-account-header-37* : account-header =
  set-attrs(make-object('account-header),
          'account-length, 12,
          'account-type, 12,
          'cid, 33,
          'p-1, principal-name(*test-lhs-principal*),
          'p-2, principal-name(*test-rhs-principal*),
          'tm-1, set-attrs(make-object('dsa-name), 'dsa-name-value, 'tm-1),
          'tm-2, set-attrs(make-object('dsa-name), 'dsa-name-value, 'tm-2),
          'account-gutmid, set-attrs(make-object('gutmid),
                                    'gutmid-value, ['abc, 'def]))
var *test-account-record-37* : account-record =
  set-attrs(make-object('account-record),
          'account-header-value, *test-account-header-37*,
          'extension-vector-value, {*test-extension-vector-13*,
                                    *test-extension-vector-14*),
          'trailer-record-value, *test-trailer-record-12*)
var *test-account-header-38* : account-header =
  set-attrs(make-object('account-header),
          'account-length, 12,
          'account-type, 12,
          'cid, 88,
          'p-1, principal-name(*test-lhs-principal*),
          'p-2, principal-name(*test-rhs-principal*),
          'tm-1, set-attrs(make-object('dsa-name), 'dsa-name-value, 'tm-1),
          'tm-2, set-attrs(make-object('dsa-name), 'dsa-name-value, 'tm-2),
          'account-gutmid, set-attrs(make-object('gutmid),
                                    gutmid-value, ['abc, 'def]),
          'account-time-stamp, set-attrs(make-object('dsa-time),
                      'dsa-hour, 08,
                      'dsa-minute, 56,
                      'dsa-second, 08))
var *test-account-record-38* account-record =
  set-attrs(make-object('account-record),
          'account-header-value, *test-account-header-38*,
          'extension-vector-value, (*test-extension-vector-15*,
                                    *test-extension-vector-16*},
          'trailer-record-value, *test-trailer-record-13*)
var *test-account-header-39* : account-header =
  set-attrs(make-object('account-header),
          'account-length, 12,
          'account-type, 12,
          'cid, 29,
          'p-1, principal-name(*test-lhs-principal*),
          'p-2, principal-name(*test-rhs-principal*),
          'tm-1, set-attrs(make-object('dsa-name), 'dsa-name-value, 'tm-1),
          'tm-2, set-attrs(make-object('dsa-name), 'dsa-name-value, 'tm-2),
          'account-gutmid, set-attrs(make-object('gutmid),
                                    gutmid-value, ['abc, 'def]),
          'account-time-stamp, set-attrs(make-object('dsa-time),
                      'dsa-hour, 08,
                      'dsa-minute, 56,
                      'dsa-second, 08))
var *test-account-record-39* : account-record =
  set-attrs(make-object('account-record),
          'account-header-value, *test-account-header-39 *,
          'extension-vector-value, (*test-extension-vector-17*,
```

APPENDIX-continued

```
                                        *test-extension-vector-18*},
            'trailer-record-value, *test-trailer-record-14*)
var *test-account-header-40* : account-header =
  set-attrs(make-object('account-header),
            'account-length, 12,
            'account-type, 12,
            'cid; 88,
            'p-1, principal-name(*test-rhs-principal*),
            'p-2, principal-name(*test-lhs-principal*),
            'tm-1, transaction-method-name(*test-lhs-transaction*),
            'tm-2, transaction-method-name(*test-rhs-transaction*),
            'account-gutmid, set-attrs(make-object('gutmid),
                                        'gutmid-value, ['nbc, 'jkl]),
            'account-time-stamp, set-attrs(make-object('dsa-time),
                        'dsa-hour, 08,
                        'dsa-minute, 56,
                        'dsa-second, 08))
var *test-account-record-40* : account-record =
  set-attrs(make-object('account-record),
            'account-header-value, *test-account-header-40*,
            'extension-vector-value, (*test-extension-vector-11*,
                                        *test-extension-vector-12*),
            'trailer-record-value, *test-trailer-record-11*)
var *test-account-header-41* : account-header =
  set-attrs(make-object('account-header),
            'account-length, 12,
            'account-type, 12,
            'cid, 33,
            'p-1, principal-name(*test-lhs-principal*),
            'p-2, principal-name(*testt-rhs-principal*),
            'tm-1, set-attrs(make-object('dsa-name), 'dsa-name-value, 'tm-1),
            'tm-2, set-attrs(make-object('dsa-name), 'dsa-name-value, 'tm-2),
            'account-gutmid, set-attrs(make-object('gutmid),
                                        gutmid-value, ['abc, 'def]),
            'account-time-stamp, set-attrs(make-object('dsa-time),
                        'dsa-hour, 08,
                        'dsa-minute, 56,
                        'dsa-second, 08))
var *test-account-record-41* : account-record =
  set-attrs(make-object('account-record),
            'account-header-value, *test-account-header-41*,
            'extension-vector-value, {*test-extension-vector-13*,
                                        *test-extension-vector-14*},
            'trailer-record-value, *test-trailer-record-12*)
var *test-account-header-42* : account-header =
  set-attrs(make-object('account-header),
            'account-length, 12,
            'account-type, 12,
            'cid, 88,
            'p-1, principal-name(*test-lhs-principal*),
            'p-2, principal-name(*test-rhs-principal*),
            'tm-1, set-attrs(make-object('dsa-name), 'dsa-name-value, 'tm-1),
            'tm-2, set-attrs(make-object('dsa-name), 'dsa-name-value, 'tm-2),
            'account-gutmid, set-attrs(make-object('gutmid),
                                        gutmid-value, ['abc, 'def]),
            'account-time-stamp, set-attrs(make-object('dsa-time),
                        'dsa-hour, 08,
                        'dsa-minute, 56,
                        'dsa-second, 28))
var *test-account-record-42*: account-record =
  set-attrs(make-object('account-record),
            'account-header-value, *test-account-header-42*,
            'extension-vector-value, {*test-extension-vector-15*,
                                        *test-extension-vector-16*},
            'trailer-record-value, *test-trailer-record-13*)
var *test-account-header-43*: account-header =
  set-attrs(make-object('account-header),
            'account-length, 12,
            'account-type, 12,
            'cid, 29,
            'p-1, principal-name(*test-lhs-principal*),
            'p-2, principal-name(*test-rhs-principal*),
            'tm-1, set-attrs(make-object('dsa-name), 'dsa-name-value, 'tm-1),
            'tm-2, set-attrs(make-object('dsa-name), 'dsa-name-value, 'tm-2),
            'account-gutmid, set-attrs(make-object('gutmid),
                        'gutmid-value, ['abc, 'def]),
            'account-time-stamp, set-attrs(make-object('dsa-time),
                        'dsa-hour, 08,
                        'dsa-minute, 56,
```

APPENDIX-continued

```
                            'dsa-second, 28))
var *test-account-record-43* : account-record =
  set-attrs(make-object('account-record),
            account-header-value, *test-account-header-43*,
            'extension-vector-value, {*test-extension-vector-17*,
                                      *test-extension-vector-18*},
            'trailer-record-value, *test-trailer-record-14*)
var *test-account-header-44* : account-header =
  set-attrs(make-object('account-header),
            'account-length, 12,
            'account-type, 12,
            'cid, 88,
            'p-1, principal-name(*test-rhs-principal*),
            'p-2, principal-name(*test-lhs-principal*),
            'tm-1, transaction-method-name(*test-lhs-transaction*),
            'tm-2, transaction-method-name(*test-rhs-transaction*),
            'account-gutmid, set-attrs(make-object('gutmid),
                                        'gutmid-value, ['nbc, 'jkl]),
            'account-time-stamp, set-attrs(make-object('dsa-time),
                        'dsa-hour, 08,
                        'dsa-minute, 56,
                        'dsa-second, 08))
var *test-account-record-44* : account-record =
  set-attrs(make-object('account-record),
            'account-header-value, *test-account-header-44*,
            'extension-vector-value, {*test-extension-vector-11*,
                                      *test-extension-vector-12*),
            'trailer-record-value, *test-trailer-record-11*)
var *test-account-header-45* : account-header =
  set-attrs(make-object('account-header),
            'account-length, 12,
            'account-type, 12,
            'cid, 33,
            'p-1, principal-name(*test-lhs-principal*),
            'p-2, principal-name(*test-rhs-principal*),
            'tm-1, set-attrs(make-object('dsa-name), 'dsa-name-value, 'tm-1),
            'tm-2, set-attrs(make-object('dsa-name), 'dsa-name-value, 'tm-2),
            'account-gutmid, set-attrs(make-object('gutmid),
                                        gutmid-value, ['abc, 'def]),
            'account-time-stamp, set-attrs(make-object('dsa-time),
                        'dsa-hour, 08,
                        'dsa-minute, 56,
                        'dsa-second, 08))
var *test-account-record-45* : account-record =
  set-attrs(make-object('account-record),
            'account-header-value, *test-account-header-45*,
            'extension-vector-value, {*test-extension-vector-13*,
                                      *test-extension-vector-14*},
            'trailer-record-value, *test-trailer-record-12*)
var *test-account-header-46* : account-header =
  set-attrs(make-object('account-header),
            'account-length, 12,
            'account-type, 12,
            'cid, 88,
            'p-1, principal-name(*test-lhs-principal*),
            'p-2, principal-name(*test-rhs-principal*),
            'tm-1, set-attrs(make-object('dsa-name), 'dsa-name-value, 'tm-1),
            'tm-2, set-attrs(make-object('dsa-name), 'dsa-name-value, 'tm-2),
            'account-gutmid, set-attrs(make-object('gutmid),
                                        'gutmid-value, ['abc, 'def]),
            'account-time-stamp, set-attrs(make-object('dsa-time),
                        'dsa-hour, 08,
                        'dsa-minute, 56,
                        'dsa-second, 28))
var *test-account-record-46* : account-record =
  set-attrs(make-object('account-record),
            'account-header-value, *test-account-header-46*,
            'extension-vector-value, {*test-extension-vector-15*,
                                      *test-extension-vector-16*),
            'trailer-record-value, *test-trailer-record-13*)
var *test-account-header-47* : account-header =
  set-attrs(make-object('account-header),
            'account-length, 12,
            'account-type, 12,
            'cid, 29,
            'p-1, principal-name(*test-lhs-principal*),
            'p-2, principal-name(*test-rhs-principal*),
            'tm-1, set-attrs(make-object('dsa-name), 'dsa-name-value, 'tm-1),
            'tm-2, set-attrs(make-object('dsa-name), 'dsa-name-value, 'tm-2),
```

APPENDIX-continued

```
            'account-gutmid, set-attrs(make-object('gutmid),
                                    'gutmid-value, ['abc, 'def]),
            'account-time-stamp, set-attrs(make-object('dsa-time),
                        'dsa-hour, 08,
                        'dsa-minute, 56,
                        'dsa-second, 28))
var *test-account-record-47* account-record =
 set-attrs(make-object('account-record),
            'account-header-value, *test-account-header-47*,
            'extension-vector-value, {*test-extension-vector-17*,
                                      *test-extension-vector-18*},
            'trailer-record-value, *test-trailer-record-14*)
var *test-account-base2*: account-base =
            set-attrs(make-object('account-base),
                        account-base-records, (*test-account-record-11*,
                                                *test-account-record-12*,
                                                *test-account-record-13*,
*test-account-record-14*})
var *test-account-base5* : account-base =
            set-attrs(make-object('account-base),
                        'account-base-records, (*test-account-record-15*,
                                                *test-account-record-16*,
                                                *test-account-record-17*,
*test-account-record-18*})
var *test-account-base6* : account-base =
            set-attrs(make-object('account-base),
                        'account-base-records, (*test-account-record-19*,
                                                *test-account-record-21*,
                                                *test-account-record-22*,
*test-account-record-23*})
var *test-account-base7* : account-base =
            set-attrs(make-object('account-base),
                        'account-base-records, {* test-account-record-24*,
                                                *test-account-record-25*,
                                                *test-account-record-26*,
*test-account-record-27*})
var *test-account-base8* : account-base =
            set-attrs(make-object('account-base),
                        'account-base-records, (*test-account-record-28*,
                                                *test-account-record-29*,
                                                *test-account-record-48*,
*test-account-record-31*})
var *test-account-base9* : account-base =
            set-attrs(make-object('account-base),
                        'account-base-records, {*test-account-record-32*,
                                                *test-account-record-33*,
                                                *test-account-record-34*,
*test-account-record-35*})
var *test-account-base10* : account-base =
            set-attrs(make-object('account-base),
                        'account-base-records, {*test-account-record-36*,
                                                *test-account-record-37*,
                                                *test-account-record-38*,
*test-account-record-39*})
var *test-account-base11* : account-base =
            set-attrs(make-object('account-base),
                        'account-base-records, {*test-account-record-40*,
                                                *test-account-record-41*,
                                                *test-account-record-42*,
                        *test-account-record-43*})
var *test-account-base12*: account-base =
            set-attrs(make-object('account-base),
                        'account-base-records, (*test-account-record-44*,
                                                *test-account-record-45*,
                                                *test-account-record-46*,
*test-account-record-47*})
%%%%%%%%%%%%%%%%%%%%%%%%%%%%%%%%%%%%%%%%%%%%%%%%%%%%
%%%%%%%%%%%%%%%%%%%%%%%%%
function DELETE-ACCOUNT-RECORD-ON-ACCOUNT-VALUE(target-base: account-base,
            accountvalue: symbol) : reason-code =
let(reason:reasoncode = returned-info,
 acct-records: set(account-record) = account-base-records(target-base),
 record-list: set(account-record) = {})
 (if empty(acct-records) then
  reason <- returned-info
 else
  record-list <- acct-records;
  re::format-vars(true, acct-records);
  (enumerate rec over acct-records do
```

APPENDIX-continued

```
    (if empty({x | (x: extension-vector) x in extension-vector-value(rec) & acct-value(x) =
accountvalue})
        then
    record-list <- acct-records less rec;
    re::format-vars(true, record-list);
    re:: format-vars(true, rec);
    record-list <- setdiff(acct-records,
                    (extension-vector-value(rec)));
    re::format-vars(true, (extension-vector-value(rec)));
    record-list <- acct-records less (trailer-record-value(rec));
    re::format-vars(true, trailer-record-value(rec));
    erase-object(rec)));
    account-base-records(target-base) <- record-list;
    re:: format-vars(true, account-base-records(target-base));
  reason <- return-ok);
reason
%%%%%%%%%%%%%%%%%%%%%%%%%%%%%%%%%%%%%%%%%%%%%%%%%%%%
%%%%%%%%%%%%%%%%%%%%%%%%%%%%%%%
function DELETE-ACCOUNT-RECORD-ON-ACCOUNT-VALUE-TYPE(target-base: account-base,
        accountvaluetype: integer) : reason-code =
let(reason:reason-code = returned-info,
 acct-records: set(account-record) = account-base-records(target-base),
 record-list: set(account-record) = {})
 (if empty(acct-records) then
   reason <- returned-info
 else
   record-list <- acct-records;
   re::format-vars(true, acct-records);
   (enumerate rec over acct-records do
   (if ~empty({x | (x: extension-vector) x in extension-vector-value(rec) & acct-value-type(x) =
accountvaluetype})
        then
    record-list <- acct-records less rec;
    re::format-vars(true, record-list);
    re:: format-vars(true, rec);
    record-list <- setdiff(acct-records,
                    (extension-vector-value(rec)));
            re:: format-vars(true, (extension-vector-value(rec)));
            record-list <- acct-records less (trailer-record-value(rec));
            re::format-vars(true, trailer-record-value(rec));
            erase-object(rec)));
            account-base-records(target-base) <- record-list;
            re:: format-vars(true, account-base-records(target-base));
            reason <- return-ok);
            reason
%%%%%%%%%%%%%%%%%%%%%%%%%%%%%%%%%%%%%%%%%%%%%%%%%%%%
%%%%%%%%%%%%%%%%%%%%%%%%%%%%%%%
            %:eval delete-account-record-on-account-value(*test-account-base13*, *test-acct-value*)
            %:eval delete-account-record-on-account-value-type(*test-account-base23*, *test-acct-value-
            type*)
            var *test-acct-value*: symbol = 'GonewitnTheWind
            var *test-acct-value-type* : integer = 102
            var *test-extension-vector-21* : extension-vector =
    set-attrs(make-object('extension-vector),
                        'acct-value, 'ForrestGump,
                        'acct-value-length, 99,
                        'acct-value-type, 222,
                        'extension-billable?, true)
var *test-extension-vector-22* : extension-vector =
    set-attrs(make-object('extension-vector),
                        'acct-value, 'GonewithTheWind,
                        'acct-value-length, 99,
                        'acct-value-type, 222,
                        'extension-billable?, true)
var *test-extension-vector-23* : extension-vector =
    set-attrs(make-object('extension-vector),
                        'acct-value, 'GonewithTheWind,
                        'acct-value-length, 99,
                        'acct-value-type, 88,
                        'extension-billable?, true)
var *test-extension-vector-24* : extension-vector =
    set-attrs(make-object('extension-vector),
                        'acct-value, 'GonewithThewind,
                        'acct-value-length, 99,
                        'acct-value-type, 88,
                        'extension-billable?, true)
var *test-extension-vector-25 * : extension-vector =
    set-attrs(make-object('extension-vector),
                        'acct-value, 'ForrestGump,
```

APPENDIX-continued

```
                                        'acct-value-length, 99,
                                        'acct-value-type, 102,
                                        'extension-billable?, true)
var *test-extension-vector-26* : extension-vector =
        set-attrs(make-object('extension-vector),
                                        'acct-value, 'ForrestGump,
                                        'acct-value-length, 99,
                                        'acct-value-type, 102,
                                        'extension-billable?, true)
var *test-extension-vector-27* : extension-vector =
        set-attrs(make-object('extension-vector),
                                        'acct-value, 'ForrestGump,
                                        'acct-value-length, 99,
                                        'acct-value-type, 125,
                                        'extension-billable?, true)
var *test-extension-vector-28* : extension-vector =
        set-attrs(make-object('extension-vector),
                                        'acct-value, 'ForrestGump,
                                        'acct-value-length, 99,
                                        'acct-value-type, 125,
                                        'extension-billable?, true)
var *test-trailer-record-11*: trailer-record =
        set-attrs(make-object(,trailer-record),
                                        'trailer-time-stamp,
                                        make-object('dsa-time), 'status, 1)
var *test-trailer-record-12* : trailer-record =
        set-attrs(naake-object('trailer-record),
                                        'trailer-time-stamp,
                                        'make-object('dsa-time), 'status, 1)
var *test-trailer-record-13* : trailer-record
        set-attrs(make-ohject('trailer-record),
                                        'trailer-time-stamp, set-attrs(make-object('dsa-time),
                        'dsa-hour, 08,
                        'dsa-minute, 56,
                        'dsa-second, 58),
                        'status, 1)
var *test-trailer-record-14* : trailer-record
        set-attrs(make-object('trailer-record),
                                        'trailer-time-stamp, set-attrs(make-object('dsa-time),
                        'dsa-hour, 12,
                        'dsa-minute, 56,
                        'dsa-second, 58),
                        'status, 4)
var *test-account-header-52*: account-header
 set-attrs(make-object('account-header),
        'account-length, 12,
        'account-type, 12,
        'cid, 16,
        'p-1, principal-name(*test-rhs-principal*),
        'p-2, principal-name(*test-lhs-principal*),
        'tm-1, transaction-method-name(*test-lhs-transaction*),
        'tm-2, transaction-method-name(*test-rhs-transaction*),
        'account-gutmid, set-attrs(make-object('gutmid),
                                        'gutmid-value, ['nbc, 'jkl]))
var *test-account-record-52* : account-record
 set-attrs(make-object('account-record),
        'account-header-value, *test-account-header-52*,
        'extension-vector-value, (*test-extension-vector-21*,
                                        *test-extension-vector-22*},
        'trailer-record-value, *test-trailer-record-11*)
var *test-account-header-53* : account-header =
 set-attrs(make-object('account-header),
        'account-length, 12,
        'account-type, 12,
        'cid, 33,
        'p-1, principal-name(*test-lbs-principal*),
        'p-2, principal-name(*test-rhs-principal*),
        'tm-1, set-attrs(make-object('dsa-name), 'dsa-name-value, 'tm-1),
        'tm-2, set-attrs(make-object('dsa-name), 'dsa-name-value, 'tm-2),
        'account-gutmid, set-attrs(make-object('gutmid),
                                        'gutmid-value, ['abc, 'def]))
var *test-account-record-53* : account-record =
 set-attrs(make-object('account-record),
        'account-header-value, *test-account-header-53*
        'extension-vector-value, {*test-extension-vector-23*,
                                        *test-extension-vector-24*},
        'trailer-record-value, *test-trailer-record-12*)
var *test-account-header-54* : account-header =
 set-attrs(make-object('account-header),
```

APPENDIX-continued

```
              'account-length, 12,
              'account-type, 12,
              'cid, 69,
              'p-1, principal-name(*test-lhs-principal*),
              'p-2, principal-name(*test-rhs-principal*),
              'tm-1, set-attrs(make-object('dsa-name), 'dsa-name-value, 'tm-1),
              'tm-2, set-attrs(make-object('dsa-name), 'dsa-name-value, 'tm-2),
              'account-gutmid, set-attrs(make-object('gutmid),
                                         'gutmid-value, ['abc, 'def]),
              'account-time-stamp, set-attrs(make-object('dsa-time),
                         'dsa-hour, 08,
                         'dsa-minute, 56,
                         'dsa-second, 08))
var *test-account-record-54*: account-record =
  set-attrs(make-object('account-record),
             'account-header-value, *test-account-header-54*,
             'extension-vector-value, {*test-extension-vector-25*,
                                        *test-extension-vector-26*},
             'trailer-record-value, *test-trailer-record-13*)
var *test-account-header-55* : account-header =
  set-attrs(make-object('account-header),
             'account-length, 12,
             'account-type, 12,
             'cid, 29,
             'p-1, principal-name(*test-lhs-principal*),
             'p-2, principal-name(*test-rhs-principal*),
             'tm-1, set-attrs(make-object('dsa-name), 'dsa-name-value, 'tm-1),
             'tm-2, set-attrs(make-object('dsa-name), 'dsa-name-value, 'tm-2),
             'account-gutmid, set-attrs(make-object('gutmid),
                                        'gutmid-value, ['abc, 'def]),
             'account-time-stamp, set-attrs(make-object('dsa-time),
                         'dsa-hour, 08,
                         'dsa-minute, 56,
                         'dsa-second, 08))
var *test-account-record-55* : account-record =
  set-attrs(make-object('account-record),
             'account-header-value, *test-account-header-55*,
             'extension-vector-value, {*test-extension-vector-27*,
                                        *test-extension-vector-28*},
             'trailer-record-value, *test-trailer-record-14*)
var *test-account-base13* : account-base =
          set-attrs(make-object('account-base),
                     'account-base-records, *test-account-record-52*,
                                            *test-account-record-53*,
                                            *test-account-record-54*,
*test-account-record-55*})
var *test-account-base23*: account-base =
          set-attrs(make-object('account-base),
                     *account-base-records, {*test-account-record-52*,
                                             *test-account-record-53*,
                                             *test-account-record-54*,
*test-account-record-55*})
%%%%%%%%%%%%%%%%%%%%%%%%%%%%%%%%%%%%%%%%%%%%%%%%%%%
%%%%%%%%%%%%%%%%%%%%%%%%%%%%%
function DELETE-ACCOUNT-RECORD-ON-BILLABLE-INDICATOR(target-base: account-base,
          billabte?: boolean) : reason-code =
let(reason:reason-code = returned-info,
  acct-records: set(account-record) = account-base-records(target-base),
  record-list: set(account-record) = {})
  (if empty(acct-records) then
    reason <- returned-info
  else
    record-list <- acct-records;
    (enumerate rec over acct-records do
    (if empty({x| (x: extension-vector) x in extension-vector-value(rec) & extension-billable?(x) = billable?})
          then
    record-list <- acct-records less rec;
    re::format-vars(true, rec);
    record-list <- setdiff(acct-records,
                                         (extension-vector-value(rec)));
    re::format-vars(true, record-list);
    record-list <- acct-records less (trailer-record-value(rec));
    erase-object(rec)
    elseif size(extension-vector-value(rec)) = 0 and account-billable?(rec) = billable?
          then
    re::format-vars(true, size(extension-vector-value(rec)));
    record-list <- acct-records less rec;
    re::format-vars(true, rec);
```

APPENDIX-continued

```
  record-list <- acct-records less (trailer-record-value(rec));
  erase-object(rec)));
  account-base-records(target-base) <- record-list;
  re::format-vars(true,account-base-records(target-base));
 reason <- return-ok);
reason
%%%%%%%%%%%%%%%%%%%%%%%%%%%%%%%%%%%%%%%%%%%%%%%%%%%%
%%%%%%%%%%%%%%%%%%%%%%%%%%%%%
%:eval delete-account-record-on-billable-indicator(*test-account-base15*, false)
%to test this function, run the above command. Two out of the 4 testing records should be deleted. This is
the scenario in which when an account record has mutiple extension vectors that some of them had the value
for the extension-billable? which matched the supplied parameter value.
%when an account record does not have the extension vector, the program has to check the account-
biliable? value to determine which record to detete. In order words, the program first delete based on the
extension-billable? value if there is one. If there is no extension-billable? (no extension-vector) then
deletion is based on the value of the account-billable? To test that, alter the testing data below, comment
out the 'extension-vector-value in the *test-account-record-x* and make the size of the extension-vector-
value(rec) to 0 then re-load the data and run the command above.
var *test-billable-value* : boolean = true
var *test-extension-vecotr-31* : extension-vector =
        set-attrs(make-object('extension-vector),
                                        'acct-value, 'ForrestGump,
                                        'acct-value-length, 99,
                                        'acct-value-type, 222,
                                        'extension-billable?, true)
var *test-extension-vecotr-32* : extension-vector =
        set-attrs(make-object('extension-vector),
                                        'acct-value, 'GonewithTheWind,
                                        'acct-value-length, 99,
                                        'acct-value-type, 222,
                                        'extension-billable?, true)
var *test-extension-vecotr-33* : extension-vector =
        set-attrs(make-object('extension-vector),
                                        'acct-value, 'GonewithTheWind,
                                        'acct-value-length, 99,
                                        'acct-value-type, 88,
                                        'extension-billable?, true)
var *test-extension-vecotr-34* : extension-vector =
        set-attrs(make-object('extension-vector),
                                        'acct-value, 'GonewithTheWind,
                                        'acct-value-length, 99,
                                        'acct-value-type, 88,
                                        'extension-billable?, true)
var *test-extension-vecotr-35* : extension-vector =
        set-attrs(make-object('extension-vector),
                                        'acct-value, 'ForrestGump,
                                        'acct-value-length, 99,
                                        'acct-value-type, 102,
                                        'extension-billable?, false)
var *test-extension-vecotr-36* : extension-vector =
        set-attrs(make-object('extension-vector),
                                        'acct-value, 'ForrestGump,
                                        'acct-value-length, 99,
                                        'acct-value-type, 102,
                                        'extension-billable?, false)
var *test-extension-vecotr-37* : extension-vector =
        set-attrs(make-object('extension-vector),
                                        'acct-value, 'ForrestGump,
                                        'acct-value-length, 99,
                                        'acct-value-type, 125,
                                        'extension-billable?, true)
var *test-extension-vector-38* : extension-vector =
        set-attrs(make-object('extension-vector),
                                        'acct-value, 'ForrestGump,
                                        'acct-value-length, 99,
                                        'acct-value-type, 125,
                                        'extension-billable?, false)
var *test-trailer-record-11* : trailer-record =
        set-attrs(make-object('trailer-record),
                                        'trailer-time-stamp,
                                        make-object('dsa-time), 'status, 1)
var *test-trailer-record-12* : trailer-record =
        set-attrs(make-object('trailer-record),
                                        'trailer-time-stamp,
                                        make-object('dsa-time), 'status, 1)
var *test-trailer-record-13* : trailer-record =
        set-attrs(make-object('trailer-record),
                                        'trailer-time-stamp, set-attrs(make-qbject('dsa-time),
                'dsa-hour, 08,
```

APPENDIX-continued

```
                'dsa-minute, 56,
                'dsa-second, 58),
                'status, 1)
var *test-trailer-record-14* : trailer-record =
        set-attrs(make-object('trailer-record),
                                'trailer-time-stamp, set-attrs(make-object('dsa-time),
                'dsa-hour, 12,
                'dsa-minute, 56,
                'dsa-second, 58),
                'status, 4)
var *test-account-header-62* : account-header =
 set-attrs(make-object('account-header),
        'account-length, 12,
        'account-type, 12,
        'cid, 16,
        'p-1, principal-name(*test-rhs-principal*),
        'p-2, principal-name(*test-lhs-principal*),
        'tm-1, transaction-method-name(*test-lhs-transaction*),
        'tm-2, transaction-method-name(*test-rhs-transaction*),
        'account-gutmid, set-attrs(make-object('gutmid),
                                'gutmid-value, ['nbc, 'jkl]),
        'account-billable?, true)
var *test-account-record-62* : account-record =
 set-attrs(make-object('account-record),
        'account-header-value, *test-account-header-62*,
        'extension-vector-value, {*test-extension-vector-31*,
                                *test-extension-vector-32*},
        'trailer-record-value, *test-trailer-record-11*)
var *test-account-header-63*: account-header
 set-attrs(make-object('account-header),
        'account-length, 12,
        'account-type, 12,
        'cid, 33,
        'p-1, principal-name(*test-lhs-principal*),
        'p-2, principal-name(*test-rhs-principal*),
        'tm-1, set-attrs(make-object('dsa-name), 'dsa-name-value, 'tm-1),
        'tm-2, set-attrs(make-object('dsa-name), 'dsa-name-value, 'tm-2),
        'account-gutmid, set-attrs(make-object('gutmid),
                                'gutmid-value, ['abc, 'def]),
        'account-biilable?, false)
var *test-account-record-63*: account-record =
 set-attrs(make-object('account-record),
        'account-header-value, *test-account-header-63*,
        'extension-vector-value, {*test-extension-vector-33*,
                                *test-extension-vector-34*),
        'trailer-record-value, *test-trailer-record-12*)
var *test-account-header-64* : account-header =
 set-attrs(make-object('account-header),
        'account-length, 12,
        'account-type, 12,
        'cid, 69,
        'p-1, principal-name(*test-lhs-principal*),
        'p-2, principal-name(*test-rhs-principal*),
        'tm-1, set-attrs(make-object('dsa-name), 'dsa-name-value, 'tm-1),
        'tm-2, set-attrs(make-object('dsa-name), 'dsa-name-value, 'tm-2),
        'account-gutmid, set-attrs(make-object('gutmid),
                                'gutmid-value, ['abc, 'def]),
        'account-billable?, false,
        'account-time-stamp, set-attrs(make-object('dsa-time),
                'dsa-hour, 08,
                'dsa-minute, 56,
                'dsa-second, 08))
var *test-account-record-64* : account-record =
 set-attrs(make-object('account-record),
        'account-header-value, *test-account-header-64*,
        'extension-vector-value, (*test-extension-vector-35*,
                                *test-extension-vector-36*},
        'trailer-record-value, *test-trailer-record-13*)
var *test-account-header-65* : account-header =
 set-attrs(make-object('account-header),
        'account-length, 12,
        'account-type, 12,
        'cid, 29,
        'p-1, principal-name(*test-lhs-principal*),
        'p-2, principal-name(*test-rhs-principal*),
        'tm-1, set-attrs(make-object('dsa-name), 'dsa-name-value, 'tm-1),
        'tm-2, set-attrs(make-object('dsa-name), 'dsa-name-value, 'tm-2),
        'account-gutmid, set-attrs(make-object('gutmid),
                                'gutmid-value, ['abc, 'def]),
```

APPENDIX-continued

```
                account-time-stamp, set-attrs(make-object('dsa-time),
                        'dsa-hour, 08,
                        'dsa-minute, 56,
                        'dsa-second, 08),
                account-billable?, true)
var *test-account-record-66* : account-record =
  set-attrs(make-object('account-record),
                'account-header-value, *test-account-header-65*,
                'extension-vector-value, {*test-extension-vector-37*,
                                        *test-extension-vector-38*},
                *trailer-record-value, *test-trailer-record-14*)
var *test-account-base15* : account-base =
        set-attrs(make-object('account-base),
                        'account-base-records, {*test-account-record-62*,
                                        *test-account-record-63*,
                                        *test-account-record-64*,
*test-account-record-65*})
%%%%%%%%%%%%%%%%%%%%%%%%%%%%%%%%%%%%%%%%%%%%%%%%%%%
%%%%%%%%%%%%%%%%%%%%%%%%%%%%%
function DELETE-ACCOUNT-RECORD(target-base: account-base,
        principal-1: dsa-name,
        target-cid: integer,
        target-gutmid: gutmid) : reason-code =
let(reason:reason-code = returned-info,
 acct-records: set(account-record) = account-base-records(target-base),
 record-list: set(account-record) = {})
 (if empty(acct-records) then
   reason <- returned-info
 else
   record-list <- acct-records;
   re::format-vars(true, acct-records);
   (enumerate rec over acct-records do
   (if dsa-name-value(p-1(account-header-value(rec))) = dsa-name-value(principal-1) and
    cid(account-header-value(rec)) = target-cid and
    gutmid-value(account-gutmid(account-header-value(rec))) = gutmid-value(target-gutmid)
                then
                        record-list <- acct-records less rec;
                        re::format-vars(true, record-list);
                        re::format-vars(true, rec);
                        record-list <- setdiff(acct-records,
                                (extension-vector-value(rec)));
    re::format-vars(true, (extension-vector-value(rec)));
    record-list <- acct-records less (trailer-record-value(rec));
    re::format-vars(true, trailer-record-value(rec));
    erase-object(rec)));
    account-base-records(target-base) <- record-list;
    re:: format-vars(true, account-base-records(target-base));
  reason <- return-ok);
reason
%%%%%%%%%%%%%%%%%%%%%%%%%%%%%%%%%%%%%%%%%%%%%%%%%%%
%%%%%%%%%%%%%%%%%%%%%%%%%%%%%
%test data
%:eval delete-account-record(*test-account-base*, principal-name(*test-lhs-principal*), *test-cid-value*,
*test-gutmid-value*)
var *test-lhs-principal* : principal =
        *initiaiize-a-principal*('test-lhs-principal,
                                        'test-lhs-transaction)
var *test-rhs-principal* : principal =
        *initialize-a-principal*('test-rhs-principal,
                                        'test-rhs-transaction)
var *test : gutmid = set-attrs(make-object('gutmid),
                                *gutmid-value, ['abc, 'def])
var *test-cid-value* : integer = 6
var *test-extension-vector-1* : extension-vector =
        set-attrs(make-object('extension-vector),
                                'acct-value, 'ForrestGump,
                                'acct-value-length, 99,
                                'acct-value-type, 88,
                                'extension-billable?, true)
var *test-extension-vector-2* : extension-vector =
        set-attrs(make-object('extension-vector),
                                'acct-value, 'ForrestGump,
                                'acct-value-length, 99,
                                'acct-value-type, 88,
                                'extension-billabie?, true)
var *test-extension-vector-3* : extension-vector =
        set-attrs(make-object('extension-vector),
                                'acct-value, ForrestGump,
                                'acct-value-length, 99,
```

APPENDIX-continued

```
                                                'acct-value-type, 88,
                                                'extension-billable?, true)
var *test-extension-vector-4* : extension-vector =
        set-attrs(make-object('extension-vector),
                                                'acct-value, ForrestGump,
                                                'acct-value-length, 99,
                                                'acct-value-type, 88,
                                                'extension-billable?, true)
var *test-extension-vector-5* : extension-vector =
        set-atrs(make-object('extensin-vector),
                                                'acct-value. 'ForrestGump,
                                                'acct-value-length, 99,
                                                'acct-value-type, 88,
                                                'extension-billable?, true)
var *test-extension-vector-6* : extension-vector =
        set-attrs(make-object('extension-vector),
                                                'acct-value, 'ForrestGump,
                                                'acct-value-length, 99,
                                                'acct-value-type, 88,
                                                'extension-billable?, true)
var *test-trailer-record-1* : trailer-record =
        set-attrs(make-object('trailer-record),
                                                'trailer-time-stamp,
                                                make-object('dsa-time), 'status, 1)
var *test-trailer-record-2* : trailer-record =
        set-attrs(make-object('trailer-record),
                                                'trailer-time-stamp,
                                                make-object('dsa-time), 'status, 1)
var *test-trailer-record-3* : trailer-record =
        set-attrs(make-object('trailer-record),
                                                'trailer-time-stamp, set-attrs(make-object('dsa-time),
                        'dsa-hour, 08,
                        'dsa-minute, 56,
                        'dsa-second, 58),
                        'status, 1)
var *test-account-header 1* : account-header =
 set-attrs(make-object('account-header),
        'account-length, 12,
        'account-type, 12,
        'cid, 6,
        'p-1, principal-name(*test-rhs-principal*),
        'p-2, principal-name(*test-lhs-principal*),
        'tm-1, set-attrs(make-object('dsa-name), 'dsa-name-value, 'tm-1),
        'tm-2, set-attrs(make-object('dsa-name), 'dsa-name-value, 'tm-2),
        'account-gutmid, set-attrs(make-object('gutmid),
                                        'gutmid-value, ['nbc, 'jkl]))
var *test-account-record-1* : account-record =
 set-attrs(make-object('account-record),
        'account-header-value, *test-account-header-1*,
        'extension-vector-value, {*test-extension-vector-1*,
                                        *test-extension-vector-2*},
        'trailer-record-value, *test-trailer-record-1*)
var *test-account-header-2* : account-header =
 set-attrs(make-object('account-header),
        'account-length, 12,
        'account-type, 12,
        'cid, 6,
        'p-1, principal-name(*test-lhs-principal*),
        'p-2, principal-name(*test-rhs-principal*),
        'tm-1, set-attrs(make-object('dsa-name), 'dsa-name-value, 'tm-1),
        'tm-2, set-attrs(make-object('dsa-name), 'dsa-name-value, 'tm-2),
        'account-gutmid, set-attrs(make-object('gutmid),
                                        'gutmid-value, ['abc, 'def]))
var *test-account-record-2* : account-record =
 set-attrs(make-object('account-record),
        'account-header-value, *test-account-header-2*,
        'extension-vector-value, (*test-extension-vector-3*,
                                        *test-extension-vector-4*},
        'trailer-record-value, *test-trailer-record-2*)
var *test-account-header-3* : account-header =
 set-attrs(make-object('account-header),
        'account-length, 12,
        'account-type, 12,
        'cid, 99,
        'p-1, principal-name(*test-lhs-principal*),
        'p-2, principal-name(*test-rhs-principal*),
        'tm-1, set-attrs(make-object('dsa-name), 'dsa-name-value, 'tm-1),
        'tm-2, set-attrs(make-object('dsa-name), 'dsa-name-value, 'tm-2),
        'account-gutmid, set-attrs(make-object('gutmid),
```

APPENDIX-continued

```
                        'gutmid-value, ['abc, 'def]),
        'account-time-stamp, set-attrs(make-object('dsa-time),
                        'dsa-hour, 08,
                        'dsa-minute, 56,
                        'dsa-second, 08))
var *test-account-record-3* : account-record =
 set-attrs(make-object('account-record),
        'account-header-value, *test-account-header-3*,
        'extension-vector-value, {*test-extension-vector-5*,
                                   *test-extension-vector-6*},
        'trailer-record-value, *test-trailer-record-3*)
var *test-account-base*: account-base =
        set-attrs(make-object('account-base),
                'account-base-records, (*test-account-record-1*,
                                         *test-account-record-2*,
                                         *test-account-record-3*})
%%%%%%%%%%%%%%%%%%%%%%%%%%%%%%%%%%%%%%%%%%%%%%%%
%%%%%%%%%%%%%%%%%%%%%%%%%%%%%%%
%The "Extract" function works the following way:
%1) check the target database if there is any record existing. If yes, go to 2). If no, return error-message,
%2) loop through all the account records in the target base, find the record with the attribute type and value
matches with the supplied type and value,
%3) Extract the records from the target base
%%%%%%%%%%%%%%%%%%%%%%%%%%%%%%%%%%%%%%%%%%%%%%%%
%%%%%%%%%%%%%%%%%%%%%%%%%%%%%%%
function EXTRACT-ACCOUNT-RECORD-ON-P1 (target-base: account-base,
principal-1: dsa-name): reason-code
=
let(reason:reason-code = returned-info,
 acct-records: set(account-record) = account-base-records(target-base),
 record-list: set(account-record) = ({})
  (if empty(acct-records) then
   reason <- returned-info
  else
  (enumerate rec over acct-records do
   (if dsa-name-value(p-1(account-header-value(rec))) = dsa-name-value(principal-1)
        then
   record-list <- record-list with rec));
   Re:: format-vars(true, record-list);
  reason <- return-ok);
reason
%%%%%%%%%%%%%%%%%%%%%%%%%%%%%%%%%%%%%%%%%%%%%%%%
%%%%%%%%%%%%%%%%%%%%%%%%%%%%%%%
function EXTRACT-ACCOUNT-RECORD-ON-P2(target-base: account-base,
        principal-2: dsa-name): reason-code
        =
        let(reason:reason-code = returned-info,
          acct-records: set(account-record) = account-base-records(target-base),
          record-list: set(account-record) = {})
          (if empty(acct-records) then
            reason <- returned-info
          else
          (enumerate rec over acct-records do
            (if dsa-name-value(p-2(account-header-value(rec))) = dsa-name-value(principal-2)
        then
   record-list <- record-list with rec));
   Re::format-vars(true, record-list);
  reason <- return-ok);
reason
%%%%%%%%%%%%%%%%%%%%%%%%%%%%%%%%%%%%%%%%%%%%%%%%
%%%%%%%%%%%%%%%%%%%%%%%%%%%%%%%
function EXTRACT-ACCOUNT-RECORD-ON-TM1(target-base: account-base,
        Tmethod-1: dsa-name) : reason-code
=
let(reason:reason-code = returned-info,
 acct-records: set(account-record) = account-base-records(target-base),
 record-list: set(account-record) = ({})
 (if empty(acct-records) then
   reason <- returned-info
 else
 (enumerate rec over acct-records do
   (if dsa-name-value(tm-1(account-header-value(rec))) = dsa-name-value(Tmethod-1)
        then
   record-list <- record-list with rec));
   Re::format-vars(true, record-list);
  reason <- return-ok);
reason
%%%%%%%%%%%%%%%%%%%%%%%%%%%%%%%%%%%%%%%%%%%%%%%%
%%%%%%%%%%%%%%%%%%%%%%%%%%%%%%%
```

APPENDIX-continued

```
function EXCTRACT-ACCOUNT-RECORD-ON-TM2(target-base: account-base,
        Tmethod-2: dsa-name) : reason-code
        =
        let(reason:reason-code = returned-info,
          acct-records: set(account-record) = account-base-records(target-base),
          record-list: set(account-record) = {})
          (if empty(acct-records) then
            reason <- returned-info
          else
            (enumerate rec over acct-records do
            (if dsa-name-value(tm-2(account-header-value(rec))) = dsa-name-value(Tmethod-2)
          then
  record-list <- record-list with rec));
  Re::format-vars(true, record-list);
 reason <- return-ok);
reason
%%%%%%%%%%%%%%%%%%%%%%%%%%%%%%%%%%%%%%%%%%%%%%%%
%%%%%%%%%%%%%%%%%%%%%%%%%%%%%
function EXCTRACT-ACCOUNT-RECORD-ON-GUTMID(target-base: account-base,
        target-gutmid: gutmid) : reason-code =
let(reason:reason-code = returned-info,
 acct-records: set(account-record) = account-base-records(target-base),
 record-list: set(account-record) = {})
 (if empty(acct-records) then
   reason <- returned-info
 else
   (enumerate rec over acct-records do
   (if gutmid-value(account-gutmid(account-header-value(rec))) = gutmid-value(target-gutmid)
        then
   record-list <- record-list with rec));
   Re::format-vars(true, record-list);
 reason <- return-ok);
reason
%%%%%%%%%%%%%%%%%%%%%%%%%%%%%%%%%%%%%%%%%%%%%%%%
%%%%%%%%%%%%%%%%%%%%%%%%%%%%%
function EXTRACT-ACCOUNT-RECORD-ON-TIME-STAMP(target-base: account-base,
        starting-time-stamp: dsa-time, ending-time-stamp: dsa-time) : reasoncode =
        let(reason:reason-code = returned-info,
          acct-records: set(account-record) = account-base-records(target-base),
          record-list: set(account-record) = {})
          (if empty(acct-records) then
            reason <- returned-info
          else
            (enumerate rec over acct-records do
            (if((dsa-hour(account-time-stamp(account-header-value(rec)))) =
              dsa-hour(starting-time-stamp) and
              dsa-minute(account-time-stamp(account-header-value(rec))) =
              dsa-minute(starting-time-stamp) and
              dsa-second(account-time-stamp(account-header-value(rec))) =
              dsa-second(starting-time-stamp))
          and
    (dsa-hour(trailer-time-stamp(trailer-record-value(rec)))
    dsa-hour(ending-time-stamp) and
    dsa-minute(trailer-time-stamp(trailer-record-value(rec))) =
    dsa-minute(ending-time-stamp) and
    dsa-second(trailer-time-stamp(trailer-record-value(rec))) =
    dsa-second(ending-time-stamp))
        then
  record-list <- record-list with rec));
  Re::format-vars(true, record-list);
 reason <- return-ok);
reason
%%%%%%%%%%%%%%%%%%%%%%%%%%%%%%%%%%%%%%%%%%%%%%%%
%%%%%%%%%%%%%%%%%%%%%%%%%%%%%
function EXTRACT-ACCOUNT-RECORD-ON-STARTING-TIME-STAMP(target-base: account-base,
        starting-time-stamp: dsa-time) : reason-code
=
let(reason:reason-code = returned-info,
 acct-records: set(account-record) = account-base-records(target-base),
 record-list: set(account-record) = {})
 (if empty(acct-records) then
   reason <- returned-info
 else
   (enumerate rec over acct-records do
   (if((dsa-hour(account-time-stamp(account-header-value(rec)))) =
     dsa-hour(starting-time-stamp) and
     dsa-minute(account-time-stamp(account-header-value(rec))) =
     dsa-minute(starting-time-stamp) and
     dsa-second(account-time-stamp(account-header-value(rec))) =
```

APPENDIX-continued

```
        dsa-second(starting-time-stamp))
            then
    record-list <- record-list with rec));
    Re::format-vars(true, record-list);
  reason <- return-ok);
reason
%%%%%%%%%%%%%%%%%%%%%%%%%%%%%%%%%%%%%%%%%%%%%%%
%%%%%%%%%%%%%%%%%%%%%%%%%%%%%%
function EXTRACT-ACCOUNT-RECORD-ON-ENDING-TIME-STAMP(target-base: account-base,
        ending-time-stamp: dsa-time) : reason-code
=
let(reason:reasoncode = returned-info,
 acct-records: set(account-record) = account-base-recorcis(target-base),
 record-list: set(account-record) = {})
 (if empty(acct-records) then
   reason <- returned-info
 else
   (enumerate rec over acct-records do
    (if((dsa-hour(trailer-time-stamp(trailer-record-valuc(rec))) =
      dsa-hour(ending-time-stamp) and
      dsa-minute(trailer-time-stamp(trailer-record-valuc(rec))) =
      dsa-minute(ending-time-stamp) and
      dsa-second(trailer-time-stamp(trailer-record-value(rec))) =
      dsa-second(ending-time-stamp)))
        then
    record-list <- record-list with rec));
    Re:: format-vars(true, record-list);
  reason <- return-ok);
reason
%%%%%%%%%%%%%%%%%%%%%%%%%%%%%%%%%%%%%%%%%%%%%%%
%%%%%%%%%%%%%%%%%%%%%%%%%%%%%
function EXTRACT-ACCOUNT-RECORD-ON-CID(target-base: account-base,
        target-acct-cid: integer): reason-code
=
let(reason:reason-code = returned-info,
 acct-records: set(account-record) = account-base-records(target-base),
 record-list: set(account-record) = {})
 (if empty(acct-records) then
   reason <- returned-info
 else
   (enumerate rec over acct-records do
    (if cid(account-header-value(rec)) = target-acct-cid
        then
    record-list <- record-list with rec));
    Re:: format-vars(true, record-list);
  reason <- return-ok);
reason
%%%%%%%%%%%%%%%%%%%%%%%%%%%%%%%%%%%%%%%%%%%%%%%
%%%%%%%%%%%%%%%%%%%%%%%%%%%%%
function EXTRACT-ACCOUNT-RECORD-ON-STATUS(target-base: account-base,
        target-status: integer): reason-code
=
let(reason:reason-code = returned-info,
 acct-records: set(account-record) = account-base-records(target-base),
 record-list: set(account-record) = {})
 (if empty(acct-records) then
   reason <- returned-info
 else
   (enumerate rec over acct-records do
    (if status(trailer-record-value(rec)) = target-status
        then
    record-list <- record-list with rec));
    Re::format-vars(true, record-list);
  reason <- return-ok);
reason
%%%%%%%%%%%%%%%%%%%%%%%%%%%%%%%%%%%%%%%%%%%%%%%
%%%%%%%%%%%%%%%%%%%%%%%%%%%%%
function EXTRACT-ACCOUNT-RECORD-ON-ACCOUNT-VALUE(target-base: account-base,
 accountvalue: symbol) : reason-code =
let(reason:reason-code returned-info,
 acct-records: set(account-record) = account-base-records(target-base),
 record-list: set(account-record) = {})
 (if empty(acct-records) tnen
   reason <- returned-info
 else
   (enumerate rec over acct-records do
    (if empty({x | (x: extension-vector) x in extension-vector-value(rec) & acct-value(x) =
accountvalue })
        then
```

APPENDIX-continued

```
    record-list <- record-list with rec));
  Re::format-vars(true, record-list);
 reason <- return-ok);
reason
%%%%%%%%%%%%%%%%%%%%%%%%%%%%%%%%%%%%%%%%%%%%%%%%%
%%%%%%%%%%%%%%%%%%%%%%%%%%%%%%
function EXTRACT-ACCOUNT-RECORD-ON-ACCOUNT-VALUE-TYPE(target-base: account-base,
         accountvaluetype: integer) : reason-code =
let(reason:reason-code = returned-info,
 acct-records: set(account-record) = account-base-records(target-base),
 record-list: set(account-record) = {})
 (if empty(acct-records) tnen
   reason <- returned-info
 else
   (enumerate rec over acct-records do
   (if ~empty({x | (x: extension-vector) x in extension-vector-value(rec) & acct-value-type(x) =
accountvaluetype})
         then
    record-list <- record-list with rec));
   Re:: format-vars(true, record-list);
 reason <- return-ok);
reason
%%%%%%%%%%%%%%%%%%%%%%%%%%%%%%%%%%%%%%%%%%%%%%%%%
%%%%%%%%%%%%%%%%%%%%%%%%%%%%%%
function EXTRACT-ACCOUNT-RECORD-ON-BILLABLE-INDICATOR(target-base: account-base,
         billable?: boolean) : reason-code =
let(reason:reason-code = returned-info,
 acct-records: set(account-record) = account-base-records(target-base),
 record-list: set(account-record) = {})
 (if empty(acct-records) tnen
   reason <- returned-info
 else
   (enumerate rec over acct-records do
   (if-empty({x | (x: extension-vector) x in extension-vector-value(rec) & extension-billable?(x) =
billable?})
         then
    record-list <- record-list with rec
    elseif size(extension-vector-value(rec)) = 0 and account-billable? (rec) = billable?
         then
    record-list <- record-list with rec));
   Re::format-vars(true, record-list);
 reason <- return-ok);
reason
%%%%%%%%%%%%%%%%%%%%%%%%%%%%%%%%%%%%%%%%%%%%%%%%%
%%%%%%%%%%%%%%%%%%%%%%%%%%%%%%
var *starting-time-stamp* : dsa-time = set-attrs(make-object('dsa-time),
                       'dsa-hour, 08,
                       'dsa-minute, 56,
                       'dsa-second, 08)
var *ending-time-stamp* : dsa-time =
         set-attrs(make-object('dsa-time),
                       'dsa-hour, 08,
                       'dsa-minute, 56,
                       'dsa-second, 58)
var *test-lhs-principal* : principal =
         *initialize-a-principal *('test-lhs-principal,
                                           test-lhs-transaction)
var *test-rhs-principal* : principal =
         *initialize-a-principal*('test-rhs-principal,
                                           test-rhs-transaction)
var *test-lhs-transaction* : transaction-method =
         *initialize-a-transaction-method*(
                                           test-lhs-transaction)
var *test-lhs-transaction* : transaction-method =
         *initialize-a-transaction-method*(
                                           test-rhs-transaction)
var *test-gutmid-value* : gutmid = set-attrs(make-object(gutmid),
                                           'gutmid-value, ['abc, 'def])
var *testing-conversation-id-value* : integer = 29
var *test-acct-type-value* : integer = 222
var *test-conv-status* : integer = 1
var *test-acct-value* : symbol = 'GonewithTheWind
var *test-extension-vector-41 * : extension-vector =
         set-attrs(make-object('extension-vector)
                                           'acct-value, 'ForrestGump,
                                           'acct-value-length, 99,
                                           'acct-value-type, 222,
                                           'extension-billable?, true)
var *test-extension-vector-42* : extension-vector =
```

APPENDIX-continued

```
                set-attrs(make-object('extension-vector),
                                        'acct-value, 'GonewithTheWind,
                                        'acct-value-length, 99,
                                        'acct-value-type, 222,
                                        'extension-billable?, true)
var *test-extension-vector-43* : extension-vector =
        set-attrs(make-object('extension-vector),
                                        'acct-value, 'GonewithTheWind,
                                        'acct-value-length, 99,
                                        'acct-value-type, 88,
                                        'extension-biltable?, false)
var *test-extension-vector-44* : extension-vector =
        set-attrs(make-object('extension-vector),
                                        'acct-value, 'GonewithTheWind,
                                        'acct-value-length, 99,
                                        'acct-value-type, 88,
                                        'extension-billable?, false)
var *test-extension-vector-45* : extension-vector =
        set-attrs(make-object('extension-vector),
                                        'acct-value, 'ForrestGump,
                                        'acct-value-length, 99,
                                        'acct-value-type, 102,
                                        'extension-billable?, false)
var *test-extension-vector-46* : extension-vector =
        set-attrs(make-object('extension-vector),
                                        'acct-value, 'ForrestGump,
                                        'acct-value-length, 99,
                                        'acct-value-type, 102,
                                        'extension-billable?, true)
var *test-extension-vector-47* : extension-vector =
        set-attrs(make-object('extension-vector),
                                        'acct-value, 'ForrestGump,
                                        'acct-value-length, 99,
                                        'acct-value-type, 125,
                                        'extension-billable?, true)
var *test-extension-vector-48* : extension-vector =
        set-attrs(make-otject('extension-vector),
                                        'acct-value, 'ForrestGump,
                                        'acct-value-length, 99,
                                        'acct-value-type, 125,
                                        'extension-billable?, true)
var *test-trailer-record-11* : trailer-record =
        set-attrs(make-object('trailer-record),
                                        'trailer-time-stamp,
                                        make-object('dsa-time), 'status, 1)
var *test-trailer-record-22* : trailer-record =
        set-attrs(make-object('trailer-record),
                                        'trailer-time-stamp,set-attrs(make-object('dsa-time),
                        'dsa-hour, 08,
                        'dsa-minute, 56,
                        'dsa-second, 58),
                                        'status, 1)
var *test-trailer-record-13* : trailer-record =
        set-attrs(make-object('trailer-record),
                                        'trailer-time-stamp, set-attrs(make-object('dsa-time),
                        'dsa-hour, 08,
                        'dsa-minute, 56,
                        'dsa-second, 58),
                        'status, 1)
var *test-trailer-record-14* : trailer-record =
        set-attrs(make-object('trailer-record),
                                        'trailer-time-stamp, set-attrs(make-object('dsa-time),
                        'dsa-hour, 12,
                        'dsa-minute, 56,
                        'dsa-second, 58),
                        'status, 4)
var *test-account-header-56* : account-header =
 set-attrs(make-object('account-header),
                'account-length, 12,
                'account-type, 12,
                'cid, 16,
                'p-1, principal-name(*test-rhs-principal*),
                'p-2, principal-name(*test-lhs-principal*),
                'tm-1, transaction-method-name(*test-lhs-transaction*),
                'tm-2, transaction-method-name(*test-rhs-transaction*),
                'account-gutmid, set-attrs(make-object('gutmid),
                                        'gutmid-value, ['nbc, 'jkl]),
                'account-billable?, false)
var *test-account-record-56* : account-record =
```

APPENDIX-continued

```
    set-attrs(make-object('account-record),
            'account-header-value, *test-account-header-56*,
            'extension-vector-value, {*test-extension-vector-41*,
                                      *test-extension-vector-42*},
            'trailer-record-value, *test-trailer-record-11*)
var *test-account-header-57* : account-header =
  set-attrs(make-object('account-header),
            'account-length, 12,
            'account-type, 12,
            'cid, 33,
            'p-1, principal-name(*test-lhs-principal*),
            'p-2, principal-name(*test-rhs-principal*),
            'tm-1, set-attrs(make-object('dsa-name), 'dsa-name-value, 'tm-1),
            'tm-2, set-attrs(make-object('dsa-name), 'dsa-name-value, 'tm-2),
            'account-gutmid, set-attrs(make-object('gutmid),
                                      'gutmid-value, [abc, 'def]),
            'account-billable?, true)
var *test-account-record-57* : account-record =
  set-attrs(make-object('account-record),
            'account-header-value, *test-account-header-57*,
            'extension-vector-value, (*test-extension-vector-43*,
                                      *test-extension-vector-44*),
            'trailer-record-value, *test-trailer-record-22*)
var *test-account-header-58* : account-header =
  set-attrs(make-object('account-header),
            'account-length, 12,
            'account-type, 12,
            'cid, 69,
            'p-1, principal-name(*test-lhs-principal*),
            'p-2, principal-name(*test-rhs-principal*),
            'tm-1, set-attrs(make-object('dsa-name), 'dsa-name-value, 'tm-1),
            'tm-2, set-attrs(make-object('dsa-name), 'dsa-name-value, 'tm-2),
            'account-gutmid, set-attrs(make-object('gutmid),
                                      'gutmid-value, ['abc, 'def]),
            'account-billable?, false,
            'account-time-stamp, set-attrs(make-object('dsa-time),
                        'dsa-hour, 08,
                        'dsa-minute, 56,
                        'dsa-second, 08))
var *test-account-record-58* : account-record =
  set-attrs(make-object('account-record),
            'account-header-value, *test-account-header-58*,
            'extension-vector-value, (*test-extension-vector-45*,
                                      *test-extension-vector-46*},
            'trailer-record-value, *test-trailer-record-13*)
var *test-account-header-59* : account-header
  set-attrs(make-object('account-header),
            'account-length, 12,
            'account-type, 12,
            'cid, 29,
            'p-1, principal-name(*test-rhs-principal*),
            'p-2, principal-name(*test-rhs-principal*),
            'tm-1, set-attrs(make-object('dsa-name), 'dsa-name-value, 'tm-1),
            'tm-2, set-attrs(make-object('dsa-name), 'dsa-name-value, 'tm-2),
            'account-gutmid, set-attrs(make-object('gutmid),
                                      'gutmid-value, ['abc, 'def]),
            'account-billable?, true,
            'account-time-stamp, set-attrs(make-object('dsa-time),
                        'dsa-hour, 08,
                        'dsa-minute, 56,
                        'dsa-second, 08))
var *test-account-record-59* : account-record =
  set-attrs(make-object('account-record),
            account-header-value, *test-account-header-59*,
            'extension-vector-value, {*test-extension-vector-47*,
                                      *test-extension-vector-48*},
            'trailer-record-value, *test-trailer-record-14*)
var *test-account-base14* : account-base =
        set-attrs(make-object('account-base),
                  account-base-records, {*test-account-record-56*,
                                      *test-account-record-57*,
                                      *test-account-record-58*,
*test-account-record-59*})
%%%%%%%%%%%%%%%%%%%%%%%%%%%%%%%%%%%%%%%%%%%%%%%%%%%%%
%%%%%%%%%%%%%%%%%%%%%%%%%%%%%
%The "Retrieve" function works the following way:
%1) This function can retrieve records from a specified principal and receives data at a specified
accounting-service-name
%2) Look for all the records match with the specified attribute value
```

APPENDIX-continued

```
%3) call the receive-some-data function to receive records
%%%%%%%%%%%%%%%%%%%%%%%%%%%%%%%%%%%%%%%%%%%%%%%%
%%%%%%%%%%%%%%%%%%%%%%%%%%%%%%%%%
function RETRIEVE-ACCOUNT-RECORD(p-name: dsa-name,
         accting-service-name : symbol) : reason-code
let(reason: reason-code = returned-error,
   target-account-records: set(account-record) = ({x| (x) account-record(x) & p-1(x) = p-name}))
   (if empty(target-account-records) then
     reason <- returned-error;
     re::format-vars(true, target-account-records)
   else
     receive-some-data(account-retrieve-tm, account-flush-record-tm,target-account-records);
     re::format-vars(true, receive-some-data);
     re::format-vars(true, account-flush-record-tm);
     re::format-vars(true, account-retrieve-tm);
   reason <- return-ok);
reason
%%%%%%%%%%%%%%%%%%%%%%%%%%%%%%%%%%%%%%%%%%%%%%%%
%%%%%%%%%%%%%%%%%%%%%%%%%%%%%%%%%:eval retrieve-account-record(*test-lhs-
principal*, *test-acct-service-name*)
var *test-lhs-principal* : principal =
         *initiaiize-a-principal*('test-lhs-principal,
                                     test-lhs-transaction)
var *test-rhs-principal* : principal =
         *initiaiize-a-principal*('test-rhs-principal,
                                     test-rhs-transaction)
var *test-extension-vector-51* : extension-vector =
         set-attrs(make-object('extension-vector),
                                     'acct-value, 'ForrestGump,
                                     'acct-value-length, 99,
                                     'acct-value-type, 88,
                                     'extension-billable?, true)
var *test-extension-vector-52* : extension-vector =
         set-attrs(make-object('extension-vector),
                                     'acct-value, 'ForrestGump,
                                     'acct-value-length, 99,
                                     'acct-value-type, 88,
                                     'extension-billable?, true)
var *test-extension-vector-53* : extension-vector
         set-attrs(make-object('extension-vector),
                                     * acct-value, 'ForrestGump,
                                     'acct-value-length, 99,
                                     'acct-value-type, 88,
                                     'extension-billable?, true)
var *test-extension-vector-54* : extension-vector =
         set-attrs(make-object('extension-vector),
                                     'acct-value, 'ForrestGump,
                                     'acct-value-length, 99,
                                     'acct-value-type, 88,
                                     'extension-billable?, true)
var *test-extension-vector-55* : extension-vector =
         set-attrs(make-object('extension-vector),
                                     'acct-value, 'ForrestGump,
                                     'acct-value-length, 99,
                                     'acct-value-type, 88,
                                     'extension-billable?, true)
var *test-extension-vector-56* : extension-vector =
         set-attrs(make-object('extension-vector),
                                     'acct-value, 'ForrestGump,
                                     'acct-value-length, 99,
                                     'acct-value-type, 88,
                                     'extension-billable?, true)
var *test-extension-vector-57* : extension-vector =
         set-attrs(make-object('extension-vector),
                                     'acct-value, 'ForrestGump,
                                     'acct-value-length, 99,
                                     'acct-value-type, 88,
                                     'extension-billable?, true)
var *test-extension-vector-58* : extension-vector =
         set-attrs(make-object('extension-vector)
                                     'acct-value, 'ForrestGump,
                                     'acct-value-length, 99,
                                     'acct-value-type, 88,
                                     'extension-billable?, true)
var *test-trailer-record-15* : trailer-record =
         set-attrs(make-object('trailer-record),
                                     'trailer-time-stamp,
                                     make-object('dsa-time), 'status, 1)
var *test-trailer-record-16* : trailer-record =
```

APPENDIX-continued

```
                set-attrs(make-object('trailer-record),
                                        'trailer-time-stamp,
                                        make-object('dsa-time), 'status, 1)
var *test-trailer-record-17* : trailer-record =
        set-attrs(make-object('trailer-record),
                                        'trailer-time-stamp, set-attrs(make-object('dsa-time),
                        'dsa-hour, 08,
                        'dsa-minute, 56,
                        'dsa-second, 58),
                        'status, 1)
var *test-trailer-record-18* : trailer-record =
        set-attrs(make-object('trailer-record),
                                        'trailer-time-stamp, set-attrs(make-object('dsa-time),
                        'dsa-hour, 12,
                        'dsa-minute, 56,
                        'dsa-second, 58),
                        'status, 1)
var *test-account-header-68* : account-header =
 set-attrs(make-object('account-header),
            'account-length, 12,
            'account-type, 12,
            'cid, 36,
            'p-1, principal-name(*test-rhs-principal*),
            'p-2, principal-name(*test-lhs-principal*),
            'tm-1, set-attrs(make-object('dsa-name), 'dsa-name-value, 'tm-1),
            'tm-2, set-attrs(make-object('dsa-name), 'dsa-name-value, 'tm-2),
            'account-gutmid, set-attrs(make-object('gutmid),
                                        gutmid-value, ['nbc, 'jkl]))
var *test-account-record-68* : account-record =
 set-attrs(make-object('account-record),
            'account-header-value, *test-account-header-68*,
            'extension-vector-value, {*test-extension-vector-51*,
                                        *test-extension-vector-52*),
            'trailer-record-value, *test-trailer-record-15*)
var *test-account-header-61 * : account-header =
 set-attrs(make-object('account-header),
            'account-length, 12,
            'account-type, 12,
            'cid, 46,
            'p-1, principal-name(*test-lhs-principal*),
            'p-2, principal-name(*test-rhs-principal*),
            'tm-1, set-attrs(make-object('dsa-name), 'dsa-name-value, 'tm-1),
            'tm-2, set-attrs(make-object('dsa-name), 'dsa-name-value, 'tm-2),
            'account-gutmid, set-attrs(make-object('gutmid),
                                        gutmid-value, ['abc, 'def]))
var *test-account-record-61 * : account-record =
 set-attrs(make-object('account-record),
            'account-header-value, *test-account-header-61*,
            'extension-vector-value, (*test-extension-vector-53*,
                                        *test-extension-vector-54*},
            'trailer-record-value, *test-trailer-record-16*)
var *test-account-header-66* : account-header =
 set-attrs(make-object('account-header),
            *account-length, 12,
            'account-type, 12,
            'cid, 36,
            'p-1, principal-name(*test-lhs-principal*),
            'p-2, principal-name(*test-rhs-principal*),
            'tm-1, set-attrs(make-object('dsa-name), 'dsa-name-value, 'tm-1),
            'tm-2, set-attrs(make-object('dsa-name), 'dsa-name-value, 'tm-2),
            'account-gutmid, set-attrs(make-object('gutmid),
                                        *gutmid-value, ['abc, 'def]),
            'account-time-stamp, set-attrs(make-object('dsa-time),
                        'dsa-hour, 08,
                        'dsa-minute, 56,
                        'dsa-second, 08))
var *test-account-record-66*: account-record =
 set-attrs(make-object('account-record),
            'account-header-value, *test-account-header-66*,
            'extension-vector-value, {*test-extension-vector-55*,
                                        *test-extension-vector-56*},
            'trailer-record-value, *test-trailer-record-17*)
var *test-account-header-67* : account-header =
 set-attrs(make-object('account-header),
            'account-length, 12,
            'account-type, 12,
            'cid, 22,
            'p-1, principal-name(*test-lhs-principal*),
            'p-2, principal-name(*test-rhs-principal*),
```

APPENDIX-continued

```
                'tm-1, set-attrs(make-object('dsa-name), 'dsa-name-value, 'tm-1),
                'tm-2, set-attrs(make-object('dsa-name), 'dsa-name-value, 'tm-2),
                'account-gutmid, set-attrs(make-object('gutmid),
                                            gutmid-value, ['abc, 'def]),
                'account-time-stamp, set-attrs(make-object('dsa-time),
                            'dsa-hour, 08,
                            'dsa-minute, 56,
                            'dsa-second, 08))
var *test-account-record-67* : account-record =
  set-attrs(make-object('account-record),
            'account-header-value, *test-account-header-67*,
            'extension-vector-value, {*test-extension-vector-57*,
                                        *test-extension-vector-58*},
            'trailer-record-value, *test-trailer-record-18*)
var *test-account-base16* : account-base =
        set-attrs(make-object('account-base),
                    *account-base-records, {*test-account-record-68*,
                                            *test-account-record-61*,
                                            *test-account-record-66*,
*test-account-record-67*))
var *test-acct-service-name* : symbol = 'susie
%%%%%%%%%%%%%%%%%%%%%%%%%%%%%%%%%%%%%%%%%%%%%%%%%%%%
%%%%%%%%%%%%%%%%%%%%%%%%%%%%%%%%
%The "Forward" function works the following way:
%1) check the target database if there is any record existing. If yes, go to 2), If no, return error-message,
%2) loop through all the account records in the target base, find the record with the attribute type and value
matches with the supplied type and value,
%3) Extract the records from the target base
%4) Call the send-some-data function to forward data to the destined tm.
%%%%%%%%%%%%%%%%%%%%%%%%%%%%%%%%%%%%%%%%%%%%%%%%%%%%
%%%%%%%%%%%%%%%%%%%%%%%%%%%%%%%%
function FORWARD-ACCOUNT-RECORD-ON-P1(target-base: account base,
        principal-1: dsa-name, acct-service-name: symbol) : reason-code =
let(reason:reason-code = returned-info,
 acct-records: set(account-record) = account-base-records(target-base),
 record-list: set(account-record) = {})
 (if empty(acct-records)then
    reason <- returned info
 else
    (enumerate rec over acct-records do
    (if dsa-anme-value(p-1(account-header-value(rec))) = dsa-name-value(principal-1)
            then
     record-list <- record-list with rec;
     record-list <- record-list union (extension-vector-value(rec));
     record-list <- record-list with (trailer-record-value(rec))));
    send-some-data(account-forward-tm, account-accept-tm, record-list);
    Re::format-vars(true, record-list);
    re::format-vars(true, send-some-data);
    reason <- return-ok);
reason
%%%%%%%%%%%%%%%%%%%%%%%%%%%%%%%%%%%%%%%%%%%%%%%%%%%%
%%%%%%%%%%%%%%%%%%%%%%%%%%%%%%%%
function FORWARD-ACCOUNT-RECORD-ON-P2(target-base: account base,
        principal-2: dsa-name, acct-service-name: symbol) : reason-code =
        let(reason:reason-code = returned-info,
          acct-records: set(account-record) = account-base-records(target-base),
          record-list: set(account-record) = {})
         (if empty(acct-records) then
            reason <- returned-info
         else
            (enumerate rec over acct-records do
            (if dsa-name-value(p-2(account-header-value(rec))) = dsa-name-value(principal-2)
            then
    record-list <- record-list with rec;
    record-list <- record-list union (extension-vector-value(rec));
    record-list <- record-list with (trailer-record-value(rec))));
   send-some-data(account-forward-tm, account-accept-tm, record-list);
    Re::format-vars(true, record-list);
    re::format-vars(true, send-some-data);
 reason <- return-ok);
reason
%%%%%%%%%%%%%%%%%%%%%%%%%%%%%%%%%%%%%%%%%%%%%%%%%%%%
%%%%%%%%%%%%%%%%%%%%%%%%%%%%%%%%
function FORWARD-ACCOUNT-RECORD-ON-TM1(target-base: account-base,
        Tmethod-1: dsa-name, acct-service-name: symbol): reason-code =
let(reason:reason-code = returned-info,
 acct-records: set(account-record) = account-base-records(target-base),
 record-list: set(account-record) = {})
 (if empty(acct-records) then
```

APPENDIX-continued

```
    reason <- returned-info
  else
   (enumerate rec over acct-records do
   (if dsa-name-value(tm-1 (account-header-value(rec))) = dsa-name-value(Tmethod-1)
        then
    record-list <- record-list with rec;
    record-list <- record-list union (extension-vector-value(rec));
    record-list <- record-list with (trailer-record-value(rec))));
   send-some-data(account-forward-tm, account-accept-tm, record-list);
    Re::format-vars(true, record-list);
    re::format-vars(true, send-some-data);
  reason <- return-ok);
 reason
%%%%%%%%%%%%%%%%%%%%%%%%%%%%%%%%%%%%%%%%%%%%%%%
%%%%%%%%%%%%%%%%%%%%%%%%%%%%%%%
function FORWARD-ACCOUNT-RECORD-ON-TM2(target-base: account-base,
        Tmethod-2: dsa-name, acct-service-name: symbol) : reason-code =
let(reason :reason-code = returned-info,
 acct-records: set(account-record) = account-base-records(target-base),
 record-list: set(account-record) = {})
 (if empty(acct-records) then
   reason <- returned-info
  else
   (enumerate rec over acct-records do
   (if dsa-name-value(tm-2(account-header-value(rec))) = dsa-name-value(Tmethod-2)
        then
    record-list <- record-list with rec;
    record-list <- record-list union (extension-vector-value(rec));
    record-list <- record-list with (trailer-record-value(rec))));
   send-some-data(account-forward-tm, account-accept-tm, record-list);
    Re:: format-vars(true, record-list);
    re:: format-vars(true, send-some-data);
  reason <- return-ok);
 reason
%%%%%%%%%%%%%%%%%%%%%%%%%%%%%%%%%%%%%%%%%%%%%%%
%%%%%%%%%%%%%%%%%%%%%%%%%%%%%%%
function FORWARD-ACCOUNT-RECORD-ON-GUTMID(target-base: account-base,
        target-gutmid: gutmid, acct-service-name: symbol) : reason-code =
let(reason:reason-code = returned-info,
 acct-records: set(account-record) = account-base-records(target-base),
 record-list: se-(account-record) = {})
 (if empty(acct-records) then
   reason <- returned-info
  else
   (enumerate rec over acct-records do
   (if gutmid-value(account-gutmid(account-header-value(rec))) = gutmid-value(target-gutmid)
        then
    record-list <- record-list with rec;
    record-list <- record-list union (extension-vector-value(rec));
    record-list <- record-list with (trailer-record-value(rec))));
   send-some-data(account-forward-tm, account-accept-tm, record-list);
    Re::fornaat-vars(true, record-list);
    re::format-vars(true, send-some-data);
  reason <- return-ok);
 reason
%%%%%%%%%%%%%%%%%%%%%%%%%%%%%%%%%%%%%%%%%%%%%%%
%%%%%%%%%%%%%%%%%%%%%%%%%%%%%%%
function FORWARD-ACCOUNT-RECORD-ON-TIME-STAMP(target-base: account-base,
        starting-time-stamp: dsa-time, ending-time-stamp: dsa-time, acct-service-name: symbol):
        reason-code =
        let(reason:reason-code = returned-info,
         acct-records: set(account-record) = account-base-records(target-base),
         record-list: set(account-record) = {})
         (if empty(acct-records) then
           reason <- returned-info
          else
           (enumerate rec over acct-records do
           (if((dsa-hour(account-time-stamp(account-header-value(rec)))) =
             dsa-hour(starting-time-stamp) and
             dsa-minute(account-time-stamp(account-header-value(rec))) =
             dsa-minute(starting-time-stamp) and
             dsa-second(account-time-stamp(account-header-value(rec))) =
             dsa-second(starting-time-stamp))
           and
    (dsa-hour(trailer-time-stamp(trailer-record-value(rec))) =
    dsa-hour(ending-time-stamp) and
    dsa-minute(trailer-time-stamp(trailer-record-value(rec))) =
    dsa-minute(ending-tie-stamp) and
    dsa-second(trailer-time-stamp(trailer-record-value(rec))) =
```

APPENDIX-continued

```
      dsa-second(ending-time-stamp))
          then
      record-list <- record-list with rec;
      record-list <- record-list union (extension-vector-value(rec));
      record-list <- record-list with (trailer-record-value(rec))));
    send-some-data(account-forward-tm, account-accept-tm, record-list);
      Re::format-vars(true, record-list);
      re::format-vars(true, send-some-data);
  reason <- return-ok);
reason
%%%%%%%%%%%%%%%%%%%%%%%%%%%%%%%%%%%%%%%%%%%%%%%%%%%
%%%%%%%%%%%%%%%%%%%%%%%%%%%%%%%%
function FORWAR-ACCOUNT-RECORD-ON-STARTING-TIME-STAMP(target-base: account-base,
starting-time-stamp: dsa-time, acct-service-name: symbol) : reason-code =
let(reason:reason-code = returned-info,
 acct-records: set(account-record) = account-base-records(target-base),
 record-list: set(account-record) = {})
 (if empty(acct-records) then
    reason <- returned-info
 else
    (enumerate rec over acct-records do
    (if((dsa-hour(account-time-stamp(account-header-value(rec))))
       dsa-hour(starting-time-stamp) and
       dsa-minute(account-time-stamp(account-header-value(rec))) =
       dsa-minute(starting-time-stamp) and
       dsa-second(account-time-stamp(account-header-value(rec))) =
       dsa-second(starting-time-stamp))
          then
      record-list <- record-list with rec;
      record-list <- record-list union (extension-vector-value(rec));
      record-list <- record-list with (trailer-record-value(rec))));
    send-some-data(account-forward-tm, account-accept-tm, record-list);
      Re::format-vars(true, record-list);
      re::format-vars(true, send-some-data);
  reason <- return-ok);
reason
%%%%%%%%%%%%%%%%%%%%%%%%%%%%%%%%%%%%%%%%%%%%%%%%%%%
%%%%%%%%%%%%%%%%%%%%%%%%%%%%%%%%
function FORWARD-ACCOUNT-RECORD-ON-ENDING-TIME-STAMP(target-base: account base,
ending-time-stamp: dsa-time, acct-service-name: symbol): reason-code =
let(reason:reason-code = returned-info,
 acct-records: set(account-record) = account-base-records(target-base),
 record-list: set(account-record) = {})
 (if empty(acct-records) then
    reason <- returned-info
 else
    (enumerate rec over acct-records do
    (if((dsa-hour(trailer-tinne-stamp(trailer-record-value(rec))) =
       dsa-hour(ending-time-stamp) and
       dsa-minute(trailer-time-stamp(trailer-record-va1ue(rec))) =
       dsa-minute(ending-time-stamp) and
       dsa-second(trailer-time-stamp(trailer-record-value(rec))) =
       dsa-second(ending-time-stamp)))
          then
      record-list <- record-list with rec;
      record-list <- record-list union (extension-vector-value(rec));
      record-list <- record-list with (trailer-record-value(rec))));
    send-some-data(account-forward-tm, account-accept-tm, record-list);
      Re::format-vars(true, record-list);
      re::format-vars(true, send-some-data);
  reason <- return-ok);
reason
%%%%%%%%%%%%%%%%%%%%%%%%%%%%%%%%%%%%%%%%%%%%%%%%%%%
%%%%%%%%%%%%%%%%%%%%%%%%%%%%%%%%
function FORWARD-ACCOUNT-RECORD-ON-CID(target-base: account-base,
          target-acct-cid: integer, acct-service-name: symbol) : reason-code =
          let(reason:reason-code = returned-info,
            acct-records: set(account-record) = account-base-records(target-base),
            record-list: set(account-record) = {})
            (if empty(acct-records) then
              reason <- returned-info
            else
              (enumerate rec over acct-records do
              (if cid(account-header-value(rec)) = target-acct-cid
            then
      record-list <- record-list with rec;
      record-list <- record-list union (extension-vector-value(rec));
      record-list <- record-list with (trailer-record-value(rec))));
    send-some-data(account-forward-tm, account-accept-tm, record-list);
```

APPENDIX-continued

```
    Re::format-vars(true, record-list);
    re::format-vars(true, send-some-data);
  reason <- return-ok);
reason
%%%%%%%%%%%%%%%%%%%%%%%%%%%%%%%%%%%%%%%%%%%%%%%%%
%%%%%%%%%%%%%%%%%%%%%%%%%%%%%
function FORWARD-ACCOUNT-RECORD-ON-STATUE(target-base: account-base,
          target-status: integer, acct-service-name: syrnbol) : reason-code =
          let(reason:reasoncode = returned-info,
           acct-records: set(account-record) = account-base-records(target-base)
           record-list: set(account-record) = {})
           (if empty(acct-records) then
             reason <- returned-info
           else
             (enumerate rec over acct-records do
             (if status(trailer-record-value(rec)) = target-status
          then
     record-list <- record-list with rec;
     record-list <- record-list union (extension-vector-value(rec));
     record-list <- record-list with (trailer-record-value(rec))));
    send-sorne4ata(account-forward-tm, account-accept-tm, record-list);
    Re::format-vars(true, record-list);
    re::format-vars(true, send-some-data);
  reason <- return-ok);
reason
%%%%%%%%%%%%%%%%%%%%%%%%%%%%%%%%%%%%%%%%%%%%%%%%%
%%%%%%%%%%%%%%%%%%%%%%%%%%%%%
%
function FORWARD-ACCOUNT-RECORD-ON-ACCOUNT-VALUE(target-base: account-base,
          accountvalue: symbol, acct-service-name: symbol) : reason-code =
let(reason:reason-code = returned-info,
 acct-records: set(account-record) = account-base-records(target-base),
 record-list: set(account-record) = {})
 (if empty(acct-records) then
   reason <- returned-info
 else
   (enumerate rec over acct-records do
   (if -empty({x | x: extension-vector) x in extension-vector-value(rec) & acct-value(x) =
accountvalue})
         then
     record-list <- record-lisI with rec;
     record-list <- record-list union (extension-vector-value(rec));
     record-list <- record-list with (trailer-record-value(rec))));
    send-some-data(account-forward-tm, account-accept-tm, record-list);
    Re::format-vars(true, record-list);
    re::format-vars(true, send-some-data);
  reason <- return-ok);
reason
%%%%%%%%%%%%%%%%%%%%%%%%%%%%%%%%%%%%%%%%%%%%%%%%%
%%%%%%%%%%%%%%%%%%%%%%%%%%%%
function FORWARD-ACCOUNT-RECORD-ON-ACCOUNT-VALUE-TYPE(target-base: account-base,
          accountvaluetype: integer, acct-service-name: symbol): reason-code =
let(reason:reasoncode = returned-info,
 acct-records: set(account-record) = account-base-records(target-base),
 record-list: set(account-record) = {})
 (if empty(acct-records) then
   reason <- returned-info
 else
   (enumerate rec over acct-records do
   (if ~empty({x | (x: extension-vector) x in extension-vector-value(rec) & acct-value-type(x) =
accountvaluetype})
         then
     record-list <- record-list with rec;
     record-list <- record-list union (extension-vector-value(rec));
     record-list <- record-list with (trailer-record-value(rec))));
    send-some-ata(account-forward-tm, account-accept-tm, record-list);
    Re::format-vars(true, record-list);
    re::format-vars(true, send-some-data);
  reason <- return-ok);
reason
%%%%%%%%%%%%%%%%%%%%%%%%%%%%%%%%%%%%%%%%%%%%%%%%%
%%%%%%%%%%%%%%%%%%%%%%%%%%%%%
function FORWARD-ACCOUNT-RECORD-ON-BILLABLE-INDICATOR(target-base: account-base,
    billable?: boolean, acct-service-name: symbol) : reasoncode =
let(reason:reason-code = returned-info,
 acct-records: set(account-record) = account-base-records(target-base),
 record-list:- set(account-record) = {})
 (if empty(acct-records) then
   reason <- returned-info
```

APPENDIX-continued

```
    else
    (enumerate rec over acct-records do
      (if empty({x | x: extension-vector) x in extension-vector-value(rec) & extension-billable?(x) =
billable?})
          then
        record-list <- record-list with rec;
        record-list <- record-list union (extension-vector-value(rec));
        record-list <- record-list with (trailer-record-value(rec))
      elseif size(extension-vector-value(rec)) = 0 and account-billable? (rec) = billable?
          then
        record-list <- record-list with rec;
        record-list <- record-list with (trailer-record-value(rec))));
      send-some-data(account-forward-tm, account-accept-tm, record-list);
      Re::format-vars(true, record-list);
      re::format-vars(true, send-some-data);
    reason <- return-ok);
reason
%%%%%%%%%%%%%%%%%%%%%%%%%%%%%%%%%%%%%%%%%%%%%%%%%%%%%%%%
%%%%%%%%%%%%%%%%%%%%%%%%%%%%%%%%%%%
var *test-service-name*: symbol = 'NoGuarantee
%:eval forward-account-record-on-time-stamp(*test-account-base14*, *starting-time-stamp*, *ending-time-
stamp*, *test-service-name*)
%:eval forward-account-record-on-gutmid(*test-account-base14*, *test-gutmid-value*, *test-service-
name*)
%:eval forward-account-record-on-p1(*test-account-base14*, principal-name(*test-lhs-principal*), *test-
service-name*)
%:eval forward-account-record-on-tm1(*test-account-base14*, transaction-method-name(*test-lhs-
transaction*), *test-service-name*)
%:eval forward-account-record-on-cid(*test-account-base14*, *Testing-Conversation-Id-Value*, *Test-
Service-Name*)
%:Eval Forward-Account-Record-On-Status(*Test-Account-Base14*, *Test-Conv-Status*, *Test-Service-
Name*)
%:Eval Forward-Account-Record-On-Starting-Time-Stamp(*Test-Account-Base14*, *Starting-Time-
Stamp*, *Test-Service-Name*)
%:Eval Forward-Account-Record-On-Ending-Time-Stamp(*Test-Account-Base14*, *Ending-Time-
Stamp*, *Test-Service-Name*)
%:Eval Forward-Account-Record-On-Billable-Indicator(*Test-Account-Base14*, False, *Test-Service-
Name*)
%:eval forward-account-record-on-account-value(*test-account-base14*, *test-acct-value*, *test-service-
name*)
%:eval forward-account-record-on-account-value-type(*test-acct-value-type*, *test-
service-flame*)
%:eval Extract-account-record-on-time-stamp(*test-account-base14*, *starting-time-stamp*, *ending-time-
stamp*)
%:eval extract-account-record-on-gutmid(*test-account-base14*, *test-gutmid-value*)
%:eval extract-account-record-on-p1(*test-account-base14*, principal-name(*test-lhs-principal*))
%:eval extract-account-record-on-tm1(*test-account-base14*, transaction-method-name(*test-lhs-
transaction*))
%:eval extract-account-record-on-cid(*test-account-base14*, *testing-conversation-id-value*)
%:eval extract-account-record-on-status(*test-account-base14*, *test-conv-status*)
%:eval extract-account-record-on-starting-time-stamp(*test-account-base14*, *starting-time-stamp*)
%:eval extract-account-record-on-ending-time-stamp(*test-account-base14*, *ending-time-stamp*)
%:eval extract-account-record-on-billable-indicator(*test-account-base14*, false)
%:eval extract-account-record-on-account-value(*test-account-base14*, *test-acct-value*)
%:eval delete-account-record(*test-account-base*, principal-name(*test-lhs-principal*), *test-cid-value*,
*test-gutmid-value*)
%:eval delete-account-record-on-time-stamp(*test-account-base2*, *starting-time-stamp*, *ending-time-
stamp*)
%:eval delete-account-record-on-gutmid(*test-account-base7*, *test-gutmid-value*)
%:eval delete-account-record-on-p1(*test-account-base4*, principal-name(*test-lhs-principal*))
%:eval delete-account-record-on-tm1(*test-account-base6*, transaction-method-name(*test-lhs-
transaction*))
%:eval delete-account-record-on-cid(*test-account-base9*, *testing-cid-value*)
%:eval delete-account-record-on-status(*test-account-base10*, *test-conv-status*)
%:eval delete-account-record-on-start-time-stamp(*test-account-base11*, *starting-time-stamp*)
%:eval delete-account-record-on-end-time-stamp(*test-account-base12*, *ending-time-stamp*)
%:eval delete-account-record-on-billable-indicator(*test-account-base15*, false)
%:eval delete-account-record-on-account-value(*test-account-base13*, *test-acct-value*)
%:eval create-dsa-model(*top*)
%:eval append-account-record(*test-convid-value*)
%:eval close-account-record(*test-conid-value*, false, true)
%:eval close-account-record(*test-conid-value*, true, true)
%:eval flush-account-record(*tested-id-value*, *test-acct-service-name*)
%:eval retrieve-account-record(principal-name(*test-lhs-principal*), *test-acct-service-name*)
%:eval delete-account-record-on-account-value-type(*test-account-base23*, *test-acct-value-type*)
%:eval extract-account-record-on-account-value-type(*test-account-base14*, *test-acct-value-type*)
dsa-aut.re
#||
```

Copyright (C) 1995 Xerox Corporation. All Rights Reserved. Copyright

APPENDIX-continued protection claimed includes all forms and matters of copyrightable material and information now allowed by statutory or judicial law or hereinafter granted, including without limitation, material generated from the software programs which are displayed on the screen such as icons, screen display looks, etc.

```
||#
!! in-package("RU")
!! in-grammar('user)
function GET-AUTHORIZATION-TICKET(): authorization-ticket =
let (ticket-value: authorization-ticket =
  set-attrs(make-object('authorization-ticket),
         'access-rights, {'system-administration}))
ticket-value
function GET-CAPABILITY() : capability =
let (capability-value : capability = everythings-authorized)
capability-value
function VALIDATE-AUTHORIZATION-TICKET(obj : dsa-system-object,
                                       key : set(authorization-ticket)): boolean
computed-using
principal(obj) => validate-authorization-ticket(obj, key) =
let (validated? : boolean = false)
x=principals-capability(obj) & x in get-access-class(key)
               --> vaiidated?=true,
transaction-method(obj) => validate-authorization-ticket(obj, key) =
let (vaiidated? : boolean = false)
x=transaction-methods-capability(obj) & x in get-access-class(key)
               -->   validated?=true
function GET-ACCESS-CLASS (class-key: set(autnorization-ticket)): set(capability) =
let (capabilities : set(capability) = {nothings-authorized })
if empty({x | (x,y) x in class-key &
         y in access-rights(x) &
         y='system-administration }) then
capabilities <- capabilities with everythings-authorized;
capabilities
var EVERYTHINGS-AUTHORIZED: capability = set-attrs(make-object('capability),
                                          'capability-classification,
                                          {'everythings-authorized })
var NOTHINGS-AUTHORIZED : capability = set-attrs(make-object('capability),
                                          'capability-classification,
                                          {'nothtings-authorized })
var IM-AUTHORIZED: capability set-attrs(make-object('capability),
                       'capability-classification,
                       {'im-authorized})
dsa-aut.re0
#||
```

Copyright (C) 1995 Xerox Corporation. All Rights Reserved. Copyright protection claimed includes all forms and matters of copyrightable material and information now allowed by statatory or judicial law or hereinafter granted, including without limitation, material generated from the software programs which are displayed on the screen such as icons, screen display looks, etc.

```
||#
!! in-package("RU")
!! in-grammar('user)
"dsa-authentication-model.re - 7/10/95"
#||
   Provide the stub for the Authentication Service using the GSSAPI
||#
% Copied from dsa-communication-model.re. Circular references are a problem
var RETURN-OK: reason-code = set-attrs(make-object('reason-code),
                                       'reason-code-value, 'return-ok)
var RETURNED-ERROR: reason-code = set-attrs(make-object('reason-code),
                                       'reason-cede-value, 'returned-error)
% Define a single authentication service (temporary)
var ACTIVE-CONNECTION: map(authentication-service connection) = {||}
var ONE-AND-ONLY-AS: authentication-service =
         make-object('authentication-service)
function AUTHENTICATE-PRINCIPAL(p-name: dsa-name) : reason-code =
let (prin: principal named-principal(p-name),
  tin-cans-and-string: address-family = make-object('address-family),
  authentication-connection: connection = make-object('connection),
  request: string = [])
format(true, "entering AUTHENTICATE-PRINCIPAL-%");
if acquire-credentials(prin) = *gss-s-complete* then
  if init-sec-context(prin, one-and-only-as, false, 0) =
         *gss-s-complete* then
% Set up connection between principal and authentication service
  authentication-connection <- get-connection(tin-cans-and-string);
  agents-connections(principals-agent(prin)) <-
```

APPENDIX-continued

```
  agents-connections-(principals-agent(prin)) with
    authentication-connection;
  active-connection(one-and-only-as) <- authentication-connection;
% Construct request to authentication service
  let (p-name: string =
    symbol-to-string(dsa-name-value(principal-name(prin))),
    auth-token: string = token-string(sc-token(principal-sc(prin))))
    request <- concat("authenticate", p-name,"{", auth-token,"}");
    re::format-vars(true, request);
% Send request and wait for response
  let (req-do: data-object =
    set-attrs(make-object('data-object), 'ts-user-data, request))
    if t-data-request(authentication-connection, 'left, req-do) ~=
      t-request-ok then returned-error else auth-wait();
% Parse response and return result
  let (g = find-object('re::grammar, 'authentication),
    request-object: object = undefined)
    if t-data-indication(authentication-connection, 'left, req-do) ~=
      t-request-ok then returned-error
    else
      request-object <- parse-from-string(ts-user-data(req-do), g,true);
      if authentication-response(request-object) and-then
        authentication-r-value(request-object) = "good"
      then return-ok
      else returned-error
    else
      returned-error
    else
      returned-error
% Wait for authentication service to respond (play operating system)
function AUTH-WAIT () =
  format(true, "entering AUTH-WAIT~%");
  the-authentication-service();
  format(true, "AUTH-WAIT returning to caller~%")
% Here is the one-and-only-authentication-service function
function THE-AUTHENTICATION-SERVICE() =
let (req-do: data-object =
  set-attrs(make-object('data-object), 'ts-user-data, []),
  good: data-object =
    set-attrs(make-object('data-bject), 'ts-user-data,
                                            "\?good\""),
  bad: data-object =
    set-attrs(make-object('data-object), 'ts-user-data,
                                            "\"bad\""),
  conn: connection = active-connection(one-and-only-as),
  g = find-object('re::grammar, 'authentication),
  request-object: object = undefined)
format(true, "entering THE-AUTHENTICATION-SERVICE~%");
if t-data-indication(conn, 'right, req-do)
        = t-request-ok then
    request-object <- parse-from-string(ts-user-data(req-do), g, true);
    re:: format-vars(true, request-object);
    if authentication-request(request-object) then
#|
Here is where the token would be checked for validity. The name of the
principal being authenticated is
  dsa-name-value(principal-name(prin-2-be-authenticated(request-object)))
The value of the token is in
  token-string(authentication-token(request-object))
|#
    t-data-request(conn, 'right, good)
  else
    t-data-request(conn, 'right, bad)
  else
    t-data-request(conn, 'right, bad)
function ACQUIRE-CREDENTIALS (prin: principal) : integer =
  format(true, "entering ACQUIRE-CREDENTIALS~%"),
  if defined?(prin) then
  if undefined?principal-credentials(prin)) then
    principal-credentiais(prin) <- make-object('credentials);
%% make-object to be replaced by mechanism to find specific credentials
    *gss-s-complete*
  else
    *gss-s-bad-name*
%% mech-type, input-channel bindings not implemented as input parameters
function INIT-SEC-CONTEXT (prin: principal,
          target: authentication-service,
          deleg-flag: boolean,
%% several other flags required - see gssapi
```

APPENDIX-continued

```
            time-req: integer): integer =
let(sc: security-context = make-object('security-context))
 format(true, "entering INIT-SEC-CONTEXT~%");
 if defined?(prin) and defined?(target) then
   principal-sc(prin) <- sc;
   sc-target(sc) <- target;
   sc-token(sc) <- set-attrs(make-object('token), 'token-string,
                                           "\"token\"")); 
%% the format of the token is dependent on the underlying mechanism
   sc-deleg-flag(sc) <- deleg-flag;
   sc-time(sc) <- time-req;
   *gss-s-complete*
 else
   erase-object(sc);
   *gss-s-ba-name*
%%%% test
function instantiate-a-principal(p-name : symbol, t-m-name : symbol) : principal =
 let (p: principal = make-object('principal),
   p-n : dsa-name = make-object('dsa-name),
   t-m: transaction-method = make-object('transaction-method),
   t-m-n : dsa-name = make-object('dsa-name))
principals-agent(p) <- make-object('agent);
principal-name(p) <- p-n;
dsa-name-value(p-n) <- p-name;
dsa-name-value(t-m-n) <- t-m-name;
transaction-method-name(t-m) <- t-m-n;
principal-transaction-methods(p) <- {t-m};
p
function test-authentication() : reason-code =
 let (p = instantiate-a-principal('bill, 'gets-paid))
   authenticate-principal(principal-name(p))
% :eval test-authentication()
dsa-com.re
#|
Copyright (C) 1995 Xerox Corporation. All Rights Reserved. Copyright
protection claimed includes all forms and matters of copyrightable
material and information now allowed by statutory or judicial law or
hereinafter granted, including without limitation, material generated
from the software programs which are displayed on the screen such as
icons, screen display looks, etc.
|#
!! in-package("RU")
!! in-grarnmar('user)
%%%%%%%%%%%%%%%%%%%%%%%%%%%%%%%%%%%%%%%%%%%%%%%%%%
%%%%%%%%%%%%%%%%%%%%%%%%%%%%
%
% The code below builds the DSA conversation and connection constructs
%
%%%%%%%%%%%%%%%%%%%%%%%%%%%%%%%%%%%%%%%%%%%%%%%%%%
%%%%%%%%%%%%%%%%%%%%%%%%%%%%
% Place holder code for compatibility with existing dsa-communications-model.
% Code needs to be added to look up the principals in the AIS and get
% their addresses.
%
function CREATE-DYAD (p-name: dsa-name,
        target-name: dsa-name) : dyad =
let (prin: principal = named-principal(p-name),
 target: principal = named-principal(target-name),
 this-dyad: dyad = make-object('dyad))
% sc-result: tuple(sc: security-context, status: integer)
%       = <undefined, 0>)
 if defined?(prin) and defined?(target) then
   dyad-lhs(tbis-dyad) <- prin;
   dyad-rhs(this-dyad) <- target;
% if acquire-credentials(p-name) = *gss-s-complete* then
%    erase-object(this-dyad);
%    undefined
% else
%    sc-result <- init-sec-context(p-name, target-name, false, 0);
%    if sc-result.status - *gss-s-complete* then
%      sc-of-dyad(this-dyad) <- sc-result.sc;
   this-dyad
%% What about authorization?
% else
%   erase-object(this-dyad);
%   undefined
   else
     erase-object(this-dyad);
     undefined
```

APPENDIX-continued

```
%%%% - End place holder code.
function GET-CONNECTION (addr-family: address-family) : connection =
let (new-connection = make-object('connection))
set-attrs(newconnection, 'addresses, addr-family)
var *CONVERSATION-POINER* : integer = 0
function GET-HALF-CONVERSATION ():conversation =
let (new-conversation : conversation = make-object('conversation),
  new-conversation-buffer = set-attrs(make-object('conversation-buffer),
                                      'conversation-data, []),
  new-conversation-account-record = make-object('account-record))
*CONVERSATION-POINTER* <- *CONVERSATION-POINTER* + 1;
set-attrs(new-conversation,
          'conversation-id, *CONVERSATION-POINTER*,
          'conversation-send-receive, new-conversation-buffer,
          'conversation-account-record, new-conversation-account-record,
          'conversation-state, reset)
function GET-HALF-DYAD (agnt: agent,
                       target: principal) : dyad
                       computed-using
[empty({x| (x) x in agent-dyads(agnt) & dyad-rbs(x)=target}) =>
get-half-dyad (agnt, target) =
let (old-dyad: dyad = arb({x | (x) x in agent-dyads(agnt) &
                       dyad-rhs(x)=target}))
old-dyad,
true => get-half-dyad (agnt, target) =
let (t-name : dsa-name = principal-name(target),
  p-name: dsa-name = principal-name(agents-principal(agnt)))
let (new-yad : dyad = create-yad(p-name, t-name))
agent-yads(agnt) <- agent-dyads(agnt) with new-dyad;
new-dyad
%%%%%%%%%%%%%%%%%%%%%%%%%%%%%%%%%%%%%%%%%%%%%%%%%
%%%%%%%%%%%%%%%%%%%%%%
%If there is no accounting function installed, do not call the open-account-record% function.
%Test starts at the tm level. If the value of acct-record-for-tm = true, call the %open-account-record
function to generate account-record for the tm. Test the value individually at the lhs and rhs sides and call
the function individually to gen%erate records for both sides. If the value of acct-record-for-tm = false, do
not %call the open-account-record function. If the value of acct-record-for-tm = not-%specified, then move
the test to the principal level. Same logic applies at
%the principal level. When the value of acct-record-for-principal = not-specified,%then the test moves up
to the system level. Same logic applies to the system
%level. When the value of acct-record-for-system = not-specified, then move the %%test to the accounting
service level. If there is accounting service installed, %generate account records. If not, do not call the
open-account-record function.
%This logic only applies to the situation where an agent calls the c-begin. A prin%cipal can call the open-
account-record function directly. Therefore, no test need% be done.
%From bob's code, it is not clear to me should I call this function using the conversation object or the cid.
It will be an easy change if the answer is cid.
function RECORDS-YES-NO(target-system: dsa-system,
          conv: conversation) : reason-code =
let(reason : reason-code = returned-error,
  lhs-tm: transaction-method = conversation-tm-1(conv),
  rhs-tm: transaction-methed = conversation4m-2(conv),
  invoking-principal : principal = conversation-p-1(conv),
  invoked-principal : principal = conversation-p-2(conv),
  lhs-conv:conversation = get-half-conversation(),
  rhs-conv:conversation = get-half-conversation())
((if acct-record-for-transaction-method(lhs-tm) = "true"
          then
conversation-account-record(lhs-conv) <- open-account-record(lhs-conv);
if acct-record-for-transaction-method(lhs-tm) = "false"
          then
reason <- returned-info; %there is no account-record needed.
(if acct-record-for-transaction-methed(lhs-tm) = "not-specified"
          then
 (if acct-record-for-principal(invoking-principal) = "true"
          then
conversation-account-record(lhs-conv) <- open-account-record(lhs-conv);
if acct-record-for-principal(invoking-principal) = "false"
          then
reason <- returned-info; %there is no account-record needed.
(if acct-record-for-principal(invoking-principal) = "not-specified"
          then
(if acct-record-for-system(target-system) = "true"
          then
conversation-account-record(lhs-conv) <- open-account-record(lhs-onv);
if acct-record-for-system(target-system) = "false"
          then
reason <- returned-info;
if acct-record-for-system(target-system) = "not-specified"
```

APPENDIX-continued

```
        then
  reason <- returned-info))))); %If there is no accounting-service installed, do not call the open-
account-record function.
(if acct-record-for-transaction-method(rhs-tm) = "true"
        then
conversation-account-record(rhs-onv) <- open-account-record(rhs-conv);
if acct-record-for-transaction-method(lhs-tm) = "false"
        then
reason <- returned-info; %there is no account-record needed.
(if acct-record-for-transaction-method(rhs-tm) = "not-specified"
        then
(if acct-record-for-principal(invoked-principal) = "true"
        then
conversation-account-record(rhs-conv) <- open-account-record(rhs-conv);
if acct-record-for-principal(invoked-principal) = "false"
        then
  reason <- returned-info; %there is no account-record needed.
(if acct-record-for-principal(invoked-principal) = "not-specified"
        then
 (if acct-record-for-system(target-system) = "true"
        then
 conversation-account-record(rhs-conv) <- open-account-record(rhs-conv);
 if acct-record-for-system(target-system) = "false"
        then
 reason <- returned-info;
 if acct-record-for-system(target-system) = "not-specified"
        then
 reason <- returned-info))))); %If there is no accounting-service installed, do not call the open-
account-record function.
 reason <- return-ok);
reason
%%%%%%%%%%%%%%%%%%%%%%%%%%%%%%%%%%%%%%%%%%%%%%%%%%%%%%%%%
%%%%%%%%%%%%%%%%%%%%%%%%%%%%%%%%%
function OPEN-ACCOUNT-RECORD(conv: conversation): reason-code =
 let(new-account-header: Account-header = make-object('account-header),
  Invoking-principal: principal = first(ancestors-of-class(conv, 'principal)),
  Invoked-principal: principal = make-object('principal),
  Invoking-tm: transaction-method =least-ancestor-of-class(conv, 'transaction-method),
  Invoked-tm: transaction-method = make-object('transaction-method),
  h: gutmid = make-object('gutmid),
  f: dsa-time = make-object('dsa-time),
  reason: reason-code = returned-error)
  (if undefined?(conv) then
   reason <- returned-error
  else
   p-1(new-account-header) <- principal-name(Invoking-principal);
   tm-1(new-account-header) <- transaction-method-name(Invoking-tm);
   p-2(new-account-header) <- principal-name(Invoked-principal);
   tm-2(new-account-header) <- transaction-method-name(Invoked-tm);
   cid(new-account-header) <- conversation-id(conv);
   account-gutmid(new-account-header) <- h;
   account-time-stamp(new-account-header) <- f;
   account-billable?(new-account-header) <- false;
   account-length(new-account-header) <- *account-length*;
   account-type(new-account-header) <- *account-type*;
   re::format-vars(true, new-account-header);
   reason <- return-ok);
reason
%%%%%%%%%%%%%%%%%%%%%%%%%%%%%%%%%%%%%%%%%%%%%%%%%%%%%%%%%
%%%%%%%%%%%%%%%%%%%%%%%%%%%%%%%%%
var ACCOUNT-OPEN-RECORD-TM: transaction-method =
        set-attrs(make-object('transaction-method),
                 'transaction-method-name,
                 set-attrs(make-object('dsa-name),
                          'dsa-name-value, 'account-open-record))
var ACCOUNT-CLOSE-RECORD-TM : transaction-method =
        set-attrs(make-object('transaction-method),
                 'transaction-method-name,
                 set-attrs(make-object('dsa-name),
                          'dsa-name-value, 'account-close-record))
var ACCOUNT-APPEND-RECORD-TM: transaction-method =
        set-attrs(make-object('transaction-method),
                 'transaction-method-name,
                 set-attrs(make-object('dsa-name),
                          'dsa-name-value, 'account-append-record))
var ACCOUNT-FLUSH-RFCORD-TM: transaction-method =
        set-attrs(make-object('transaction-method),
                 'transaction-method-name,
                 set-attrs(make-object('dsa-name),
```

APPENDIX-continued

```
                                      'dsa-name-value, 'account-flush-record))
%%%%%%%%%%%%%%%%%%%%%%%%%%%%%%%%%%%%%%%%%%%%%%%%%
%%%%%%%%%%%%%%%%%%%%
%%%%%%%%%%%%%%%%%%%%%%%%%%%%%%%%%%%%%%%%%%%%%%%%%
%%%%%%%%%%%%%%%%%%%
function BUILD-CONVERSATION (lhs-tm : transaction-method,
                 rhs-tm: transaction-method): reason-code
computed-using
% First make sure both input parameters are transaction methods
~(transaction-method(lhs-tm) or transaction-method(rhs-tm)) =>
        build-conversation(lhs-tm, rhs-tm) = returned-error,
        % Next, check if transaction method belongs to a principal
        defined?(least-ancestor-of-class(lhs-tm, 'principal)) =>
        build-conversation(lhs-tm, rhs-tm) =
let (reason : reason-code = returned-error,
  tcp-ip: address-family = make-object('address-family),
  lhs-conv: conversation = get-half-conversation(),
  rhs-conv: conversation = get-half-conversation())
let (new-connection : connection = get-connection(tcp-ip))
lhs-conversation(new-connection) <- lhs-conv;
transaction-methods-conversation(lhs-tm) <- lhs-conv;
rhs-conversation(new-connection) <- rhs-conv;
transaction-methods-conversation(rhs-tm) <- rhs-conv;
records-yes-no;
reason <- return-ok,
% Before the accounting service is cailed, the testing function RECORDS-YES-NO nee%ds to be called
first to check if account-record is needed to be generated.
%In some instances, tbere is no need to generate a record when a conversation is
% established.
% If, instead, transaction methods are agent transactions that means
% that they are trying to set up an infrastructure conversation over our
% connection abstraction.
lhs-tm in agent-transaction-methods(x) & agent(x) =>
        build-conversation(lhs-tm, rhs-tm) =
let (reason : reason-code = returned-error,
  tcp-ip: address-family = make-object('address-family),
  lhs-conv : conversation = get-half-conversation(),
  rhs-conv : conversation = get-half-conversation())
let (new-connection : connection = get-connection(tcp-ip))
lhs-conversation(new-connection) <- lhs-conv;
transaction-methods-dnversation(lhs-tm) <- lhs-conv;
rhs-onversation(new-connection) <- rhs-conv;
transaction-methods-conversation(rhs-tm) <- rhs-conv;
reason <- return-ok,
true => build-conversation(lhs-tm, rbs-tm) = returned-info
%%%%%%%%%%%%%%%%%%%%%%%%%%%%%%%%%%%%%%%%%%%%%%%%%
%%%%%%%%%%%%%%%%%%%%
%
% The purpose of the following is to construct the finite state machine
% for the DSA conversation.
%
var RESET: dsaconversation-state = make-dsa-conversation-state('reset)
var INITIALIZE : dsa-conversation-state = make-dsa-convcrsation-state('initialize)
var SEND: dsa-conversation-state = make-dsa-conversation-state('send)
var RECEIVE: dsa-conversation-state = make-dsa-conversation-state('receive)
var SEND-PENDING : dsa-conversation-state = make-dsa-conversation-state('send-pending)
var CONFIRM :dsa-onversation-state = make-dsa-conversation-state('confirm)
var NOT-DEFINED : dsa-conversation-state = make-dsa-conversation-state('not-defined)
var INVALID-CALL: dsa-conversation-state = make-dsa-conversation-state('invalid-call)
type STATE-TABLE = map(tuple(dsa-verb, dsa-conversation-state),
        dsa-conversation-state)
        function BUILD-CONVERSATION-STATE-TABLE (): state-table =
        let (cabort : c_abort = make-object('c_abort),
          cattributes : c_attributes make-object('c_attributes),
          cbegin : c_begin = make-object('c_begin),
          cend : c_end = make-object('c_end),
          cexception : c-exception = make-object('c_exception),
          creceive: c_receive = make-object('c_receive),
          csend : c_send = make-object('c_send),
          csignal : c_signal = make-object('c_signai))
        let (verbs: set(communication-verb) = {cabort, cattributes, cbegin, cend,
                                       cexception, creceive, csend,
                                       csignal},
  comm-states: set(dsa-conversation-state) = {reset, initialize, send,
                                       receive, send-pending,
                                       confirm, not-defined,
                                       invalid-call),
  undefined-states : set(dsa-conversation-state) = (not-defined})
let (states : state-table = {|>x, y> -> z|
```

APPENDIX-continued

```
                    (x, y, z) x in verbs &
                    y in comm-states & z in undefined-states |})
states(<cbegin, reset>) <- initialize;
states(<cbegin, initiallze>) <- invalid-call;
states(<cbegin, send>) <- invalid-all;
states(<cbegin, receive>) <- invalid-call;
states(<cbegin, send-pending>) <- invalid-call;
states(<cbegin, confirm>) <- invalid-call;
states(<creceive, receive>) <- receive;
states(<creceive, reset>) <- invalid-all;
states(<creceive, initialize>) <- invalid-call;
states(<creceive, send>) <- invalid-all;
states(<creceive, send-pending>) <- invalid-call;
states(<creceive, confirm>) <- invalid-call;
states(<csend, send>) <- send;
states(<csend, send-pending>) <- send;
states(<csend, reset>) <- invalid-call;
states(<csend, initialize>) <- invalid-call;
states(<csend, receive>) <- invalid-all;
states(<csend, confimn>) <- invalid-call;
states(<cattributes, reset>) <- invalid-call;
states(<cattributes, receive>) <- receive;
states(<cattributes, send>) <- send;
states(<cattributes, initialize>) <- initialize;
states(<cattributes, send-pending>) <- send-pending;
states(<cattributes, confirm>) <- confirm;
states(<csignal, reset>) <- reset;
states(<cexception, reset>) <- reset;
states(<cabort, initialize>) <- reset;
states(<cabort, receive>) <- reset;
states(<cabort, send>) <- reset;
states(<cabort, send-pending>) <- reset;
states(<cabort, confirm>) <- reset;
states(<cabort, reset>) <- invalid-call;
states
var *CONVERSATION-STATE-TABLE*: state-table = build-conversation-state-table()
function CONVERSATION-FINITE-STATE-MACIHINE (comm-verb : communication-verb,
                                  state 1 : dsa-conversation-state)
                    : dsa-conversation-state =
let (table = *conversation-state-table*,
  a : set(tuple(communication-verb, dsa-conversation-state)) = {},
  b : set(tuple(communication-verb, dsa-conversation-state)) = {})
a <- domain(table);
b <- (<x,y> | (x,y,z) <x,y> in a &
    z=rt-instance-of(comm-verb) &
    rt-instance-of(x) in rt-class-superclasses(z, false) &
    state1 = y};
table(arb(b))
function MAKE-DSA-CONVERSATION-STATE (state-name : symbol)
                    : dsa-conversation-state =
let (a: dsa-conversation-state = make-object('dsa-conversation-state))
conversation-state-value(a) <- state-name;
a
%%%%%%%%%%%%%%%%%%%%%%%%%%%%%%%%%%%%%%%%%%%%%%%%%%%%%%
%%%%%%%%%%%%%%%%%%%%%%%%%%
%
% This is the beginning of the reason codes for the communication verbs. As
% such this is very much work in progress. Our current tninking is along
% the following lines: Reason Code space is partitioned into three segments
%
% RETURN-OK - function call or verb execution completed as designed
%       without error or comment
%
% RETURN-ERROR - function call or verb execution failed.
%
% RETURNED-INFO - function call or verb execution completed with
%       additionai information.
%
% Each of the three can be interpreted as functions tnemselves mapping over
% the space of integers. The integer values, depending in context, have
% additional information about the returned value, they may as in Unix
% provide a pointer into a message file, for example. We'll call these
% "meanings". Right now "meanings" are integers. Later we may want them
% to be full flegded objects!
%
%%%%%%%%%%%%%%%%%%%%%%%%%%%%%%%%%%%%%%%%%%%%%%%%%%%%%%
%%%%%%%%%%%%%%%%%%%%%%%%%
var RETURN-OK: reason-code = set-attrs(make-object('reason-code),
                                  'reason-code-value, 'return-ok)
```

APPENDIX-continued

```
var RETURNED-ERROR: reason-ode = set-attrs(make-object('reason-code),
                                            'reason-code-value, 'returned-error)
var RETURNED-INFO : reason-code = set-attrs(make-object('reason-code),
                                            'reason-code-value, 'returned-info)
%%%%%%%%%%%%%%%%%%%%%%%%%%%%%%%%%%%%%%%%%%%%%%%%
%%%%%%%%%%%%%%%%%%%%%%%%
%
% The stuff below probably contains throw away code. It's purpose is to
% model communication via DSA conversation over dyads. Dyads are established
% if required and transaction method in LHS principal is attempting
% to send some data to a transaction method in RHS principal.
%
%%%%%%%%%%%%%%%%%%%%%%%%%%%%%%%%%%%%%%%%%%%%%%%%
%%%%%%%%%%%%%%%%%%%%%%%%
%%%%%%%%%%%%%%%%%%%%%%%%%%%%%%%%%%%%%%%%%%%%%%%%
%%%%%%%%%%%%%%%%%%%%%%%%
%
% The code below controls the flow of data over conversations, using the
% DSA Communication Verb set and other utilities. It is hoped that the
% constructs below can be used as models for how principals' methods use
% the DSA Communication Verbs.
%
% Send-some-data is meant to be a prototype of how DSA communications works.
% It is NOT to be interpreted as the "send" verb. Send-some-data returns
% a reason-code.
%
function SEND-SOME-DATA (lhs-tm : transaction-method,
                         rhs-tm: transaction-method,
                         data: any-type) : reason-code
  computed-using
% First check that parameters are of correct type. Return error if not.
~(transaction-method(lhs-m) & transaction-method(rhs-tm) & dsa-data(data)) =>
        send-some-data(lhs-tm, rhs-tm, data) = returned-error,
% Next, check to see if transaction methods are infrastructure TM's
lhs-tm in agent-transaction-methods(x) & agent(x) =>
        send-some-data(lhs-tm, rhs-tm, data) =
let (reason : reason-code = returned-error)
if ~empty(descendants-of-class(lhs-tm, 'conversation)) then (
let (lhs-conv : conversation = transaction-methods-conversation(lhs-tm))
let (connect : connection = arb({x | (x) connection(x) &
                         conversation-id(lhs-conv)=
                         conversation-id(lhs-conversation(x))}))
% if not defined?connection then re-create connection
ifundefined?(connect) then (
connect=get-connection(set-attrs(make-object('tcp-ip)));
lhs-conversation(connect) <- lhs-conv);
% now send-some-data(lhs-tm ->rhs-tm) over the connection. Note that only
% the lhs of the connection has a defined value (lhs-conversation). The
% lhs-agent can only manage the lhs of the conversation. The communication
% process defined by the verbs will take care of the rest. Note, also, that
% we are using the connection_xxx communication verbs.
let (csend: connection_send =
        set-attrs(make-object('connection_send),
                  'send-conversation, lhs-conv,
                  'send-data, data,
                  'send-data-length, size(dsa-data-value(data)),
                  'send-received-signal?, false,
                  'send-reason-code, returned-error))
out-data(lhs-tm) <- append(out-data(lhs-tm),data);
c-send-rule(csend);
reason <- send-reason-code(csend))
else
% if you are here this means that there was no conversation between the two
% infrastructure transaction methods. Therefore create one and call
% send-some-data again. If this fails return reason-code return-error.
let (infrastructure-services-name : dsa-name = make-object('dsa-name))
let (cbegin : connection_begin =
        set-attrs(make-object('connection-begin),
                  'begin-self, infrastructure-services-name,
                  'begin-partner, transaction-method-name(rhs-tm),
                  'begin-partner-method, rhs-tm,
                  begin-reason-code, returned-error))
% you know who you are and which transaction method desires the conversation
% so use this information in the call to the c-begin rule.
c-begin-rule(cbegin, lhs-tm);
reason <- send-some-data(lhs-tm, rhs-tm, data),
% Check that lhs-tm is the transaction method in some principal, then
% if defined?conversation then send some data, and exit.
% Note that this is modelling the lhs only. It's assumed here
```

APPENDIX-continued

```
% that the rhs has some kind of receive-some-data function that is the
% mirror of this one. The receive-some-data function is handling the rhs
% conversation stuff. This is awkward for the current version of the
% connection code segments below.
undefined?(least-ancestor-of-class(lhs-tm, 'principal)) or
undefined?(least-ancestor-of-class(rhs-tm, 'principal)) =>
        send-some-data (lhs-tm, rhs-tm, data) = returned-info,
~empty(descendants-of-class(lhs-tm, 'conversation)) =>
        send-some-data (lhs-tm, rhs-tm, data) =
let (reason : reason-code = returned-error,
 lhs-conv : conversation = transaction-methods-conversation(lhs-tm),
 connect : connection = make-object('connection),
 lhs-principal : principal = least-ancestor-of-class(lhs-tm, 'principal))
let (lhs-agent : agent = principals-agent(lhs-principal))
% if there is no connection between the conversations then re-create
% the connection. We are assuming that the initialization of the
% conversation between lhs-tm and rhs-tm included the instantiation of
% a connection otherwise you could not get to this branch.
empty({x | (x) x in agents-connections(lhs-agent)}) ->
connect=get-connection(arb(agent-addresses(principals-agent(lhs-principal))))
& lhs-conversation(connect)=lhs-conv;
% now send-some-data(lhs-tm -> rhs-tm) over the connection. Note that only
% the lhs of the connection has a defined value (lhs-conversation). The
% lhs-agent can only manage the lhs of the conversation. The communication
% process defined by the verbs will take care of the rest.
let (csend : dyad_send =
        set-attrs(make-object('dyad_send),
                    'send-conversation, lhs-conv,
                    'send-data, data,
                    'send-data-length, size(dsa-data-value(data)),
                    'send-received-signal?, false,
                    'send-reason-code, returned-error))
out-data(lhs-tm) <- append(out-data(lhs-tm),data);
c_send-rule(csend);
reason <- send-reason-code(csend),
% Now if there is no conversation between the lhs principal's transaction,
% lhs-tm, and the rhs principal's transaction, rhs-tm, build one. I guess
% that the first thing you need to do is to check to see if there is
% a dyad between the lhs-principal and the rhs-principal. If not,
% get one, if allowed, if not allowed leave. Here's the "algorithm":
%
% identify lhs-principal and rhs-principal;
%
% if defined?dyad(lhs-principal <-> rhs-principal) then
%        build-conversation(lhs-tm -> rhs-tm)
%            (execute appropropriate comm-verbs
%        use CPIC flows as appropriate)
%        send-some-data(lhs-tm -> rhs-tm); exit
% if undefined?dyad(lhs-principal <-> rhs-principal) then
%        get lhs-principal's agent
%        get lhs-agent to make dyad with
%            rhs-principal via rhs-agent
%        if no rhs-agent, leave, otherwise
%        go to previous if-then
true => send-some-data (lhs-tm, rhs-tm, data) =
let (reason : reason-code = returned-error,
 ok-to-connect? : boolean false,
 lhs-principal : principal = least-ancestor-of-class(lhs-tm, 'principal),
 rhs-principal : principal = least-ancestor-of-class(rhs-tm, 'principal))
let (current-dyad : dyad =
   get-half-dyad(principals-agent(lhs-principal), rhs-principal))
if defined?(current-dyad) then ok-to-connect? <- true;
if ok-to-connect? then
% the DSA communication verb stuff goes here, you know, things like
% c_begin, etc?
let (cbegin : dyad-begin =
        set-attrs(make-object('dyad-begin),
                        'begin-self, principal-name(lhs-principal),
                        'begin-partner, principal-name(rhs-principal),
                        'begin-partner-method, rhs-tm,
                        'begin-reason-code, returned-error))
% you know who you are and which transaction method desires the conversation
% so use this information in the call to the c_begin rule.
transaction-methods-authorization-tickets(lhs-tm) <-
        transaction-methods-authorization-tickets(lhs-tm)
                with get-authorization-ticket();
principals-authorization-tickets(lhs-principal) <-
        principals-authorization-tickets(lhs-principal)
                with get-authorization-ticket();
```

APPENDIX-continued

```
c_begin-rule(cbegin, lhs-tm);
reason <- send-some-data(lhs-tm, rhs-tm, data)
%%%%%%%%%%%%%%%%%%%%%%%%%%%%%%%%%%%%%%%%%%%
%%%%%%%%%%%%%%%%%%%%%%%
%
% The receive side of things (that's the side governed by the rhs-principal)
% goes here. Note we are assuming a symmetry here. Either side can be
% the receiver (or requestee, in the language of the system test).
%
%%%%%%%%%%%%%%%%%%%%%%%%%%%%%%%%%%%%%%%%%%%
%%%%%%%%%%%%%%%%%%%%%
function RECEIVE-SOME-DATA (lhs-tm: transaction-method,
                            rhs-tm: transaction-method,
                            data: any-type)
computed-using
true => receive-some-data(lhs-tm, rhs-tm, data) = true
%%%%%%%%%%%%%%%%%%%%%%%%%%%%%%%%%%%%%%%%%%%
%%%%%%%%%%%%%%%%%%%%%
%
% The globals below are here just during the implementation phase of this
% project. Used to test constructions as they are developed.
%
%%%%%%%%%%%%%%%%%%%%%%%%%%%%%%%%%%%%%%%%%%%
%%%%%%%%%%%%%%%%%%%%%
function *initialize-a-transaction-method* (tm-name: synabol)
                        : transaction-method =
let (init-tm: transaction-method = make-object('transaction-method),
  tm-n : dsa-name = make-object('dsa-name))
transaction-method-name(init-tm) <- tm-n;
dsa-name-value(tm-n) <- tm-name;
init-tm
function *initialize-an-agent* (prin-name : dsa-name) : agent =
let (init-agent: agent = make-object('agent),
  assigned-principal : principal = named-principal(prin-name),
  addr-fam: address-fanaily = make-object('address-family))
principals-agent(assigned-principal) <- init-agent;
principal-authenticated?(init-agent) <- false;
agent-addresses(init-agent) <- {addr-fam};
agent-transaction-methods(init-agent) <- {account-open-record-tm,
                                          account-close-record-tm,
                                          account-append-record-tm,
                                          accotnt-flush-record-tm);
init-agent
function *initialize-a-principal* (p-name: symbol, t-m-name: symbol)
                        : principal =
let (init-principal : principal = make-object('principal),
  p-n : dsa-name = make-object('dsa-name),
  init-principals-agent: agent = make-object('agent))
principal-name(init-principal) <- p-n;
dsa-name-value(p-n) <- p-name;
principal-transaction-methods(init-principal) <-
        {*initialize-a-transaction-method*(t-m-name)};
init-principals-agent <- *initialize-an-agent*(p-n);
principals-agent(init-principal) <- init-principals-agent;
init-principal
function *initailize-a-connection*(l-tm transaction-method,
                        r-tm: transaction-method)
                        : connection =
let (reason = build-conversation(l-tm, r-tm),
  init-connection = make-object('connection))
if reason=return-ok then
x=transaction-methods-conversation(l-tm) &
connection(y) & conversation-id(lhs-conversation(y)) = conversation-id(x)
--> init-connection <- y;
init-connection
%%%%%%%%%%%%%%%%%%%%%%%%%%%%%%%%%%%%%%%%%%%
%%%%%%%%%%%%%%%%%%%%%
%
% Here we go! Here we use the Refine rules mechanism to define the verbs and
% their actions. I will keep them in this file until it gets so unweildy that
% I can't easily print this file.
%
% Please not that the order in which the pre-conditions are checked are left
% to right. So that the last condition checked is the one farthest from the
% --> symbol! For example, in the c_send rule that last thing that is done
% is the update of the conversation buffer of the sending transaction and the
% last thing done is the update of the conversation buffer of the receiving
% transaction.
%
```

APPENDIX-continued

```
%%%%%%%%%%%%%%%%%%%%%%%%%%%%%%%%%%%%%%%%%%%%%%%%%
%%%%%%%%%%%%%%%%%%%%%%%%%%
rule C_ABORT-RULE(abort-verb : c_abort)
true --> true
rule C_ATTRIBUTES-RULE(attributes-verb : c_attributes)
true--> true
rule C_BEGIN-RULE(begin-verb : c_begin,
        self-method: transaction-method)
(dyad_begin(begin-verb) &
defined?(begin-self(begin-verb)) &
defined?(begin-partner(begin-verb)) &
validate-authorization-ticket(begin-partner(begin-verb),
                    principals-authorization-tickets(begin-self(begin-verb))) &
validate-authorization-ticket(begin-partner-method(begin-verb),
                    transaction-methods-authorization-tickets(self-method)) &
conversation-finite-state-machine(begin-verb,
        conversation-state(begin-conversation(begin-verb))) = initailize &
conversation-initailized?(begin-verb, self-method)=return-ok) or-else
(connection_begin(begin-verb) &
defined?(begin-self(begin-verb)) &
defined?(begin-partner(begin-verb)) &
conversation-finite-state-machine(begin-verb,
        conversation-state(begin-conversation(begin-verb))) = initailize &
conversation-initailized?(begin-verb, self-method)=return-ok)
        --> begin-reason-code(begin-verb) = return-ok
rule C_CHANGE-COMMITMENT-RULE(change-commiment-verb : c_change_commitment)
true --> true
rule C_CONFORM-RULE(conform-verb: c_conform)
true --> true
rule C_CONFOR--ON-RULE(conformation-verb c_conformation)
true --> true
rule C_DRAIN-RULE(drain-verb : c_drain)
true --> true
rule C_END-RULE(end-verb : c_end)
true --> true
rule C_RECEIVE-RULE(receive-verb : c_receive)
true --> true
rule C-SEND-RULE(send-verb: c_send)
update-conversation-buffers(send-conversation(send-verb),
                    send-data(send-verb))=return-ok &
conversation-startup-request(send-conversation(send-verb)) = return-ok &
conversation-finite-state-machine(send-verb,
        conversation-state(send-conversation(send-verb))) = send
            --> send-reason-code(send-verb) = return-ok
rule C_SIGNAL-RULE(signal-verb : c_signal)
true --> true
% This function checks to see if it's ok to "converse" with the other side.
function CONVERSATION-STARTUP-REQUEST(conv: conversation): reason-code =
let(connect: connection = make-object('connection),
 return-code : reason-code = returned-error)
(connection(x) & (lhs-conversation(x) = conv or rhs-conversation(x) = conv))
 --> connect = x;
a=conversation-state(rhs-conversation(connect)) & (a = receive or a = initailize)
 --> return-code = return-ok;
return-code
% This function updates the conversation buffer then attempts to receive
% or transmit data over it's conversation.
function UPDATE-CONVERSATION-BUFFERS(conv : conversation,
                    data : dsa-data) : reason-code =
let (data-buffer : conversation-buffer = conversation-send-receive(conv),
 return-code : reason-code = returned-error)
conversation-data(data-buffer) <- append(conversation-data(data-buffer) data);
return-code <- transmit-receive-data(conv);
return-code
% This function will be used by transmitting and receiving transaction
% method to model the transfer and receipt of conversation data. It attempts
% to transmit data that it finds in the conversation-buffer and it receives
% data into the conversation buffer. In fact, it transfers data from the
% sending conversation's buffer to the receiving conversation buffer.
function TRANSMIT-RECEIVE-DATA(conv: conversation): reasoncode =
let (return-code : reason-code = returned-error,
 transmit-receive-buffer: conversation-buffer =
                    conversation-send-receive(conv),
 transmit-receive-data-value: seq(string) =
 data-connection : connection = make-object('connection))
(connection(x) & (lhs-conversation(x) = conv or rhs-conversation(x) = conv))
 --> data-connection = x
if undefined?(lhs-conversation(data-connection)) then
return-code <- returned-error else (
```

APPENDIX-continued

```
(enumerate data-element over conversation-data(transmit-receive-buffer) do
transmit-receive-data-value <-
  concat(transmit-receive-data-value,
         image(symbol-to-string, dsa-data-value(data-element))));
let (transmit-data-object: data-object =
        set-attrs(make-object('data-object),
                     'ts-user-data, first(transmit-receive-data-value)),
  receive-data-object : data-object =
        set-attrs(make-object('data-object),
                     'ts-user-data, []))
t-data-request(data-connection, left, transmit-data-object);
t-data-indication(data-connection, 'right, receive-data-object);
let (rhs-receive-data-buffer = conversation-send-receive(
                     rhs-conversation(data-connection)),
       rhs-received-data : dsa-data =
'set-attrs(make-object('dsa-data),
              'dsa-data-value,
              string-to-symbol(ts-user-data(receive-data-object), "ru")))
conversation-data(rhs-receive-data-buffer) <-
append(conversation-data(rhs-receive-data-buffer), rhs-received-data));
return-code
function CONVERSATION-INITIALIZED?(begin : c_begin,
                   tm : transaction-method): reasoncode =
let (reason = build-conversation(tm, begin-partner-method(begin)),
  return-code: reason-code = returned-error)
if reason = return-ok then (
begin-conversation(begin) <- transaction-methods-conversation(tm);
return-code <- return-ok)
%%%%%%%%%%%%%%%%%%%%%%%%%%%%%%%%%%%%%%%%%%%%%%%%%%%%
%%%%%%%%%%%%%%%%%%%%%%%%%%%
%
% The code fragments below are here just to test that the abstract syntax
% trees are built correctly. Individually they cannot be used to and test
% demonstrate the communication model. System test of the communication
% should be run via functions in the dsa-system-test.re file. Note that
% the entire section is commented out. DO NOT UNCOMMENT THIS SECTION.
%
%%%%%%%%%%%%%%%%%%%%%%%%%%%%%%%%%%%%%%%%%%%%%%%%%%%%
%%%%%%%%%%%%%%%%%%%%%%%%%%%
#|
var *testdata* : dsa-data = make-object('dsa-data)
var *test-lhs-principal* : principal =
        *initialize-a-principal*('test-lhs-principal,
                                            'test-lhs-transaction)
var *test-rhs-principal* : principal =
        *initialize-a-principal*('test-rhs-principal,
                                            'test-rhs-transaction)
var *show-this-movie* : transaction-method =
        *initialize-a-transaction-method*('show-this-movie)
var *send-this-movie* : transaction-method =
        *initialize-a-transaction-method*('send-this-movie)
var *cbegin* : c_begin = make-object('c_begin)
var *connection-begin* : connection_begin = make-object('connection_begin)
var *dyad-begin* dyad-begin* : dyad_begin = make-object('dyad_begin)
var *fsm* : dsa-conversation-state =
        conversation-finite-state-machine(*cbegin*,
                                            reset)
var *connection-fsm* : dsa-conversation-state =
        conversation-finite-state-machine(*connection-begin*,
                                            reset)
var *dyad-fsm* : dsa-conversation-state =
        conversation-finite-state-machine(*dyad-begin*,
                                            reset)
|#
dsa-dom-re
#|
Copyright (C) 1995 Xerox Corporation All Rights Reserved. Copyright
protection claimed includes all forms and matters of copyrightable
material and information now allowed by statutory or judicial law or
hereinafter granted, inctuding without limitation, material generated
from the software programs which are displayed on the screen such as
icons, screen display looks, etc.
|#
!! in-package("RU")
!! in-grammar('user)
% Primary Object Classes
var DSA-WORLD: objectclass subtype-of user-object
var DSA-SYSTEM-OBJECT: objectclass subtype-of dsa-worid
var PRINCIPAL: objectclass subtype-of dsa-system-object
```

APPENDIX-continued

```
var INFRASTRUCTURE: object-class subtype-of dsa-system-object
%var ACCOUNTING-SERVICE: object-class subtype-of infrastructure
%% Defined in file acctt-domain-model.re
var AGENT: object-class subtype-of infrastructure
%var AGENT-INSTANCE-SERVICE: object-class subtype-of infrastructure
%% Defined in file ais-omain-model.re
%var AUThENTIC-ON-SERVICE: object-class subtype-of infrastructure
%% Defined in file auth-domain-model.re
%var AUTHORIZATION-SERVICE: object-class subtype-of infrastructure
var DIRECTORY-SERVICE: object-class subtype-of infrastructure
%var CONNECTION: object-class subtype-of infrastructure
%% Defined in file dsa-language.re
var DYAD: object-class subtype-of dsa-system-object
var TRANSACTION-METHOD: object-class subtype-of dsa-system-object
var DSA-NAME: object-class subtype-of dsa-system-object
var DSA-CONVERSATION-STATE: object-class subtype-of dsa-system-object
var CONVERSATION-STATE-VALUE: map(dsa-conversation-state, symbol) = (||)
var CONVERSATION: object-class subtype-of dsa-system-object
var CONVERSATION-ID: map(conversation, integer) = {||}
var CONVERSATION-STATE: map(conversation, dsa-conversation-state) = {||}
var ADDRESS-FAMILY: object-class subtype-of infrastructure
var NET-ADDRESS: map(address-family, set(symbol))
        computed-using net-address(@@) = {}
% Attributes
%%% Principal
var Principal-Name: map(principal, dsa-name) = {||}
var Principals-Agent: map(principal, agent) = {||}
var Principal-Papers: map(principal, dsa-name) = {||}
var Principal-IS-Interfaces: map(principal, set(infrastructure))
        computed-using
        principal-is-interfaces(@@) = {}
var acct-record-for-principal: map(principal, string) = {}
%%% Transfered form JohnS's Authentication domain model by LMyers 95.08.16
%%% Things that really belong in dsa-domain-model.re
var NAMED-PRINCIPAL: map(dsa-name, principal) = {I-}
form DEFINE-PRINCIPAL-NAME-CONVERSE
define-fun-converses('principal-name, 'named-principal, true)
% The transaction methods that define a principal
%
var Principal-Transaction-Methods: map(principal, set(transaction-method)) = {||}
%%% Agent
var Agents-Principal: map(agent, principal) ={||}
var Agent-Dyads: map(agent, set(dyad))
computed-using agent-dyads(@@) = {}
var Principal-Authenticated?: map(agent, boolean) = {||}
var Agent-Addresses: map(agent, set(address-family))
computed-using agent-addresses(@@) = {}
% The agent transaction methods supplied by DSA infrastructure
%
var Agent-Transaction-Methods: map(agent, set(transaction-method))
computed-using agent-transaction-methods(@@) = {}
%%% Dyad
% The Principals a Dyad is connecting together
var Dyad-LHS: map(dyad, principal) = {||}
var Dyad-RHS: map(dyad, principal) = {||}
% The conversations being carried by a Dyad
var Dyad-Conversations: map(dyad, set(conversation))
computed-using dyad-conversations(@@) = {}
%%% Transaction method
var Transaction-Method-Name: map(transaction-method, dsa-name) = {||}
var Acct-record-for-transaction-method: map(transaction-method, string) = {||}
var transaction-methods-conversation:
        map(transaction-method, conversation) = {||}
var ROOT-TRANSACTION-METHOD?: map(transaction-method,boolean) = {||}
% The name of the Refine function which executes the transaction method
%
var Transaction-Method-Function: map(transaction-method, symbol) = {||}
%%% Conversation
var Conversation-P-1: map(conversation, dsa-name) = {||}
var Conversation-TM-1: map(conversation, dsa-name) = {||}
var Conversation-P-2: map(conversation, dsa-name) = {||}
var Conversation-TM-2: map(conversation, dsa-name) = {||}
%%% DSA-Name
var DSA-Name-Value: map(dsa-name, symbol) = {||}
% Converse Relationships
form DEFINE-PRINCIPAL-AGENT-CONVERSE
define-fun-converses('principals-agent, 'agents-principal, true)
dsa-lan.re
#||
```

APPENDIX-continued

Copyright (C) 1995 Xerox Corporation. All Rights Reserved Copyright protection claimed includes all forms and matters of copyrightable material and information now allowed by statutory or judicial law or hereinafter granted, including without limitation, material generated from the software programs which are displayed on the screen such as icons, screen display looks, etc.

```
|#
!! in-package("RU")
!! in-grammar('user)
% DSA Language Classes
var DSA-LANGUAGE: object-class subtype-of dsa-world
var DSA-EXPRESSION: object-class subtype-of dsa-language
var DSA-VERB: object-class subtype-of dsa-expression
var DSA-VERB-NAME: map(dsa-verb, symbol) {||}
var DSA-VERB-METHODS: map(dsa-verb, set(transaction-method))
        computed-using dsa-verb-methods(@@) = {}
var DSA-VERB-PARAMETERS: map(dsa-verb, seq(dsa-data))
        computed-using dsa-verb-parameters(@@) = []
var DSA-VERB-RETURN: map(dsa-verb, seq(dsa-data))
        computed-using dsa-verb-return(@@) = []
var DSA-VERB-DESCRIPTION: map(dsa-verb, string) = {||}
%% DSA Protocol Boundary classes
var DSA-CONTEXT: object-class subtype-of dsa-language
var COMMUNIC-ON-INTERFACE: map(dsa-context, set(communication-verb))
        computed-using communication-interface(@@) = {}
%%% The attributes below is here for completeness. Actual declaration appears
%%% in files acct-domain-model.re and directory-domain-model.re, respectively
%var ACCOUNTING-INTERFACE: map(dsa-context, set(accounting-verb))
        computed-using accounting-interface(@@) = {}
%var DIRECTORY-INTERFACE: map(dsa-context, set(directory-verb))
        computed-using directory-interface(@@) = {}
%% Infrastructure Language
var CONNECTION: object-class subtype-of infrastructure
var LHS-CONVERSATION: map(connection, conversation) = {||}
var RHS-CONVERSATION: map(connection, conversation) = {||}
var ADDRESSES: map(connection, address-family) = {||}
var AGENTS-CONNECTIONS: map(agent, set(connection))
        computed-using agents-connections(@@) = {}
var CONVERSATION-BUFFER: object-class subtype-of dsa-language
var CONVERSATION-DATA: map(conversation-buffer, seq(dsa-data))
        computed-using conversation-data(@@) = []
var CONVERSATION-SEND-RECEIVE: map(conversation, conversation-buffer) = {||}
var ANY: objectclass subtype-of dsa-language
var ANY-VALUE: map(any, symbol) {||}
var SELF: object-class subtype-of dsa-language
var self-value: map(self, principal) = {||}
var PARTNER: objectclass subtype-of dsa-language
var partner-value: map(partner, principal) = {||}
var GUTMD: object-class subtype-of dsa-language
var GUTMD-VALUE: map(gutmid, seq(symbol))
        computed-using gutmid-value(@@) = []
var COMMITMENT: object-class subtype-of dsa-language
var COMMITMENT-VALUE: map(commitment, symbol) {||}
var DSA-CREDENTIALS: object-class subtype-of dsa-language
var dsa-credentials-value: map(dsa-credentials, seq(symbol))
        computed-using dsa-credentials-value(@@) = []
var DSA-MEDIUM: object-class subtype-of dsa-language
var DSA-MEDIUM-VALUE: map(dsa-medium, symbol) = {||}
var DSA-TIME: object-class subtype-of dsa-language
var DSA-HOUR: map(dsa-time, integer) = {||}
var DSA-MINUTE: map(dsa-time, integer) = {||}
var DSA-SECOND: map(dsa-time, integer) = {||}
var RESOURCE-TOKEN: object-class subtype-of dsa-language
var RESOURCE-TOKEN-VALUE: map(resource-token, symbol) = {||}
var RETURNED-INDICATOR: object-class subtype-of dsa-language
var RETURNED-INDICATOR-VALUE: map(returned-indicator, symbol) = {||}
var REASON-CODE: objectclass subtype-of dsa-language
var REASON-CODE-VALUE: map(reason-code. symbol) = {||}
var DSA-DATA: object-class subtype-of dsa-language
var DSA-DATA-VALUE: map(dsa-data, seq(symbol))
        computed-using dsa-data-value(@@) = []
var IN-DATA: map(transaction-method, seq(dsa-data))
        computed-using in-data(@@) = []
var OUT-DATA: map(transaction-method, seq(dsa-data))
        computed-using out-data(@@) = []
%%% Communication Infrastructure
var COMMUNICATION-VERB: object-class subtype-of dsa-verb
var C_ABORT: object-class subtype-of communication-verb
var abort-conversation: map(c_abort, conversation) = {||}
```

APPENDIX-continued

```
var abort-reason-code: map(c__abort, reason-code) = {||}
var C__ATTRIBUTES: object-class subtype-of communication-verb
var attributes-conversation: map(c__attributes, conversation) = {||}
var attributes-self: map(c__attributes, dsa-name) = {||}
var attributes-self-signature: map(c__attributes, dsa-credentials) = {||}
var attributes-partner: map(c__attributes, dsa-name) = {||}
var attributes-own-metnod: map(c__attributes, transaction-method) = {||}
var attributes-partner-method: map(c__attributes, transaction-method) = {||}
var attributes-gutmid: map(c__attributes, gutmid) = {||}
var attributes-resource-token: map(c__attributes, resource-token) = {||}
var attributes-commitment: map(c__attributes, commitment) = {||}
var attributes-priority: map(c__attributes, integer) = {||}
var attributes-net-type: map(c__attributes, symbol) = {||}
var attributes-net-address: map(c__attributes, symbol) = {||}
var attributes-medium: map(c__attributes, dsa-medium) = {||}
var attributes-reason-code: map(c__attributes, reason-code) = {||}
var C__BEGIN: object-class subtype-of communication-verb
var begin-self: map(c__begin, dsa-name) = {||}
var begin-self-signature: map(c__begin, dsa-credentials) = {||}
var begin-partner: map(c__begin, dsa-name) = {||}
var begin-partner-signature: map(c__begin, dsa-credentials) = {||}
var begin-partner-method: map(c__begin, transaction-method) = {||}
var begin-resource-token: map(c__begin, resource-token) = {||}
var begin-return: map(c__begin, symbol) = {||}
var begin-commitment: map(c__begin, commitment) = {||}
var begin-priority: map(c__begin, integer) = {||}
var begin-net-type: map(c__begin, symbol) = {||}
var begin-medium: map(c__begin, dsa-medium) = {||}
var begin-conversation: map(c__begin, conversation) = {||}
var begin-reason-code: map(c__begin, reason-code) = {||}
var C__CHANGE__COMMITMENT: object-class subtype-of communication-verb
var change-commitment-conversation: map(c__change__comnutment, conversation) = {||}
var change-commitment-commitment: map(c__change__commitment#commitment) = {||}
var change-commitment-received-signal?: map(c-change__commitment, boolean) = {||}
var change-commitment-reason-code: map(c__change__commitment, reason-code) = {||}
var C__CONFORM: object-class subtype-of communication-verb
var conform-conversation: map(c__conform, conversation) = {||}
var conform-commitment: map(c__conform, commitment) = {||}
var conform-received-signal?: map(c__conform, boolean) = {||}
var conform-reason-code: map(c__conform, reason-code) = {||}
var C__CONFORMATION: object-class subtype-of communication-verb
var conformation-conversation: map(c__conformation conversation) = {||}
var conformation-reason-code: map(c__conformation, reason-code) = {||}
var C__DRAIN: object-class subtype-of communication-verb
var drain-conversation: map(c__drain, conversation) = {||}
var drain-reason-code: map(c__drain, reason-code) = {||}
var C__END: object-class subtype-of communication-verb
var end-conversation: map(c__end, conversation) = {||}
var end-commitment: map(c__end, commitment) = {||}
var end-reason-code: map(c__end, reason-code) = {||}
var C__EXCEPTION: object-class subtype-of communication-verb
var exception-conversation: map(c__exception, conversation) = {||}
var exception-received-signal?: map(c__exception boolean) = {||}
var exception-reason-code: map(c__exception, reason-code) = {||}
var C__RECEIVE: object-class subtype-of communication-verb
var receive-conversation: map(c__receive conversation) = {||}
var receive-data-length: map(c__receive, integer) = {||}
var receive-data: map(c__receive, dsa-data) = {||}
var receive-returned: map(c__receive, returned-indicator) = {
var receive-resource-token: map(c__receive, resource-token) = {||}
var receive-reason-code: map(c__receive, reason-code) = {||}
var C__SEND: object-class subtype-of communication-verb
var send-conversation: map(c__send, conversation) = {||}
var send-data: map(c__send, dsa-data) = {||}
var send-data-length: map(c__send integer) = {||}
var send-received-signal?: map(c__send, boolean) = {||}
var send-reason-code: map(c__send, reasoncode) = {||}
var C__SIGNAL: object-class subtype-of communication-verb
var signal-conversation: map(c-signal conversation) = {||}
var signal-reason-code: map(c-signal reason-code) = {||}
%%%%%%%%%%%%%%%%%%%%%%%%%%%%%%%%%%%%%%%%%%%%%%%%%%%%
%%%%%%%%%%%%%%%%%%%%%%%%%%
%
% The communcation verbs below define the syntax for conversations associated
% with the DSA dyad abstraction.
%
%%%%%%%%%%%%%%%%%%%%%%%%%%%%%%%%%%%%%%%%%%%%%%%%%%%%
%%%%%%%%%%%%%%%%%%%%%%%%%%
var DYAD__ABORT: object-class subtype-of c__abort
```

APPENDIX-continued

```
var DYAD_ATTRIBUTES: object-class subtype-of c_attributes
var DYAD_BEGIN: object-class subtype-of c_begin
var DYAD_CHANGE_COMMITMENT: object-class subtype-of c_change_commitment
var DYAD_CONFORM: object-class subtype-of c_conform
var DYAD_CONFORMATION: object-class subtype-of c_conformation
var DYAD_DRAIN: object-class subtype-of c_drain
var DYAD_END: objectclass subtype-of c_end
var DYAD_EXCE-flON: object-class subtype-of c_exception
var DYAD_RECEIVE: object-class subtype-of c_receive
var DYAD_SEND: object-class subtype-of c_send
var DYAD_SIGNAL: object-class subtype-of c_signal
%%%%%%%%%%%%%%%%%%%%%%%%%%%%%%%%%%%%%%%%%%%%%%%%%%
%%%%%%%%%%%%%%%%%%%%%%%%%%%
%
% The communcation verbs below define the syntax for the connection object
% In DSA, the connection is the abstraction that models the complete
% stack used for infrastructure, for communication between the infrastructure
% services.
%
%%%%%%%%%%%%%%%%%%%%%%%%%%%%%%%%%%%%%%%%%%%%%%%%%%
%%%%%%%%%%%%%%%%%%%%%%%%%%%
var CONNECTION-ABORT: object-class subtype-of c_abort
var CONNECTION-ATTRIBUTES: object-class subtype-of c_attributes
var CONNECTION-BEGIN: object-class subtype-of c_begin
var CONNECTION-CHANGE-COMMITMENT: object-class subtype-of c_change_commitment
var CONNECTION-CONFORM: object-class subtype-of c_conform
var CONNECTION-CONFORMATION: object-class subtype-of c_conformation
var CONNECTION-DRAIN: object-class subtype-of c_drain
var CONNECTION-END: object-class subtype-of c_end
var CONNECTION_EXCEPTION: object-class subtype-of c_exception
var CONNECTION_RECEIVE: object-class subtype-of c_receive
var CONNECTION_SEND: object-class subtype-of c_send
var CONNECTION_SIGNAL: object-class subtype-of c_signal
%%% Agent Instance Service API
var LOOKUP-BY-NAME: object-class subtype-of dsa-verb
var LOOKUP-NAME: map(lookup-by-name dsa-name) = {||}
var LOOKUP-REASON-CODE: map(lookup-by-name reason-code) = {||}
var LOOKUP-BY-ADDRESS: object-class subtype-of dsa-verb
var REGISTER: object-class subtype-of dsa-verb
var REGISTERED-PRINCIPAL: map(register, principal) = {||}
var REGISTER-REASON-CODE: map(register, reason-code) = {||}
var UN-REGISTER: object-class subtype-of dsa-verb
var UN-REGISTER-PRINCIPAL: map(un4egister, principal) = =||}
var UN-REGISTER-REASON-CODE: map(un-register, reason-code) = {||}
dsa-mod.re
#||
Copyright (C) 1995 Xerox Corporation. All Rights Reserved. Copyright
protection claimed includes all forms and matters of copyrightable
material and information now allowed by statutory or judicial law or
hereinafter granted, including without limitation, material generated
from the software programs which are displayed on the screen such as
icons, screen display looks, etc.
!! in-package("RU-RI")
!! in-grammar('user)
%%%%%%%%%%%%%%%%%%%%%%%%%%%%%%%%%%%%%%%%%%%%%%%%%%
%%%%%%%%%%%%%%%%%%%%%%%%%%
%
% Since I copied the source from the intervista file, I'll leave the intro
% stuff helow in the file. I suspect as I customize the code the information
% here is less and less relevant. I'll leave it for now.
%
%%%%%%%%%%%%%%%%%%%%%%%%%%%%%%%%%%%%%%%%%%%%%%%%%%
%%%%%%%%%%%%%%%%%%%%%%%%%%
#||
This file contains programs that shows the DSA Model. The top level interface
is the function CREATE-DSA-MODEL-GRAPHICS which takes as its only argument a
DSA object in a DSA-SYSTEM-MODEL, and brings up a window displaying four
subwindows depicting several views of the model. For example, in the REFINE
interface window, you can try it with:
:eval create-dsa-model-graphics(*top)
The implementation is as follows:
For each object O in the representation of the program, we introduce an
associated ICON which is stored as the value of the ICON-FOR-TREE-NODE-1
attribute of the object O. ICON-FOR-TREE-NODE-1 has an inverse attribute
called TREE-NODE-FOR-ICON-1.
Whenever a parent object P is reiated to a child object C via a tree
attribute A, we introduce a link L between the associated icons for P
and C. The link L is such that:
  source(L) = icon-for-tree-node-1(P) &
```

APPENDIX-continued

```
  target(L) = icon-for-tree-node-1(C) &
  label(L) = [symbol-to-string(name(A))]
The third line above indicates that the label of the link is the name
of the attribute A.
To display a REFINE program whose root object is R, we:
1. Make a DIAGRAM-SURFACE S and a DIAGRAM-WINDOW V that views S
2. Create icons and links as described above
3. Invoke the LAYOUT-TREE function on the icon associated with the root
   object R. This arranges the icons in a tree layout.
4. Use the REFRESH-WINDOW function to show the diagram-window Y.
|#
%%%%%%%%%%%%%%%%%%%%%%%%%%%%%%%%%%%%%%%%%%%%%%%%%%%
%%%%%%%%%%%%%%%%%%%%%%%
%
% This section contains the code for the ASTs and Graphing of DSA Objects.
%
%%%%%%%%%%%%%%%%%%%%%%%%%%%%%%%%%%%%%%%%%%%%%%%%%%%
%%%%%%%%%%%%%%%%%%%%%%%
var *layout-trees-using-direct-links?* : boolean = false
% This attribute links each object in a REFINE program representation to an
% icon that represents the object. The icon is computed based on the class
% of the object, and is cached. The inverse attribute is TREE-NODE-FOR-ICON-1.
%
var icon-For-Tree-Node-1: map(object, icon)
  computed-using icon-for-tree-node-1(d) = make-icon-for-tree-node(d)
form Cache-Icon-For-Tree-Node
  cache('icon-for-tree-node-1, true)
var Tree-Node-For-Icon-1:
  map(icon, object) = {||}
form Tree-Node-Icon-Converses
  define-fun-converses('icon-for-tree-node-1, 'tree-node-for-icon-1, true)
function Make-Icon-For-Tree-Node (tn: object): icon =
let (new-icon = make-object('icon),
  new-label = make-label-for-tree-node(tn))
height-width-ratio(new-icon) <- 0.4;
size-factor(new-icon) <- 3.5;
icon-type(new-icon) <- 'box;
label(new-icon) <- new-label;
new-icon
% This function is passed an object in a REFINE program. and returns a
% label for the icon associated with the object. If the object is an
% RE::BINDING or RE::BINDING-REF, then it uses the name of the object for a
% label. If the object is a literal (e.g., an integer constant) then it
% uses the literal value itself. Otherwise, it uses the class of the
% object.
function MAKE-LABEL-FOR-TREE-NODE (tn: object): seq(string)
  computed-using
  tn = 'v' => make-label-for-tree-node(tn) = make-label-for-tree-node(v),
  re::binding(tn)
  => make-label-for-tree-node(tn) = [symbol-to-string(name(tn))],
  (re::literal-integer-op(tn) or
  re::literal-real-op(tn) or
  re::literal-character-op(tn) or
  re::literal-string-op(tn) or
  re::quote-op(tn) or
  re::true-op(tn) or
  re:: false-op(tn))
  => make-label-for-tree-node(tn) [re::stringize-node(tn)],
  make-label-for-tree-node(tn) = [symbol-to-string(re::class(tn))]
% This is the top level interface. It creates a DIAGRAM-SURFACE and a
% DIAGRAM-WINDOW, makes the appropriate icons and links, lays out the
% tree and displays the DIAGRAM-WINDOW.
function GRAPH-DSA-OBJECT (tn: object): diagram-window =
let (surf = make-object('diagram-surface),
  dw = make-object('diagram-window))
with-screen-updates-disabled(
dw,
(window-titie(dw) <- format(false,
        "Graph for ~A",
        re::stringize-node(tn));
make-icons-and-links-for-program-tree(tn, surf);
layout-tree(icon-for-tree-node-1(tn), 'target-icons,
  'down, 2.3, 1.5, 10, false)));
window-mouse-button-functions(dw) <-
        ['dsa-diagram-window-mouse-button-function];
mouse-over-object-function(dw) <- 'write-something;
% the view-surface function arranges window DW so that it shows the
% entire contents of the surface SURF, and then refreshes the window
% DW.
```

APPENDIX-continued

```
let (tn-region = bounding-region({icon-for-tree-node-1(tn)}),
    tn-position = position(icon-for-tree-node-1(tn)))
% The stuff below computes a new region in which to draw the graph
% with the icon represent the node tn at the center. The complicated
% formula is my attempt at avoiding fractions in the position
% computation. Also the resulting window inside the tf-window below
% still fails to place the icon in the middie. I'll solve that problem
% later. For now the icons and links show up with labels visible.
let (new-region = make-region(
    (3 * region-left(tn-region)) - (2 * point-x(tn-position)),
            (3 * region-bottom(tn-region)) - (2 * point-y(tn-position)),
            3 * region-width(tn-region),
            3 * region-height(tn-region)))
  surface-viewed(dw) <- surf;
  view-region(dw, new-region);
  dw
function DISPLAY-AND-PRETTY-PRINT-DSA-OBJECT (tn: object,
                                              source : window) : msp-window =
let (dsa-w = make-object('msp-window),
    *mouse-sensitive-printing?* = true,
    *print-grammar-name* = 'user)
  window-title(dsa-w) <- "DSA NODE";
  msp-format(dsa-w, "~\\pp\\", tn);
  register-tf-subwindow(dsa-w, source);
  if-reshape-sub-window(source, dsa-w, 'lower-left);
  %mouse-handler(dsa-w) <- 'default-window-mouse-handler;
  expose-window(dsa-w)
function DSA-DIAGRAM-WINDOW-MOUSE-BUTTON-FUNCTION (mouse-click: any-type,
                                                    obj : object,
                                                    pos: point,
                                                    win : diagram-window) =
let (home-window: window = super-window(win))
if icon(obj)
then
  (if mouse-button-match-general?(mouse-click, 'mouse-left)
    then user-move-icon(win, obj)
  elseif mouse-button-match-general?(mouse-click, 'mouse-middle)
    then delete-icon(obj)
  elseif mouse-butwn-match-general?(mouse-click, 'mouse-right)
    then display-and-pretty-print-dsa-object(
                    tree-node-for-icon-1(obj), home-window)
  elseif mouse-button-match-general?(mouse-click, 'mouse-left,
                                     '::down, false, ':: shift?, true)
    then window-active?(win) <- false)
function WRITE-SOMETHING (win: window,
                          obj: any-type,
                          reg: any-type)
computed-using
msp-window(win) => write-something(win, obj, reg) = (
  tf-write-mouse-doc-line(win, "Mouse Buttons: \"Left\" is \"SHOW AST DIAGRAM\"");
  enumerate h over msp-window-object-hulls(win, obj)
  do draw-hull-outline(win, h);
  % the line beiow is NOT supported by Reasoning, needs to be
  % replaced by supported interfaces and functions(rsp)
  ri::hyperlink-to-visible-windows-mouse-over-object-function(win, obj, reg)),
diagrann-window(win) => write-something(win, obj, reg) = (
  % the line below is NOT supported by Reasoning, needs to be
  % replaced by supported interfaces and functions(rsp)
  ri::draw-icon-or-link-outline(win, obj, reg);
  tf-write-mouse-doc-line(win, "Mouse Buttons: Left is \"MOVE\", Middle is \"DELETE\", Right is
\"PRETTY-PRINT\"");
  ri::hyperlink-to-visible-windows-mouse-over-object-function(win, obj, reg)),
table-window(win) => write-something(win, obj, reg) = (
  tf-write-mouse-doc-line(win, "Left: Change State")),
outlipe-window(win) => write-something(win, obj, reg) = (
  tf-wn.te-raouse-doc-line(win, "Double-click Left: expand"))
% This function recursively traverses the program rooted at TN, introduces
% an icon for each object, and creates links between icons that represent
% immediate ancestors in the program tree. It puts each icon created on the
% diagram-surface SURF.
function MAKE-ICONS-AND-LINKS-FOR-PROGRAM-TREE
  (tn: object, surf: diagram-surface) =
% First, put the icon associated with TN into the ICONS attribute of SURF.
i = icon-for-tree-node-1(tn) --> i in icons(surf);
% Next, enumerate the children of TN. For each child C, create a link
% between the icon for TN and the ICON for C, and label it with the name
% of the attribute that links TN to C. Then invoke this function
% recursively on C.
enumerate c over kids(tn) do
```

APPENDIX-continued

```
(if ~(linked?(icon-for-tree-node-1(tn), icon-for-tree-node-1(c)))
 then (let (new-link = make-object('link))
   dynamic?(new-link) <- true;
    label-boxed?(new-link) <- false;
   source(new-link) <- icon-for-tree-node-1(tn);
   target(new-link) <- icon-for-tree-node-1(c);
   link-type(new-link) <- 'piecewise-linear;
   label(new-link) <- make-label-for-up-link(c)));
 make-icons-and-links-for-program-tree(c, surf)
function MAKE-LABEL-FOR-UP-LINK (tn: object): seq(string) =
[symbol-to-string(name(re::parent-link(tn)))]
%%%%%%%%%%%%%%%%%%%%%%%%%%%%%%%%%%%%%%%%%%%%%%%%%%%%
%%%%%%%%%%%%%%%%%%%%%%%%%%%%%
%
% This section contains code for the Outline windows, hopefully used to
% display the DSA application script.
%
%%%%%%%%%%%%%%%%%%%%%%%%%%%%%%%%%%%%%%%%%%%%%%%%%%%%
%%%%%%%%%%%%%%%%%%%%%%%%%%%%%
function OUTLINE-BROWSE-AST (root: object) : outline-window =
 let (ow = make-object('outline-window))
 window-title(ow) <- "DSA AST Outline";
 mouse-over-object-function(ow) <- 'write-something;
 mouse-handler(ow) <- 'ast-outline-mouse-handler;
 outline-root-item(ow) <- make-ast-item(root);
 ow
var ITEM-TO-AST-OBJECT: map(outline-item, object) = {||}
function MAKE-AST-ITEM (obj: object) : outline-item =
 let (new-item: outline-item = make-object('outline-item))
 item-string(new-item) <- string-downcase(symbol-name(class(obj)));
 item-to-ast-object(new-item) <- obj;
 new-item
function EXPAND-AST-ITEM (item : outline-item) =
 sub-items(item) <- [make-ast-item(k) | (k) k in kids(item-to-ast-object(item))]
function AST-OUTLINE-MOUSE-HANDLER (mouse-event: symbol,
                                    item: object,
                                    pos : point,
                                    ow : outline-window) =
if outline-item(item)
then (if mouse-event = 'mouse-left
      then expand-ast-item(item)
      elseif mouse-event = 'mouse-middle
      then sub-items(item) <- [])
%%%%%%%%%%%%%%%%%%%%%%%%%%%%%%%%%%%%%%%%%%%%%%%%%%%%
%%%%%%%%%%%%%%%%%%%%%%%%%%%%%
%
% This section contains the code for the DSA State Table.
%
%%%%%%%%%%%%%%%%%%%%%%%%%%%%%%%%%%%%%%%%%%%%%%%%%%%%
%%%%%%%%%%%%%%%%%%%%%%%%%%%%%
var *communication-verbs* : seq(symbol) = ['cabort, 'cattributes, 'cbegin,
                                           'csend, 'creceive]
                              function SHOW-STATE-TABLE (): table-window =
                                let (tbl = make-object('table-window))
                                window-titie(tbl) <- "Conversation State Transition";
                                table-window-organization(tbl) <- '::row;
                                table-window-columns(tbl) <- [make-labelled-column(str) | (str)
                              str in ["reset", "intialize",
                                      "send", "receive", "send-pending",
                                      "confirm"]];
table-window-rows(tbl) <- [make-row-for-verb(v)
                           | (v) v in *commumcation-verbs*];
refresh-window(tbl);
tbl
function MAKE-LABELLED-COLUMN (str : string): table-column =
 let (col = make-object('table-column))
 table-element-label(col) <- [str];
 col
function MAKE-ROW-FOR-VERB (v: symbol) : table-row =
 let (row = make-object('table-row))
 table-element-label(row) <- [];
 table-element-cells(row) <- [];
 row
%%%%%%%%%%%%%%%%%%%%%%%%%%%%%%%%%%%%%%%%%%%%%%%%%%%%
%%%%%%%%%%%%%%%%%%%%%%%%%%%%%
%
% This section contains code for the DSA AST's.
%
%%%%%%%%%%%%%%%%%%%%%%%%%%%%%%%%%%%%%%%%%%%%%%%%%%%%
```

APPENDIX-continued

```
%%%%%%%%%%%%%%%%%%%%%%%
%%%%%%%%%%%%%%%%%%%%%%%%%%%%%%%%%%%%%%%%%%%%%%%
%%%%%%%%%%%%%%%%%%%%%%%%%
%
% This section contains code building an auxillary diagram window displaying
% the graph starting at node n. Note that this fuction is called by selecting
% the left mouse button while the cursor is over an object in a msp-window.
%
%%%%%%%%%%%%%%%%%%%%%%%%%%%%%%%%%%%%%%%%%%%%%%%
%%%%%%%%%%%%%%%%%%%%%%%%%
function SHOW-DSA-PROGRAM (tn: object) : msp-window =
  let (w = make-object('msp-window),
    *mouse-sensitive-printing?* = true,
    *print-grammar-name* = 'user)
  window-title(w) <- "Pretty Print DSA Object";
  window-mouse-button-functions(w) <-
          ['dsa-msp-window-mouse-button-function];
  mouse-over-object-function(w) <- 'write-something;
  msp-format(w, "~\\pp\\", tn);
  w
function DISPLAY-DIAGRAM (n: object, source: window) =
  let (disp : diagram-window = graph-dsa-object(n))
  register-tf-subwindow(disp, source);
  tf-reshape-sub-window(source, disp, 'upper-right);
  refresh-window(disp);
  expose-window(disp)
function DSA-MSP-WINDOW-MOUSE-BUTTON-FUNCTION (mouse-click: any-type,
                                              obj : object,
                                              pos : point,
                                              win: window) =
  let (home-window : window = super-window(win))
  if msp-window(win)
    then
      (if mouse-button-match-general?(mouse-click, 'mouse-left)
         then display-diagram(obj, home-window))
%%%%%%%%%%%%%%%%%%%%%%%%%%%%%%%%%%%%%%%%%%%%%%%
%%%%%%%%%%%%%%%%%%%%%%%%%
%
% This section contains code that builds a edit window allowing entry of
% ASCII text describing the application for which a specification will be
% derived. Parsing this file creates the nodes that the remaining subwindows
% display.
%
%%%%%%%%%%%%%%%%%%%%%%%%%%%%%%%%%%%%%%%%%%%%%%%
%%%%%%%%%%%%%%%%%%%%%%%%%
function DSA-SCRIPT-PROGRAM (script: string): msp-window =
  let (aw = make-object('msp-window))
  window-title(aw) <- "DSA Application Script";
  msp-format(aw, "~s", script);
  aw
%%%%%%%%%%%%%%%%%%%%%%%%%%%%%%%%%%%%%%%%%%%%%%%
%%%%%%%%%%%%%%%%%%%%%%%%%
%
% This section contains code for the file browser window. The plan is to allow
% the developer the option of selecting a file from the browser, open their
% favorite editor, edit the file (change the dsa spec or model), execute the
% appropriate build command, etc.
%
%%%%%%%%%%%%%%%%%%%%%%%%%%%%%%%%%%%%%%%%%%%%%%%
%%%%%%%%%%%%%%%%%%%%%%%%%
var *bobs-directory* : string =
        "/project/xrx/specifications/refine/bob/dsa-project/"
function MAKE-DSA-FILE-BROWSER() =
  'let (dsa-browser: fb-window = make-file-browser-window())
  window-title(dsa-browser) <- "DSA File Browser";
  mouse-handler(dsa-browser) <- 'dsa-file-browser-mouse-handler;
  browse-directory(*bobs-directory*, dsa-browser);
  dsa-browser
function DSA-FILE-BROWSER-MOUSE-HANDLER (button, obj, pos, win) =
  if button = 'mouse-right & lisp::pathname(obj)
    then edit-file(obj)
    else file-browser-window-mouse-handler (button, obj, pos, win)
dsa-sco.re
#|
```

Copyright (C) 1995 Xerox Corporation. All Rights Reserved. Copyright
protection claimed includes all forms and matters of copyrightable
material and information now allowed by statutory or judicial law or
hereinafter granted, including without limitation, material generated
from the software programs which are displayed on the screen such as APPENDIX-continued

```
icons, screen display looks, etc.
‖#
!! in-package("RU")
!! in-grammar('user)
var REFERENCES: map(principal, set-principal-ref))
        computed-using references(@@) = {}
var REF-TO: map-rincipal-ref, principal) = {‖}
form DEFINE-REFERENCES-CONVERSE
  define-fun-converses('ref-to, 'references, true)
function SCOPE-DSA-SYSTEM (system: dsa-system) =
 let (dsa-principals = descendants-of-class(system, 'principal),
   dsa-principals-refs = descendants-of-class(system, 'principal-ref))
 princpl-ref in dsa-principals-refs &
 princpl in dsa-principals &
 principal-name(princpl) = principal-ref-name(princpl-ref)
 -->
 ref=to(princpl-ref) = princpl
dsa-scr.re
#‖
Copyright (C) 1995 Xerox Corporation. All Rights Reserved. Copyright
protection claimed includes all forms and matters of copyrightable
material and information now allowed by statutory or judicial law or
hereinafter granted, including without limitation, material generated
from the software programs which are displayed on the screen such as
icons, screen display looks, etc.
‖#
!! in-package("RU")
!! in-grammar(user)
var *dsa-script* : string ="
 dsa-system WidgetsRus
 component principal bill : person;
 component principal accounts-payable : service;
 component principal accounting : infrastructure;
 component principal clearinghouse : infrastructure;
 component principal monthly-statement: document;
 component principal print-service : service
 start
 make-request(principal bill, accounting-application {},
        principal accounts-payable, payme{});
 make-request(principal bill, accounting-application{},
        principal accounting, send0journal-entry {});
 make-request(principal bill, accounting-application {},
        principal clearinghouse, find-service {});
 make-request(principal monthly-statement, opendoc-shell{},
        principal print-service, print{})
 stop
"
dsa-tre-re
#‖
Copyright (C) 1995 Xerox Corporation. All Rights Reserved. Copyright
protection claimed includes all forms and matters of copyrightable
material and information now allowed by statutory or judicial law or
hereinafter granted, including without limitation, material generated
from the software programs which are displayed on the screen such as
icons, screen display looks, etc.
‖#
!! in-package("RU")
!! in-grammar('user)
form DECLARE-DSA-TREE-ATTRIBUTES
define-tree-attributes('dsa-system, ∴'system-name,
                      'system-components,
                      'system-statements,
                      'acct-record-for-system});
define-tree-attributes('component, {'component-principal,
                      'component-type});
                      define-tree-attributes('principal, {'principal-name,
                                    'in-data,
                                    'out-data,
                                    'principals-capability,
                                    'principals-authorization-tickets,
                                    'principal-credentials,
                                    'principal-sc,
                                    'principal-transaction-methods,
                      'acct-record-for-principal});
define-tree-attributes('dsa-data, {'dsa-data-value});
define-tree-attributes('agent, {'agent-dyads,
                                    'principal-authenticated?,
                                    'agents-connections,
                      'agent-addresses,
```

APPENDIX-continued

```
                              'agent-trasaction-methods});
define-tree-attributes('dsa-verb, {'dsa-verb-name,
                              'dsa-verb-methods,
                              'dsa-verb-parameters,
                              'dsa-verb-return,
                                            'dsa-verb-description});
define-tree-attributes('dsa-conversation-state,
                              {'conversation-state-value});
define-tree-attributes('conversation, {'conversation-id,
                                            'conversation-send-receive,
                                            'conversation-state});
define-tree-attributes('c__abort, {'abort-conversation,
                              'abort-reason-code});
define-tree-attributes('dsa-name, {'dsa-name-value});
define-tree-attributes('request, {requestor,
                              'requestee,
                              'from-method,
                                            'to-method});
define-tree-attributes('dyad, {'dyad-lhs,
                              'dyad-rhs,
                                            'dyad-conversations});
define-tree-attributes('reason-code, {'reason-code-value});
define-tree-attributes('c__begin, {'begin-self,
                                            'begin-self-signature,
                                            'begin-partner,
                                            'begin-partner-signature,
                                            'begin-partner-metnod,
                                            'begin-resource-token,
                                            'begin-return,
                                            'begin-commitment,
                                            'begin-priority,
                                            'begin-net-type,
                                            'begin-medium,
                                            'begin-conversation,
                                            'begin-reason-code });
define-tree-attributes('c__change__commitment, {'change-commitment-conversation,
                                            'change-commitment-commitment,
                                            'change-commitment-received-signal?,
                                            'change-commitment-reason-code});
define-tree-attributes('c__conform, }'conform-conversation,
                                            'conform-commitment,
                                            'conform-received-signal?,
                                            'conform-reason-code });
define-tree-attributes('c__conformation, {'conformation-conversation,
                                            'conformation-reason-code });
define-tree-attributes('c__drain, {'drain-conversation,
                                            'drain-reason-code });
define-tree-attributes('c__end, {'end-conversation,
                                            'end-commitment,
                                            'end-reason-code});
define-tree-attributes('c__exception, {'exception-conversation,
                                            'exception-received-signal?
                                            'exception-reason-code});
define-tree-attributes('c-signal, {'signal-conversation,
                                            'signal-reason-code});
define-tree-attributes('c__send, {'send-conversation,
                                            'send-data,
                                            'send-data-length,
                                            'send-received-signal?,
                                            'send-reason-code});
define-tree-attributes('c__receive, {'receive-conversation,
                                            'receive-data,
                                            'receive-data-length,
                                            'receive-returned,
                                            'receive-resource-token,
                                            'receive-reason-code});
define-tree-attributes('gutmid, {'gutmid-value });
define-tree-a(tributes('returned-indicator, {'returned-indicator-value));
define-tree-attributes('commitment, {'commitment-value });
define-tree-attributes('dsa-medium, {'dsa-medium-value });
define-tree-attributes('c__attributes, {'attributes-conversation,
                                            'attributes-self,
                                            'attributes-self-signature,
                                            'attributes-partner,
                                            'attributes-own-method,
                                            'attributes-partner-method,
                                            'attributes-gutmid,
                                            'attributes-resource-token,
                                            'attributes-commitment,
```

APPENDIX-continued

```
                                            'attributes-priority,
                                            'attributes-net-type,
                                            'attributes-net-address,
                                            'attributes-medium,
                                            'attributes-reason-code});
define-tree-attributes('dsa-credentials, {'dsa-credentials-value});
define-tree-attributes('dsa-time, {'dsa-hour,
                                            'dsa-minute,
                                            'dsa-second});
define-tree-attributes('connection, {'addresses,
                                            'lhs-conversation,
                                            'rhs-conversaiton});
define-tree-attributes('conversation-buffer, {'conversation-data});
define-tree-attributes('transaction-method,
                                            {'transaction-method-name,
                                            'transaction-methods-conversation,
                                            'transaction-methods-capability,
                                            'transaction-methods-authorization-tickets,
                                            transaction-method-function,
                                            'acct-record-for-transaction-method })
dsa-win.re
#|
Copyright (C) 1995 Xerox Corporation. All Rights-Reserved. Copyright
protection claimed includes all forms and matters of copyrightable
material and information now allowed by statutory or judicial law or
hereinafter granted, including without limitation, material generated
from the software programs which are displayed on the screen such as
icons, screen display looks, etc.
|#
!! in-package("RU-RI")
!! in-grammar('user, 'tf-menu-grammar)
function MAKE-DSA-TF-WINDOW (): tf-window =
 let (tf: tf-window = make-object('tf-window))
 install-tf-control-panel-window(tf);
 window-title(tf) <- "DSA Specification";
 window-region(tf) <- make-region(100, 100, 1000, 700);
 tf-window-menus(tf) <-
 [menu file "File"
   item open "Open" do-open "Open a file (NOT IMPLEMENTED)",
   item close "Close" do-close "Close selected window",
   item save "Save" do-save "Save this file (NOT IMPLEMENTED)",
   item exit "Exit" do-exit "Exit DSA-Specification and close all windows'",
  menu edit "Edit"
   item copy "Copy" do-copy ""copy the selected item (NOT IMPLEMENTED)",
   item insert "Insert" do-insert "Insert from kill buffer (NOT IMPLEMENTED)",
   item delete "Delete" do-delete "Delete the selected item (NOT IMPLEMENTED)'",
  make-tf-windows-menu(),
  menu model "Create DSA Model"
   item parse "Parse Script" do-parse-script "Parse DSA Script" ,
    item model "Create Model" do-create-dsa-model "Create a DSA Model'"
   ];
 tf
function do-exit (tfw: tf-window, do-exit) =
 window-active?(tfw) <- false
function do-close(tfw: tf-window, do-close) =
 window-active?(selected-sub-window(tfw)) <- false
function UPDATE-WINDOW (win : ri::window, tn : re::object)
 computed-using
 diagram-window(win) =>update-window(win, tn) = (
 let (surf = surface-viewed(win))
 with-screen-updates-disabled(
  win,
  (make-icons-and-links-for-program-tree(tn, surf);
  layout-tree(icon-for-tree-node-1 (tn), 'target-icons,
          'down, 2.3, 1.5, 10, false)));
 %let (new-region = bounding-region({icon-for-tree-node-1(tn)}))
 %view-region(win, new-region);
 view-surface(win, surf);
 refresh-window(win);
 expose-window(win)),
 msp-window(win) => update-window(win, tn) = (
 let (*mouse-sensitive-printing?* = true,
         *print-grammar-name* = 'user)
  clear-msp-window(win);
  msp-format(win, ~\\pp\\", tn)),
outline-window(win) => update-window(win, tn) = outline-browse-ast(tn),
table-window(win) => update-window(win, tn) = show-state-table()
function do-parse-script(tfw : tf-window, do-parse-script) =
 let (model = ru::parse-dsa-system(ru::*dsa-script*))
```

APPENDIX-continued

```
enumerate x over {y | (y) y in ri::home-objects(tfw) &
                      (diagram-window(y) or table-window(y) or
                      msp-window(y) or outline-window(y))} do
                      update-window(x, model)
function do-create-sa-model(tfw :tf-window, do-create-dsa-model) =
if diagram-window(selected-sub-window(tfw)) then (
  let (selected-icon = get-icon(selected-sub-window(tfw), "Select DSA System Node"))
  let (new-model =
        ru::create-sa-model(ru-ri::tree-node-for-icon-1(selected-icon)))
  let (new-dsa-system: ru::dsa-system = ru::*top*)
  enumerate x over {y | (y) y in ri::home-objects(tfw) &
        (diagram-window(y) or table-window(y) or
        msp-window(y) or outline-window(y)) do
        update-window(x, new-sa-system));
tf-write-mouse-doc-line(tfw, "Select the AST Diagram Window")
%%%%%%%%%%%%%%%%%%%%%%%%%%%%%%%%%%%%%%%%%%%%%%%%%%%%%%
%%%%%%%%%%%%%%%%%%%%%%%%%%%
%
% This section contains the top level function called to create the top level
% window containing the subwindows above. It is called passing the root node
% of the DSA model that is to be graphicaily displayed.
%
%%%%%%%%%%%%%%%%%%%%%%%%%%%%%%%%%%%%%%%%%%%%%%%%%%%%%%
%%%%%%%%%%%%%%%%%%%%%%%%%%%
function CREATh-DSA-GRAPHIC-MODEL (script: slring): tf-window =
  let (tn = ru::parse-dsa-system(script))
  let (dw : diagram-window = graph-dsa-object(tn),
    ow : outline-window = outline-browse-ast(tn),
    tw : table-window = show-state-table(),
    mw: msp-window = show-dsa-program(tn),
    aw : msp-window = dsa-script-program(script),
    fbw: fb-window = make-dsa-fille-browser(),
    tf-win : tf-window = make-dsa-tf-window())
  register-tf-subwindow(tw, tf-win);
  register-tf-subwindow(dw, tf-win);
  register-tf-subwindow(ow, tf-win);
  register-tf-subwindow(mw, tf-win);
  register-tf-subwindow(aw, tf-win);
  register-tf-subwindow(fbw, tf-win);
  tf-reshape-sub-window(tf-win, tw, 'upper-right);
  tf-reshape-sub-window(tf-win, ow, 'upper-right);
  tf-reshape-sub-window(tf-win, dw, 'lower-left);
  tf-reshape-sub-window(tf-win, mw, 'upper-left)t,
  tf-reshape-sub-window(tf-win, aw, 'lower-right);
  tf-reshape-sub-window(tf-win, fbw, 'right-half);
  expose-window(dw);
  expose-window(mw);
  expose-window(aw);
  expose-window(tw);
  expose-window(tf-win);
  tf-win
%var *DSA-TF-WINDOW* : tf-window = expose-window(make-dsa-tf-window())
ru-ri-p.re
#||
Copyright (C) 1995 Xerox Corporation. All Rights Reserved. Copyright
protection claimed includes all forms and matters of copyrightable
material and information now allowed by statutory or judicial law or
hereinafter granted, including without limitation, material generated
from the software programs which are displayed on the screen such as
icons, screen display looks, etc.
||#
!! in-package("RU")
!! in-grammar('user)
"Make the REFINE-USER-REFINE-INTERFACE package. This package is a standard
REFINE user package but also includes all of the INTERVISTA symbols."
form MAKE-RI-USER-PACKAGE
  make-user-package('refine-user-refine-interface,
                    '::nicknames, {'ru-ri},
                    '::use, {'ri})
```

What is claimed is:

1. A method for controlling communication on a broadband communication system in which communication takes place between an invoking principal that uses an information service and an invoked principal that provides the information service, comprising the steps of:

identifying a first agent for the invoking principal and a second agent for the invoked principal; and defining a set of transaction methods, accessible by said agents, for establishing a dyad between the invoking principal and the invoked principal, said transaction methods providing communications services to the dyad for generating at both the first agent and the second agent an accounting record for the information service; the accounting records including billing processes and being transmitted by the first agent and the second agent to an accounting service.

2. The method of claim 1, further comprising the step of recording payment required by the first agent for the services received from the second agent.

3. The method of claim 1, wherein the transaction methods provide communications services that include authentication.

4. The method of claim 1, wherein the transaction methods provide communications services that include authorization.

5. A document services architecture facilitating communication over a broadband communication system in which communication takes place between an invoking principal that uses an information service and an invoked principal that provides the information service, comprising:

means for identifying a first agent for the invoking principal and a second agent for the invoked principal; and means for defining a set of transaction methods, accessible by said agents, for establishing a dyad between the invoking principal and the invoked principal, said transaction methods providing communications services to the dyad for generating at both the first agent and the second agent an accounting record for the information service; the accounting records including billing processes and being transmitted by the first agent and the second agent to an accounting service.

6. The document services architecture of claim 5, wherein the invoked principal is a telephone service.

7. The document services architecture of claim 6, wherein the invoking principal is a user of the telephone service.

\* \* \* \* \*

UNITED STATES PATENT AND TRADEMARK OFFICE
CERTIFICATE OF CORRECTION

| | |
|---|---|
| PATENT NO. | : 6,073,160 |
| APPLICATION NO. | : 08/768420 |
| DATED | : June 6, 2000 |
| INVENTOR(S) | : Paul V Grantham et al. |

It is certified that error appears in the above-identified patent and that said Letters Patent is hereby corrected as shown below:

Column 1, line 26, insert as a new paragraph:

This invention was made with Government support under DABT63-92-C-0034 awarded by DARPA. The Government has certain rights in this invention.

Signed and Sealed this

Eleventh Day of March, 2008

JON W. DUDAS
*Director of the United States Patent and Trademark Office*